US012239960B2

(12) United States Patent
da Silva et al.

(10) Patent No.: US 12,239,960 B2
(45) Date of Patent: Mar. 4, 2025

(54) ZEOLITE COMPOSITES FOR WATER PURIFICATION

(71) Applicant: UWM Research Foundation, Inc., Milwaukee, WI (US)

(72) Inventors: Marcia Renata Quadros da Silva, Oak Creek, WI (US); David Garman, Lindfield (AU); Mohsen Manjili, Glendale, WI (US); Yan Zhang, Tianjin (CN)

(73) Assignee: UWM Research Foundation, Inc., Milwaukee, WI (US)

( * ) Notice: Subject to any disclaimer, the term of this patent is extended or adjusted under 35 U.S.C. 154(b) by 176 days.

(21) Appl. No.: 17/153,792

(22) Filed: Jan. 20, 2021

(65) Prior Publication Data
US 2021/0252483 A1    Aug. 19, 2021

Related U.S. Application Data

(60) Provisional application No. 63/138,712, filed on Jan. 18, 2021, provisional application No. 62/963,460, filed on Jan. 20, 2020.

(51) Int. Cl.
*C01B 32/23* (2017.01)
*B01J 20/18* (2006.01)
(Continued)

(52) U.S. Cl.
CPC ......... *B01J 20/3204* (2013.01); *B01J 20/183* (2013.01); *B01J 20/186* (2013.01);
(Continued)

(58) Field of Classification Search
CPC .... B01J 20/3204; B01J 20/183; B01J 20/186; B01J 20/3071; B01J 20/3078;
(Continued)

(56) References Cited

U.S. PATENT DOCUMENTS

| 6,936,176 B1 | 8/2005 | Greene III et al. |
| 9,353,037 B2 | 5/2016 | Chu et al. |

(Continued)

FOREIGN PATENT DOCUMENTS

| CN | 101298040 A | 11/2008 |
| EP | 3071316 A1 | 9/2016 |

(Continued)

OTHER PUBLICATIONS

WO201617827—see NPL fo rmachine translation, 2016.*

(Continued)

*Primary Examiner* — Smita S Patel
(74) *Attorney, Agent, or Firm* — Michael Best & Friedrich LLP

(57) ABSTRACT

Zeolites having surface modification with graphene oxide, reduced graphene oxide, or a sulfide have utility in removing pollutants from a water supply. Pollutants include Persistent Organic Pollutants (POPs) and heavy metals, such as lead. POPs are adsorbed onto zeolites having surface modification with graphene oxide and/or reduced graphene oxide. Heavy metals are adsorbed onto zeolites having surface modification with a sulfide.

11 Claims, 95 Drawing Sheets
(46 of 95 Drawing Sheet(s) Filed in Color)

(51) Int. Cl.
| | |
|---|---|
| *B01J 20/30* | (2006.01) |
| *B01J 20/32* | (2006.01) |
| *C02F 1/28* | (2023.01) |
| C02F 101/20 | (2006.01) |
| C02F 101/34 | (2006.01) |
| C02F 101/36 | (2006.01) |

(52) U.S. Cl.
CPC ....... *B01J 20/3071* (2013.01); *B01J 20/3078* (2013.01); *B01J 20/3085* (2013.01); *B01J 20/3223* (2013.01); *B01J 20/3234* (2013.01); *B01J 20/3285* (2013.01); *C01B 32/23* (2017.08); *C02F 1/288* (2013.01); *B01J 2220/46* (2013.01); *C01B 2204/04* (2013.01); *C01P 2002/82* (2013.01); *C01P 2002/85* (2013.01); *C01P 2004/03* (2013.01); *C02F 1/281* (2013.01); *C02F 1/283* (2013.01); *C02F 1/285* (2013.01); *C02F 2101/20* (2013.01); *C02F 2101/345* (2013.01); *C02F 2101/36* (2013.01); *C02F 2101/363* (2013.01); *C02F 2303/16* (2013.01); *C02F 2305/04* (2013.01); *C02F 2305/08* (2013.01)

(58) Field of Classification Search
CPC ................ B01J 20/3085; B01J 20/3223; B01J 20/3234; B01J 20/3285; B01J 2220/46; C01P 2002/82; C01P 2002/85; C01B 32/23; C02F 1/281; C02F 1/283; C02F 1/285; C02F 2101/20; C02F 2101/345; C02F 2101/36; C02F 2101/363; C02F 2305/04; C02F 2305/08; C02F 1/288
See application file for complete search history.

(56) References Cited

U.S. PATENT DOCUMENTS

| | | | |
|---|---|---|---|
| 2015/0096935 A1 | 4/2015 | Mitra et al. | |
| 2015/0129502 A1* | 5/2015 | Meng ................. | B01J 20/3234 210/660 |
| 2015/0231577 A1 | 8/2015 | Nair et al. | |
| 2016/0214030 A1 | 7/2016 | Naito et al. | |
| 2016/0280563 A1 | 9/2016 | Raveendran-Nair et al. | |
| 2016/0297693 A1 | 10/2016 | Raveendran-Nair et al. | |
| 2018/0250704 A1* | 9/2018 | Truica-Marasescu ...................... | B05D 3/002 |

FOREIGN PATENT DOCUMENTS

| | | | | |
|---|---|---|---|---|
| WO | WO-2016017827 A1 * | 2/2016 | ............... | B01J 23/75 |
| WO | WO-2019106344 A1 * | 6/2019 | ......... | B01D 67/0069 |

OTHER PUBLICATIONS

Abu-Nada et al., Recent Advances in Applications of Hybrid Graphene Materials for Metals Removal from Wastewater, Nanomaterials, Mar. 24, 2020, vol. 10, No. 595, 31 pages.

AI et al., "Removal of methylene blue from aqueous solution by a solvothermal-synthesized graphene/magnetite composite", Journal of Hazardous Materials, 2011, vol. 192, No. 13, pp. 1515-1524.

Baerlocher et al., "Atlas of zeolite framework: Introduction and Explanatory Notes", Elsevier, 6th Edn., 2007, 17 pages.

Beyer, "Dealumination Techniques for Zeolites", Post-Synthesis Modification I, ed. H. G. K. Weitkamp, Springer Berlin Heidelberg, New York, 2002, vol. 3, pp. 203-255.

Boks et al., "Forces involved in bacterial adhesion to hydrophilic and hydrophobic surfaces", Microbiology, 2008, vol. 154, pp. 3122-3133.

Bradder et al., "Dye adsorption on layered graphite oxide", Journal of Chemical & Engineering Data, 2011, vol. 56, No. 1, pp. 138-141.

Bruinsma et al., "Bacterial adhesion to surface hydrophilic and hydrophobic contact lenses", Biomaterials, 2001, vol. 22, pp. 3217-3224.

Burakov et al., "Adsorption of heavy metals on conventional and nanostructured materials for wastewater treatment purposes: A review", Ecotoxicology and Environmental Safety, 2018, vol. 148, pp. 702-712.

Busca, G. Heterogenous Catalysts. In Heterogeneous Catalytic Materials: Solid State Chemistry, Surface Chemistry Elsevier, 2014 (9 pages).

Celis et al., "Heavy metal adsorption by functionalized clays", Environmental science & technology, 2000, vol. 34, No. 21, pp. 4593-4599.

Chai et al., "Effects and mechanisms of anionic and nonionic surfactants on biochar removal of chromium", Environmental Science and Pollution Research, 2018, vol. 25, pp. 18443-18450.

Chen et al., "Macroscopic and spectroscopic investigations of the adsorption of nitroaromatic compounds on graphene oxide, reduced graphene oxide, and graphene nanosheets", Environmental Science & Technology, 2015, vol. 49, No. 10, pp. 6181-6189.

Cheng et al., "Biosorption of Pb(II) Ions from Aqueous Solutions by Waste Biomass from Biotrickling Filters: Kinetics, Isotherms, and Thermodynamics", J. Environ. Eng., 2016, vol. 142, C4015001, 7 pages.

Chiarle et al., "Mercury removal from water by ion exchange resins adsorption", Water Research, 2000, vol. 34, No. 11, pp. 2971-2978.

Chowdhury et al., "Recent advances in the use of graphene-family nanoadsorbents for removal of toxic pollutants from wastewater", Advances in Colloid and Interface Science 2014, vol. 204, pp. 35-56.

Cubillas, P. et al. "Synthesis mechanism: crystal growth and nucleation." In Zeolites and catalysis: synthesis, reactions and applications. J. Cejka & S. Zones, ed. (2010): 1-55.

Dalagan et al., "Simultaneous functionalization and reduction of graphene oxide with diatom silica", Journal of Materials Science, 2013, vol. 48, pp. 3415-3421.

Dave et al., "A Concise Review on Surfactants and Its Significance," International Journal of Applied Chemistry, vol. 13, No. 3, 2017, pp. 663-672.

Drewniak et al., "Studies of Reduced Graphene Oxide and Graphite Oxide in the Aspect of Their Possible Application in Gas Sensors", Sensors, 2016, vol. 16, pp. 1-16.

Dreyer et al., "The chemistry of graphene oxide", Chem. Soc. Rev., 2010, vol. 39, pp. 228-240.

Du et al., "Hierarchically Oedered Macro-Mesoporous TiO2-graphene composite films: Improved mass transfer, reduced charge recombination, and their enhanced photocatalytic activities", ACS Nano 2011, 5 (1), pp. 590-596.

Elimelech et al., "Relative Insignificance of Mineral Grain Zeta Potential to Colloid Transport in Geochemically Heterogenous Porous Media", Environmental Science & Technology, 2000, vol. 34, pp. 2143-2148.

Ersan et al. "Adsorption of organic contaminants by graphene nanosheets: A review", Water Research, 2017, vol. 126, pp. 385-398.

Eskandarloo et al., "Nano- and micromotors for cleaning polluted waters: focused review on pollutant removal mechanisms", Nanoscale, 2017, vol. 9, pp. 13850-13863.

Fan et al., "Fabrication of novel magnetic chitosan grafted with graphene oxide to enhance adsorption properties for methyl blue," Journal of Hazardous Materials, 2012, vol. 215-216, pp. 272-279.

Fardmousavi et al., "Thiol-functionalized hierarchical zeolite nanocomposite for adsorption of Hg2+ from aqueous solutions", Comptes Rendus Chimie, 2014, vol. 17, No. 12, pp. 1203-1211.

Filice et al., "Graphene oxide and titania hybrid Nafion membranes for efficient removal of methyl orange dye from water", Carbon, 2015, vol. 82, pp. 489-499.

Gao et al., "Adsorption and removal of tetracycline antibiotics from aqueous solution by graphene oxide", Journal of Colloid and Interface Science, 2012, vol. 368, No. 1, pp. 540-546.

Gao et al., "Engineered Graphite Oxide Materials for Application in Water Purification", ACS Applied Materials & Interfaces, 2011, vol. 3, No. 6, pp. 1821-1826.

(56) References Cited

OTHER PUBLICATIONS

Gebremedhin-Haile et al., "Removal of mercury ions from mixed aqueous metal solutions by natural and modified zeolitic minerals", Water, Air, & Soil Pollution, 2003, vol. 148, pp. 179-200.

Guo et al., "Preparation of Graphene Oxide-Based Hydrogels as Efficient Dye Adsorbents for Wastewater Treatment", Nanoscale Research Letters, 2015, vol. 10,No. 272, 10 pages.

He et al., "Biosorption of Cd(II) from synthetic wastewater using dry biofilms from biotrickling filters", Int. J. Environ. Sci. Technol., 2018, vol. 15, pp. 1491-1500.

Heistad et al., "Virus removal by unsaturated wastewater filtration: effects of biofilm accumulation and hydrophobicity", Water Science & Technology, 2009, vol. 60, pp. 399-407.

Huang et al., "Removal of cadmium and lead from aqueous solutions using nitrilotriacetic acid anhydride modified ligno-cellulosic material", RSC Advances, 2015, vol. 5, pp. 11475-11484.

International Zeolite Association, "Sedimentary Zeolite Deposits in Australia," <http://www.iza-online.org/natural/Catalog/Australia.pdf> publicly available at least as early as Feb. 21, 2016, 4 pages.

Isernia, "FTIR study of the relation, between extra-framework aluminum species and the adsorbed molecular water, and its effect on the acidity in ZSM-5 steamed zeolite", Materials Research, 2013, vol. 16, pp. 792-802.

Jiang et al., "Reversible transition of graphene from hydrophobic to hydrophilic in the presence of an eletric field", The Journal of Physical Chemistry, 2012, vol. 116, pp. 19321-19326.

Jin et al., "Adsorption of 4-n-Nonylphenol and Bisphenol-A on Magnetic Reduced Graphene Oxides: A Combined Experimental and Theoretical Studies", Environ. Sci. Technol., 2015, vol. 49, No. 15, pp. 9168-9175.

Kerr, "Chemistry of Crystalline Aluminosilicates. V. Preparation of Aluminum-Deficient Faujasites", The Journal of Physical Chemistry, 1968, vol. 72, pp. 2594-2596.

Kharissova et al., "Magnetic adsorbents based on micro-and nanostructured materials", RSC Adv., 2015, vol. 5, pp. 6695-6719.

Khulbe et al., "Removal of heavy metals and pollutants by membrane adsorption techniques". Appl Water Sci., 2018, vol. 8, No. 19, 30 pages.

Kim et al., "Preparation of microporous silica membranes for gas separation", Korean J. Chem. Eng., 2001, vol. 18, pp. 106-112.

Kou et al., "Making silica nanoparticle-covered graphene oxide nanohybrids as general building blocks for large-area superhydrophilic coatings", Nanoscale, 2011, vol. 3, pp. 519-528.

Kudin et al., "Raman Spectra of Graphite Oxide and Functionalized Graphene Sheets", Nano Letters, 2008, vol. 8, pp. 36-41.

Kurniawan et al., "Comparison of low-cost adsorbents for treating wastewaters laden with heavy metals", Science of The Total Environment, 2006, vol. 366, pp. 409-426.

Lami et al., "Single step dealumination of zeolite beta precursors for the preparation of hydrophobic adsorbents", Microporous Materials, 1993, vol. 1, pp. 237-245.

Lazar et al., "Adsorption of Small Organic Molecules on Graphene", Journal of the American Chemical Society 2013, vol. 135, No. 16, pp. 6372-6377.

Li et al., "Sorption of arsenic by surfactant-modified zeolite and kaolinite", Microporous and Mesoporous Materials, 2007, vol. 105, No. 3, pp. 291-297.

Li et al., Chromate transport through columns packed with surfactant-modified zeolite/zero valent iron pellets, Chemosphere, 2007, vol. 68, No. 10, pp. 1861-1866.

Lin et al., "Adsorption of butanol from aqueous solution onto a new type of macroporous adsorption resin: studies of adsorption isotherms and kinetics simulation", Journal of Chemical Technology and Biotechnology, 2012, vol. 87, No. 7, pp. 924-931.

Liu et al., "Preparation of water-soluble β-cyclodextrin/poly(acrylic acid)/graphene oxide nanocomposites as new adsorbents to remove cationic dyes from aqueous solutions", Chemical Engineering Journal, 2014, vol. 257, pp. 299-308.

Liu et al., "Three-Dimensional Graphene Oxide Nanostructure for Fast and Efficient Water-Soluble Dye Removal", ACS Applied Materials & Interfaces, 2012, vol. 4, No. 2, pp. 922-927.

Liu et al., Adsorption of Au (III), Pd (II), and Pt (IV) from aqueous solution onto graphene oxide, Journal of Chemical & Engineering Data, 2013, vol. 58, No. 2, pp. 209-216.

Lutz, "Zeolite Y: Synthesis, Modification and Properties—A Case Revisited" Advances in Materials Science and Engineering, 2014, pp. 1-21.

Ma et al., "Fabrication of ultra-light graphene-based gels and their adsorption of methylene blue", Chemical Engineering Journal, 2014, vol. 240, No. 15, pp. 595-600.

Ma et al., "Preparation, characterization and antibacterial properties of silver-modified graphene oxide", Journal of Materials Chemistry, 2011, vol. 21, pp. 3350-3352.

Manjili et al., "Graphene oxide and thiol functionalized natural zeolite for the removal of lead from water," Water Supply, 2020, vol. 20, No. 7, pp. 2577-2588.

Manjili, "Novel Engineered Porous Materials for the Removal of Lead from Water," University of Wisconsin Milwaukee UWM Digital Commons, Thesis and Dissertations, Dec. 2018, 158 pages.

Mao et al., "A new reducing agent to prepare single-layer, high-quality reduced graphene oxide for device applications," Nanoscale, 2011, vol. 3, pp. 2849-2853.

Mao et al., "Specific Protein Detection Using Thermally Reduced Graphene Oxide Sheet Decorated with Gold Nanoparticle-Antibody Conjugates", 2010, Adv. Mater., vol. 22, pp. 3521-3526.

Margeta et al., "Natural Zeolites in Water Treatment—How Effective is Their Use", Chapter 5, in Water Treatment, eds. W. Elshorbagy and R. Chowdhury, IntechOpen, 2013, 32 pages.

Mercier et al., "Heavy metal ion adsorbents formed by the grafting of a cystamine functionality to mesoporous silica molecular sieves: factors affecting Hg (II) uptake", Environmental Science & Technology, 1998, vol. 32, No. 18, pp. 2749-2754.

Mishra et al., "Functionalized graphene sheets for arsenic removal and desalination of sea water", Desalination, vol. 282, 2011, pp. 39-45.

Moon et al., "Mechanisms of Na adsorption on graphene and graphene oxide: density functional theory approach", Carbon Letters, 2015, vol. 16, pp. 116-120.

Murakami et al., "Studies in Surface Science and Catalysis 28: New Developments in Zeolite Science and Technology", Proceedings of the 7th International Zeolite Conference, Elsevier, 1986, 22 pages.

Musyoka et al., "Thermal stability studies of zeolites A and X synthesized from South African coal fly ash", Research on Chemical Intermediates, 2015, vol. 41, pp. 575-582.

Nooney et al., "Heavy metal remediation using functionalized mesoporous silicas with controlled macrostructure", Langmuir, 2001, vol. 17, No. 2, pp. 528-533.

Omegna et al., "Dealumination and realumination of microcrystalline zeolite beta: an XRD, FTIR and quantitative multinuclear (MQ) MAS NMR study", Physical Chemistry Chemical Physics, 2004, vol. 6, pp. 447-452.

Pasti et al., "Factors affecting drug adsorption on beta zeolites," Journal of Separation Science, 2013, vol. 36, pp. 1604-1611.

Pei et al., "Adsorption characteristics of 1,2,4-trichlorobenzene, 2,4,6-trichlorophenol, 2-naphthol and naphthalene on graphene and graphene oxide", Carbon, 2013, vol. 51, pp. 156-158.

Ramesha et al., "Graphene and graphene oxide as effective adsorbents toward anionic and cationic dyes", Journal of Colloid and Interface Science, 2011, vol. 361, No. 1, pp. 270-277.

Riddick, "The Concept", in Control of Colloid Stability through Zeta Potential, vol. 1 New York, 1968, 6 pages.

Ritchie et al., Polycysteine and other polyamino acid functionalized microfiltration membranes for heavy metal capture, Environmental science & technology, 2001, vol. 35, No. 15, pp. 3252-3258.

Shen et al., "Environmental Applications of Three-Dimensional Graphene-Based Macrostructures: Adsorption, Transformation, and Detection", Environ. Sci. Technol., 2015, vol. 49, No. 1, pp. 67-84.

Siddhanti et al., "Potential nanoenabled environmental applications for radionuclides", Report EPA-R-09-002, Environmental Protection Agency (EPA), Washington, DC, 2009, 152 pages.

(56) References Cited

OTHER PUBLICATIONS

Silva et al., "Graphene-oxide loading on natural zeolite particles for enhancement of adsorption properties," RSC Adv., 2020, vol. 10, pp. 4589-4597.

Silva, "An Integrative Investigation of Sources, Fate, and Transport of Bacteria in Milwaukee Coastal Beaches," May 2013, Theses and Dissertations, University of Wisconsin Milwaukee, 174 pages.

Sing et al., "Characterization of porous solids: An Introductory Survey", Characterization of Porous Solids II, 1991, 9 pages.

Sing et al., "Reporting physisorption data for gas/solid systems with special reference to the determination of surface area and porosity," Pure & Applied. Chemistry, 1985, vol. 57, No. 4, pp. 603-619.

Sprynskyy et al., "Study of the selection mechanism of heavy metal (Pb2+, Cu2+, Ni2+, and Cd2+) adsorption on clinoptilolite", Journal of Colloid and Interface Science, 2006, vol. 304, pp. 21-28.

Sreeprased et al., "Immobilized graphene-based composite from asphalt: Facile synthesis and application in water purification", Journal of Hazardous Materials, 2013, vol. 246-247, pp. 213-220.

Stefanović et al., "Structural investigation of Zn 2+ sorption on clinoptilolite tuff from the Vranjska Banja deposit in Serbia", Microporous and Mesoporous Materials, 2007, vol. 105, No. 3, pp. 251-259.

Sun et al., "Selective Ion Penetration of Graphene Oxide Membranes", ACS Nano, 2013, vol. 7, pp. 428-437.

Sygouni et al., "Characterization of TiO2 nanoparticle suspensions in aqueous solutions and TiO2 nanoparticle retention in water-saturated columns packed with glass beads", Chemical Engineering Journal, 2015, vol. 262, pp. 823-830.

Usachev et al., "Thermal transformations in systems based on zeolites Y, X, and A containing zinc and sodium nitrates,", Russ. Chem. Bull. , 2003, vol. 52, pp. 1940-1949.

Vilela et al., "Graphene-Based Microbots for Toxic Heavy Metal Removal and Recovery from Water", Nano Letters, 2016, vol. 16, No. 4, pp. 2860-2866.

Wan et al., "Graphene and carbon-based nanomaterials as highly efficient adsorbents for oils and organic solvents", Nanotechnology Reviews, 2016, vol. 5, No. 1, pp. 3-20.

Wang et al., "Adsorption of Polycyclic Aromatic Hydrocarbons by Graphene and Graphene Oxide Nanosheets", Environmental Science & Technology, 2014, vol. 48, No. 9, pp. 4817-4825.

Wang et al., "Biosorbents for heavy metals removal and their future", Biotechnology Advances, 2009, vol. 27, pp. 195-226.

Wang et al., "Graphene-based materials: Fabrication, characterization and application for the decontamination of wastewater and wastegas and hydrogen storage/generation", Advances in Colloid and Interface Science, 2013, vol. 195-196, pp. 19-40.

Wang et al., "Nanomaterials as Sorbents to Remove Heavy Metal Ions in Wastewater Treatment," J Environ Anal Toxicol., 2012, vol. 2, No. 7, 5 pages.

Wang et al., "Zeolitic Imidazolate Framework/Graphene Oxide Hybrid Nanosheets Functionalized Thin Film Nanocomposite Membrane for Enhanced Antimicrobial Performance", ACS Appl. Mater. Interfaces, 2016, vol. 8, No. 38, pp. 25508-25519.

Wikipedia, "Cystamine" <https://en.wikipedia.org/wiki/Cystamine>, publicly available at least as early as Jun. 26, 2008, 5 pages.

Wu et al., "Role of biochar on composting of organic wastes and remediation of contaminated soilds—a review", Environ Sci Pollut Res, 2017, vol. 24, pp. 16560-16577.

Xu et al., "Decontamination of Bisphenol A from Aqueous Solution by Graphene Adsorption", Langmuir, 2012, vol. 28, No. 22, pp. 8418-8425.

Yang et al., "Adsorption of naphthalene and its derivatives on magnetic graphene composites and the mechanism investigation", Colloids and Surfaces A: Physicochemical and Engineering Aspects, 2013, vol. 422, pp. 118-125.

Yang et al., "Adsorption of organic compounds by carbon nanomaterials in aqueous phase: Polanyi theory and its application", Chemical Reviews, 2010, vol. 110, No. 10, pp. 5989-6008.

Yang et al., "Removal of methylene blue from aqueous solution by graphene oxide", Journal of Colloid and Interface Science, 2011, vol. 359, No. 1, pp. 24-29.

Yang et al., "The computational understanding and design of zeolites", Handbook of Zeolites, 2009, Ed. T.W. Wong, 18 pages.

Yu et al., "Benzene carboxylic acid derivatized graphene oxide nanosheets on natural zeolites as effective adsorbents for cationic dye removal, Journal of hazardous materials, 2013, vol. 260, pp. 330-338.

Yuna, "Review of the Natural, Modified, and Synthetic Zeolites for Heavy Metals Removal from Wastewater", Environmental Engineering Science, 2016, vol. 33, pp. 443-453.

Zakaria et al., "Catalyst screening for conversion of glycerol to light olefins", Chemical Engineering Journal, 2012, vol. 207-208, pp. 803-813.

Zhang et al., "Enhancement of Electrochemical Performance of Macroporous Carbon by Surface Coating of Polyaniline", Chemistry of Materials, 2010, vol. 22, pp. 1195-1202.

Zhang, "Graphene-Based Materials Coated on Zeolite for the Removal of Persistent Organic Pollutants from Water," University of Wisconsin Milwaukee UWM Digital Commons, Theses and Dissertations, Dec. 2018, 160 pages.

Zhao et al., "Adsorption of phenanthrene on multilayer graphene as affected by surfactant and exfoliation", Environmental Science & Technology, 2013, vol. 48, No. 1, pp. 331-339.

Zhao et al., "Graphene sponge for efficient and repeatable adsorption and desorption of water contaminations", Journal of Materials Chemistry 2012, vol. 22, pp. 20197-20202.

Zhu et al., "Facile one-pot synthesis of novel spherical zeolite-reduced graphene oxide composites for cationic dye adsorption", Industrial & Engineering Chemistry Research, 2014, vol. 53, No. 35, pp. 13711-13717.

* cited by examiner

ZEOLITE COMPOSITES FOR WATER PURIFICATION

CROSS-REFERENCE TO RELATED APPLICATIONS

This application claims priority to U.S. Provisional Application No. 62/963,460, filed Jan. 20, 2020, and U.S. Provisional Application No. 63/138,712, filed Jan. 18, 2021, which are hereby incorporated by reference in their entirety.

STATEMENT OF GOVERNMENT INTEREST

This invention was made with government support under IIP-0968887 and IIP-1540032 awarded by the National Science Foundation. The government has certain rights in the invention.

TECHNICAL FIELD

The present disclosure relates to zeolites having surface modification with graphene oxide, reduced graphene oxide, or a sulfide for removal of persistent organic pollutants (POPs) or heavy metals from a water supply and methods of preparing and using the same.

BACKGROUND

Adsorption is a fast, low-cost and the most-commonly implemented water treatment technology for the removal of multiple contaminations from ground water, drinking water or wastewater. Due to its high surface area, porous structure, and specific surface reactivity, activated carbon has been the most successful commercialized and widely used adsorbent in water purification all over the world. Although it has a high capacity of adsorbing various organic compounds and can be easily modified by chemical treatment to increase its adsorption capacity, activated carbon has several disadvantages. It is expensive, and the powdered form is difficult to be separated from the aquatic system when it becomes exhausted, and the effluent reaches the maximum allowable discharge level. Furthermore, the adsorption process transfers pollutants from one phase to another rather than eliminating them from the environment. The regeneration of exhausted activated carbon by the chemical and thermal procedures are also expensive and result in weight loss of the adsorbent.

Recently numerous approaches have been investigated for the development of cheaper and more effective novel composite adsorbents. Several researchers have focused on the graphene-based materials by modification of graphene or GO, such as metal oxide nanocomposites (e.g., nanosized FeO, MgO, $CuO_2$, magnetic $Fe_2O_3$ and $Fe_3O_4$, and $TiO_2$), monomer or polymer modification of graphene-based materials, graphene-sand composites. and graphene-based sponge, foam, or hydrogel.

Difficulties in removing persistent organic pollutants (POPs) to improve quality and safety of treated water sources require the exploration of novel and multifunctional materials.

Adsorption is also widely used in water treatment to remove heavy metals, due to its low cost, availability and eco-friendly nature. Among adsorption processes, nanomaterials have been identified as effective adsorbents in water treatment because they enhance efficiency and adsorption capacities and show fast adsorption rates mainly due to their high surface area. Sadegh et al., *Journal of Nanostructure in Chemistry* (2017) 7, 1-14. Zeolites based on their ion-exchange properties, have been used as adsorbents and ion-exchangers for different environmentally friendly applications and water treatment. However, the design of efficient and selective adsorbent for removal of heavy metals remains challenging. Materials with improved adsorption capacity and recyclability are needed.

SUMMARY

The invention described here combines removal of heavy metal pollutants and POPs from drinking and wastewater using functionalized natural zeolite. Surface treated zeolite is used to remove one or more targeted heavy metals via sorption and adsorption mechanism from drinking and wastewater. The invention leverages highly microporous three-dimensional structure of zeolite that offers exceptional ion-exchange and sorption properties advantageous in heavy metal removal from water. The absorption capacity of the zeolite is evaluated based on functionalized surface, dosage, contact time and pH levels in water. Based on the hard soft acid base (HSAB) theory, the adsorbent of the invention should be effective for several heavy metals.

Acid treated and functionalized zeolite with graphene oxide (GO) is also used in removal of persistent organic pollutants (POPs) comprising of BPA, PFOA, Metformin, Atrazine etc., from water. Column adsorption studies of a four-time coated reduced graphene oxide (rGO) on modified zeolites for polychlorinated biphenyl (PCB), perfluorooctanoic acid (PFOA), and bisphenol-A (BPA) show that over 81% adsorbate removal rate is maintained after 24 hours. This technology utilizes highly favorable synergistic effects between zeolite and the graphene oxide for significantly enhanced removal of POPs in water.

In one aspect, the present invention provides a composition comprising a zeolite substrate and one or more nanosheets adhered to the zeolite substrate, the one or more nanosheets comprising graphene oxide and/or reduced graphene oxide. Another aspect of the invention provides a method of preparing a graphene oxide-containing composition comprising adhering one or more nanosheets of graphene oxide to a zeolite substrate. In another aspect, the invention provides a method of preparing a reduced graphene oxide-containing composition comprising reducing a graphene oxide-containing composition of the invention. In still another aspect, the invention provides a method of removing a persistent organic pollutant from a water supply comprising contacting a graphene oxide/reduced graphene oxide-containing composition of the invention with a water supply containing the persistent organic pollutant and adsorbing the persistent organic pollutant onto the composition.

In another aspect, the invention provides a composition comprising a sulfide-functionalized zeolite. Another aspect of the invention provides a method of preparing a sulfide-functionalized zeolite comprising contacting a zeolite substrate with zinc acetate and thioacetamide. Another aspect of the invention provides a method of preparing a sulfide-functionalized zeolite comprising contacting a Na salt-treated zeolite substrate with cystamine, or a salt thereof.

In another aspect, the invention provides a method of removing a heavy metal from a water supply comprising contacting a composition of the invention with a water supply containing the heavy metal and adsorbing the heavy metal onto the composition.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

1. Definitions

Figure 1:
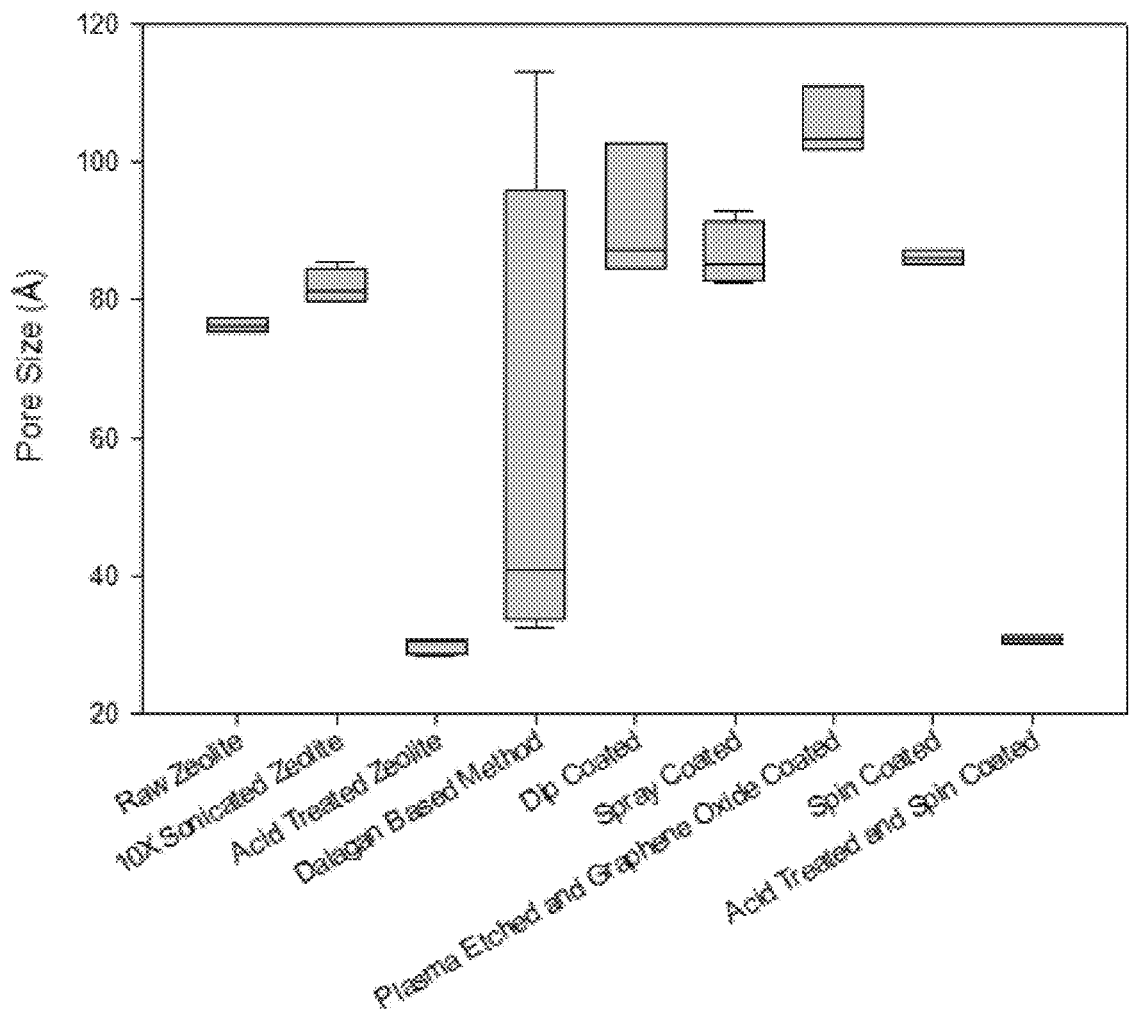
FIG. 1 shows pore size of zeolite particles under different cleaning and graphene oxide coating treatments.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "alkyl," as used herein, means a straight or branched, saturated hydrocarbon chain. The term "$C_{1-4}$alkyl" means a straight or branched chain hydrocarbon containing from 1 to 4 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkylene," as used herein, refers to a divalent group derived from a straight or branched chain hydrocarbon, for example, of 2 to 4 carbon atoms ($C_{2-4}$alkylene). Representative examples of alkylene include, but are not limited to, —$CH_2CH_2$—, —$CH_2CH_2CH_2$—, —$CH_2CH_2CH_2CH_2$—, and —$CH_2CH_2CH_2CH_2CH_2$—.

List of Abbreviations 1

AMZ APTES modified zeolites
APTES (3-Aminopropyl) triethoxysilane
BET Brunauer, Emmett and Teller
BPA bisphenol A
CZ Clean zeolite
CEC cation-exchange capacity
DB disperse blue 26
DCGZ drying method graphene oxide coated zeolites
EDCs endocrine disrupting compounds
EDS X-ray spectroscopy
FT-IR Fourier-transform infrared spectroscopy
FRGAMZ 4 times recoated GO coated APTES modified zeolites
FRrGAMZ 4 times recoated reduced GO coated APTES modified zeolites
GAC granular activated carbon
GAMZ GO coated APTES modified zeolites
GBMZS Graphene based material coated on modified zeolites substrate
GO graphene oxide
LC-MS liquid chromatography coupled with tandem mass spectrometry
MB methylene blue
Mt million ton
PFCs perfluorinated compounds
PFOA perfluorooctanesulfonic acid
POPs persistent organic pollutants
RB reactive black 5
rGO reduced graphene oxide
SEM scanning electron microscope
SF sodium fluorescein
UV visible spectrophotometer
WTPs water treatment processes
XPS X-ray photoelectron spectroscopy List of Abbreviations 2

1/n Degree of nonlinearity between solution concentration and
adsorption AC Activated carbon
$C_0$ Initial concentration
CEC Cation Exchange Capacity
CDB Contaminants disinfection byproducts
CDHZ* Cystamine hydrochloride zeolite with no pretreatment
$CDHZ^1$ Cystamine hydrochloride zeolite with, 1 mmol
$CDHZ^2$ Cystamine hydrochloride zeolite with, 2 mmol
$C_e$ Equilibrium concentration
CNT Carbon nanotube
$c_t$ Concentration at time t
CZ Clean zeolite
D Diffusion coefficient
EDS Energy dispersive spectroscopy
EPA Environmental Protection Agency
FTIR Fourier Transform Infrared Spectroscopy
HDTMA hexadecyltri-methylammonium
HSAB hard and soft acids and bases
ICP-MS Inductively coupled plasma mass spectrometry
J Diffusion flux
$K_d$ Distribution coefficient
$K_F$ Freundlich constant
$K_L$ Langmuir constant
$K_{ML}$ Modified Longmuir constant
$K_p$ Pseudo constant
$K_{P1}$ Pseudo first order
$K_{P2}$ Pseudo second order
LC-MS Liquid chromatography mass spectrometry
M Adsorbent mass MCL Maximum contaminant limit
MCLG Maximum Contamination Level Goals
ppb parts per billion
ppm parts per million
q Surface coverage
$q_e$ Equilibrium adsorption capacity
$q_{max}$ Maximum adsorption capacity
$q_t$ Adsorption capacity at time t
R Removal efficiency
r Adsorbent radius
$R^2$ R-squared
$r_a$ Rate of adsorption
$r_d$ Rate of desorption
SEM Scanning electron microscope
t Time
TGA Thermogravimetric analysis
USGS United States Geological Survey
V Solution volume
WHO World Health Organization
ZnS—Z Zinc sulfide zeolite 2. Zeolite Compositions Natural zeolite is hydrated aluminosilicate minerals with a porous structure. The chemical composition of various natural zeolites is shown in the table below.

| Zeolite | Chemical composition (%) | | | | | | | |
|---|---|---|---|---|---|---|---|---|
| | $SiO_2$ | $Al_2O_3$ | $Fe_2O_3$ | CaO | MgO | $Na_2O$ | $K_2O$ | $TiO_2$ |
| Turkey clinoptilolite | 70.9 | 12.4 | 1.21 | 2.54 | 0.83 | 0.28 | 4.46 | 0.089 |
| Iranian clinoptilolite | 70 | 10.46 | 0.46 | 0.2 | — | 2.86 | 4.92 | 0.02 |
| Cuba clinoptilolite | 62.36 | 13.14 | 1.63 | 2.72 | 1.22 | 3.99 | 1.2 | — |
| Brazil mordenite | 67.82 | 14.96 | 0.42 | 1.87 | 0.18 | 0.32 | 4.47 | 0.07 |
| Italy phillipsite + chabazite | 56.42 | 15.8 | 4.08 | 2.42 | 0.86 | 2.35 | 8.14 | 0.004 |
| Turkey clinoptilolite | 69.72 | 11.74 | 1.21 | 2.3 | 0.31 | 0.76 | 4.14 | — |
| Chinese clinoptilolite | 65.52 | 9.89 | 1.04 | 3.17 | 0.61 | 2.31 | 0.88 | 0.21 |
| Chilean clinoptilolite + mordenite | 67 | 13 | 2 | 3.2 | 0.69 | 2.6 | 0.45 | 0.2 |
| Turkey clinoptilolite | 69.31 | 13.11 | 1.31 | 2.07 | 1.13 | 0.52 | 2.83 | — |
| Croatia clinoptilolite | 64.93 | 13.39 | 2.07 | 2 | 1.08 | 2.4 | 1.3 | — |
| Iranian clinoptilolite + mordenite | 66.5 | 11.81 | 1.3 | 3.11 | 0.72 | 2.01 | 3.12 | 0.21 |
| Turkey clinoptilolite | 64.99 | 9.99 | 3.99 | 3.51 | 1.01 | 0.18 | 1.95 | — |
| Chinese clinoptilolite | 68.27 | 7.48 | 1.95 | 2.61 | 1.87 | 0.68 | 1.69 | — |
| Turkey clinoptilolite | 70 | 14 | 0.75 | 2.5 | 1.15 | 0.2 | 2.3 | 0.05 |
| Chinese clinoptilolite | 69.5 | 11.05 | 0.08 | 2.95 | 0.13 | 2.95 | 1.13 | 0.14 |
| Ukrainian clinoptilolite | 67.29 | 12.32 | 1.26 | 3.01 | 0.29 | 0.66 | 2.76 | 0.26 |
| Ukrainian mordenite | 64.56 | 12.02 | 0.95 | 3.58 | 0.68 | 0.94 | 2.03 | 0.23 |
| Slovakian clinoptilolite | 67.16 | 12.3 | 2.3 | 2.91 | 1.1 | 0.66 | 2.28 | 0.17 |
| Croatian clinoptilolite | 55.8 | 13.32 | 1.3 | 5.75 | 0.7 | 3.9 | 2.35 | — |
| Ukraine clinoptilolite | 66.7 | 12.3 | 1.05 | 2.1 | 1.07 | 2.06 | 2.96 | — |
| Australian clinoptilolite | 68.26 | 12.99 | 1.37 | 2.09 | 0.83 | 0.64 | 4.11 | 0.23 |

Graphene oxide (GO) is a single-atomic-layered material, made by the oxidation of graphite, which is cheap and abundant. It is an oxidized form of graphene, laced with oxygen-containing groups. The polar oxygen functional groups of GO render it hydrophilic so that it can be dispersible in water (and other solvents). It is commonly sold in powder form, dispersed, or as a coating material on substrates. It has been widely applied in field-effect transistors, sensors, transparent conductive films, clean energy devices, biomedical applications and the synthesis of the graphene-polymer nanocomposites.

Reduced graphene oxide (rGO), with π-π stacking on the surface, has an excellent property as an adsorbent. Even though it has defects on the surface, rGO is the most low-cost solution to achieve the similar quality as graphene sheets. Usually, the reduction of GO is one of the critical reaction for reduction of the oxygen-containing groups. Reduction methods include: (1) chemical reduction by hydrazine monohydrate, hydrazine, sodium borohydride; (2) thermally-mediated reduction; (3) electrochemical reduction. The technology platform of the proposed innovative material also allows targeting a single compound or a broad range of compounds depending on the application and modification on the functionalization of the particle.

Molecular Structure of graphene, GO and rGO.

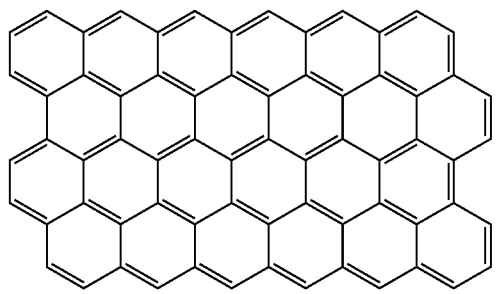

Graphene

-continued

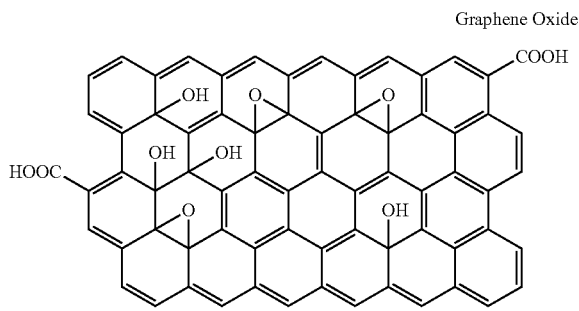

Graphene Oxide

Reduced Graphene Oxidie

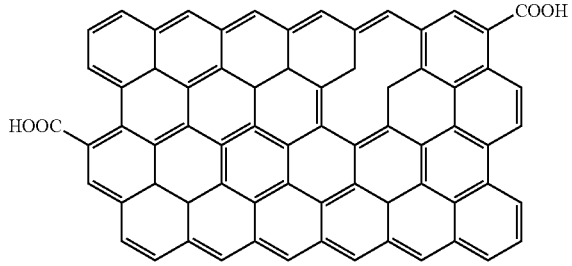

In the following, embodiments of the zeolite compositions of the invention are disclosed. The first embodiment is denoted E1, the second embodiment is denoted E2 and so forth.

E1. A composition comprising
(a) a zeolite substrate; and
(b) one or more nanosheets adhered to the zeolite substrate, the one or more nanosheets comprising graphene oxide and/or reduced graphene oxide.

E2. The composition of E1, wherein the zeolite substrate is a clinoptilolite zeolite substrate.

E3. The composition of E2, wherein the clinoptilolite zeolite substrate is Australian clinoptilolite zeolite substrate.

E4. The composition of any of E1-E3, wherein the zeolite substrate comprises $SiO_2$, $Al_2O_3$, $K_2O$, $CaO$, $Fe_2O_3$, and $Na_2O$.

E5. The composition of E4, wherein the zeolite substrate comprises about 65-72% $SiO_2$.

E6. The composition of E4 or E5, wherein the zeolite substrate comprises about 10-15% $Al_2O_3$.

E7. The composition of any of E1-E6, wherein the zeolite substrate is a sonicated zeolite substrate. A "sonicated zeolite" refers to a zeolite that has been repeatedly sonicated in water and rinsed following sonication.

E7.1. The composition of E7, wherein the zeolite is sonicated at a frequency of 35-40 KHz.

E7.2. The composition of E7.1, wherein the zeolite is sonicated at a frequency of 37 KHz.

E8. The composition of any of E1-E7.2, wherein the zeolite substrate is a hot water treated zeolite substrate. A "hot water treated zeolite" refers to a zeolite that has been treated with water above ambient temperature, drained and dried. Hot water treatment includes heating to the boiling point of water through any means, such as in a microwave.

E8.1. The composition of E8, wherein the zeolite is heated in water to boiling for 30 minutes and the water drained and the zeolite dried.

E8.2. The composition of any of E1-E8.1, wherein the zeolite substrate comprises pores, the pores having a mean volume of 0.02 to 0.04 $cm^3/g$.

E8.3. The composition of E8.2, wherein the pores have a mean volume of 0.035 to 0.04 $cm^3/g$.

E8.4. The composition of any of E8-E8.3, wherein the zeolite substrate comprises pores, the pores having an average diameter of 70 to 90 Å.

E8.5. The composition of any of E1-E8.3, wherein the zeolite substrate comprises pore, the pores having an average diameter of 5 to 15 Å.

E8.6. The composition of E8.5, wherein the pores have an average diameter of about 10 Å.

E8.7. The composition of any of E1-E8.6, wherein the zeolite substrate comprises pores, the pores having a mean surface area of 10 to 20 $m^2/g$.

E8.8. The composition of E8.7, wherein the pores have a mean surface area of about 15 $m^2/g$.

E9. The composition of any of E1-E8.8, wherein the zeolite substrate is an acid-treated zeolite substrate. An "acid-treated zeolite" refers to a zeolite that has been treated with an acid, washed with a solvent, and dried.

E9.1. The composition of E9, wherein the acid is sulfuric acid (e.g., concentrated sulfuric acid).

E9.2. The composition of E9 or E9.1, wherein the acid treatment is conducted at 80-90° C.

E9.3. The composition of any of E1-E9.2, wherein the zeolite substrate comprises pores, the pores having a mean volume of 0.05 to 0.07 cm/g.

E9.4. The composition of E9.3, wherein the pores have a mean volume of about 0.06 $cm^3/g$.

E9.5. The composition of any of E1-E9.4, wherein the zeolite substrate comprises pores, the pores having an average diameter of 25 to 35 Å.

E9.6. The composition of E9.5, wherein the pores have an average diameter of about 30 Å.

E9.7. The composition of any of E1-E9.6, wherein the zeolite substrate comprises pores, the pores having a mean surface area of 70 to 110 $m^2/g$.

E9.8. The composition of E9.7, wherein the pores have a mean surface area of about 80 $m^2/g$.

E10. The composition of any of E1-E9.8, further comprising a surfactant bonded to the zeolite substrate and/or the one or more nanosheets.

E11. The composition of E10, wherein at least one of the nanosheets bonds to the surfactant and is adhered to the zeolite substrate by the surfactant.

E12. The composition of E10 or E11, wherein the surfactant is a cationic surfactant.

E13. The composition of E12, wherein the cationic surfactant is a quaternary ammonium surfactant (e.g., hexadecyltrimethylammonium, benzalkonium chloride, benzethonium chloride, methylbenzethonium chloride, cetylpyridinium chloride). Quaternary ammonium surfactants are known in the art, as described by Boethling and Lynch in *The Handbook of Environmental Chemistry*; de Oude, N. T., Ed.; Springer-Verlag: Berlin, 1992; Vol. 3, p 145; and Dave and Joshi in *Int. J. Appl. Chem.* (2017) vol. 13(3), pp. 663-672, which are incorporated herein by reference.

E14. The composition of E13, wherein the cationic surfactant is a hexadecyl trimethylammonium halide.

E14.1. The composition of E14, wherein the cationic surfactant is hexadecyltrimethylammonium bromide.

E15. The composition of E10 or E11, wherein the surfactant is a nonionic surfactant. Nonionic surfactants are known in the art, as described by Dave and Joshi, which is incorporated herein by reference. Nonionic surfactants have covalently bonded oxygen-containing hydrophilic groups, which are bonded to hydrophobic parent structures. Nonionic surfactants include ethoxylates (e.g., fatty alcohol ethoxylates, alkylphenol ethoxylates such as Triton X-100 (i.e., polyethylene glycol p-(1,1,3,3-tetramethylbutyl)-phenyl ether), fatty acid ethoxylates, ethoxylated amines, ethoxylated sorbitan esters, castor oil ethoxylate).

E16. The composition of E15, wherein the nonionic surfactant comprises a hydrophilic polyethylene oxide chain.

E17. The composition of E15 or E16, wherein the nonionic surfactant comprises an aromatic hydrocarbon lipophilic group.

E18. The composition of E17, wherein the nonionic surfactant is polyethylene glycol p-(1,1,3,3-tetramethylbutyl)-phenyl ether.

E19. The composition of E10 or E11, wherein the surfactant is an anionic surfactant and is bonded to the one or more nanosheets. Anionic surfactants are known in the art, as described by Dave and Joshi, which is incorporated herein by reference. Anionic surfactants include alkyl ether sulfates, benzyl sulfonates, and phosphate esters. Alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Other anionic surfactants include Docusate (dioctyl sodium sulfosuccinate), Alkyl-aryl ether phosphates, Alkyl ether phosphates, and sodium stearate.

E20. The composition of E19, wherein the anionic surfactant is sodium dodecyl sulfate.

E21. The composition of any of E1-E9.8, further comprising a -silyl-$C_{2-4}$alkylene-$NH_2$ group bonded to the zeolite substrate. The -silyl-$C_{2-4}$alkylene-$NH_2$ group may be covalently bonded.

E22. The composition of E21, wherein the -silyl-$C_{2-4}$alkylene-$NH_2$ group is -silyl-$(CH_2)_3$—$NH_2$.

E23. The composition of any of E1-E22, wherein the one or more nanosheets are adhered to the zeolite substrate by Dalagan's method, dip coating, plasma etching, spin coating, vacuum coating, or dry coating.

Dalagan's method refers to mixing zeolite with concentrated $H_2SO_4$ and graphene oxide and heating to reflux, followed by washing with ethanol, centrifugation, and drying.

Dip Coating method refers to immersing a zeolite in a graphene oxide solution to allow the graphene oxide to coat the zeolite surface, removing, and drying the zeolite.

Spray Coating method refers to preparing GO by diluting with DI water (e.g., water: GO 3:1 w/v ratio). The inside of the upper part of a filtering apparatus is coated lightly with the GO solution and then zeolite is added to the filtering apparatus. The remainder of the solution is sprayed onto the zeolite and the samples are dried.

Plasma Etch method refers to mixing a graphene oxide solution with zeolite placing the mixture in the plasma etcher, where vacuum is initially generated under 20 Pa and then increased to 80 Pa. Once the desired vacuum is reached, sample is submitted to plasma etching for 27 s at 50% power using oxygen and 10 psi (68.9 kPa) output. After the sample is plasma etched, sample was stirred immediately and mixed well and then dried.

Spin coating method refers to mixing a graphene oxide solution with zeolite and spinning the mixture to cause uniform spreading of the solution onto the zeolite, followed by drying.

Vacuum coating method refers to mixing a graphene oxide solution with zeolite, pouring the mixture into a filtration apparatus with a filter membrane under vacuum, and drying.

Dry coating method refers to mixing a graphene oxide solution with zeolite and shaking the mixture on a shaker followed by drying the coated zeolite.

E24. The composition of any of E1-E23, wherein the one or more nanosheets are graphene oxide nanosheets.

E24.1. The composition of E24, wherein the composition comprises pores, the pores having a mean volume of 0.02 to 0.15 $cm^3/g$.

E24.2. The composition of E24.1, wherein the pores have a mean volume of 0.075 to 0.15 $cm^3/g$.

E24.3. The composition of any of E24-E24.2, wherein the composition comprises pores, the pores having an average diameter of 5 to 10 Å.

E24.4. The composition of any of E24-E24.3, wherein the composition comprises pores, the pores having a mean surface area of 50 to 200 $m^2/g$.

E24.5. The composition of E24.4, wherein the pores have a mean surface area of 100 to 160 $m^2/g$.

E25. The composition of any of E1-E23, wherein the one or more nanosheets are reduced graphene oxide nanosheets.

E25.1. The composition of E25, wherein the composition comprises pores, the pores having a mean volume of 0.05 to 0.075 $cm^3/g$.

E25.2. The composition of E25 or E25.1, wherein the composition comprises pores, the pores having a mean surface area of 50 to 100 $m^2/g$.

E26. The composition of any of E1-E25.2, wherein the one or more nanosheets are 1, 2, 3, or 4 nanosheets.

E26.1. The composition of E26, wherein the one or more nanosheets are 4 nanosheets.

E27. A composition comprising
  (a) a zeolite substrate; and
  (b) a sulfide, the sulfide functionalizing a surface of the zeolite substrate.

E28. The composition of E27, wherein the zeolite substrate is a clinoptilolite zeolite substrate.

E29. The composition of E28, wherein the clinoptilolite zeolite substrate is Australian clinoptilolite zeolite substrate.

E30. The composition of any of E27-E29, wherein the zeolite substrate comprises $SiO_2$, $Al_2O_3$, $K_2O$, $CaO$, $Fe_2O_3$, and $Na_2O$.

E31. The composition of E30, wherein the zeolite substrate comprises about 65-72% $SiO_2$.

E32. The composition of E30 or E31, wherein the zeolite substrate comprises about 10-15% $Al_2O_3$.

E33. The composition of any of E27-E32, wherein the zeolite substrate is a Na salt-treated zeolite substrate.

E33.1. The composition of E33, wherein the Na salt is a Na halide salt, such as NaCl. NaCl salt treatment of zeolite may be performed by contacting a solution of sodium salt (NaCl) with a zeolite and refluxing. Treated zeolite is washed with water and dried.

E34. The composition of any of E27-E33, wherein the zeolite substrate is a sonicated zeolite substrate. A "sonicated zeolite" refers to a zeolite that has been repeatedly sonicated in water and rinsed following sonication.

E34.1. The composition of E34, wherein the zeolite is sonicated at a frequency of 35-40 KHz.

E34.2. The composition of E34.1, wherein the zeolite is sonicated at a frequency of 37 KHz.

E35. The composition of any of E27-E34.2, wherein the zeolite substrate is a hot water treated zeolite substrate. A "hot water treated zeolite" refers to a zeolite that has been treated with water above ambient temperature, drained and dried. Hot water treatment includes heating to the boiling point of water through any means, such as in a microwave.

E35.1. The composition of E35, wherein the zeolite is heated in water to boiling for 30 minutes and the water drained and the zeolite dried.

E35.2. The composition of E35 or E35.1, wherein the zeolite substrate comprises pores, the pores having a mean volume of 0.02 to 0.04 $cm^3/g$.

E35.3. The composition of E35.2, wherein the pores have a mean volume of about 0.03 $cm^3/g$.

E35.4. The composition of any of E35-E35.3, wherein the zeolite substrate comprises pores, the pores having an average diameter of 5 to 15 Å.

E35.5. The composition of E35.4, wherein the pores have an average diameter of about 10 Å.

E35.6. The composition of any of E35-E35.5, wherein the zeolite substrate comprises pores, the pores having a mean surface area of 10 to 20 m$^2$/g.

E35.7. The composition of E35.6, wherein the pores have a mean surface area of about 15 m$^2$/g.

E36. The composition of any of E27-E35.7, wherein the zeolite substrate is an acid-treated zeolite substrate. The acid treatments and pore characteristics are described in E9-E9.8.

E37. The composition of any of E27-E36, wherein the sulfide is cystamine, or a salt thereof.

E38. The composition of any of E27-E36, wherein the sulfide is zinc sulfide.

E39. The composition of E38, wherein the zinc sulfide comprises zinc sulfide nanoparticles.

3. Methods of Preparing Zeolite Compositions

E40. A method of preparing the composition of any of E1-E26.1 comprising adhering one or more graphene oxide nanosheets to a zeolite substrate.

E41. The method of E40, further comprising sonicating a zeolite to provide a sonicated zeolite substrate. Sonicating of zeolites is described in E7-E7.2 and in the Examples.

E41.1. The method of E41, wherein the zeolite subjected to sonication is a natural or previously untreated zeolite.

E42. The method of E41 or E41.1, further comprising contacting the sonicated zeolite substrate with water and heating above ambient temperature to provide a sonicated, hot water-treated zeolite substrate. Hot water zeolite treatment is described in E8-E8.1 and in the Examples.

E43. The method of E42, further comprising contacting the sonicated, hot water-treated zeolite substrate with an acid and heating above ambient temperature to provide a sonicated, hot water-treated, and acid treated zeolite substrate. Acid treatment is described in E9-E9.2 and in the Examples.

E44. The method of any of E40-E43, further comprising adhering the one or more nanosheets by Dalagan's method, dip coating, plasma etching, spin coating, vacuum coating, or dry coating. The methods of adhering the nanosheets are described in E23 and in the Examples.

E45. The method of any of E40-E44, further comprising contacting the zeolite substrate with a cationic surfactant. Cationic surfactants are described in E12-E14.1.

E45.1. The method of E45 comprising contacting the zeolite substrate with the cationic surfactant prior to adhering the one or more nanosheets.

E46. The method of any of E40-E44, further comprising contacting the one or more nanosheets with a nonionic surfactant or anionic surfactant. Nonionic and anionic surfactants are described in E15-E20.

E46.1. The method of E46 comprising contacting the one or more nanosheets with the nonionic surfactant or anionic surfactant prior to adhering the one or more nanosheets to the zeolite substrate.

E47. The method of any of E40-E44, further comprising contacting the zeolite substrate with an aminosilane reagent selected from one or more of $(C_{1\text{-}4}alkylO)_3Si$—$C_{2\text{-}4}$alkylene-$NH_2$, $(C_{1\text{-}4}alkylO)_2(C_{1\text{-}4}alkyl)Si$—$C_{2\text{-}4}$alkylene-$NH_2$, and $(C_{1\text{-}4}alkylO)(C_{1\text{-}4}alkyl)_2Si$—$C_{2\text{-}4}$alkylene-$NH_2$.

E47.1. The method of E47 comprising contacting the zeolite with an aminosilane reagent selected from one or more of (3-aminopropyl)-triethoxysilane, (3-aminopropyl)-diethoxy-methylsilane, (3-aminopropyl)-dimethyl-ethoxysilane, and (3-aminopropyl)-trimethoxysilane.

E47.2. The method of E47 or E47.1 comprising contacting the zeolite substrate with the aminosilane reagent prior to adhering the one or more nanosheets to the zeolite substrate.

E48. The method of any of E40-E47.2, wherein the one or more nanosheets comprise or consist of graphene oxide, further comprising reducing the graphene oxide to reduced graphene oxide. A number of processes exist for the reduction of graphene oxide, based on chemical, thermal or electrochemical approaches: Chen et al., Preparation of graphene by the rapid and mild thermal reduction of graphene oxide induced by microwaves. *Carbon* 2010, 48 (4), 1146-1152; Li, Z.; Yao et al., Ultrafast, dry microwave synthesis of graphene sheets. *Journal of Materials Chemistry* 2010, 20, 4781-4783; Chua and Pumera, Chemical reduction of graphene oxide: a synthetic chemistry viewpoint. *Chemical Society Reviews* 2014, 43, 291-312; Fernandez-Merino et al., Vitamin C is an ideal substitute for Hydrazine in the reduction of graphene oxide suspensions. *Journal of Physical Chemistry C* 2010, 114 (14), 6426-6432; Zhang et al., Reduction of graphene oxide vial ascorbic acid. *Chemical Communications*. 2010, 46, 1112-1114.

E48.1. The method of E48, comprising reducing the graphene oxide to reduced graphene oxide with microwave irradiation.

E48.2. The method of E48, comprising reducing the graphene oxide to reduced graphene oxide with ascorbic acid (i.e., vitamin C).

E49. A method of preparing the composition of any of E27-E32, E34-E36, or E38-E39, comprising contacting a zeolite substrate with zinc acetate and thioacetamide.

E50. The method of E49, further comprising sonicating a zeolite to provide a sonicated zeolite substrate. Sonicating of zeolites is described in E7-E7.2 and in the Examples.

E51. The method of E50, further comprising contacting the sonicated zeolite substrate with water and heating above ambient temperature to provide a sonicated, hot water-treated zeolite substrate. Hot water zeolite treatment is described in E8-E8.1 and in the Examples.

E52. The method of E51, further comprising contacting the sonicated, hot water-treated zeolite with an acid and heating above ambient temperature to provide a sonicated, hot water-treated, and acid treated zeolite substrate. Acid treatment is described in E9-E9.2 and in the Examples.

E53. The method of E49-E52, wherein contacting the zeolite substrate with zinc acetate and thioacetamide comprises sonicating the zeolite substrate, zinc acetate, and thioacetamide together in an aqueous medium.

E53.1. The method of E53 comprising sonicating the zeolite substrate, zinc acetate, and thioacetamide together in an aqueous medium at 15-25 kHz.

E53.2. The method of E53.1 comprising sonicating the zeolite substrate, zinc acetate, and thioacetamide together in an aqueous medium at 20 kHz.

E54. A method of preparing the composition of any of E27-E37 comprising contacting a Na salt-treated zeolite substrate with cystamine, or a salt thereof. Na salt treatment is described in E33.1 and the Examples.

E54.1. The method of E54, wherein the Na salt is a Na halide salt, such as NaCl.

E55. The method of E54, further comprising contacting a zeolite with a Na salt solution to provide the Na salt-treated zeolite substrate.

E55.1. The method of E55, wherein the Na salt is a Na halide salt, such as NaCl.

4. Methods of Adsorbing Pollutants

Persistent Organic Pollutants (POPs)

Persistent organic pollutants (POPs) are carbon-based organic compounds that are resistant to environmental degradation through chemical, biological, and photolytic processes. Thousands of synthetic POPs were generated and widely used in industrial production after 1950's. They have been used in the past and are used today in pesticides, solvents, pharmaceuticals, and industrial chemicals, which have adverse effects on human health and environment. Once released to the atmosphere, they can be persistent for an extended period, widely distribute through natural processes, and accumulate in the fatty tissue of humans and wildlife, which can result in cancer, allergies, hypersensitivity, damage of nervous systems and disruption of the immune system. When POPs accumulate in the fatty tissue of fish, predatory birds, mammals, humans, and the uppers in the food chain, their concentrations can become magnified by up to 700,000 times higher than background levels. Most POPs are human-made, some are carcinogens, and they may cause developmental defects, chronic illnesses, and death. Because of their persistence and toxicity, POPs pose an issue due to their ability to bioaccumulate with potentially significant impacts on human health and remain in the environment for a long time.

POPs have been found on every continent in the world. They can be transported through various methods such as winds, ocean currents, soil and food chains. Usually, POPs once used and released in one area can affect the environment and food chains far away from the contaminated region. POPs, especially in the surface water and local groundwater, have low removal by wastewater treatment plants and have been found in drinking water. Some of these compounds are well known, such as bisphenol A (BPA) and dichlorodiphenyltrichloroethane (DDT). Besides that, new POPs including organochlorine pesticides (OCPs), polychlorinated naphthalenes (PCNs), hexabromocyclododecanes (HBCDs), Dechlorane Plus (DPs), and related compounds (Dechloranes) have been found, analyzed and monitored. The influence of new POPs requires more research on the risks to human health and the environment. The adverse effects caused by these toxic compounds in water, wastewater, human health, and ecosystems demand the development of useful treatment technologies that can remove high toxic organic contaminants at a low cost. Simultaneously, a one-step removal process for different kinds of POPs is considered as a convenient approach and preferred in the water treatment industry. In this thesis, variably charged POPs, nonionic BPA, anionic perfluorooctanoic acid (PFOA), and cationic polychlorinated biphenyls (PCBs), are introduced.

Bisphenol A. BPA, $C_{15}H_{16}O_2$, is used for synthesizing polycarbonate, epoxy resin, and flame retardants in a sector and manufactured from phenol and acetone. It is a high-production-volume chemical used in plastics (CDs, cell phones, and bicycle helmets, etc.) and beverage containers (lacquers in linings of aluminum food and beverage cans). It was reported that it migrates from the plastic, composites and other storage containers to outside environment when heated or exposed to acidic or alkali solutions due to the degradation of BPA. Usually, most humans are exposed to BPA through ingestion. Infants are especially at risk. They can be exposed by using baby bottles, and toys. Numerous animal studies have demonstrated a correlation between BPA with obesity, thyroid and nervous system cancer. A review in 2008 concluded that BPA affects various dopaminergic processes resulting in hyperactivity, attention deficits, and a heightened sensitivity to drugs of abuse. A report from U.S. Environmental Protection Agency (EPA) from 2010 shows that over one million pounds of BPA are released into the environment annually. In 2017, the European Chemicals Agency reported that "BPA should be listed as a substance of very high concern due to its properties as an endocrine disruptor." Many research studies show that BPA was found in the blood and liver of animals and humans. Currently, the human exposure limit set by the United States Environmental Protection Agency (EPA) is 50 $\mu g \ kg^{-1} \ day^{-1}$ of BPA intake for drinking water.

The molecular structure of BPA.

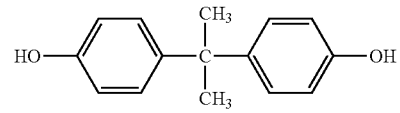

Perfluorooctanoic Acid. PFOA, $C_9HF_{15}O_2$, also known as $C_8$, is used as a surfactant in the emulsion polymerization of fluoropolymers in industry. It persists indefinitely in the natural environment due to resistance to environmental degradation (metabolism, hydrolysis, photolysis or biodegradation), and is toxic to animals and humans. It can be absorbed through the skin or oral ingestion. Recent studies are focusing on monitoring the global distribution and determination of the toxicology and mode of action of PFOA. Animal studies showed that it could cause reduced birth size, physical, developmental delays, endocrine disruption, and neonatal mortality in mammals. In 2007, research studies at the U.S. Food and Drug Administration (USFDA) investigated food contact papers as a potential source of PFOA to humans and is ongoing. In 2005, a USFDA study reported it had been detected in industrial waste, water, food, and polytetrafluoroethylene products, especially in the drinking water system and food packaging. In 2007, the New Jersey Department of Environmental Protection issued a health-based guidance level of 0.04 $\mu g \ L^{-1}$ in drinking water. The Minnesota Department of Health recommends 0.014 $\mu g \ L^{-1} \ day^{-1}$ for PFOA for adults. The United States EPA reported health advisory level of PFOA for the drinking water is to 0.07 $\mu g \ L^{-1} \ day^{-1}$ in 2016.

The molecular structure of PFOA.

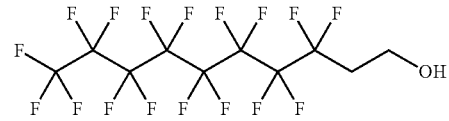

Polychlorinated biphenyls. PCBs, $C_{12}H_{10-x}Cl_x$, were deployed as dielectric and coolant fluids in electrical systems, carbonless copy paper, and heat transfer fluids before the 1960s. Because of their longevity and toxicity to human beings, PCBs were classified as POPs and banned by the US Congress in 1979. The United States EPA reported them as a likely cause of cancer, endocrine disruption, and neurotoxicity. They can be transported in the air and water due to their low vapor pressures. In the ocean, PCBs become denser than water and concentrate on the increasing depth. People are usually exposed to food, breathing contaminated air and skin contact. They can also cause skin conditions such as chloracne and rashes. Severe exposure accidents happened in Belgium, Italy, Japan, and the USA since the 1960s. In Japan, it was known as Yushō disease because over 1800 people were poisoned by 280 kg of PCB-contaminated rice bran oil used as chicken feed in 1968. In 2001, the United State EPA set the goal for drinking water's maximum contaminant level of PCBs is zero.

A series molecular structures of PCBs.

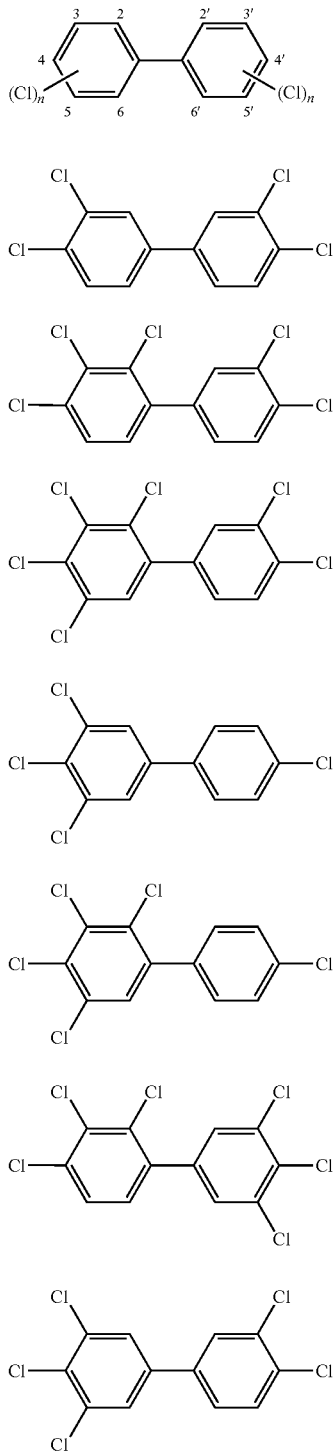

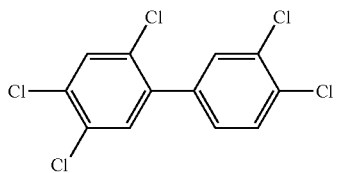

PCB 118

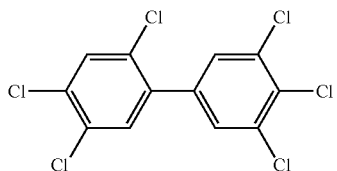

PCB 167

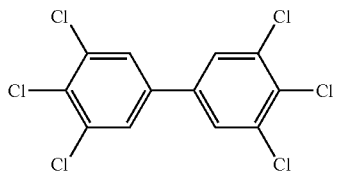

PCB 169

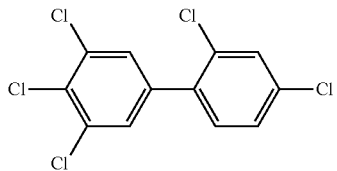

PCB 123

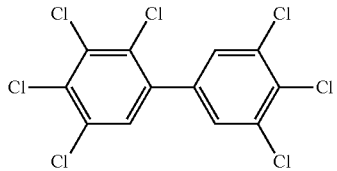

PCB 189

E56. A method of removing a persistent organic pollutant from a water supply comprising contacting the composition of any of E1-E26.1 with a water supply containing the persistent organic pollutant and adsorbing the persistent organic pollutant onto the composition. It will be sufficient if the adsorbent is brought into contact with the fluid in some way, and the adsorbent components and the fluid are then thoroughly mixed. The method according to the present invention may be carried out in a stirred tank reactor or in a column or in a fixed-bed adsorber.

E57. The method of E56, further comprising heating the composition with adsorbed persistent organic pollutant and desorbing the persistent organic pollutant.

Heavy Metals

The term heavy metal has particular application to elements having atomic weight between 53.5 and 200.6 g/mol such as cadmium (Cd), mercury (Hg), lead (Pb), and arsenic (As), as described by Fu and Wang in *Removal of heavy metal ions from wastewaters: a review*. Journal of environmental management, 2011. 92(3): p. 407-418, which is incorporated herein by reference.

Lead is a naturally occurring toxic heavy metal with significant adverse impacts on the environment, human health, and ecological systems. The United States Environmental Protection Agency (EPA) and the World Health Organization (WHO) list lead and its compounds as toxic pollutants. The maximum contaminant limit (MCL) of heavy metals, reported by the EPA is summarized in the table below. Human body and its organisms require known trace amounts of some heavy metals, such as cobalt, copper, iron, manganese, molybdenum, vanadium, strontium, and zinc. Excess levels of essential metals, however, can be detrimental to organisms, particularly humans.

The Maximum Contaminant Limit (MCL) of Heavy Metals, Reported by US-EPA

| Heavy metal | Human Toxicity impacts | MCL (ppm) water |
|---|---|---|
| Arsenic | Skin manifestation, visceral cancers, vascular diseases | 0.050 |
| Cadmium | Kidney damage, renal disorder, human carcinogenic | 0.01 |
| Chromium | Headache, diarrhea, nausea, vomiting, carcinogen | 0.05 |
| Copper | Liver damage, Wilson disease, insomnia | 0.25 |
| Nickel | Dermatitis, nausea, chronic asthma, coughing, human carcinogen | 0.20 |
| Zinc | Depression, lethargy, neuroglial signs and increased thirst | 0.80 |
| Lead | Damage to fetal brains, disease of the kidneys, circulatory system, and nervous system | 0.006 |
| Mercury | Rheumatoid arthritis, and diseases of kidneys, circulatory system, and nervous system | 0.00003 |

The EPA developed Surface Water Treatment Rules (SWTR) to improve the qualities of drinking water in November 2016. The regulations provide protection from disease-causing pathogens and contaminants, as well as protection against disinfection byproducts (DBP) that can form during drinking water treatment. They also provide guidance documents to help public water utilities implement the contamination management rules. The recommended treatment technologies remove or destroy pollutants in water. Federal laws require the EPA to provide a cost estimation for new drinking water standards. There are three major components of the final cost: treatment, monitoring, and administrative costs. Several engineering models have been developed to estimate the treatment costs using a bottom-up approach.

E58. A method of removing a heavy metal from a water supply comprising contacting the composition of any of E1-E39 with a water supply containing the heavy metal and adsorbing the heavy metal onto the composition. It will be sufficient if the adsorbent is brought into contact with the fluid in some way, and the adsorbent components and the fluid are then thoroughly mixed. The method according to the present invention may be carried out in a stirred tank reactor or in a column or in a fixed-bed adsorber.

E58.1. The method of E58, wherein the heavy metal is Pb or Hg.

E59. The method of E58 or E58.1, further comprising treating the composition having adsorbed heavy metal with an acid and desorbing the heavy metal.

E59.1. The method of E59, wherein the acid is nitric acid.

5. Examples

Example 1

Graphene-Oxide Loading on Natural Zeolite Particles

Materials and Chemicals. Australian natural clinoptilolite zeolite (diameter: 0.7-1 mm, chemical composition: 68.26% $SiO_2$, 12.99% $Al_2O_3$, 4.11% $K_2O$, 2.09% CaO, 1.37% $Fe_2O_3$, 0.83% MgO, 0.64% $Na_2$, 0.23% $TiO_2$) was provided by Zeolite Australia Ltd. Graphene oxide was produced from natural graphite powder (SP-1, Bay Carbon, MI) using the modified Hummers method. The GO suspension with a concentration of 2.5 g·mL-1 was prepared by dispersing the prepared GO powder into deionised (DI) water with the assistance of ultrasonication for 10 min (Branson M1800 Ultrasonic Cleaner, 40 kHz). Other chemicals used in this study were sulfuric acid reagent grade 95-98% (Sigma Aldrich, USA) and ethyl-alcohol anhydrous (Electron Microscopy Sciences, USA).

Materials Characterization. The surface area (S_BET), pore size and total pore volume distribution were determined by N2 adsorption isotherm with relationship between N2 adsorbed value at standard conditions (V) and the partial pressure ($p/p_0$) under $-196°$ C. (ASAP 2020, Micromeritics Inst. Corp.). Results for pore size distribution (dV/dD) were obtained from using Barrett-Joyner-Halenda (BJH) method with Faas correction. Before analysis, samples were pre-treated by degassing at 150° C. for 2 h, for removing any adsorbed species. Surface area calculations were made using the Brunauer-Emmett-Teller (BET) equation. The morphology and composition of the zeolite particles were characterized using a Hitachi S-4800 field emission scanning electron microscope (FESEM). Samples were mounted with conductive silver paste (EMSdiasum, 12686-15) on SEM stubs and viewed at an accelerating voltage of 5 kV. Thermogravimetric analysis (TGA) was carried out using a TA Instruments SDT 2960 Simultaneous DSC-TGA thermoanalyzer with a heating rate of 5° C.·$min^{-1}$ in air atmosphere. Raman spectra was obtained using a Horiba Scientific XploRA PLUS Raman microscope at a 532 nm wavelength spectra Zeta potential measurements were performed in a zeta potential ZETASIZER Nano Series—Nano ZS (Malvern Instruments Ltd, UK). X-Ray diffraction data was obtained using a Bruker ASX D8 Discover A25 device with a Cu tube at 1.5418 Å. Samples were placed in a zero-diffraction sample plate and measured from 10 to 60 2-theta.

Synthesis of graphene oxide (GO). GO was synthesized from natural graphite powder by a modified Hummers method: 0.50 g of graphite powder was added to a mixture of 0.250 g $NaNO_3$ and 13.0 mL of 98% $H_2SO_4$, followed by stirring for 1 hour in an ice bath at 0° C. Subsequently, 1.50 g of $KMnO_4$ was slowly added to the suspension while maintaining its temperature below 20° C. The mixture was stirred at room temperature under reflux condition overnight. Then, 35.0 mL water was slowly added with vigorous stirring. The reaction temperature rapidly increased to 98° C. Then, 6.0 mL of 30% $H_2O_2$, 20.0 mL of 10% HCl and 20.0 mL water were added to the mixture until its color was changed to brilliant yellow. The mixture was filtered and washed with water until the pH was close to 7. Finally, the obtained GO was collected and dried at 60° C.

Preparation of clean zeolite (Zeolite 10×). Zeolite and DI water (ratio 1:12.5 (w/v)) were placed in a beaker and sonicated (Fisherbrand, FB 11201, 37 kHz) 10 times for 15 minutes with three rinses in between each cycle. After sonication, the zeolite was boiled in a microwave at low power (zeolite: DI water ratio 1:10 (w/v) for 30 minutes and the water was discarded and replaced after every boiling cycle. The zeolite was then dried in the oven for 24 h at 100° C.

Acid treatment of natural zeolite particles. Zeolite 10× was mixed with concentrated $H_2SO_4$ (zeolite: acid 2:1 ratio—w/v). The components were mixed in a boiling flask and refluxed for 12 hours between 80-90° C. The zeolite was washed after 12 hours with absolute ethanol, centrifuged, and dried at 100° C. for 24 hours.

Methods of Coating of Zeolite Particles with Graphene Oxide.

Modified Dalagan's method. Two grams of zeolite 10× was mixed with 1 mL concentrated $H_2SO_4$ and 25 mL of graphene oxide (2.5 mg·mL$^{-1}$). The components were mixed in a boiling flask and refluxed for 24 h at 100° C. The zeolite was washed after 24 h with absolute ethanol, centrifuged, and dried at 100° C. This method was based on a published method.

Dip Coating method. A dip coating device was designed out of a 15 ml test tube, a rod, and a plankton bucket net (0.008 mm×0.012 mm). The rod was inserted in the cap of the test tube so the test tube could be dipped. A 50 ml test tube had a hole drilled in the center of its cap to fit the rod. The GO solution was placed in the 50 ml test tube and the zeolite was placed in the dip coater, the dip coater was placed in the 50 ml test tube and was vortex mixed for 24 hours upright. After 24 hours the dip coater was pulled out at a rate of 30 seconds to ensure a thin layer of coating. Once the zeolite was out of solution it was dried for 24 hours at 100° C.

Spray Coating method. Spray coating was performed with a Central Pneumatic air eraser kit. GO was prepared by diluting with DI water (water: GO 3:1 w/v ratio). The inside of the upper part of a filtering apparatus was coated lightly with the GO solution and then 1 g of zeolite was added to the filtering apparatus. The remainder of the solution was sprayed onto the zeolite and the samples were dried for 24 hours.

Plasma Etch method. One gram of zeolite 10× was placed in a glass petri dish and 1 mL of GO was distributed on the top. Sample was placed in the plasma etcher (Zepto, Diener Electronics), where vacuum was initially generated under 20 Pa and then increased to 80 Pa. Once the desired vacuum was reached, sample was submitted to plasma etching for 27 s at 50% power using oxygen and 10 psi (68.9 kPa) output. After the sample was plasma etched, sample was stirred immediately and mixed well and then dried at 100° C. for 24 h.

Spin Coating method. Spin coating was done by placing zeolite in the lid of a small petri dish with GO (zeolite: GO 1:1 ratio w/v). The mixture was ramped at 10 rpm, was dwelled for 15 seconds up until the sample reached 500 rpm. The samples were dried for 24 hours.

Sorption experiments. Adsorption experiments were conducted for brief assessment of comparison of performance among different zeolite particles and desorption experiments were performed for brief assessment of desorption of metal ions under given conditions for insight of regeneration of the particles. Batch mode experiments on adsorption of cadmium on zeolite at initial concentration of 5 mg/L and ionic strength of $10^{-3}$ $NaNO_3$ was conducted at a room temperature of 21° C. Zeolite (0.5 g) was added to 100 mL cadmium solution to provide adsorbent loading rate of 5 g/L contained in glass flasks were sealed and agitated at 120 rpm for 24 h in an orbital shaker. Zeolite particles saturated in adsorption experiments were used for batch mode experiments on desorption of cadmium from each of the zeolites. Each of the zeolites (0.5 g) was added to 100 mL 1 M HCL contained in glass flasks and were sealed and agitated at 120 rpm for 24 h in an orbital shaker. In both adsorption/desorption experiments, the suspensions were filtered at 0.45 μm syringe filter and cadmium concentrations were measured in triplicates using Atomic Absorption Spectrometer (Thermo Scientific iCE™ 3300 AAS) and the average values were taken for data analysis. The amount of cadmium adsorption at equilibrium $q_e$ (mg/g), was calculated using Eq. (1)

$$q_e = \frac{(C_0 - C_e)V}{M} \quad (1)$$

where $C_0$=initial concentration of heavy metal (mg/L): $C_e$=equilibrium concentration of the heavy metal (mg/L); V=volume of the solution (L) and M=mass of adsorbent (g). Percent desorption efficiency (% DE) was calculated using Eq. 2:

$$\%DE = \frac{(C_0 - C_e)}{C_0} * 100 \quad (2)$$

Structural characterization of natural zeolite, acid treated zeolite and GO-zeolite. The raw Australian zeolite has pore diameter ~80 Å and when cleaned (10× sonicated zeolite), the pore diameter increases slightly. FIG. 1 depicts pore size of zeolite particles under different cleaning and coating treatments. Multiple methods of coating zeolite with graphene oxide were evaluated and they represent the first phase of development of this hybrid zeolite graphene oxide materials, which have some limitations as lack of homogeneity in the amount of loading of GO and distribution. Although the nominal loading of GO is 2.5 mg/g, it is known that some methods have significant loss during the process such as spray coating. The GO depositions on the zeolite surfaces are non-homogenous as Islands of GO deposits can be found on the surface of the coated particles in the SEM images, where sheet-like structures not typical for zeolite are observed. Cleaned particles were treated with a Dalagan based method, showing a very high standard deviation in pore size, as the method presents many operational variabilities. Spin coated, spray coated, and dip coated methods present average pore diameter slightly larger than 80 Å. The plasma etched and GO spin coated particle presents significantly increase in pore size, just over 100 Å. When clean zeolite particles are exposed to acid treatment, pore diameter decreases significantly (~30 Å) as the pores get unclogged and shrink, holding this property after spin coated with GO.

Figure 2:
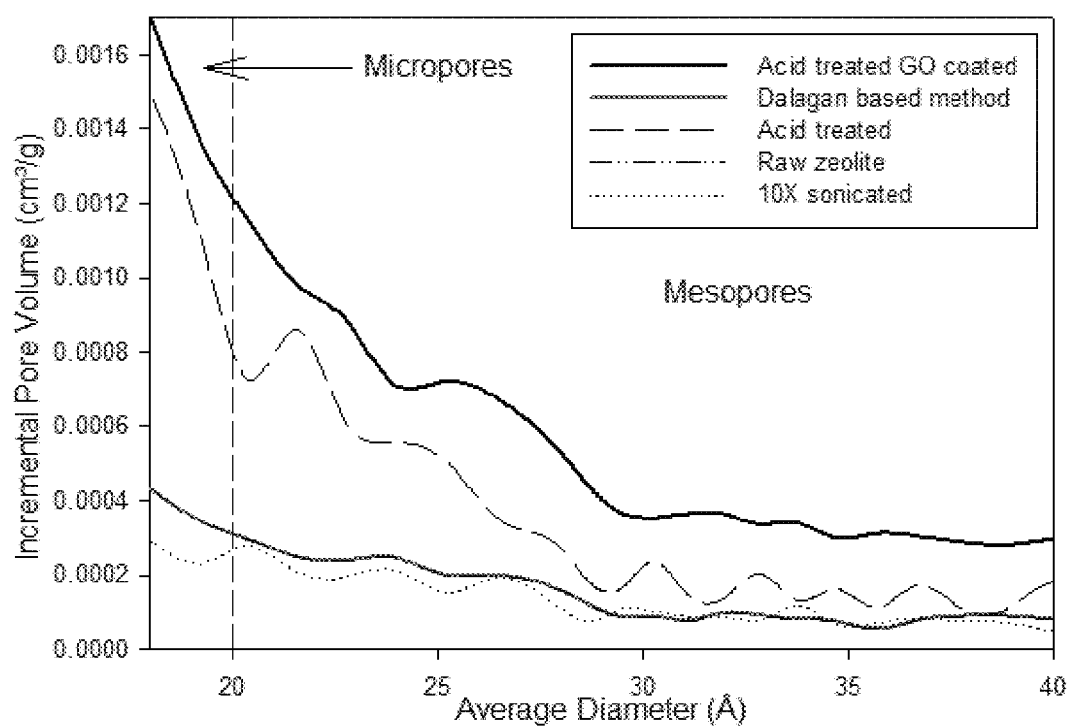
FIG. 2 shows pore size distribution of zeolite particles under different treatment and coatings using BJH method and Faas correction.

According to the IUPAC, the classification of pore sizes within the range of 20 Å to 500 Å is defined as mesoporous and the range from 7 Å to 20 Å is supermicroporous. Pore size distributions for the zeolite particles are shown in FIG. 2. where the data obtained was generated by graphical differentiation (dV/dD) with respect to diameter. All the samples show a continuous distribution extending well into the micro region. Particles receiving acid treatment have predominant area under the curves to the left of D=20 Å, denoting increasing significant micropore influence, especially the acid treated GO coated zeolite.

Figure 3:
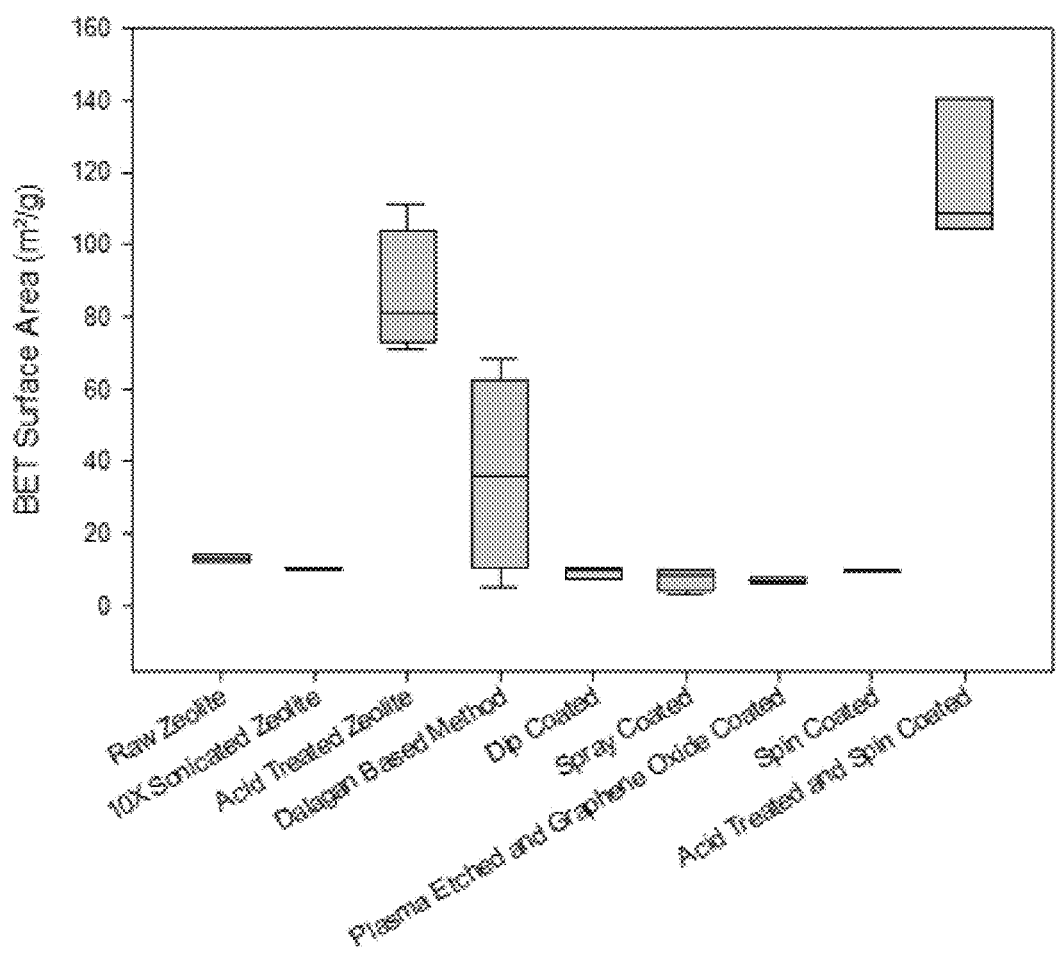
FIG. 3 shows surface area of zeolite particles under different cleaning and coating treatments.

Evaluation of the BET surface area of the zeolites (FIG. 3) show that the cleaning and most of GO coating methods maintain the same surface area of the raw material (~10 m$^2$ g). Surface area increases when particles are exposed to acid treatment. Dalagan based method provides mean surface area of ~40 m$^2$/g, with substantial variability. When clean particles are exposed to 12 hr acid treatment, surface area increases eight times, reaching 80 m$^2$/g and when GO coated it exceeds 100 m$^2$/g.

Figure 4:
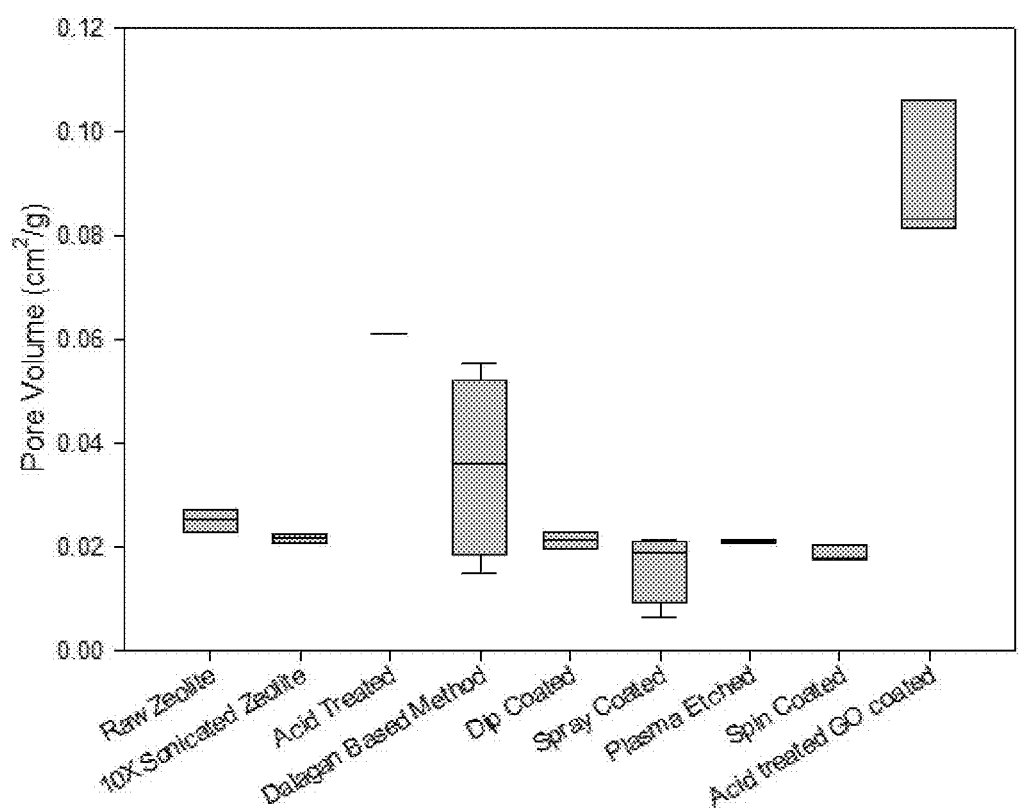
FIG. 4 shows pore volume of zeolite particles under different cleaning and coating treatments.

Most particles show pore volume at around 0.02 cm$^3$/g (FIG. 4). Pore volume increases when particles are exposed to acid treatment. Particles fabricated though Dalagan based method have pore volume around 0.04 cm$^3$/g with great variability. Clean zeolite particles that went through 12-hour acid treatment show 0.06 cm$^3$/g and just over 0.08 cm$^3$/g when GO coated. This suggests that dealumination due to acid treatment interferes with pore architecture.

Figure 5:
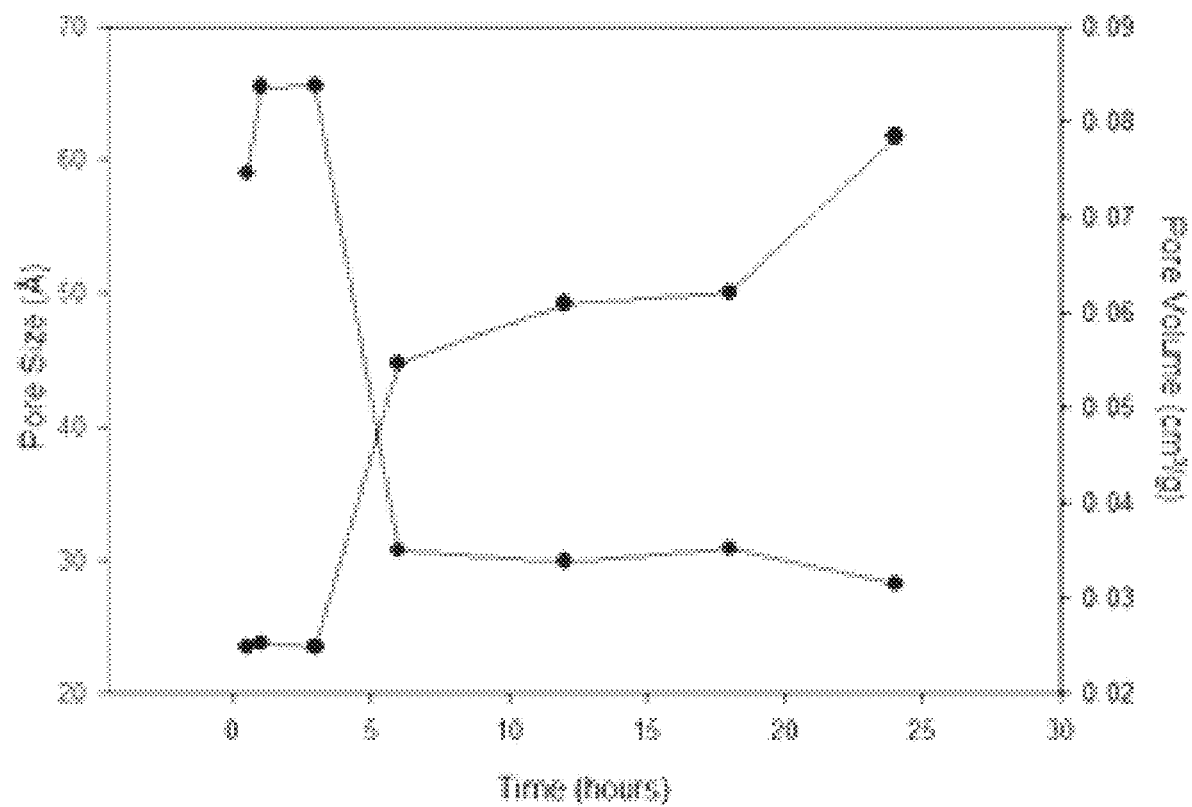
FIG. 5 shows single point pore volume and average pore size of zeolite particles under acid treatment over time.

To verify this hypothesis, we further examined the effects of acid reflux on the clean zeolite particles (FIG. 5). The single point pore volume was obtained by taking the sum of all the pore volumes within a specified range. The data shows the pore volume increases with increased exposure to the acid treatment at temperature of 85° C. The most substantial change in pore volume occurs at 6 hours with a pore volume of 0.054 cm$^3$/g. As time of acid treatment progresses, dealumination is known to take place as the volume of the pores increase while the pore diameter decreases up to 6 hr when it stabilizes around 30 Å. Dealumination is a method of chemical and structural modification of zeolites, where decationation takes place. Very common dealumination process consists of the treatment of samples in inorganic or organic acid. Under action of the introduced protons, ≡SiO—(Al(-))≡ bonds became hydrolyzed and changed firstly into more stable ≡Si—O—H units plus H—O—Al≡ split structure. Framework aluminum tends to reduce pore volume. It is also known that steaming reduces pore volume, but not necessarily the pore dimensions. As the zeolite particles progress on the treatment process, they increase concentration of silica and reduce concentration of alumina (dealumination). Alumina-rich zeolites are attracted to polar molecules such as water, while silica-rich zeolites work better with nonpolar molecules.

Figure 6A:
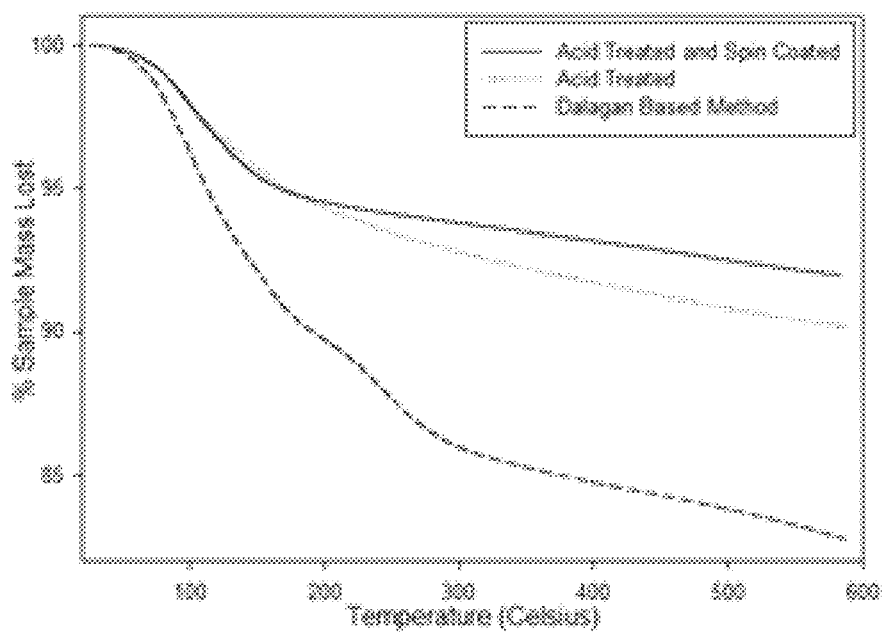
FIG. 6A shows thermogravimetric curves of zeolite particles exposed to chemical methods.
Figure 6B:
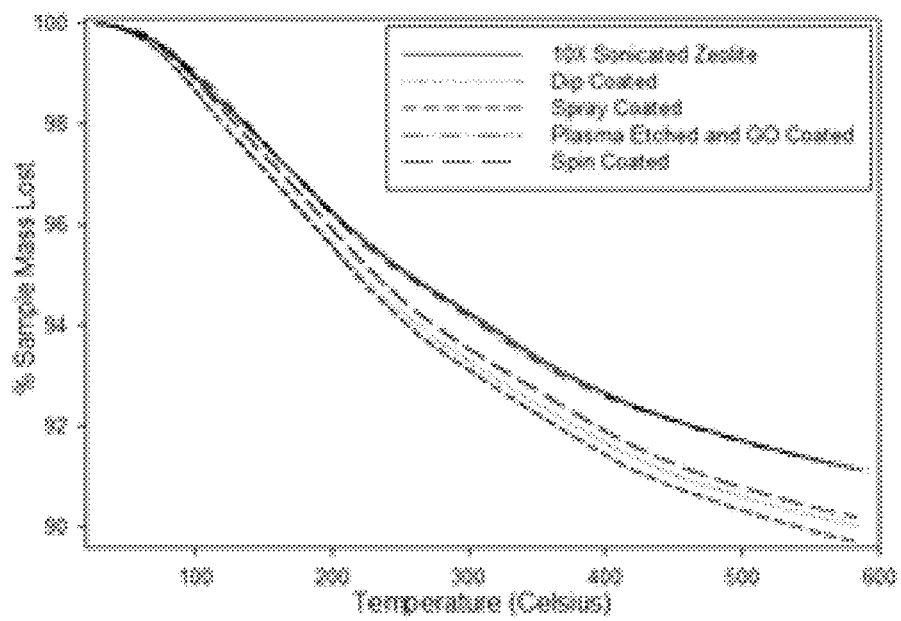
FIG. 6B shows thermogravimetric curves of zeolite particles exposed to physical methods.

Comparative TGA curves of the zeolites are presented in FIGS. 6A and 6B. Because the zeolites coated with GO in this study may be used in processes that might require elevated temperatures or might need heat treatment during the regeneration process, it was deemed important to understand their thermal stability limits. From the thermographs, it is apparent that moisture loss from both zeolites treated with physical and chemical methods started around 50° C. and continued up to approximately 600° C. for physical methods and until about 400° C. for Dalagan based method and only about 200° C. for acid treated. Comparison of the percentage weight loss of zeolite exposed to physical methods showed approximately 10% percentage weight loss of moisture for all samples, whereas the zeolite treated with Dalagan based had a total loss of about 14% and the acid treated and further GO coated particle had a total loss of approximately 6%. All zeolite temperatures (<100° C.), indicating the presence of water molecules which are weakly bonded to the surface. The weight loss occurring above 200° C. can be associated with structural water due to hydration complexes formed with exchangeable cations. The water loss above 400° C. can be associated with dihydroxylation, formed when exchangeable cations polarize water molecules, leading to release of more water from the zeolite cavities. Removal of a portion of the tetrahedrally coordinated aluminum from the zeolite framework has been shown to increase its thermal stability, which is often directly proportional to Si:Al ratio. The reason for this increase in stability might be attributable to the formation of new Si—O—Si bonds. The four hydroxyls in the product of reaction are each bonded to silicon; on heating, these four groups would be expected to condense to yield water and Si—O—Si bonds.

Figure 7:
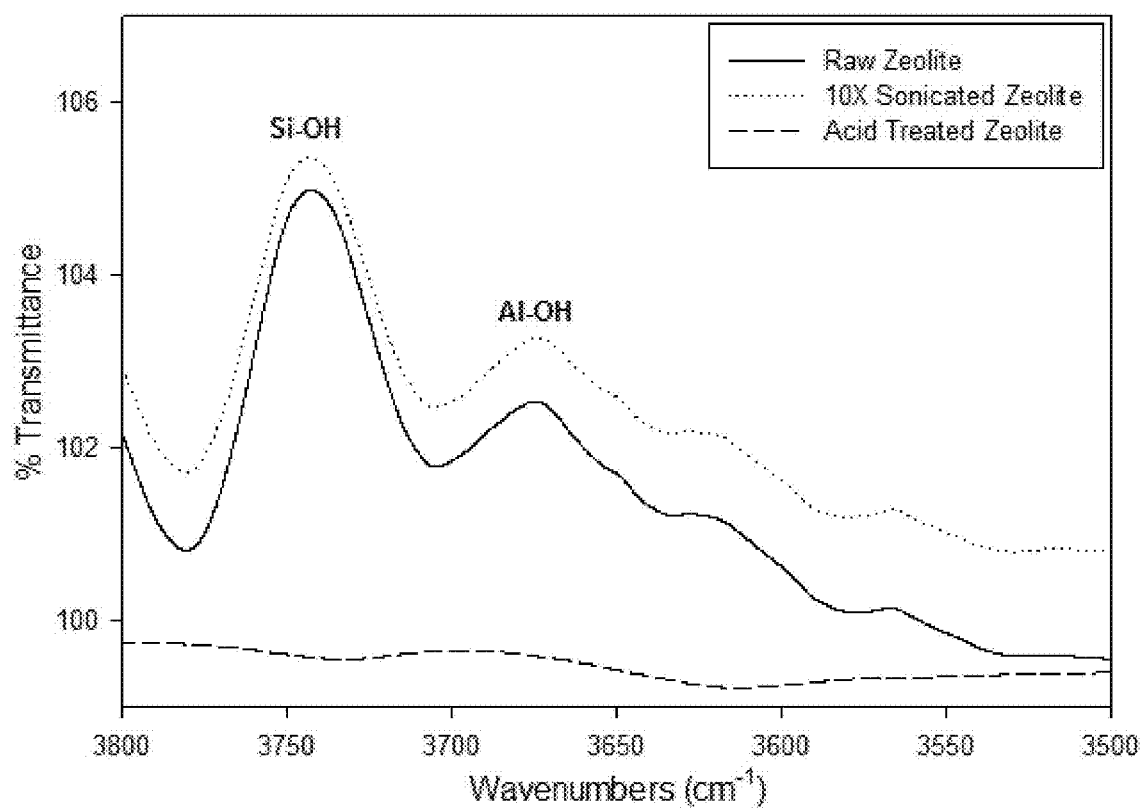
FIG. 7 shows FTIR spectra of O—H stretching vibrations in the region located between 3500 and 3800 cm-1 of the zeolite samples at different stages of fabrication.

Dealumination of the zeolite samples can be detected by FTIR in the spectral range of 3800 to 3500 cm$^{-1}$ showing the Si—OH and Al—OH bands, which are associated with the delamination of the zeolite. FIG. 7 shows a small variation of the signal around 3746 cm$^{-1}$ of O—H stretching vibrations of silanols after the acid treatment. This contrasts with the strong diminution of the signal at 3610 cm$^{-1}$ which is consistent with the reduction of the number of Si—OH—Al groups and the precipitation of aluminum outside the zeolite framework, throughout the fabrication process (from raw zeolite to acid treated GO coated).

The peak 3720-3740 cm$^{-1}$ and 3770 cm$^{-1}$ are associated with terminal silanol groups (SiOHs) with Al in an octahedral-like environment, very likely terminal too, which also reduce throughout processing of the particles. Both of the peaks at 3742 cm$^{-1}$ in the Si—OH region and a slight peak at 3670 cm$^{-1}$ 1 in the Al—OH region can be distinguished in the Raw and 10× sonicated zeolite samples, however these peaks become undetectable in the 12 hour acid treated zeolite sample. This opens the possibility that the increase of the hydrophobic character, that accompanies the partial exit of tetrahedrally coordinated aluminum out of the crystalline network, by effect of the hydrothermal treatment, causes the diminution of the bands at 3700-3642 cm$^{-1}$.

Figure 8A:
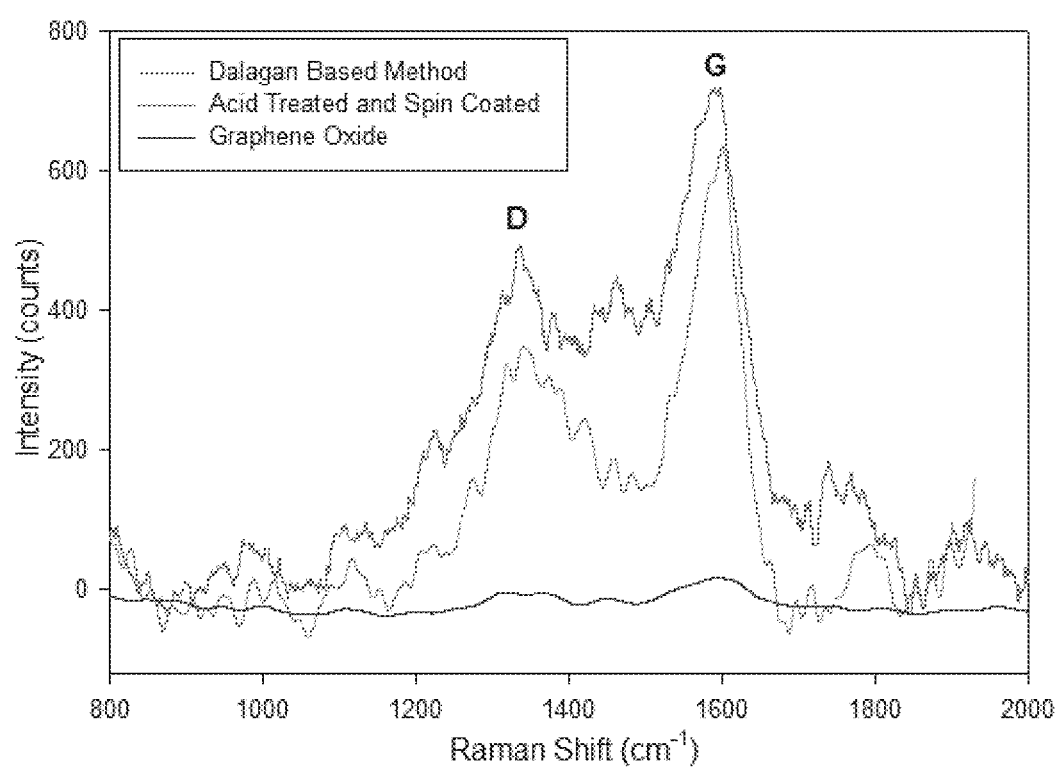
FIG. 8A shows a comparison of Raman spectra of zeolite particles coated with GO with chemical methods showing the D (~1350 cm-1) and G (~1585 cm-1) relative peak heights
Figure 8B:
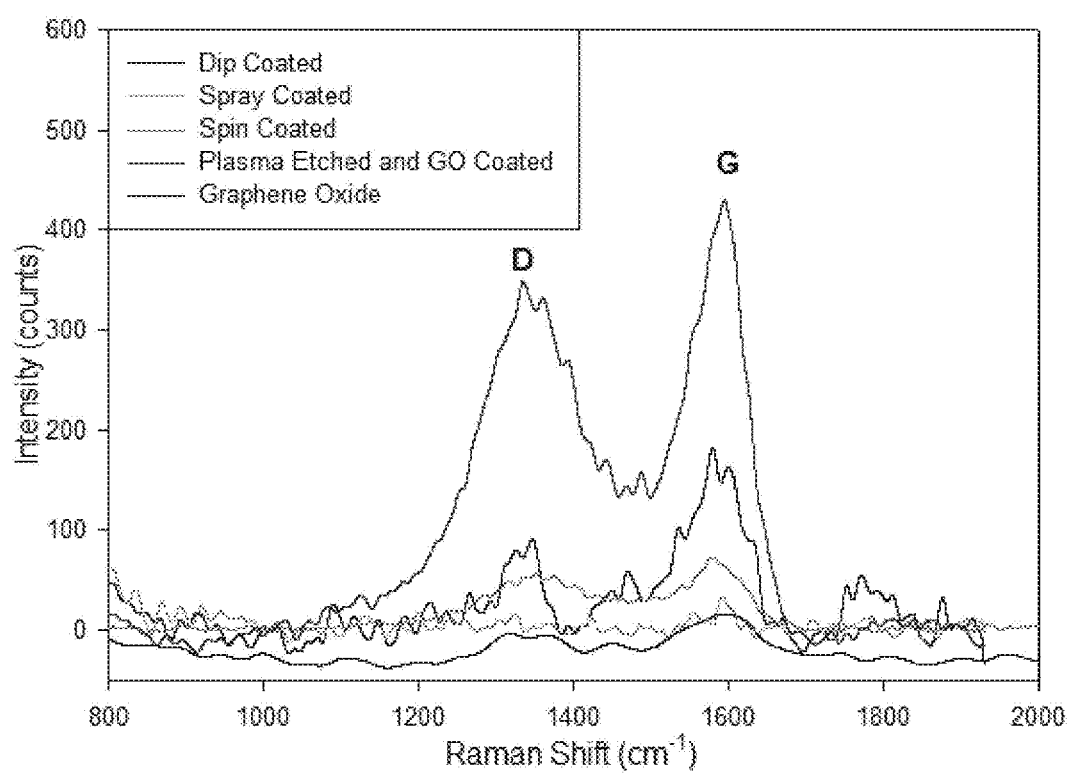
FIG. 8B shows a comparison of Raman spectra of zeolite particles coated with GO with physical methods showing the D (~1350 cm-1) and G (~1585 cm-1) relative peak heights
Figure 9A:
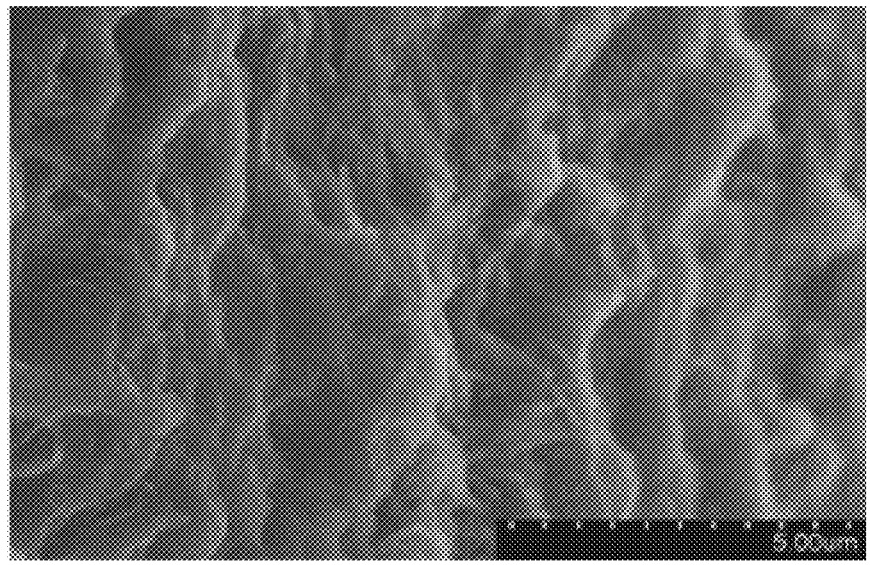
FIG. 9A shows SEM of clean zeolite (zeolite 10×) showing typical elongation features.
Figure 9B:
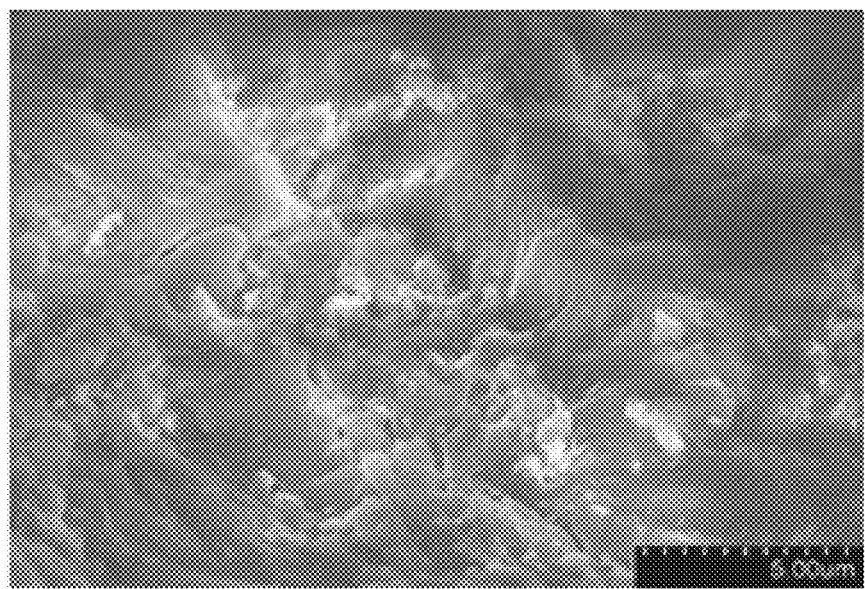
FIG. 9B shows SEM of acid treated clean zeolite particles showing small zeolite grains.

Surface Characterization, Evaluation of GO Coating, and Mechanisms of Attachment of GO to Zeolite Particles Presence of GO on the surface of zeolite can be demonstrated through Raman spectra. The Raman spectra observed from 800 to 2000 cm$^{-1}$ shows the presence of graphene oxide at the G and D peaks (FIGS. 8A and 8B). The G band (at ~1585 cm$^{-1}$) characterizes the sp$^2$-hybridized carbon-carbon bonds in graphene and occurs due to carbon-carbon bonds stretching in graphene, while D peak (at ~1350 cm$^{-1}$) is the disorder-induced band at the edge of graphene sample. The D band appears when the laser hits the edges of the graphene sheets as a result of symmetry breaking and change in selection rules. Both the Dalagan based and the acid treated spin coated samples show a presence of graphene oxide deposits. In the physical methods of coating, each method except the spray coated zeolite show a clear presence of graphene oxide on the sample. Increasing ratios at these peaks indicate that reduction of the material is occurring (FIGS. 8A and 8B). The acid treated and spin coated sample shows the greatest reduction of the graphene for the chemical-based method, and the plasma etched sample shows the greatest reduction among the physical coating methods. FE-SEM images for representatives of clean zeolite (FIG. 9A) and acid treated zeolite (FIG. 9B). Clean zeolite has typically elongated features, which are also observed on the raw zeolite particles, however several small particles, probably dust, cover the surface of these features. After prolonged acid treatment, elongated features are rare, and zeolites show outline sketch of smaller grains, supporting the previous analysis on the pore developments and structures. FE-SEM observations suggest that prolonged acid treatment form small zeolite grains. Graphene oxide was observed on GO zeolite particles. GO are transparent veil-like structures, containing highly-wrinkled graphitic layers caused by the distortion in the graphene layers due to the linkage of the residual oxygen after thermal reduction, while large nanosheet sizes are preserved.

The first mechanism of attachment of GO to zeolite is electrostatic interactions. The mechanism of coating GO sheet on the zeolites surface is mainly the interactions of the interlayered hydrogen bonds for facilitating GO sheet adherence to the zeolites surface-electrostatic interactions between GO-GO particles and GO-zeolite particles. Deposition of particles onto surfaces is very often controlled by the zeta potential of particles and collectors. Interaction between GO-GO and GO-zeolite particles can be evaluated through measurement of zeta potentials across a range of pH of the suspensions of the particles, Zeta potential values of GO and zeolite particles at various pH values were assessed. Electrostatic interactions has been cited as mechanism of removal of heavy metals by biochar when surface-sorbed by an anionic surfactant, giving biochar negative charges, which improved the electrostatic attraction between biochar and Cr(III), however it enhanced repulsion between biochar and Cr(IV). Graphene oxide contains epoxide and hydroxyl functional groups, and ions such as Na can be adsorbed vertically onto the oxygen atoms of the graphene oxide-epoxide (GO-epoxide). The adsorption energy for this case was reported to be approximately twice the value for the adsorption of Na onto the pristine graphene, probably due to the doping effect of the oxygen in the epoxide, enhancing the adsorption energy.

In this study, both GO and zeolite are negatively charged for all the pH values with the exception of GO at pH 2 ($2 \leq pH \leq 12$), suggesting that GO-zeolite and GO-GO interactions are repulsive. Similar findings for GO-zeolite and GO-GO interactions have been reported in the literature by several other investigators. Zeta potentials of both GO and zeolite decrease with increasing pH, suggesting that the suspended particles become more stable with increasing pH. Stability of suspended particles is expected to increase with increasing absolute zeta potential values. The commonly used threshold for absolute zeta potential value for stable colloidal suspensions is considered to be >30 mV. Therefore, particle suspensions with pH >5.5 are desired, because both GO and zeolite particles are stable.

The second possible mechanism are hydrophilic/hydrophobic interactions. GO particles are mostly hydrophilic and are also known for their amphiphilic properties as well. Natural zeolite particles are also amphiphilic particles. The zeolite hydrophobicity and hydrophilicity strongly depend on the aluminum content, which affect adsorption of polar and apolar molecules into the zeolite. The hydrophobicity is enhanced with dealumination. This makes the GO coated zeolite a versatile engineered material for targeting a broad range of compounds from water.

The third possible mechanism of attachment is hydrogen bond network formed between oxygen functionality on GO and water, present in the graphene oxide solution or in the intramolecular water molecule in the zeolite framework. All the water molecules in zeolite are bonded to extra framework cations and every hydrogen atom is H-bonded to framework oxygens.

Figure 10A:
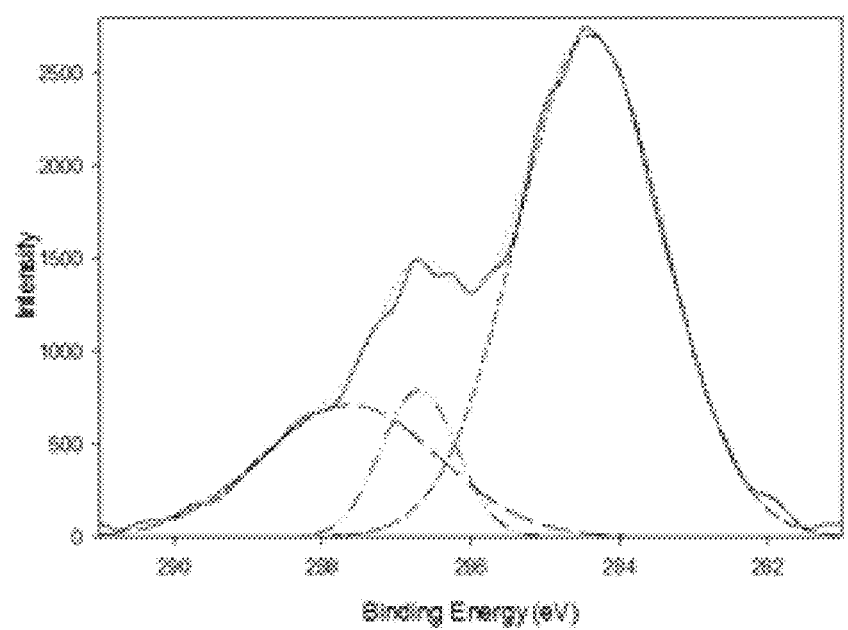
FIG. 10A shows XPS data for graphene oxide.
Figure 10B:
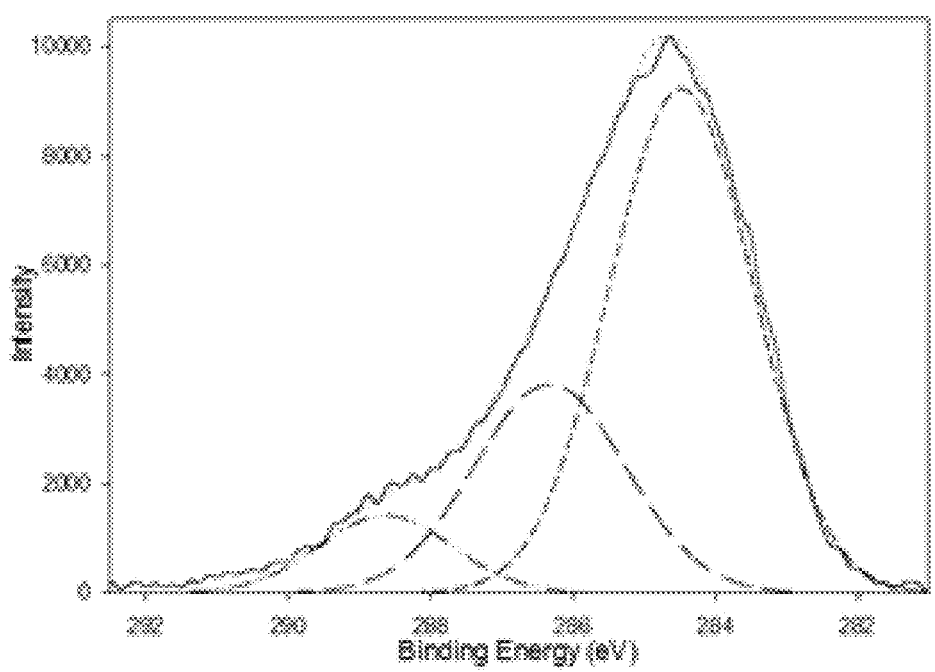
FIG. 10B shows XPS data for acid treated GO coated zeolite.

X-ray photoelectron spectrometry (XPS) was performed to confirm the predominant mechanism. Results (FIGS. 10A and 10B) show one large peak at 284 eV in the C1 s region for both the GO sample and the acid treated GO coated sample. The GO sample shows a very intense and wide peak at 287 eV which is reduced in the acid treated GO coated sample. However, the peak at 286 eV in the acid treated GO coated is much more intense than in the GO. This peak corresponds to —C—N— bonds, which is associated with hydrophobic interactions. It would be highly unlikely that hydrogen bonding is the dominating mechanism of attachment because the samples are dried, in which case these interactions would be for the most part eliminated. For the case of the acid treated GO coated zeolite, hydrophobic interactions seem to be the dominating mechanism of attachment, however this does not mean it is the only mechanism of attachment. It is likely that hydrogen bonding has a greater impact when the zeolite is initially coated, however the dried material at the end of the process lacks their interactions. With acid treatment, dealumination leads to the increasing hydrophobic interactions as indicated in the XPS data.

Sorption experiments of zeolites. Brief assessment of performance of all zeolite particles is detailed in Table 1A.

TABLE 1A

| Zeolites | Cd uptake mg/g | Adsorption % RE | Desorption % DE |
| --- | --- | --- | --- |
| Acid treated and spin coated | 695 | 75 | 19 |
| Clean zeolite | 708 | 77 | 89 |
| Spin coated | 718 | 78 | 99 |
| Dalagan based method | 656 | 71 | 0 |
| Dip coated | 720 | 78 | 95 |
| Acid treated zeolite | 661 | 72 | 14 |
| Plasma etched and GO coated | 709 | 77 | 96 |
| Spray coated | 714 | 77 | 94 |

Adsorption performance was similar for removal of cadmium ions and varied from 71% to 78%. On the other hand, their desorption properties varied significantly among zeolites. Desorption of cadmium from most of the particles varied from 89% to 99% under the experimental conditions. Three of the zeolites, Dalagan based method, acid treated zeolite and acid treated and spin coated did not have significant desorption of cadmium ions (from 0% to 19%, respectively) showing more stability under these conditions. Literature has reported vast list of methods of desorption and regeneration for zeolites that can be further explored for our particles, with vast variability in percent removal (from 30% to 100%) and desorption efficiency (from 24% to 99.5%), depending on the adsorbent, heavy metals, experimental conditions and technology applied. Further work is needed to optimize the method of recovery of heavy metals and regeneration of adsorbent. As per adsorption capacity, it has reported to vary from ~6 mg/g (natural zeolite) to ~1600 mg/g synthetic nanozeolite A for cadmium ions. Synthetic zeolites are expected to perform better as they are fabricated under controlled conditions, fine-tuned for better performance and homogeneous. The adsorption capacity of our zeolites varied from 661 mg/g to 720 mg/g, which is a great performance for a naturally based material further improved with physical treatments (cleaning and acid treatment) and/or engineered with graphene oxide, allowing applications at large scale in water industry, which estimated cost is $4/kg, being competitive when compared to the market price of the granular activated carbon (GAC) of 5 to 15 $/kg.

From all the coating methods tested and presented in this study, the acid treated and GO spin coated zeolite particle appears to have better overall performance, in terms of larger surface area, smaller pore diameter and larger pore volume, the most thermally stable material, with clear indication of GO coating evidenced by Raman, SEM and TEM, while maintaining good performance of adsorption capacity when compared with the other zeolites. It is expected good adsorption properties with cationic, anionic and non-ionic compounds and broad application of this material.

Conclusion. This work presents several proposed methods of coating natural zeolite particles with graphene oxide. Through extensive analysis, it is possible to show that zeolite particles that are cleaned and acid treated, followed by GO spin coating have better adsorption properties. These particles enhanced external surface area, smaller pore diameter, larger pore volume, improved thermal stability and stable at pH>5.5. Raman spectroscopy and SEM and TEM imaging demonstrate the presence of graphene oxide in the zeolite surface. Potential mechanisms of attachment are electrostatic interactions, hydrophobic interactions and hydrogen bond interactions.

Example 2

General Methods

Column Adsorption. The column experiment was conducted in glass columns of 21 cm length and 2 cm internal diameter. A fixed-bed was created by placing a piece of gauze at the bottom of the column, dry loading the media into the column to a bed height of 13 cm and placing a piece of gauze at the bottom of the column. Before filtration, the column was connected to a peristaltic chemical metering pump, and the pH of the adsorbents was adjusted to 7 with 0.1 M NaOH, then rinsed with 1 L deionized water. A 1 ml of 40 mg $L^{-1}$ organic model compounds and Persistent Organic Pollutants (POPs) solutions were prepared to test the removal efficiency of adsorbents, individually. The solution flowed into column (downward flow) at a rate of 5 mL $min^{-1}$.

The saturation experiment was studied by the same concentration of adsorbate. To observe reactions with actual POP contaminants, 200 μg $L^{-1}$ BPA, PFOA and PCB solutions were prepared. The following equations were used for the calculation of the removal efficiency and adsorption capacity of the absorbents.

$$\text{Removal efficiency}(\%) = \frac{(C_0 - C_f)}{C_0} \times 100\% \quad (1)$$

$$\text{Adsorption capacity}(mg/g) = \frac{(C_0 - C_t) \times V}{m} \quad (2)$$

All the experiments were performed in triplicate, and data were presented as mean±SD (standard deviation). The removal efficiency and adsorption capacity were calculated by the equations above (1) and (2), where $C_0$ (mg $L^{-1}$), $C_f$ and $C_t$ (mg $L^{-1}$) are the initial, final and outlet concentration for dyes and POPs, V (L) is the solution volume and m (g) is the weight of GO or rGO.

Batch adsorption. A 1 g of adsorbent was added to 100 ml of organic model compounds solution of the desired concentration at pH 6.0 in 250 ml reagent bottles and were agitated at 150 rpm for 48 h at room temperature (25±2° C.) in a mechanical shaker. The concentration of dyes was measured by times. The equilibrium ($q_e$) was calculated by the equation (1) and (2). The batch adsorption study was replicated thrice for each of the adsorbents.

Desorption of GO and rGO from the natural zeolite. To measure desorption of graphene-based materials from zeolite, 10 g of samples were immersed in 100 ml water and placed on a shaker table for 24 hours at 200 rpm. The solid was removed by filtration through 0.2 μm filters (Whatman) using a vacuum pump and rinsed the adsorbents by DI water for three times. The weight loss of adsorbents was measured to determine the stability of GO and rGO on the zeolites surface.

Thermal regeneration. Thermal regeneration of the adsorbents was carried out in an electric furnace. According to the literature, rGO has an excellent thermal stability under 550° C. and the melting points of PCB, BPA, and PFOA are lower than 500° C. So, the samples were placed in the electric furnace at 500° C. under an N2 atmosphere for 1 hour with at 10° C. mini. The removal efficiency of dispersed blue 26 (melting point at 217° C.) was used to test the regeneration ability of our samples.

Analytical Methods. Raman spectroscopy (Raman) was carried out using a Horiba XploRA Plus Raman microscope with a 532 nm HeNe laser with three accumulations of 10 seconds each. Infrared (IR) spectra were collected with a Shimadzu Vector Fourier transform spectrophotometer at a resolution of 4 $cm^{-1}$ with 40 scans per spectrum. X-ray photoelectron spectroscopy (XPS) spectra of samples were obtained using an HP5950A ESCA spectrometer with monochromatic Al Kα radiation as the X-ray source. Zeta potential was measured using a zetasizer nano ZS (ZEN3600, Malvern), using water as background. The morphologies of as-prepared samples were characterized by scanning electron microscopy (SEM) and energy-dispersive X-ray spectroscopy (EDS), performed on a Hitachi S-4800 equipped with a Bruker EDS detector. EDS element mapping was checked under 200 kV accelerating voltage with an image resolution of less than 0.08 nm and energy resolution of 0.35 eV.

The concentration of methylene blue and disperse blue 26 was detected by a UV visible spectrophotometer (UV-1800) Thermo Scientific. The concentration of sodium fluorescein was determined by the Saynergy H4 multi-mode plate reader. The pH of solutions was measured by a pH meter model OAKTON 700. Quantification of total BPA and PFOA was carried out by liquid chromatography coupled with tandem mass spectrometry through a turbo spray interface operating in the negative ion mode. The mobile phase consisted of water and methanol at a flow rate of 0.4 mL $min^{-1}$. The elution program was as follows: linear gradient from 40% to 60% of methanol for 20 min and then reverting to initial conditions allowing 10 min for column stabilization. The eluates from the analytical column were diverted by the switching valve to waste, except for the elution window from 9 to 11 min. The injection volume was 10 μL, and the temperature for the analytical column was set at 35° C. Quantification of PCB was detected with GC-MS (Shimadzu GCM S-QP2010 plus). The extraction of PCBs from water samples using method 3510 (separatory funnel) extraction method for subsequent analysis by SW-846 EPA Method 8082A.

Example 3

Fabrication Methods of Graphene Oxide Coated on the Natural Zeolite

Materials. Australian natural zeolite (diameter: 0.7-1 mm, chemical composition. 68.26% $SiO_2$, 12.99% $Al_2O_3$, 4.11% $K_2O$, 2.09/CaO, 1.37% $Fe_2O_3$, 0.83% MgO, 0.64% $Na_2O$, 0.23% $TiO_2$, Zeolite Australia Ltd.), GO (ACS Materials), granular activated carbon (coconuts) (GAC, General Caron corporation), the dyes, which are disperse blue 26 (Crescent chemical), methylene blue (Electron Microscopy Sciences), and sodium fluorescein (Pfaltz &Bauer), are chosen as the representations for neutral, cationic, and anionic organic model compounds. Bisphenol A (BPA, ≥99%, Sigma-Aldrich), perfluorooctanoic acid (PFOA, 96%, Sigma-Aldrich), polychlorinated biphenyl (PCB, Aroclor 21, 200 μg mL$^{-1}$, Sigma-Aldrich).

Clean zeolite. Raw zeolite was cleaned before fabrication. 40 g of raw zeolite was added into a large beaker and filled in with 500 mL of DI water. Beaker was then placed in the sonicator and set the frequency as 37 kHz for 15 minutes. This step was repeated for ten times. (The zeolite was rinsed by 500 ml for each time) The sonicated zeolite was immersed in 200 mL DI water in a large beaker and microwaved at low power for 15 minutes to bring the DI water to a low boil. This step was repeated for ten times. (The beaker was refilled with 200 ml DI water before microwave treatment) Finally, clean zeolite was rinsed and dried in the oven at 100° C. for 24 h.

Spin coating, vacuum coating and drying coating method. 1.0 mg mL$^{-1}$ and 2.5 mg mL$^{-1}$ 1 GO aqueous solutions were made by sonication of the solutions for at least 2 hours at 40–60° C.

Spin coating method: 15 ml of 1 mg mL$^{-1}$ aqueous solution of GO was poured on top of 15 g clean zeolite and was set to spin at 600 rpm for 5 min to cause uniformly spreading of the solution onto the zeolite. Then it was sped up to 800 rpm for 5 min to thin the solution layer, and finally the spin coated GO on the zeolite (SCGZ) was kept at 1600 rpm for 5 min to dry the samples. Theoretical loading=1 mg g$^{-1}$.

Vacuum coating method: 15 g of clean zeolite was mixed with 15 ml of 2.5 mg mL$^{-1}$ aqueous solution of GO. Then the mixture was poured into a filtration apparatus with a filter membrane (diameter 0.45 μm), and the vacuum was held for 10 minutes. Finally, vacuum coated GO on the zeolite (VCGZ) was placed in an oven at 100° C. for 24 h. Theoretical loading=2 mg g$^{-1}$.

Dry coating method: 15 ml of 2.5 mg mL$^{-1}$ GO solution was added to the beaker containing 15 g of clean zeolite and shaken on a shaker for 120 min at 150 rpm. Finally, dry coated GO on the zeolite (DCGZ, also referred to as DMGZ) was dried at 100° C. for 24 h. All the samples were rinsed with ethanol for three times and by water three times to remove the extra GO on zeolites surface. Theoretical loading=2.5 mg g$^{-1}$.

Figure 11:
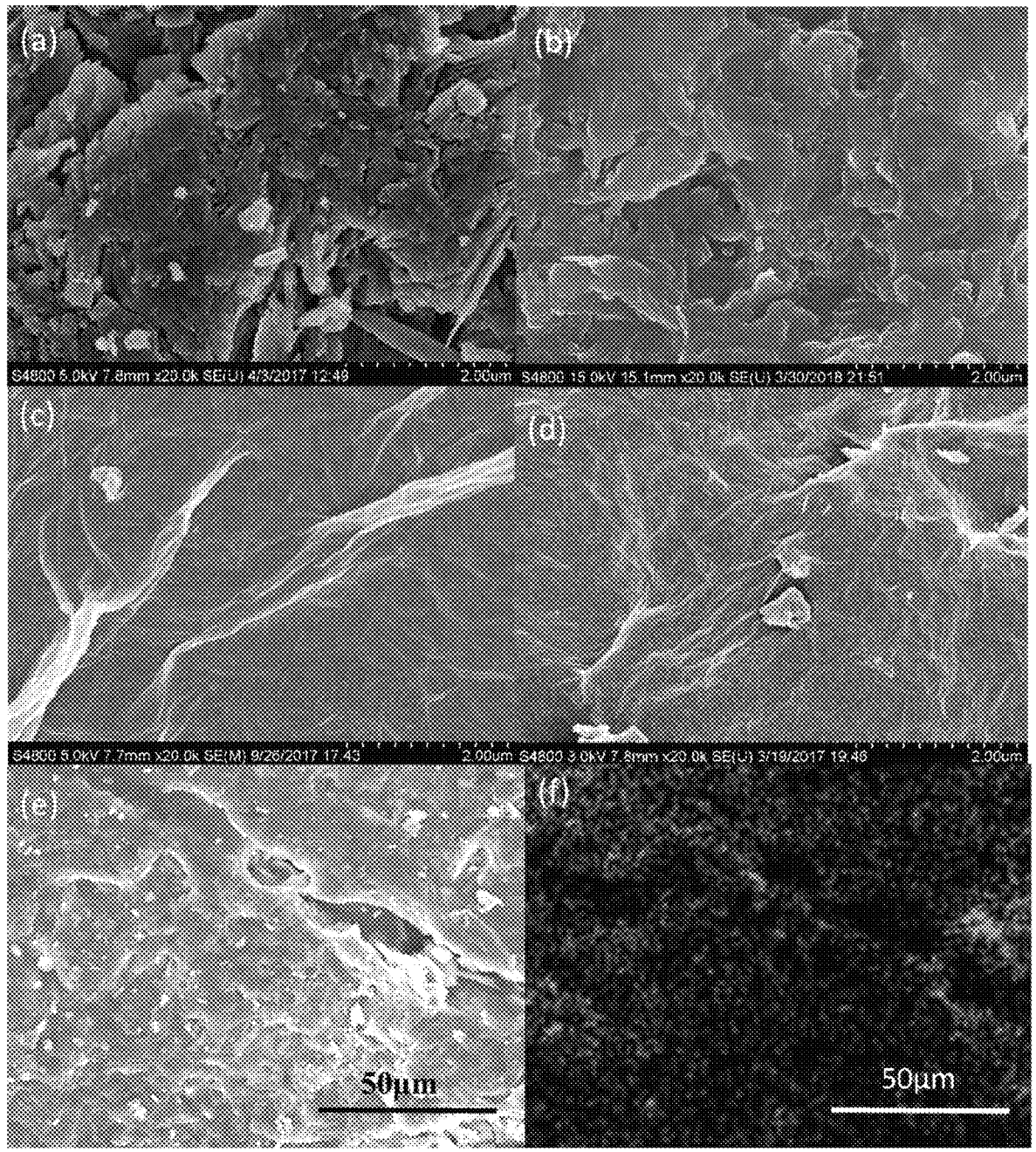
FIG. 11 shows SEM images of natural zeolite (a), SCGZ (b), VCGZ (c), DCGZ (d), and EDX element mapping of carbon for DCGZ is shown in the (e) and (f).

Characterization. The morphology of the natural zeolite (a), SCGZ (b), VCGZ (c), and DCGZ (d) was determined by SEM shown in FIG. 11, respectively. The rough and porous structure of the natural zeolite and SCGZ can be seen clearly in (a) and (b) in FIG. 11. It is hard to find large GO sheets on SCGZ due to a lower loading of GO (1 mg mL$^{-1}$). After the combination with GO and the zeolite by vacuum and dry coating methods, GO presents the sheet-like structure with a smooth surface on the zeolite which has a much more continuous surface, shown in (c) and (d) in FIG. 11. EDS elemental mapping of carbon for DCGZ revealed that the carbon layers were partially uniformly dispersed on the surface of zeolite, as shown in (e) and (f) in FIG. 11.

Figure 12A:
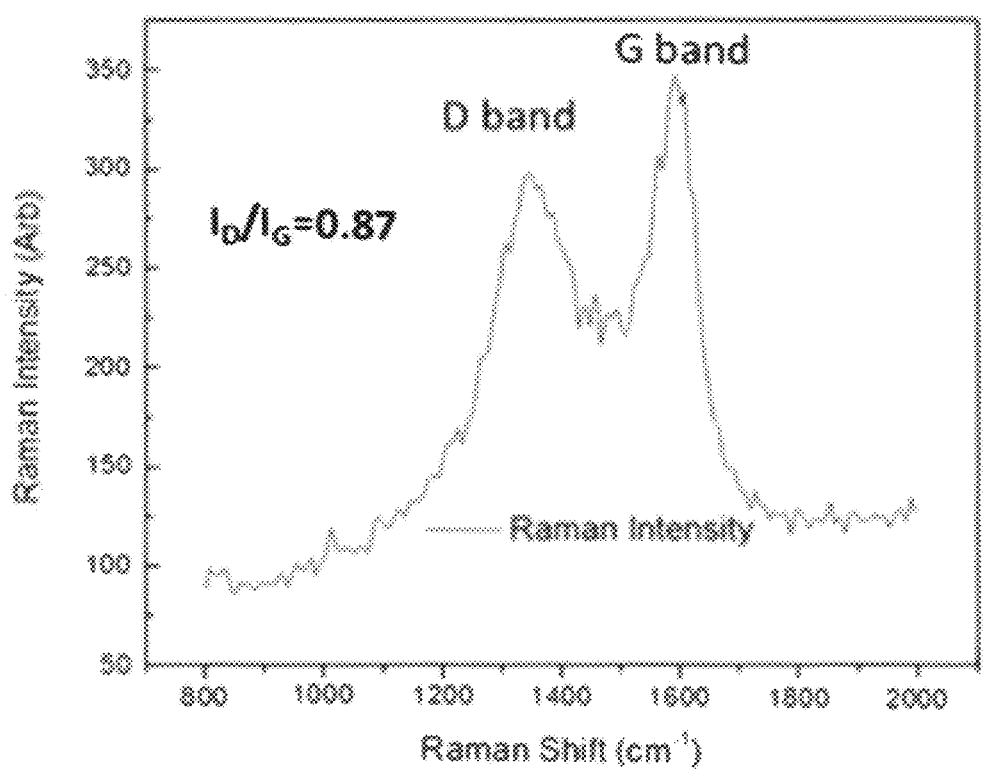
FIG. 12A shows a Raman spectra of DCGZ.

Raman mapping is used to map the sample surface with lateral resolution as good as 1 μm. This micro-scale Raman mapping is used to check GO distribution on zeolites surface. The micro-scale Raman map of the DCGZ shows two peaks (FIG. 12A): The G-band of GO appears at 1594 cm$^{-1}$ and that of D band at 1341 cm$^{-1}$.

Figure 12B:
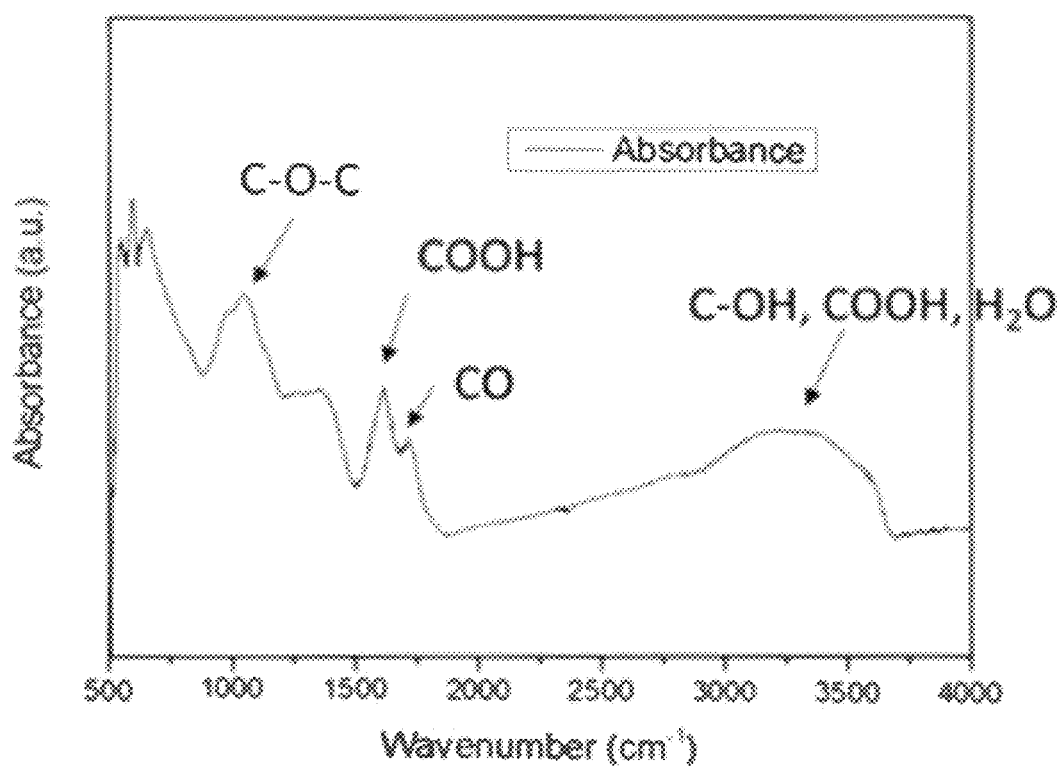
FIG. 12B shows FT-IR of DCGZ.

FIG. 12B shows the FT-IR spectra of DCGZ. In the range of DCGZ, the broadband at 3427 cm$^{-1}$ can be assigned to the stretching vibration of the —OH groups situated on the surface of GO. The peak at 1725 cm$^{-1}$ corresponds to the —COOH functional groups and the appearance of a peak at 1631 cm$^{-1}$ is owing to the skeletal vibration of unoxidized graphitic domains. The peak at 1393 cm$^{-1}$ is attributed to the —OH deformation peak and bending vibration of interlayer water. The C—O (epoxy) and the C—O (alkoxy) stretching vibration peak of GO appear at 1231 and 1061 cm$^{-1}$, respectively.

Physical properties of clean zeolite, granular activated carbon (GAC) (coconuts), SCGZ, VCGZ and DCGZ are summarized in Table 3A. The surface areas, volumes and pore sizes were calculated by the Density Functional Theory (DFT) approach. It shows that the specific pore volume and surface area follows the trend: GAC>DCGZ>VCGZ>SCGZ>clean zeolite. GAC as a successfully commercialized adsorbent, has a 0.42 cm$^2$ g$^{-1}$ specific pore volume and 1231 m$^2$ g$^{-1}$ specific surface area. Also, it displays that the loading of GO on zeolites surface has a strong impact on pore structure. The higher of loading of GO, the higher specific pore volume and surface area it exhibits. Compared with the clean zeolite, the specific pore volume and surface area of DCGZ were increased from 3.79×10$^{-2}$ to 0.11 cm$^3$ g$^{-1}$ and 14.7 to 159.4 m$^2$ g$^{-1}$, respectively. It demonstrates that GO coating layers increases the pore volume and surface area significantly and it may result in the improvement for the organic model compounds and POPs adsorption capacity.

TABLE 3A

BET surface and pore structure characteristics of adsorbents

| Samples | Pore structure | | |
|---|---|---|---|
| | $V_{DFT}$ (cm$^3$ g$^{-1}$) | $S_{DFT}$ (m$^2$ g$^{-1}$) | Pore size (Å) |
| Clean zeolites | 3.79 × 10$^{-2}$ | 14.7 | 9.4 |
| GAC | 0.42 | 1231 | 5.11 |
| SCGZ | 5.14 × 10$^{-2}$ | 45.32 | 7.37 |
| VCGZ | 9.31 × 10$^{-2}$ | 89.4 | 5.21 |
| DMGZ | 0.11 | 159.4 | 5.95 |

Figure 13A:
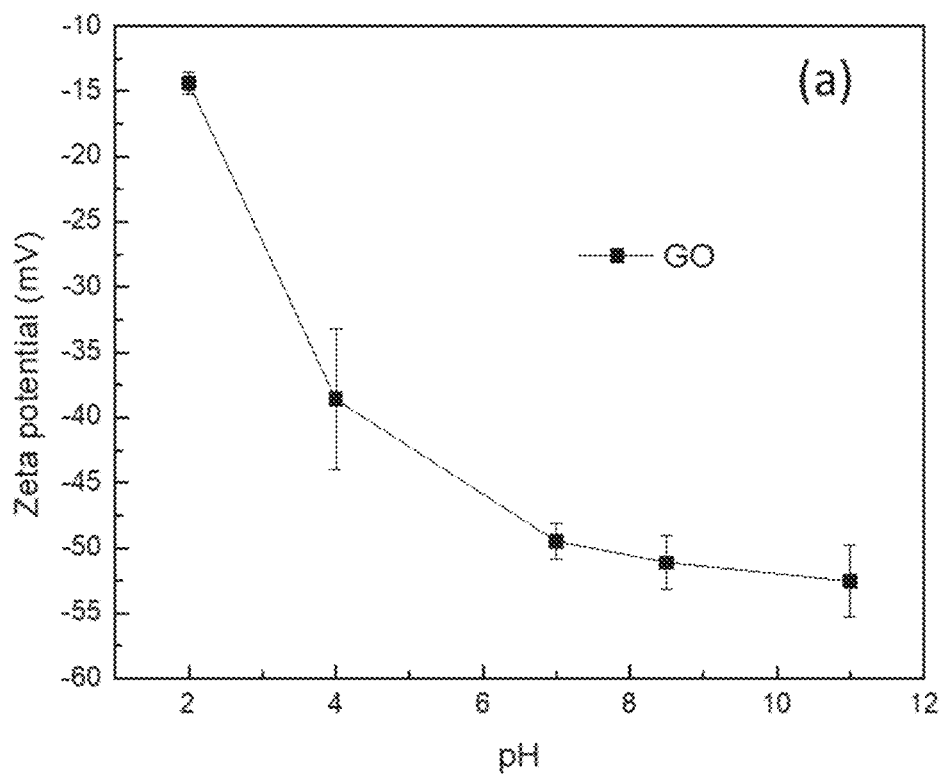
FIG. 13A shows the Zeta potential vs. pH for GO.

The surface charges of clean zeolite, SCGZ, VCGZ, and DCGZ in aqueous solutions were further examined by zeta potential measurements at different pH values ranging from 2.0-11.0. It is used for explanation of the interactions between GO and the zeolite, as well as predicting the adsorption capability of our adsorbent for variably charged POPs adsorption. As shown in FIG. 13A, the zeta potential values of GO are from ~14 to ~53 mV at pH range from 2 to 11. The negative charges originated from the ionization of the carboxylic acid and phenolic hydroxy groups located on the GO. The values of zeta potential for clean zeolite are negative, too. The mechanism of coating GO sheet on the zeolites surface is mainly the interactions of the interlayered hydrogen bonds for facilitating GO sheet adherence to the zeolites surface.

Figure 13B:
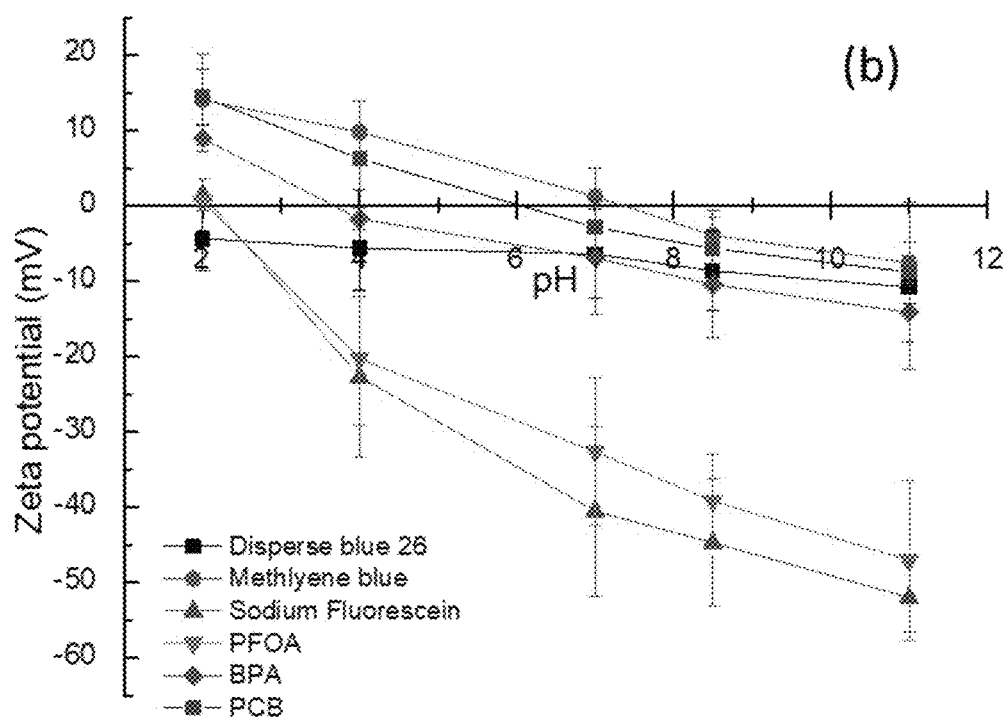
FIG. 13B shows the Zeta potential vs. pH organic model compounds.
Figure 13C:
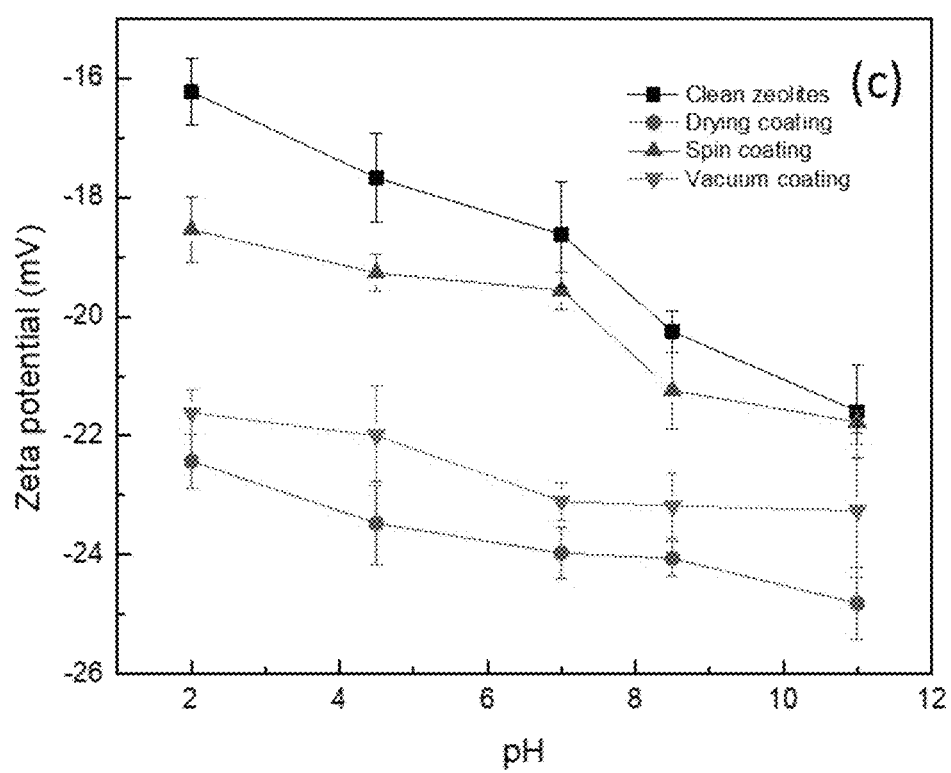
FIG. 13C shows the Zeta potential vs. pH for clean zeolite and GO coated zeolites by different coating methods.

The values of zeta potential for targeted organic model compounds and POPs are shown in FIG. 13B. It reveals that the values of the zeta potential of methylene blue and PCB are similar and in the range from 15 to –9.5 mV from pH 2 to 11. The values of the zeta potential of sodium fluorescein flows the trend of the values for PFOA. Moreover, the values of the zeta potential of disperse blue 26 are comparable with the ones of BPA. These can be explained by the similar molecule structure or charges of organic model compounds and POPs. Finally, the values of the zeta potential for clean zeolite, SCGZ, VCGZ and DMGZ are shown in FIG. 13C. It shows that the value of zeta potential of the samples depends on the loading of GO coated on the zeolites surface. The higher the loading of GO, the lower the value of zeta potential.

Figure 14:
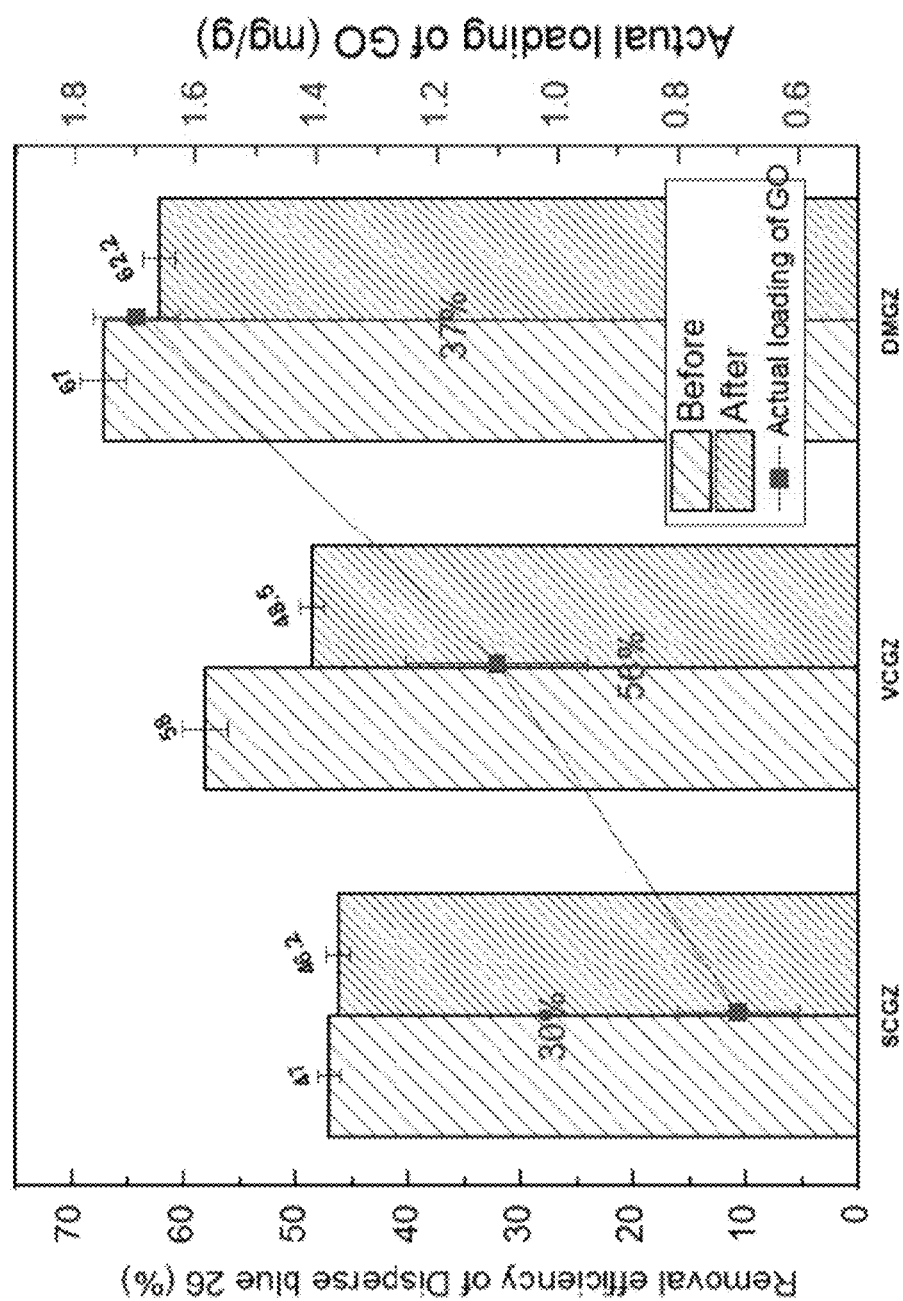
FIG. 14. shows the removal efficiency of before and after desorption experiment for dispersed blue 26 by different coating methods.

Desorption experiment. Desorption experiment was conducted to study the stability of different coating methods. It is known that an inappropriate coating method could cause the loss of GO when the solution is fluxing through the adsorbents. Herein, stronger bonding and higher loading of GO are desired to gain a better adsorption performance and stability during water treatment process. In FIG. 14, it displays the decrease of the GO loading for spin, vacuum and dry coating methods after shaking for 24 hours. Even though the theoretical loading of GO on SCGZ is approximate 1 mg g$^{-1}$, it was reduced to approximately 0.7 mg g$^{-1}$ and the removal efficiency of disperse blue 26 remained as low as 45.2%. VCGZ lost approximately 0.7 mg g$^{-1}$ (56%) of GO on the zeolites surface. VCGZ has the darkest solution of dissolved GO which was desorbed from zeolites surface. It results from the high loading of VCGZ (2 mg mL$^{-1}$) and a weak interaction between GO and the zeolite. The vacuum coating method gives a short contact time for GO and the zeolite. And GO sheets can be easily accumulated on the zeolites surface and formed a multiple layered structure which can be easily detached from zeolites surface. DCGZ displayed better performance than the others. The removal efficiency was reduced from about 67% to 62.2%. Meanwhile, the loading of GO reduced to approximately 1.7 mg g$^{-1}$. Based on this experiment, the dry coating method formed a stronger interaction between GO and the zeolite which benefits from longer contact time and proper distribution during the shaking and drying process.

Figure 15A:
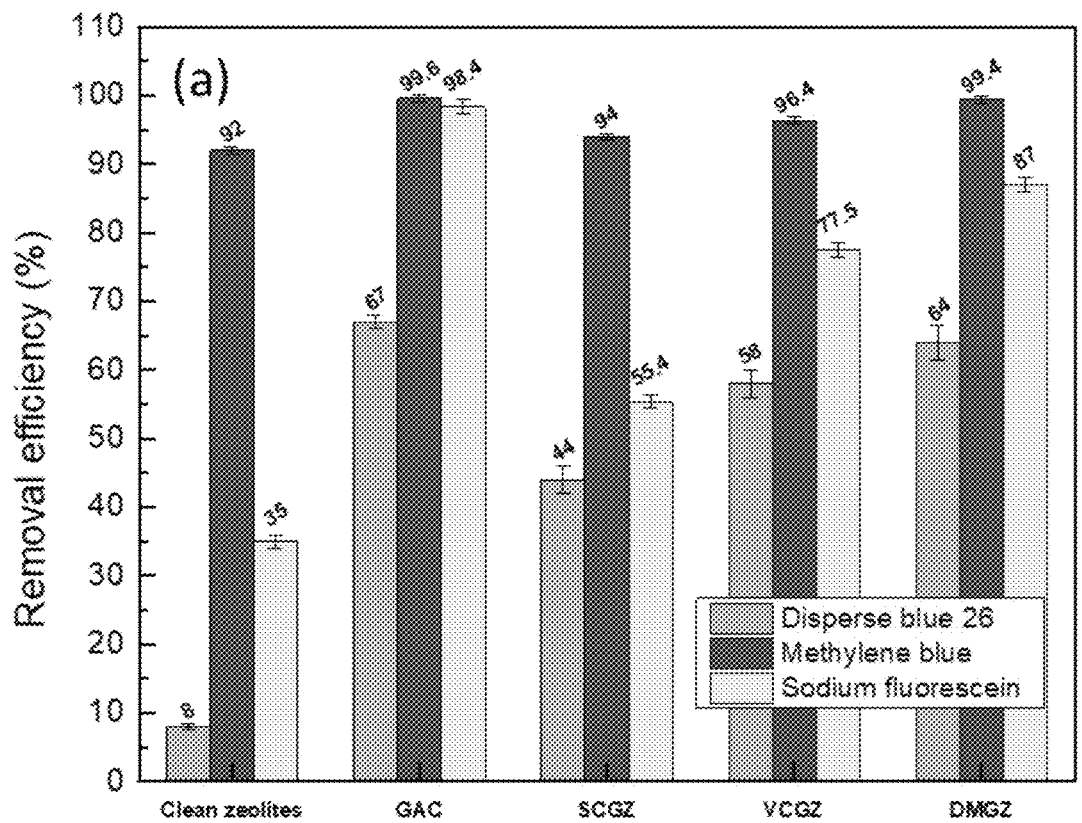
FIG. 15A shows the removal efficiency of variably charged organic model compounds for clean zeolite, GAC, SCGZ, VCGZ and DCGZ. The experiment condition is pH=7~9, flow rate=5 ml min$^{-1}$, 1 ml of the 40 mg L$^{-1}$ organic model compounds.
Figure 15B:
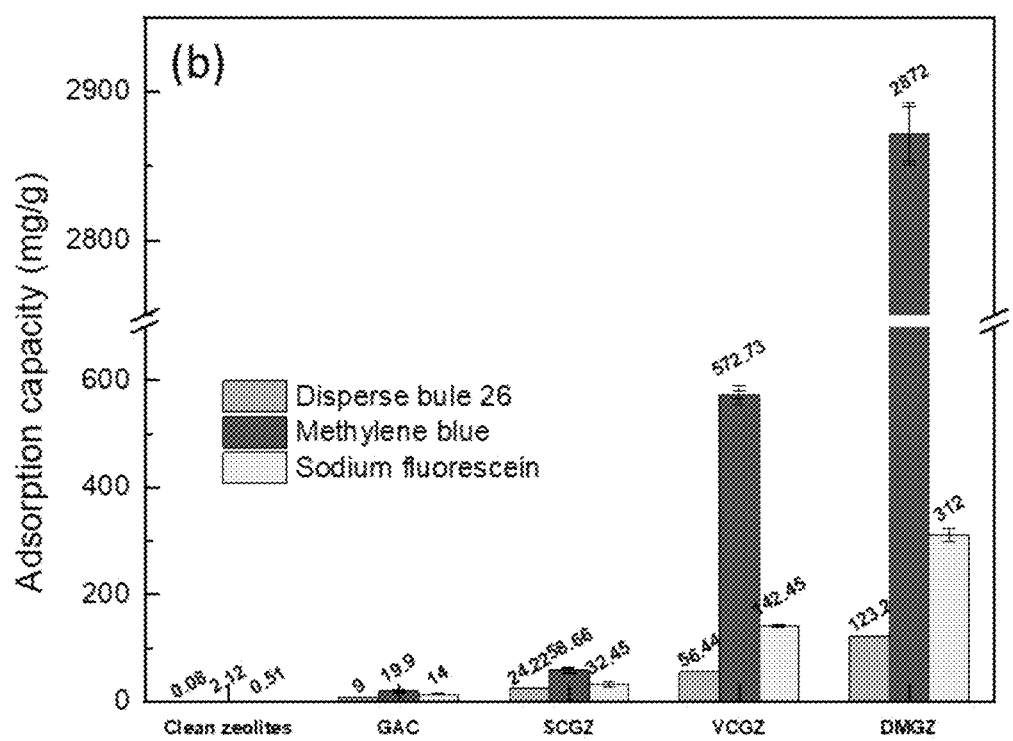
FIG. 15B shows the saturation experiment of variably charged organic model compounds for clean zeolite, GAC, SCGZ, VCGZ and DCGZ. The experiment condition is pH=7~9, flow rate=5 ml min$^{-1}$, 1 ml of the 40 mg L$^{-1}$ organic model compounds.

Organic model compounds adsorption experiments. FIGS. 15A and 15B present the removal efficiencies and adsorption capacity of variably charged organic model compounds. 40 mg L$^{-1}$ of organic model compounds was used and adjusted the value of pH to 7. The removal efficiency and saturation curves were obtained by column test experiments under a continuous flow rate of 5 ml min$^{-1}$ at room temperature. The amount of organic model compound was determined by the total pore volume of the column, which is equivalent to Ww (weight of water)–Wz (weight of zeolites) at the same volume. We set the activated material for our adsorbent is GO sheets, and the amount of adsorbent is the loading of GO on the natural zeolite. The objective of the fixed-bed column test is to design a laboratory scale experiment to test the adsorption ability of adsorbents. It is assumed that the amounts of coating GO are approximately 0.7 mg g$^{-1}$, 1.1 mg g$^{-1}$, and 1.8 mg g$^{-1}$ for SCGZ, VCGZ, and DCGZ, respectively.

FIG. 15A shows the removal efficiency of variably charged organic model compounds, anionic methylene blue, non-ionic disperse blue 26, and cationic sodium fluorescein, respectively. Clean zeolite displays a weak adsorption performance which has only 8%, 92% and 35% removal for disperse blue 26, methylene blue, and sodium fluorescein, respectively. While DCGZ shows higher removals for organic model compounds than SCGZ and VCGZ due to the higher loading of GO on zeolites surface. It also indicates that the DCGZ removal efficiencies of disperse blue 26 and methylene blue are close to the GAC, which are 67% and 99.6%, respectively. It is noted that cationic methylene blue is more favorably adsorbed onto DCGZ and GAC due to the electrostatic interactions. According to the previous analyses, the values of zeta potential of sodium fluorescein, GAC and DCGZ are negatively charged. The removal efficiency of DCGZ for sodium fluorescein reaches to 87.5% which is a significant improvement compared with SCGZ and VCGZ. However, it is still less than the removal of GAC, which is 98.6% removal for sodium fluorescein.

The adsorption capacities of clean zeolite, GAC, SCGZ, VCGZ, and DCGZ are shown in FIG. 15B. When compared with clean zeolite, SCGZ, VCGZ and DCGZ show a higher adsorption capacity for variably charged organic model compounds. The results indicate that the negative charged GO sheets play a crucial role in adsorption. It is worthy to mention that the adsorption capacity of DCGZ is over ten times more than GAC. Especially for methylene blue, the adsorption capacity reaches 2872 mg g$^{-1}$. It reveals that even a small amount of GO sheets attached to the zeolite can achieve a high adsorption capacity. It proves that GO sheets have a remarkable adsorption capability for variably charged organic pollutants due to the strong surface force include H bonding, electrostatic interactions, and van der Waals forces.

Figure 16B:
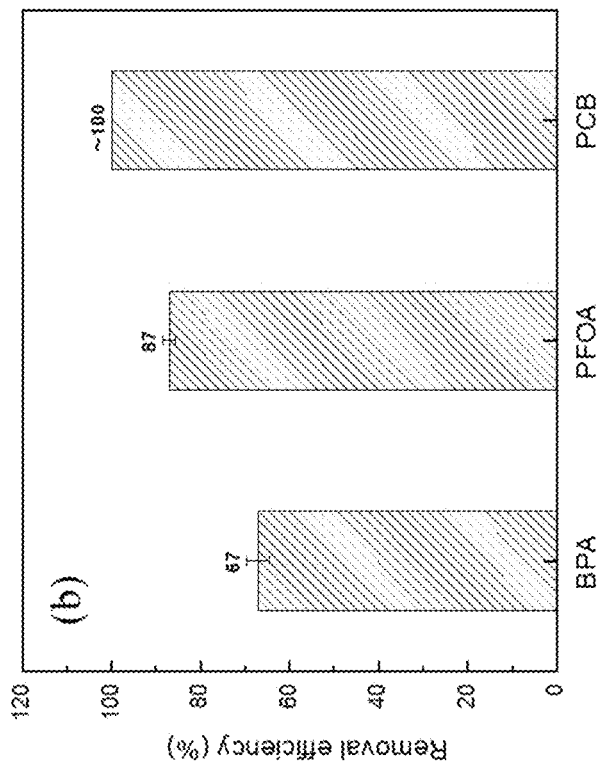
FIG. 16A and FIG. 16B show the removal efficiency of BPA, PFOA and PCB by DCGZ. The experiment condition is active materials pH=7~9, the amount of GO=1.8 mg g$^{-1}$, flow rate=5 ml min$^{-1}$, the solutions of BPA, FPOA and PCB are 1 ml and the concentration are 40 mg L.
Figure 16A:
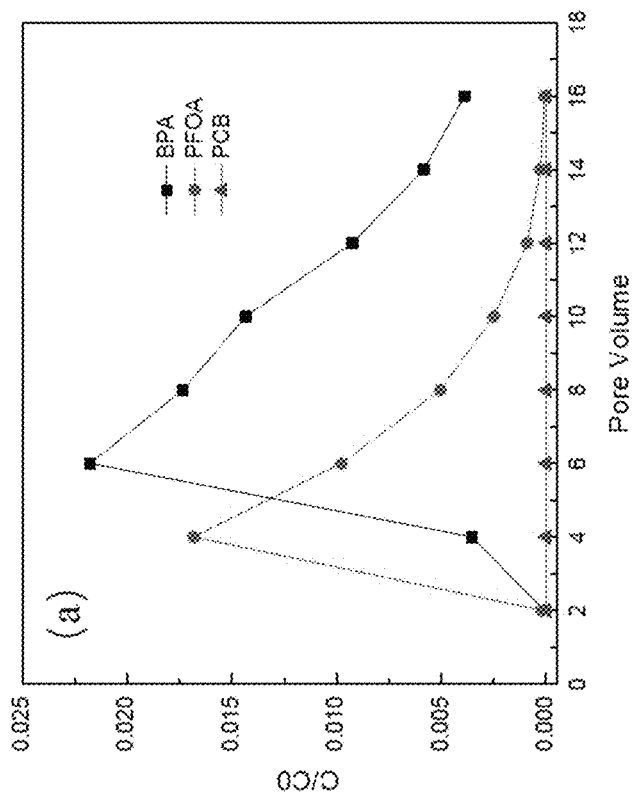

POPs adsorption experiment. Due to the large surface area and super adsorption capacity of graphene-based materials, the mechanism study of adsorption of BPA, PCB and PFOA on GO sheets has been reported in recent years. It was assumed that the removal efficiency of BPA, PCB and PFOA by DCGZ should be comparable as disperse blue 26, methylene blue and sodium fluorescein, respectively, because of their analogous molecular structure and charges. In FIGS. 16A and 16B, the column test shows that the removal efficiency of BPA and PFOA are 67% and 87%, respectively. The result of the removal efficiency of PCB by DCGZ is almost 100%, which is highly possible due to the negative surface charge of DCGZ. The experiment reveals that non-ionic POPs (BPA) can adsorb less readily on the DCGZ than charged POPs (PFOA and PCB). The adsorption mechanism of PCB on GO surface is mainly because of electrostatic interactions, while the π-π stacking of GO also plays a vital role in BPA and PFOA adsorption.

Optimization of operation conditions. Meanwhile, optimization experiments for investigating the best condition for adsorption was also conducted by using DCGZ, shown in FIG. 17A-17C. The disperse blue 26 was selected as the organic model compound. The pH of water solution, the temperature and flow rate are considered as the critical factors in the removal efficiency and adsorption capacities for the column test.

Figure 17A:
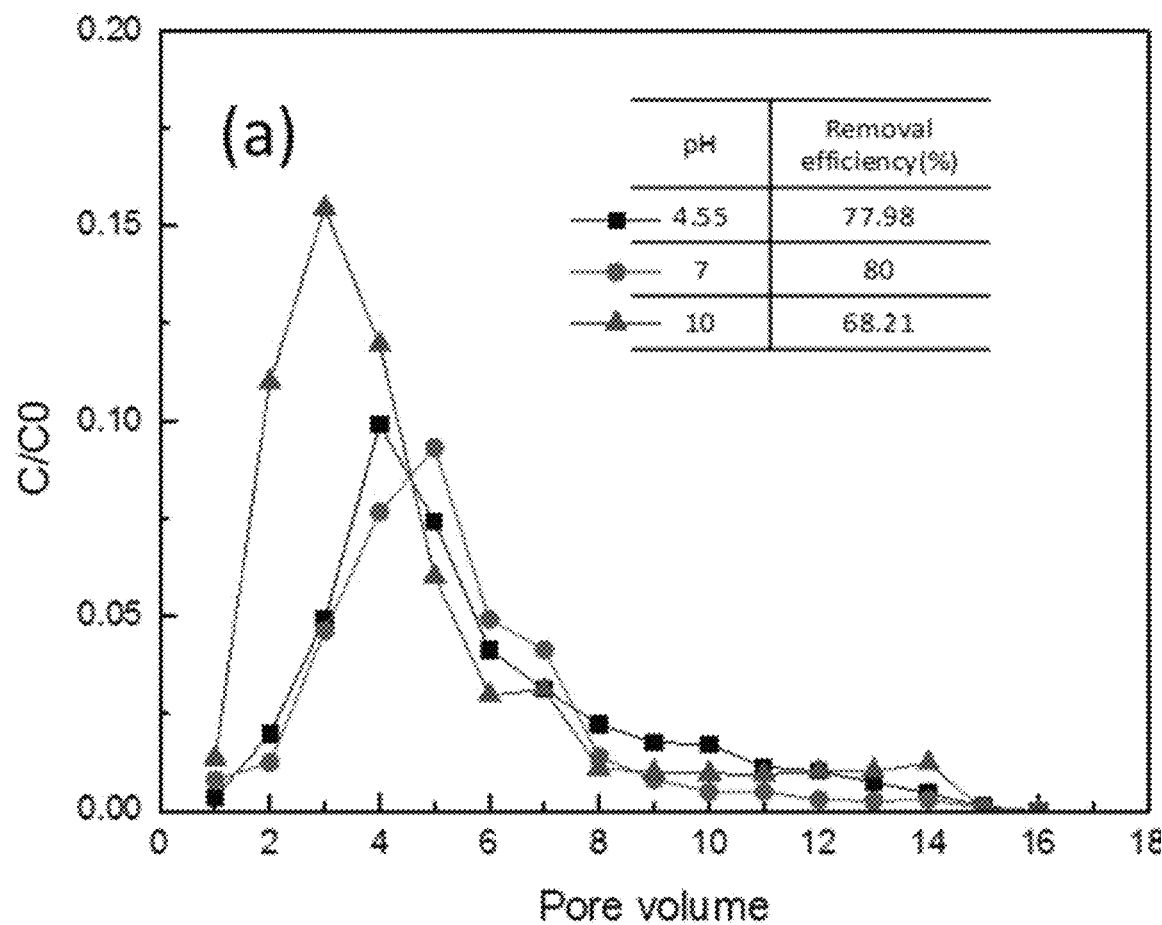
FIG. 17A shows the optimization experiment for disperse blue 26 in different pH. The experiment condition is pH=7~9, flow rate=5 ml min$^{-1}$, the amount of GO (DMGZ)=1.7 mg g$^{-1}$, 1 ml of the 40 mg L$^{-1}$ disperse blue 26.
Figure 17B:
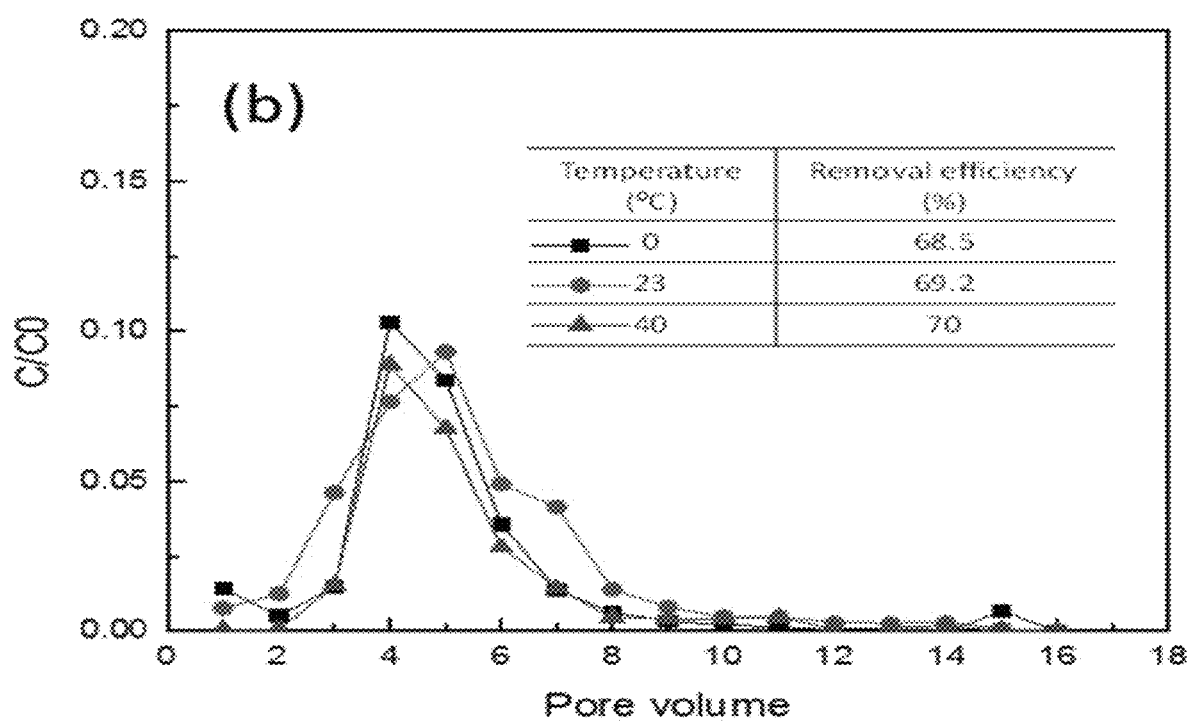
FIG. 17B shows the optimization experiment for disperse blue 26 in different temperature. The experiment condition is pH=7~9, flow rate=5 ml min$^{-1}$, the amount of GO (DMGZ)=1.7 mg g$^{-1}$, 1 ml of the 40 mg L$^{-1}$ disperse blue 26.
Figure 17C:
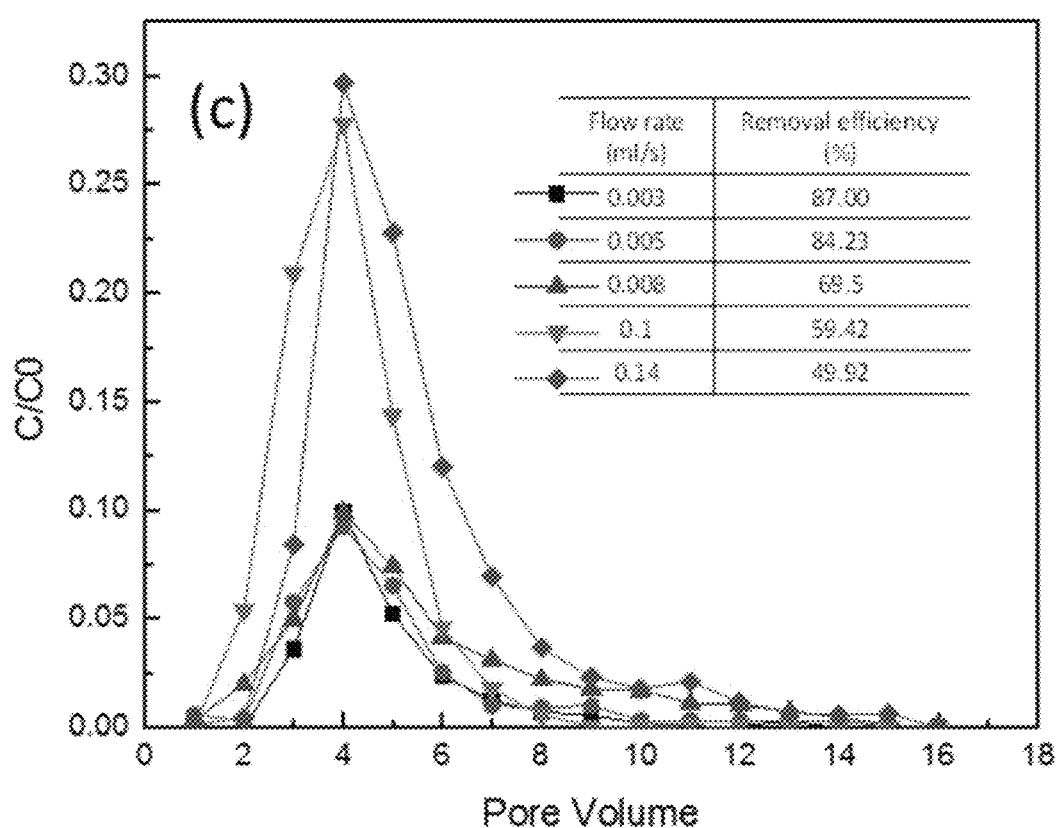
FIG. 17C The optimization experiment for disperse blue 26 in different flow rate. The experiment condition is pH=7~9, flow rate=5 ml min$^{-1}$, the amount of GO (DMGZ)= 1.7 mg g$^{-1}$, 1 ml of the 40 mg L$^{-1}$ disperse blue 26.

Solution pH is considered as the most critical parameter in the adsorption process because it can directly influence the GO surfaces and the degree of ionization of pollutants. In FIG. 17A, it shows that with increasing pH under acidic conditions, the removal efficiency of disperse blue 26 decreases gradually. The maximum removal efficiency was observed at pH=7. With the increasing pH values from 7 to 10, the removal efficiency for DCGZ decreased. This shows that the pH has a critical impact on the adsorption process, where higher pH of water solution leads to the lower removal efficiency of the neutral organic model compound. It can be attributed to the function groups and pH values of GO sheets. According to the obtained results, pH for DCGZ was about 7. When the pH of the solution is higher than the pH of DCGZ, the surface of GO becomes negatively charged and can adsorb cations by the electrostatic reactions. On the other hand, when pH of the solution is higher than the pH of adsorbent, the surface of GO becomes positively charged and absorbs anions. Considering the negative charge of disperse blue 26 at alkaline conditions (phenol), the adsorption rate decreased due to the negatively charged GO surface. In addition, at alkaline pH, the degradation of —OH groups of phenolic compounds, such as disperse blue 26 and BPA, prevents the formation of hydrogen bonds on the GO surface between adsorbed molecules in solution and GO. As a result, adsorption efficiency is decreased. In contrast, because the zeta potential of dispersed blue 26 at acidic conditions (pH=4.5) is similar with pH at neutral condition (pH=7), the removal efficiencies of disperse blue 26 are close to each other.

However, the temperature from 0 to 40° C. shows less influence on the adsorption, which the removal efficiencies are approximately 69% for dispersed blue 26. Also, the flow rate condition test shows that the higher the flow rate, the lower the removal efficiency. It is attributed to the short residence time between the disperse blue 26 and GO. Finally, according to the water treatment system in practice, the flow rate was set up at 4.8~5 ml min. In summary, the optimized operation experimental condition is: pH=7~9, flow rate=4.8~5 ml min$^{-1}$ and the temperature between 0~40° C.

Conclusion. In summary, GO sheets coated on the natural zeolite substrate was prepared via spin, vacuum, and dry coating methods. SEM, EDS, FTIR and Raman results showed that the GO sheets were successfully attached to the zeolites surface. The analyses of zeta potential revealed the interactions between the zeolite, GO and adsorbents. From the adsorption performance, it can be concluded that the dry coating method for fabrication of GO coated on natural zeolite is an effective and straightforward approach. DCGZ has a better physical stability and less desorption of GO from the zeolites than the others. The removal and adsorption capacities of variably charged organic model compounds for GO coated on the zeolites were described, which reveals that the adsorption performance strongly depend on the loading of GO. The adsorption mechanism for organic model compounds and POPs by DCGZ included electrostatic and physical interactions due to the functional groups and $\pi$-$\pi$ stacking on GO surface. Optimization of column experiment suggested the best operation conditions are: pH=7~9, flow rate=4.8~5 ml min$^{-1}$ and the temperature between 0~40° C.

Example 4

The Effect of Surfactants on the Graphene Oxide Coated on Zeolites Surface

Materials. Australian natural zeolite, (clinoptilolite, diameter: 0.7-1 mm, chemical composition: 68.26% $SiO_2$, 12.99% $Al_2O_3$, 4.11% $K_2O$, 2.09/CaO, 1.37% $Fe_2O_3$, 0.83% MgO, 0.64% $Na_2O$, 0.23% $TiO_2$, Zeolite Australia Ltd.), graphene oxide (ACS Materials), Triton X™-100, Hexadecyltrimethylammonium bromide (CTAB, 95%, Sigma-Aldrich), Sodium dodecyl sulfate (SDS, ACS reagent, ≥99.0%, Sigma-Aldrich). Dyes, which are disperse blue 26 (Crescent Chemical), methylene blue (Electron Microscopy Sciences), and sodium fluorescein (Pfaltz &Bauer), were chosen as the representations for nonionic, cationic, and anionic organic model compounds.

CTAB/zeolite and CTAB/DCGZ preparation. 10 ml of 0.25 mg·ml$^{-1}$ CTAB was mixed with 15 g of cleaned and acid-treated zeolite and shaken on shaker at 150 rpm for 60 min. Afterwards, the CTAB/zeolite was dried at 100° C. for 6 hours. 25 ml of 2.5 mg·ml$^{-1}$ GO was mixed with CTAB/zeolite and shaken on the shaker for 120 min at 150 rpm. The product was dried at 100° C. for 24 h, then rinsed with ethanol and DI water three times to remove the extra GO on the surface of zeolite before use.

SDS/DCGZ preparation. 1.5 ml of 5 wt % SDS in aqueous solution was added in 25 ml of 2.5 mg mL$^{-1}$ GO aqueous solution and sonicated for 120 min. Then the SDS/GO solution was mixed with 25 g of cleaned and acid-treated zeolite and shaken on the shaker for 120 min at 150 rpm. The product was dried at 100° C. for 24 h, then rinsed with ethanol and water three times to remove the extra GO on the surface of zeolites before use.

Triton X-100/DCGZ preparation. One drop of Triton X-100 was added into 25 ml of 2.5 mg mL$^{-1}$ GO aqueous solution and sonicated for 120 min. Then the Triton X-100 solution was mixed with 25 g cleaned and acid-treated zeolite and shaken on the shaker for 20 min at 150 rpm. The product was dried at 100° C. for 24 h, then rinsed with ethanol and water three times to remove the extra GO from the surface of zeolite before use.

Batch experiment. Adsorption capacity studies were conducted by batch experiments and column tests using the organic model compounds in aqueous solution. Batch experiments were carried out to determine the adsorption performance of organic model compounds onto the adsorbents in a 250 mL glass flask. The sample was immersed in 100 mL of a specific concentration of organic model compounds and was shaken at 150 rpm for 48 hours to reach adsorption equilibrium. The study was conducted at room temperature to represent conditions that are typical in the industrial setting. The pH of the solution was adjusted with a 0.1 M solution of NaOH and a 0.1M solution of HCl. The effect of various factors on the rate of adsorption process was assessed by varying contact time, concentration of organic model compounds, and pH of the solution. All experiments were carried out in triplicate, and the average values were taken for analyses.

Figure 18A:
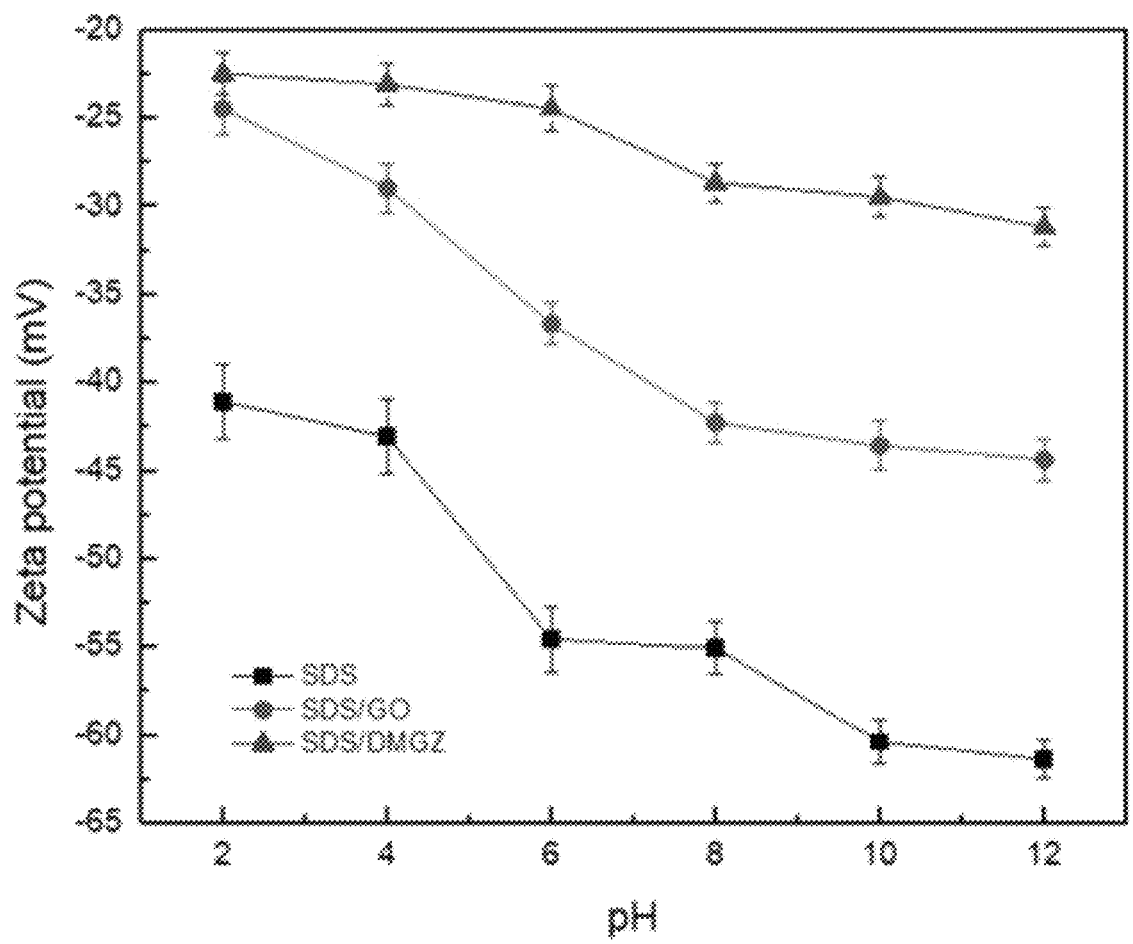
FIG. 18A shows the Zeta potential of SDS and SDS modified samples modified samples in the range of pH from 2 to 12.
Figure 18B:
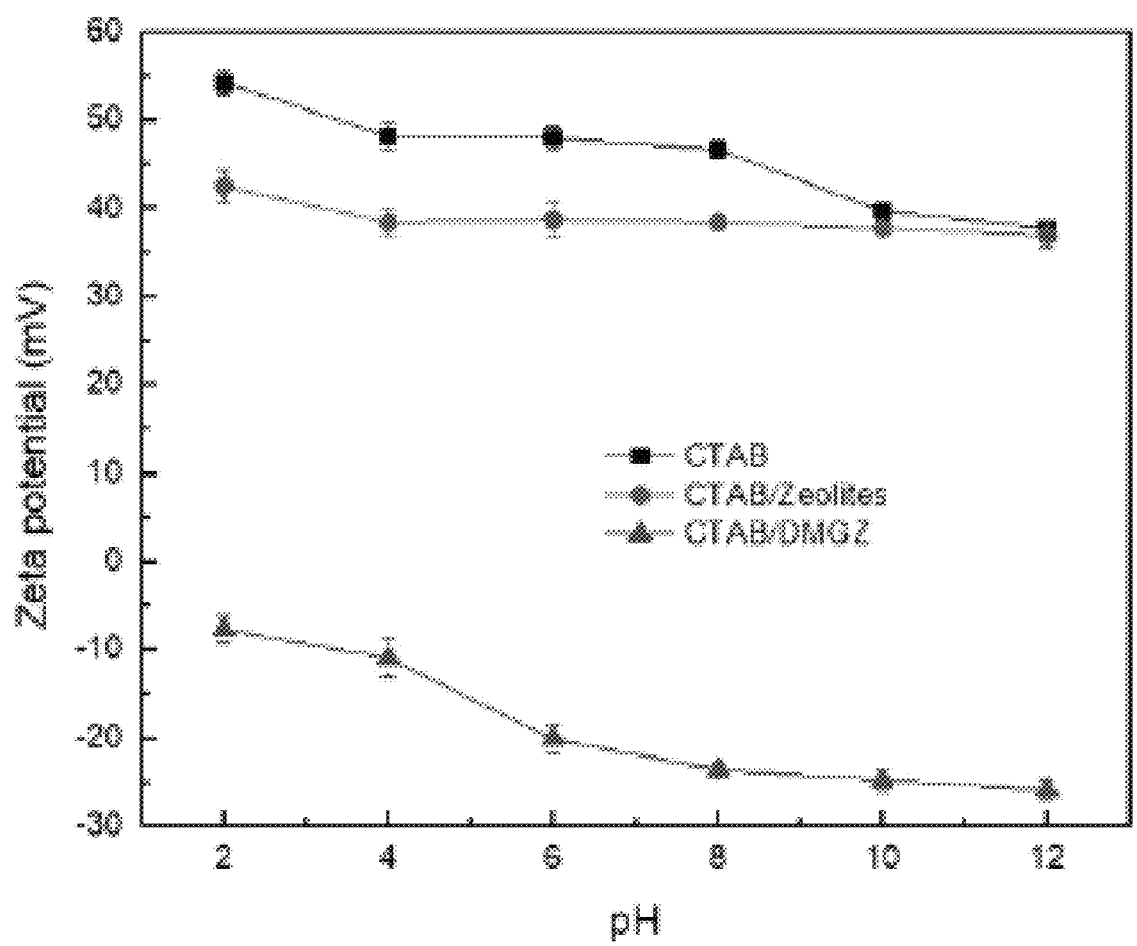
FIG. 18B shows the Zeta potential of CTAB and CTAB modified samples in the range of pH from 2 to 12.
Figure 18C:
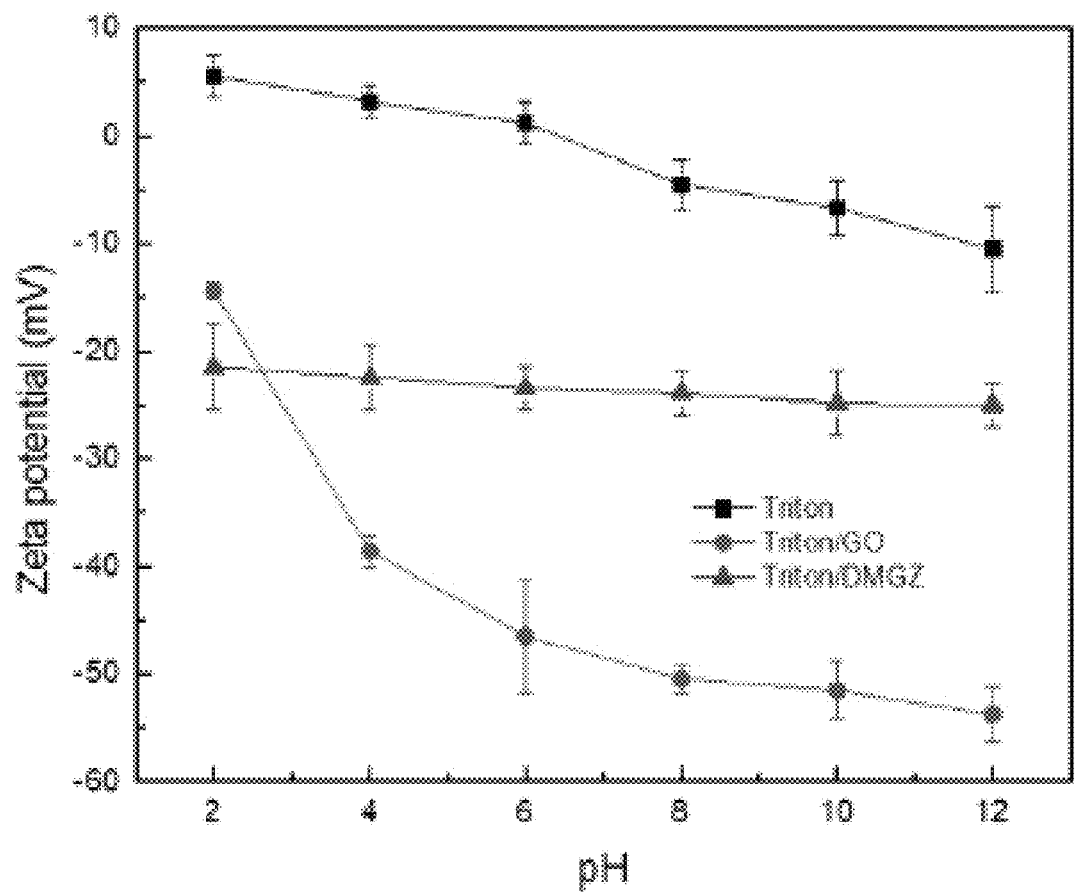
FIG. 18C shows the Zeta potential of Triton X-100 and Triton X-100 modified samples in the range of pH from 2 to 12.

Synthesis and characteristics of CTAB/DCGZ, Triton X-100/DCGZ, and SDS/DCGZ. Surface modification of the cleaned and acid-treated zeolite by cationic surfactant CTAB has been used via dry coating method. CTAB modified the anionic zeolites surface by evaporation. CTAB/DCGZ, Triton X-100/DCGZ and SDS/DCGZ was easily obtained using the dry coating method. FIG. 18A-18C shows the values of zeta potential for DCGZ with variable charge surfactants at pH values ranging from 2 to 11. The values of zeta potential for SDS/DCGZ appears to be the most negatively charged and the values of zeta potential of Triton X-100/DCGZ shows slightly higher than the values of SDS/DCGZ. The values of zeta potential of CTAB/DCGZ are substantially higher than the other samples which is not surprising considering the cationic surface of the modified zeolite. CTAB is expected to modify zeolites surface to positive charge and enhance the electrostatic interaction between the zeolite and GO sheets. The values of zeta potential for SDS/DCGZ were the lowest observed due to the anionic nature of SDS. It is expected to induce a negative charge on the GO sheets, which leads to electrostatic repulsion between the surfactant molecules and the GO sheets. The primarily separated layers of GO may appear due to the repulsion between the negatively charged GO sheets, and the intercalation of SDS within the basal planes of GO which may weaken the $\pi$-$\pi$ stacking interaction. The values of zeta potential of Triton X-100/DCGZ are similar with the DCGZ shown in Example 3. Nonionic Triton X-100 added in the GO solution results in a stable GO suspension due to the enhancement of hydrophilicity between GO layers, this also enhances the interaction between the zeolite and GO.

Figure 19:
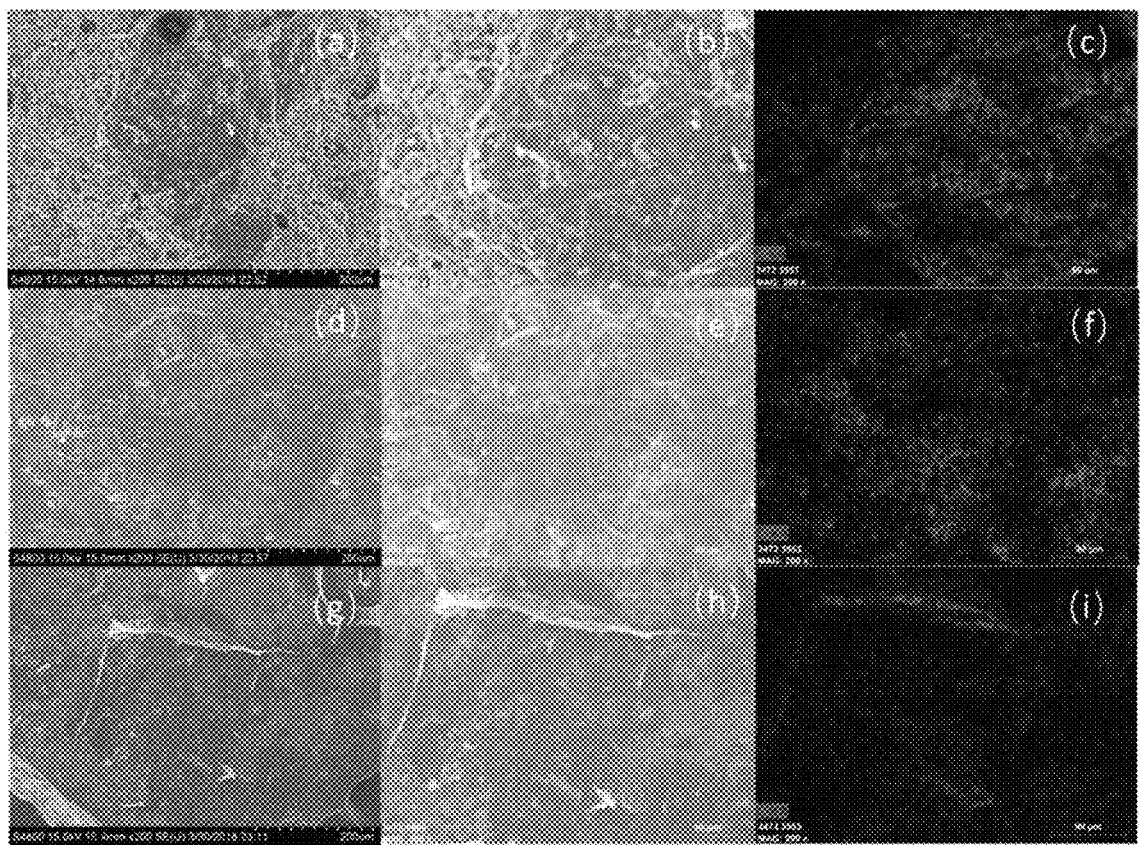
FIG. 19 shows SEM images of CTAB/DCGZ (a), SDS/DCGZ (d) and TritonX-100/DCGZ (g) at 200K resolution. The EDX mapping of carbon for CTAB/DCGZ (b,c), SDS/DCGZ (e,f) and TritonX-100/DCGZ (h,i).

SEM images of CTAB/DCGZ, SDS/DCGZ and Triton X-100/DCGZ at a low magnification resolution are presented in (a), (d), and (g) in FIG. 19, respectively. The continuous GO coating area was observed on the surface of zeolites for all these samples. Moreover, EDX mapping in (b), (c), (e), (f), (h), and (i) in FIG. 19 of carbon layers also show the lateral size of the GO sheets on the order of 10 µm to 200 µm. The selected area of SEM mapping area indicates that the GO sheets uniformly deposited on the zeolites surface with these surfactants. One possible explanation might be that and adsorption capacity of variable charge organic compounds were investigated on the samples with a variation of concentration.

These fragments are overlapping and forming only a few layers of GO sheets on the zeolites surface. Table 4A shows the EDX analysis of DCGZ samples. The C/O ratio of DCGZ is 0.19 and after modified by SDS and Triton X-100, it increases to 0.20 and 0.21, respectively. Compared with these two samples, the C/O ratio of CTAB/DCGZ increases to 0.55 which may be due to the higher loading of GO coating on the surface of the zeolite. By adding the surfactants, the surface charge of the GO sheets has been modified, and the exposed surface can serve as advanced adsorbents to attract the target organic model compounds. Based upon this hypothesis, the removal efficiency and adsorption capacity of variable charge organic compounds were investigated on the samples with a variation of concentration.

TABLE 4A

EDX analysis of surfactants added samples

| Samples(wt %) | C | O | Si | Al | C/O |
|---|---|---|---|---|---|
| DMGZ | 10.90 ± 4.50 | 57.37 ± 2.12 | 29.17 ± 1.24 | 17.45 ± 0.37 | 0.19 |
| SDS/DMGZ | 15.14 ± 6.63 | 74.33 ± 10.27 | 8.50 ± 5.22 | 2.04 ± 4.23 | 0.20 |
| CTAB/DMGZ | 32.00 ± 5.54 | 58,26 ± 10.45 | 5.14 ± 4.47 | 4.60 ± 6.69 | 0.55 |
| Triton X-100/DMGZ | 12.59 ± 2.01 | 47.01 ± 5.45 | 27.46 ± 1.24 | 15.72 ± 0.37 | 0.21 |

Figure 20:
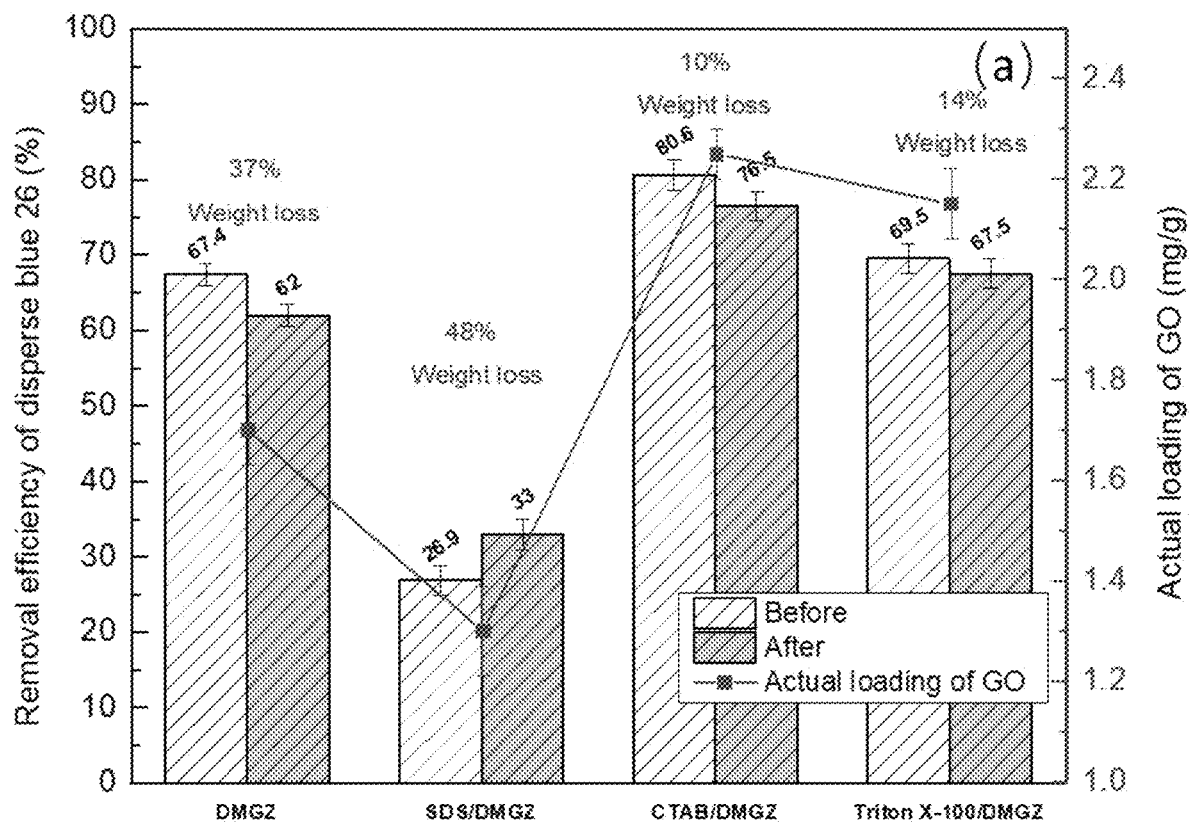
FIG. 20 shows the removal efficiency of before and after desorption experiment for dispersed blue 26 by variable surfactants.

Desorption experiment. To investigate the stability of the GO sheet deposition onto the zeolite surface in aqueous solution, the desorption experiment was conducted by shaking 10 g of adsorbents in 20 ml DI water for 24 hours at 150 rpm. Samples were rinsed with DI water three times and then the samples were dried at 100° C. for 24 hours before measuring their weights. All of the adsorbents were shaken for 24 hours. It is observed that severe desorption of GO sheets from the zeolite is obtained by SDS/DCGZ. The quantitative analyses of the GO detached from the zeolite surface was calculated and reported in FIG. 20. The calculation shows that all the desorbed samples exhibit lower removal efficiencies as compared to the non-shaken samples, especially the SDS/DCGZ which had lost about 48 wt % of GO on the zeolites surface. It is due to the decreased loading of GO on the zeolites surface. Results from the zeta potential analysis show that a reasonable conclusion is that the surface charge repulsion between zeolite and GO plays a vital role in desorption. The CTAB/DCGZ and the Triton X-100/DCGZ maintain 90 wt % and 86 wt % loading of GO on the zeolite surface respectively. These results are due to the electrostatic attraction and hydrophilicity between GO and zeolite. The stability of the GO on the zeolites surface is: CTAB/DCGZ>TritonX-100/DCGZ>DCGZ>SDS/DCGZ.

Organic model compounds adsorption experiment. To determine the adsorption capability of CTAB/DCGZ, TritonX-100/DCGZ, and SDS/DCGZ, the removal efficiencies for organic model compounds were examined by individual column tests. Study on their adsorption capacity was observed by batch experiment. Based on the analysis of the zeta potential and desorption experiments, the assumption is that CTAB/DCGZ and SDS/DCGZ may have a good adsorption performance on anionic and cationic organic model compounds, respectively. The TritonX-100/DCGZ may have a unique ability to have a broad adsorption ability than CTAB/DCGZ and SDS/DCGZ.

Figure 21A:
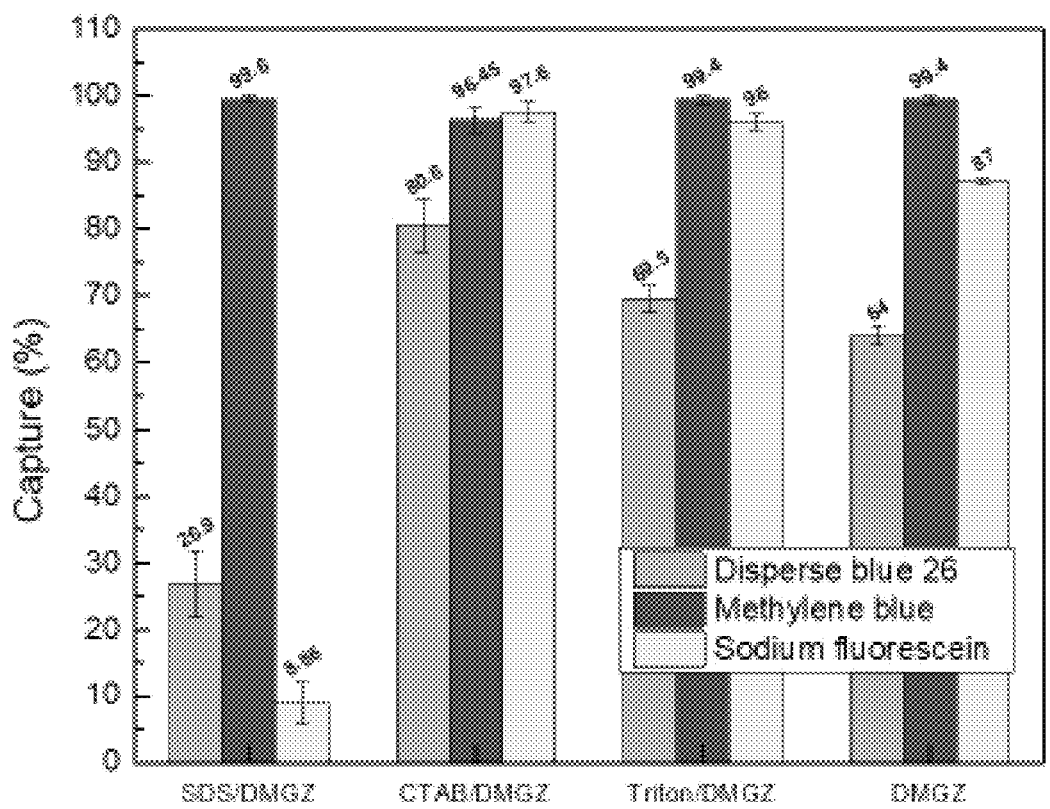
FIG. 21A shows column test for the removal efficiency of organic model compounds for CTAB/DCGZ, Triton X-100/DCGZ, and SDS/DCGZ. The pH of organic model compounds solution=7, flow rate (column test)=5 ml min$^{-1}$, the amounts of samples for column test are 9 g and the concentration of organic model compounds for column test are 40 mg L$^{-1}$ (1 ml).
Figure 21B:
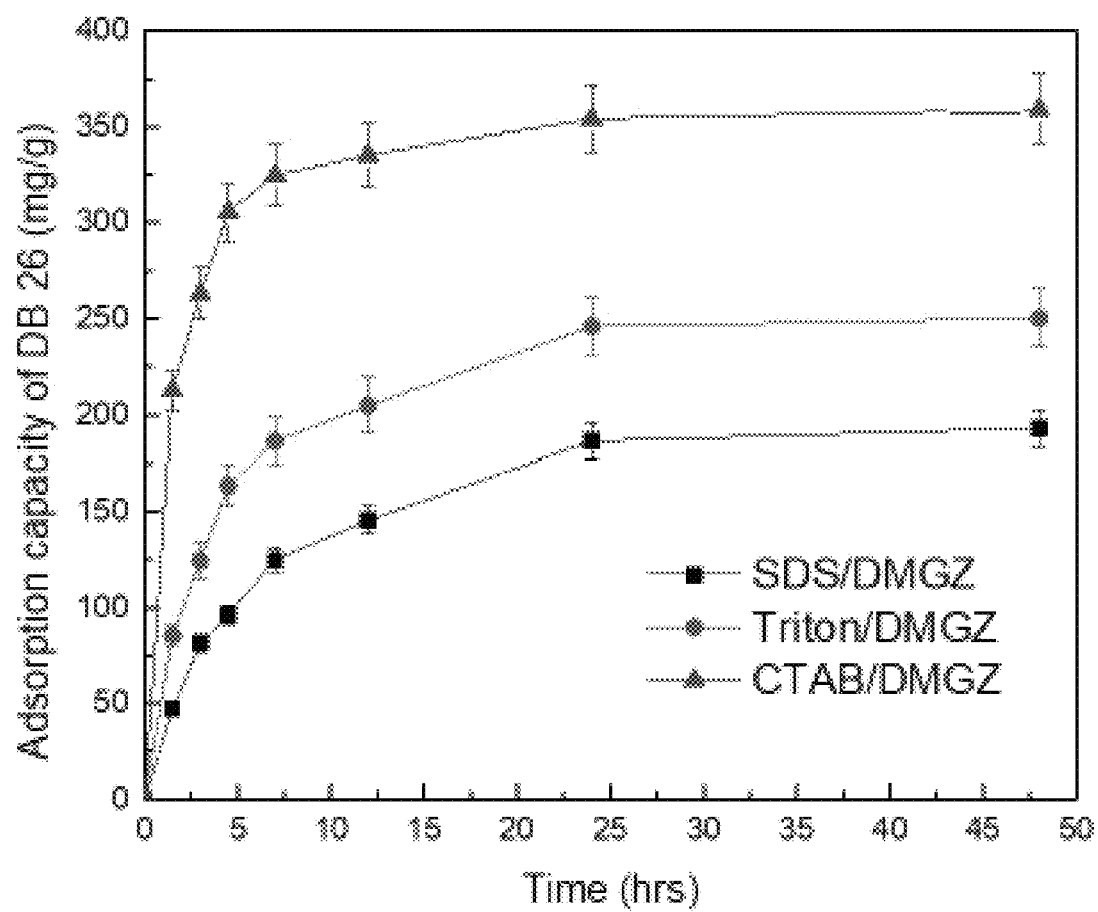
FIG. 21B shows batch experiment for adsorption capacity of disperse blue 26. The pH of organic model compounds solution=7, the amounts of samples for batch experiment are 1 g, and the concentration of organic model compounds for batch experiment are 10 mg L$^{-1}$.
Figure 21C:
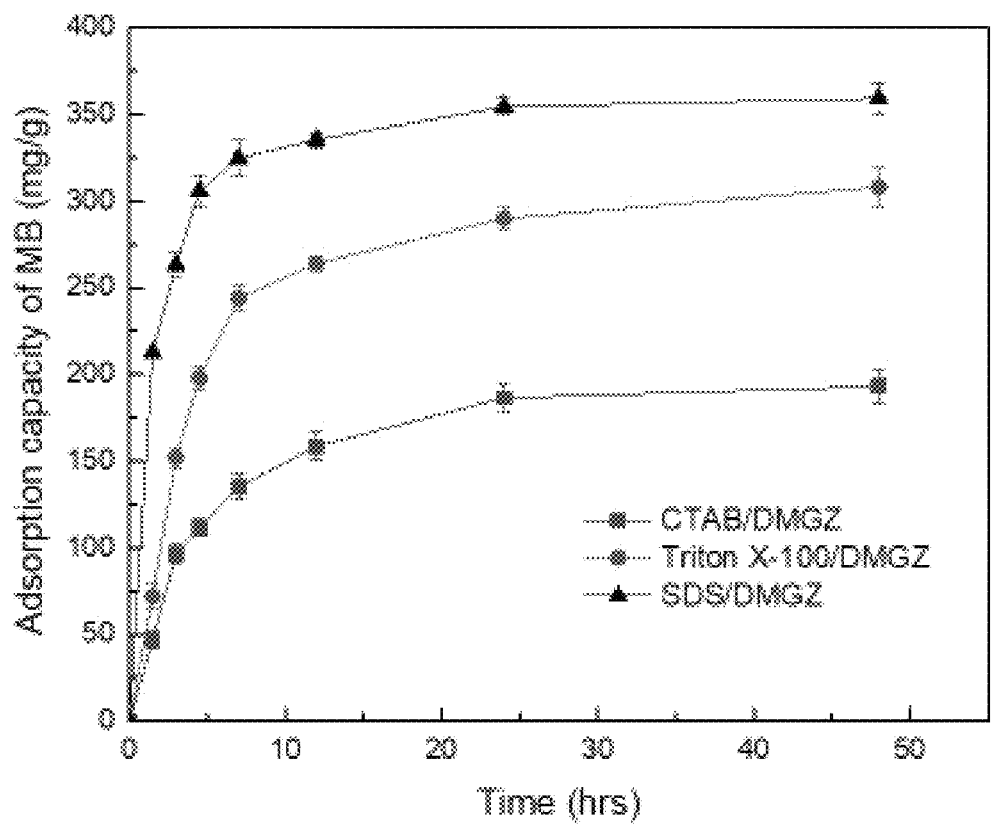
FIG. 21C shows batch experiment for adsorption capacity of methylene blue. The pH of organic model compounds solution=7, the amounts of samples for batch experiment are 1 g, and the concentration of organic model compounds for batch experiment are 10 mg L$^{-1}$.
Figure 21D:
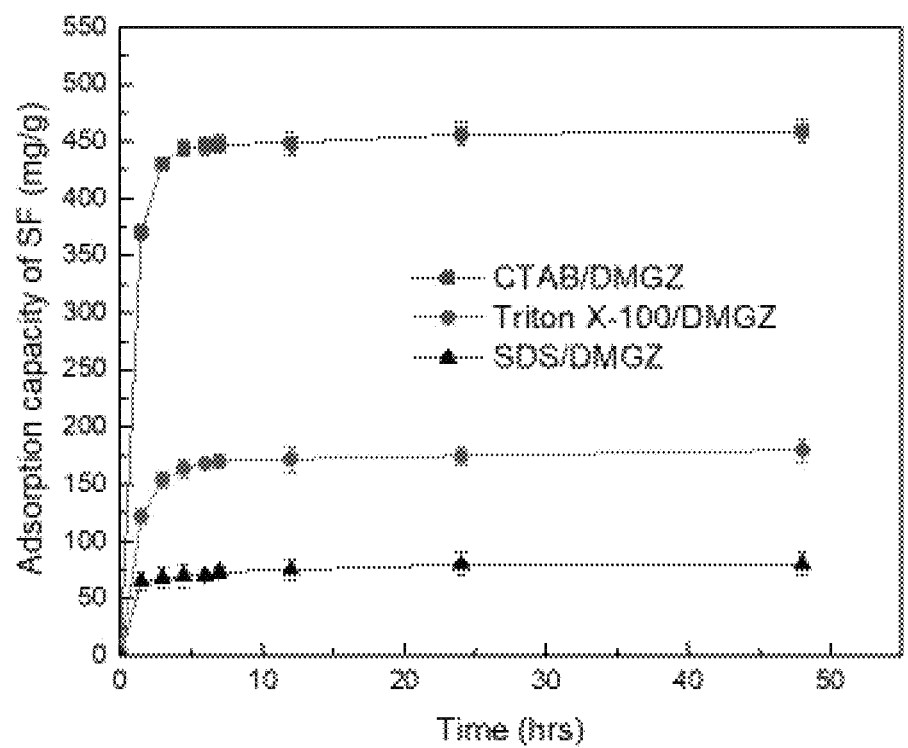
FIG. 21D shows batch experiment for adsorption capacity of sodium fluorescein. The pH of organic model compounds solution=7, the amounts of samples for batch experiment are 1 g, and the concentration of organic model compounds for batch experiment are 10 mg L$^{-1}$.
Figure 22A:
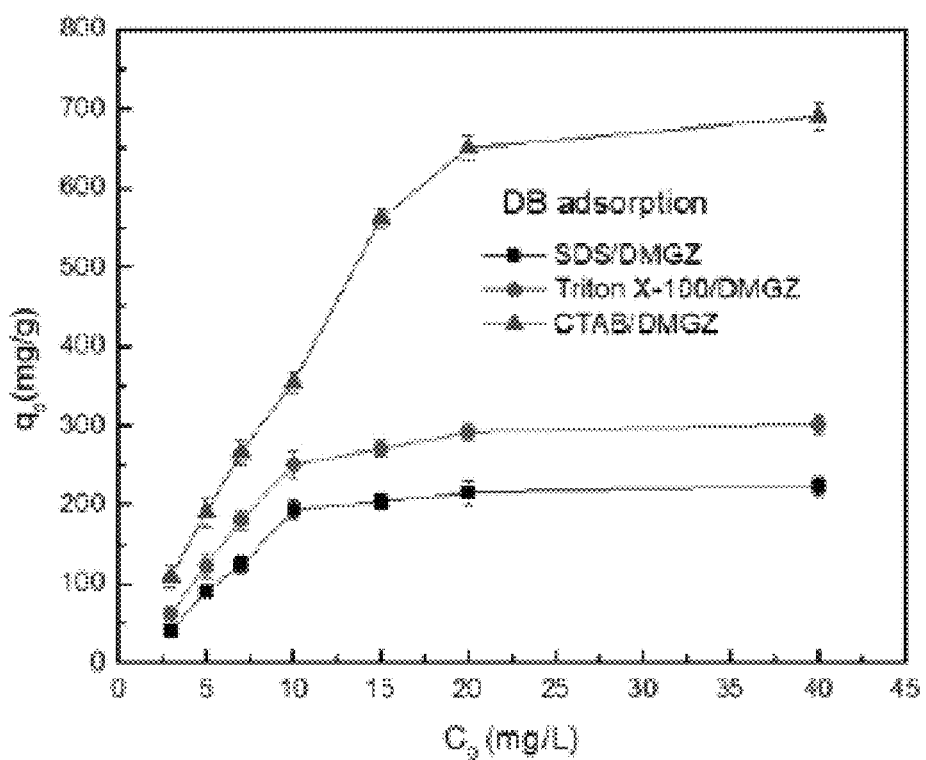
FIG. 22A shows the effect of disperse blue 26 concentration on amount of CTAB/DCGZ, Triton X-100/DCGZ, and SDS/DCGZ by batch experiment.
Figure 22B:
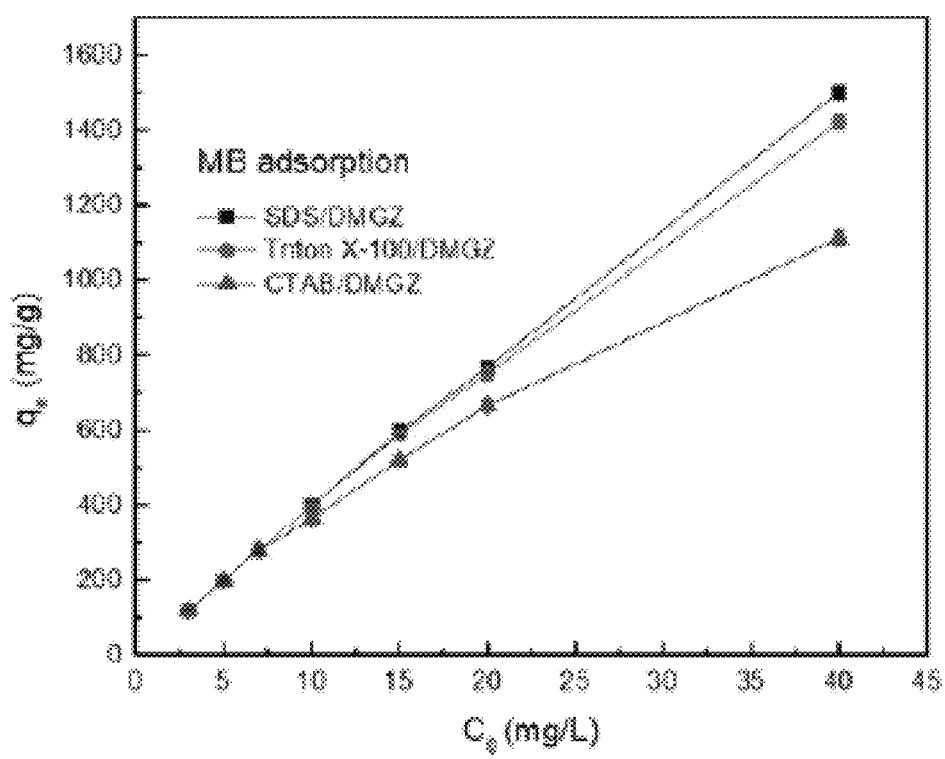
FIG. 22B shows the effect of methylene blue concentration on amount of CTAB/DCGZ, Triton X-100/DCGZ, and SDS/DCGZ by batch experiment.
Figure 22C:
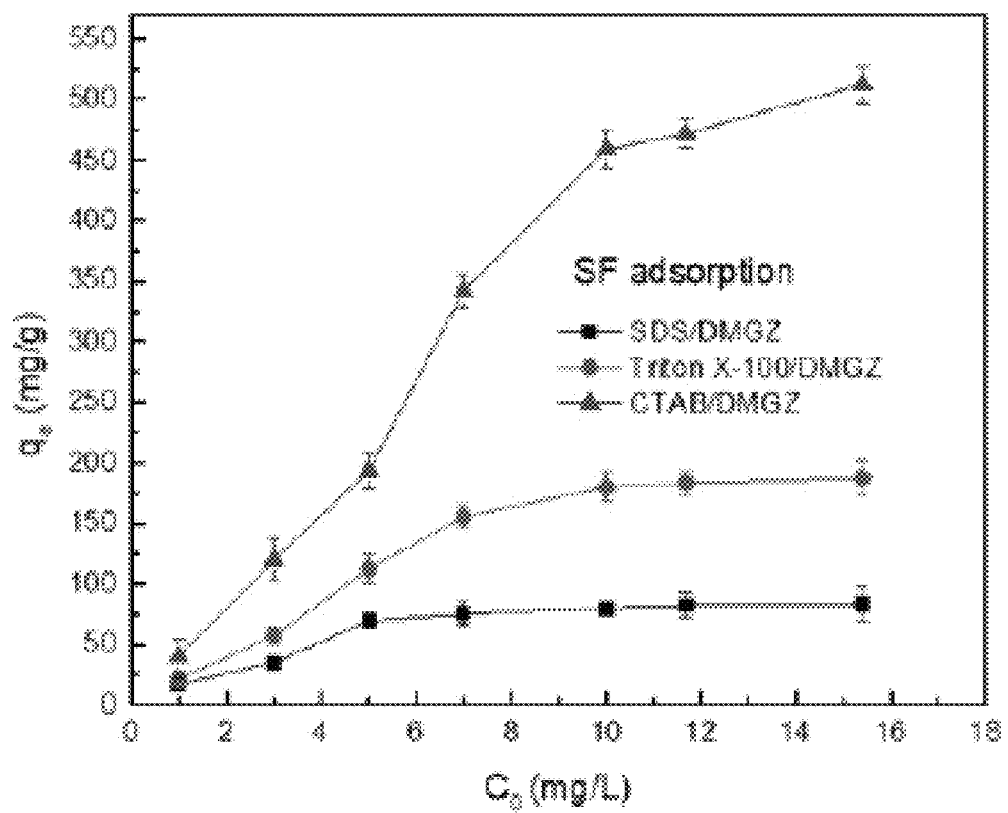
FIG. 22C shows the effect of sodium fluorescein concentration on amount of CTAB/DCGZ, Triton X-100/DCGZ, and SDS/DCGZ by batch experiment.

The removal efficiencies of nonionic disperse blue 26 and anionic sodium fluorescein are shown in FIG. 21A, they follow the trend: CTAB/DCGZ>Triton X-100/DCGZ>DCGZ>SDS/DCGZ. In FIG. 21B, the equilibrium concentration of disperse blue 26 was obtained after 24 hours, and the adsorption capacities were approximately 354 mg·g$^{-1}$, 246 mg·g$^{-1}$ and 186 mg·g$^{-1}$ for CTAB/DCGZ, TritonX-100/DCGZ, and SDS/DCGZ, respectively. Rapid adsorption for sodium fluorescein was observed in FIG. 21D, and the adsorption capacities were reached within 6 hours and were approximately 444 mg g$^{-1}$, 164 mg g$^{-1}$ and 70 mg g$^{-1}$ for CTAB/DCGZ, TritonX-100/DCGZ and SDS/DCGZ respectively. The anionic sodium fluorescein can be adsorbed to the surface of the GO sheets due to the electrostatic attraction between the negatively charged organic model compound, and the positively charged CTAB modified GO surface. Similarly, the adsorption capacity for methylene blue was measured after 24 hours and followed the trend: SDS/DCGZ>Triton X-100/DCGZ>CTAB/DCGZ which are 354 mg g$^{-1}$, 290 mg g$^{-1}$ and 186 mg g in FIG. 21C. Interestingly, the Triton X-100/DCGZ presented 96% of removal efficiency for sodium fluorescein which was higher than 87% of DCGZ. Besides that, its adsorption capacity for methylene blue is much higher than the adsorption capacity of CTAB/DCGZ. It implies that the enhancement of GO hydrophilicity leads to increase the adsorption sites on GO surface while keeps a broaden adsorption range of organic model compounds.

Finally, to investigate the effect of adsorbent dosage for variably charged model compounds, different concentrations of organic model compounds ranged from 1 mg L$^{-1}$ to 40 mg L$^{-1}$ were taken and examined after 24 hours at pH=6 at room temperature.

To determine an appropriate surfactant for GO coated on zeolite, both column tests and batch experiments were carried out. The results demonstrated that neither anionic SDS or cationic CTAB were preferred candidates due to the limitation of adsorption for variably charged organic model compounds and POPs. Triton X-100, a nonionic surfactant, induced significant adsorption increases for three variably charged organic model compounds. Only 14 wt % of GO detached from the zeolite surface under extreme conditions. It should be considered as an excellent surfactant to enhance the interaction of GO-zeolites and GO-POPs.

Conclusion. In this Example, cationic CTAB, nonionic Triton-X 100, and anionic SDS were selected as agents to enhance the attachment of GO onto the zeolite. The effect on the removal of organic model compounds was examined. The conclusions from the results of the desorption experiments and adsorption studies for variably charged organic model compounds are:

The characterization by zeta potential has shown an observable physical interaction between GO and zeolites with the adding variable charge surfactants.

SDS/DCGZ and CTAB/DCGZ display strong adsorption capabilities for cationic and anionic model compounds for complimentary charges. Meanwhile, they show weak adsorption abilities to same charged organic model compounds.

The 48 wt % GO (mass) desorbed from the zeolites surface by SDS, and the stability of the GO sheets on the zeolite surface follows the trend: CTAB/DCGZ>TritonX-100/DCGZ>DCGZ>SDS/DCGZ. The desorption experiment suggests that CTAB/DCGZ and Triton X-100/DCGZ are good candidates for water treatment process.

The batch experiment study agrees with the prediction obtained by surface charge analyses.

Based on the column tests, desorption experiments, and batch experiments Triton X-100/DCGZ shows good physical stability and adsorption capabilities for variable-charge organic model compounds. Non-ionic Triton X-100 is a promising surfactant to enhance the interaction between GO and the natural zeolite.

Example 5

APTES Modification of Natural Zeolite and In-Situ Reduction of Graphene Oxide

Materials. Australian natural zeolite, (clinoptilolite, diameter: 0.7-1 mm, chemical composition: 68.26% $SiO_2$, 12.99% $Al_2O_3$, 4.11% $K_2O$, 2.09% CaO, 1.37% $Fe_2O_3$, 0.83% MgO, 0.64% $Na_2O$, 0.23% $TiO_2$, Zeolite Australia Ltd.), graphene oxide (ACS Materials), dyes, which are disperse blue 26 (Crescent chemical), methylene blue (Electron Microscopy Sciences), and sodium fluorescein (Pfaltz &Bauer), were chosen as the representations for neutral, cationic, and anionic particles. L-Ascorbic acid (Vitamin C, Sigma-Aldrich, 99%), Bisphenol A (BPA, >99%, Sigma-Aldrich), Perfluorooctanoic acid (PFOA, 96%, Sigma-Aldrich), Aroclor 1242 (PCB, analytical standard, Ultra scientific).

In-Situ Reduced GO Coated Zeolite.

Method 1—Microwave reduced GO. 10 g of active material (2.5 mg $ml^{-1}$ DCGZ) was added in the 20 ml container. It was then microwaved at 500 W, 6.425 GHz±1.150 GHz, for each cycle; the sample was heated 5 seconds, 10 s, 20 s individually. After each heating, the microwave was stopped to let the sample cool down to room temperature. The heating and cooling cycle was repeated for a certain number of cycles until the rate of temperature rise fell back to the room temperature.

Method 2—Sol-gel method reduced GO. To reduce the GO sheets on the surface of zeolite, two different mixing approaches have been investigated. The first method encompasses mixing 5 g adsorbent with 250 mg Vitamin C directly, then add 10 ml water, react at 95° C. in the water bath for a specific time. The second method consists of adding 5 g graphene-based materials coated on modified natural zeolite substrate (GBMZS) into Vitamin C solutions at a concentration of 50 mg $ml^{-1}$, then react at 95° C. in the water bath for a specific time.

Figure 23:
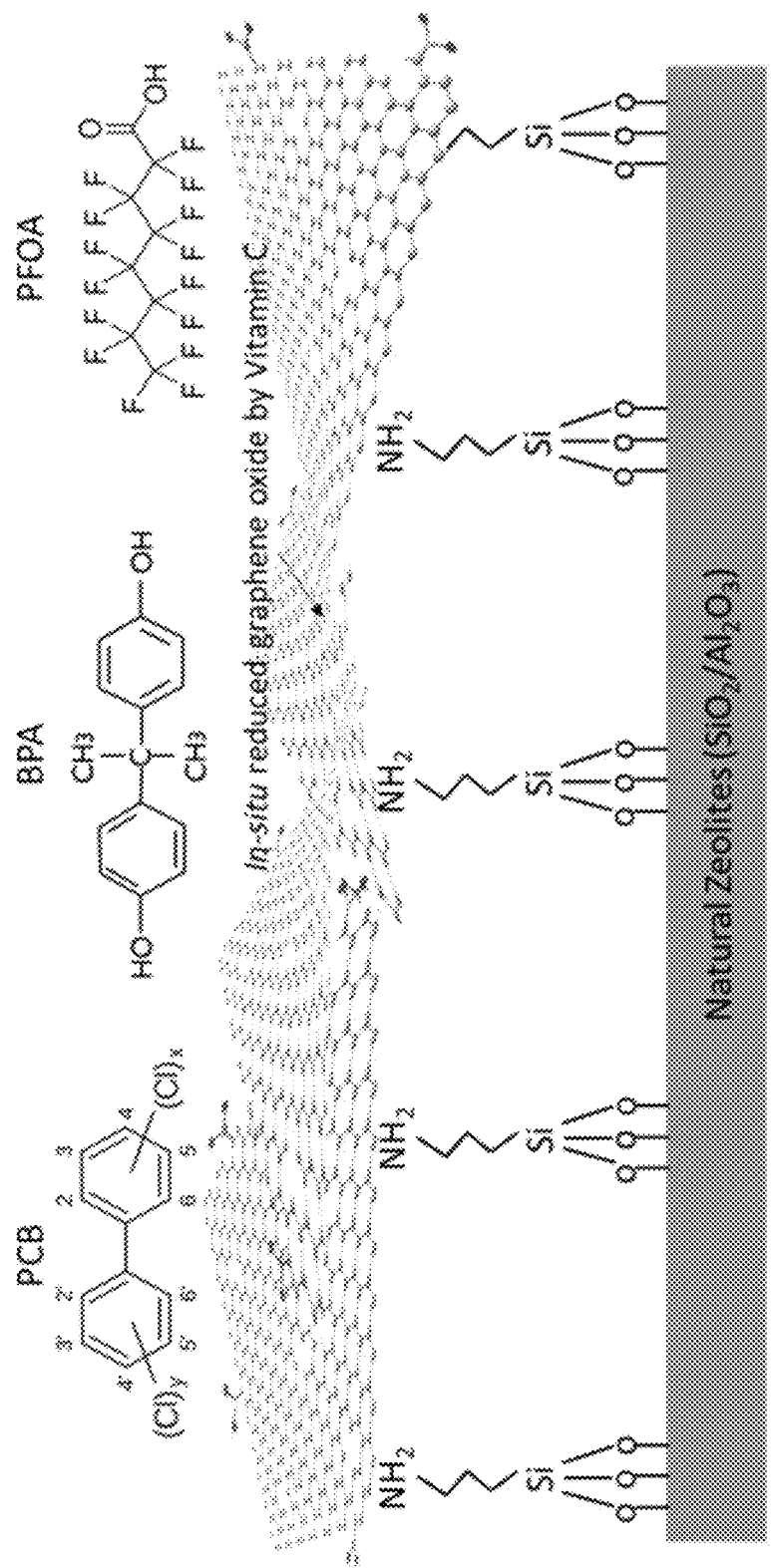
FIG. 23 shows a schematic illustration of APTES modified rGO coated on a zeolite surface.

Fabrication of GO coated APTES modified zeolites and recoated GO zeolites. 20 g of clean zeolite was added to 15 ml anhydrous ethanol along with 5 ml APTES which was shaken for 6 h. Next 70% ethanol was used to rinse the modified zeolite and was placed in the oven at 100° C. for 24 h. Afterwards the sample was mixed with 15 ml of 2.5 mg $mL^{-1}$ GO solution to with one drop of Triton X-100 added. Samples were then shaken the on the shaking machine 120 min at 150 rpm. The product was dried at 100° C. for 24 h, then rinsed with ethanol 3 times and by water 3 times for removal of the extra GO on the surface of the zeolite. Lastly, the GO coated zeolite samples were placed in an oven at 100° C. for 24 h before using. Table 5A shows the summary of the series of adsorbents in this Example and FIG. 23 shows the schematic illustration of APTES modified rGO coated on the zeolites.

TABLE 5A

Summary of the series of adsorbents

| Samples | Materials | Fabrication | Theoretical loading of GO/rGO (mg $g^{-1}$)[a] |
|---|---|---|---|
| CZ | Clean zeolite | Clean zeolite Process 1 | 0 |
| AMZ | APTES modified acid treated zeolites | APTES modified process | 0 |
| DCGZ | Dry method GO coated zeolites | Drying method coated process | 1.8[a] |
| GAMZ | GO coated APTES modified zeolites | Drying method GO coated APTES modified acid zeolites | 2.53[a] |
| FRGAMZ | 4 times recoated GO coated APTES modified zeolites | Four times GO recoated APTES modified zeolites | 10[a] |
| FRrGAMZ | 4 times recoated reduced GO coated APTES modified zeolites | In-situ Vitamin C reduced GO four times coated APTES modified zeolites | 10[a] |

[a]The theoretical loading of GO/rGO, calculated from the desorption experiment assuming a 100% adsorption capacity of GO/rGO on the functionalized zeolites surface.

The recoated GO onto the natural zeolite was added to 15 ml of 2.5 mg $ml^{-1}$ GO solution in the beaker containing the 15 g of GO coated APTES modified zeolite. Then it was shaken on the shaker for 120 min at 150 rpm. The product was dried at 100° C. for 24 h.

Thermal regeneration. Thermal regeneration of the adsorbents was carried out in an electric furnace. According to the literature, rGO has excellent thermal stability at 550° C., and the melting points of PCB, BPA, and PFOA are lower than 500° C. The samples were placed in the electric furnace at 500° C. under N2 atmosphere for 1 hour at 10° C. $min^{-1}$. The removal efficiency of disperse blue 26 (melting point at 217° C.) was used to test the regeneration ability of FRrGAMZ.

Figure 24A:
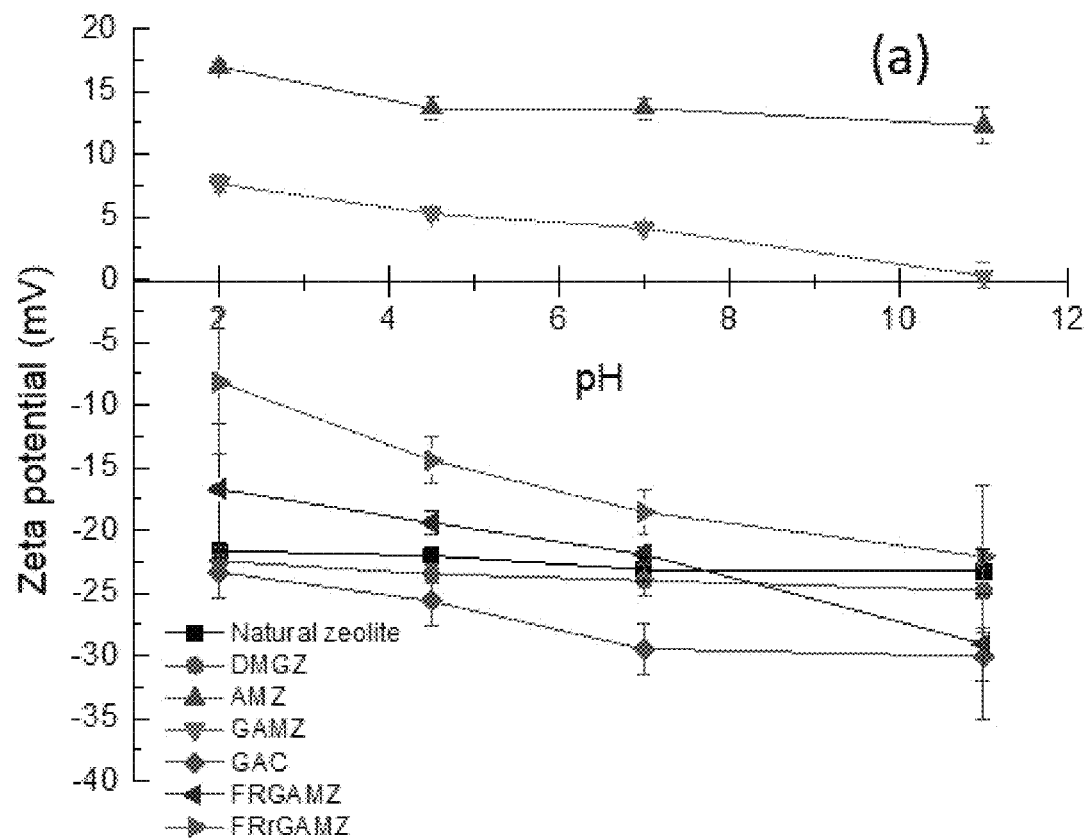
FIG. 24A shows Zeta potential of multifunctional adsorbents

Study of increasing GO loading with surface modification of zeolite. Many research studies focus on the kinetics and isothermal adsorption mechanism of graphene-based products by batch experiment. While graphene has a large surface area, it has been used ineffectively in water purification. It is desired to fabricate single or few layers graphene-based products which are stable, capable, and easily separated from water. To obtain multilayered sheets or thin-layered graphene-based materials, GO was coated onto the zeolite selected as the support material for deposition and confirmed in previous chapters. The zeta potential measurement was examined to understand the interaction between the zeolite and graphene-based materials. According to the zeta potential shown in FIGS. 24A and 24B, both charges of zeolite and GO are negative. Those negative charges originated from the ionization of the C=O, O—C=OH and —OH are from the functional groups of GO and zeolites surface. It is highly likely that hydrophilicity caused by hydrogen bonding between —OH or —COOH groups on the GO surface and associated —OH groups on zeolite, provided the driving force to form the coating layer on the zeolite surface rather than electrostatic attraction. APTES was used to generate ionic bonding between the zeolite and GO by the interaction of amine groups with oxygen-containing groups to gain a higher loading of GO. In FIG. 24A, it can be seen that surface charge of AMZ switched from negative to positive (17.5 mV at pH=2 and 12.4 mV at pH=11). The results imply that the driving force for the coating layer buildup is primarily due to the electrostatic attraction between the AMZ surface and GO. Therefore, to obtain a higher loading, the drying method coating procedure was performed in a stepwise manner. In this study, we prepared one-time GO coating samples DCGZ and GAMZ, and four-time GO coating samples FRGAMZ and FRrGAMZ to study the influence of loading of GO on the surface of zeolites. (See Table 5A) The theoretical loading of graphene-based materials was calculated under the assumption that the total amount of GO present was adsorbed to zeolite surface. The theoretical loading of GO increased from 2.5 mg g$^{-1}$ for GAMZ to 10 mg g$^{-1}$ for FRGAMZ, and the zeta potential switched from positive to negative. It demonstrates qualitatively that the GO coating layers are formed by the stepwise adsorption of zeolite and GO.

Figure 25A:
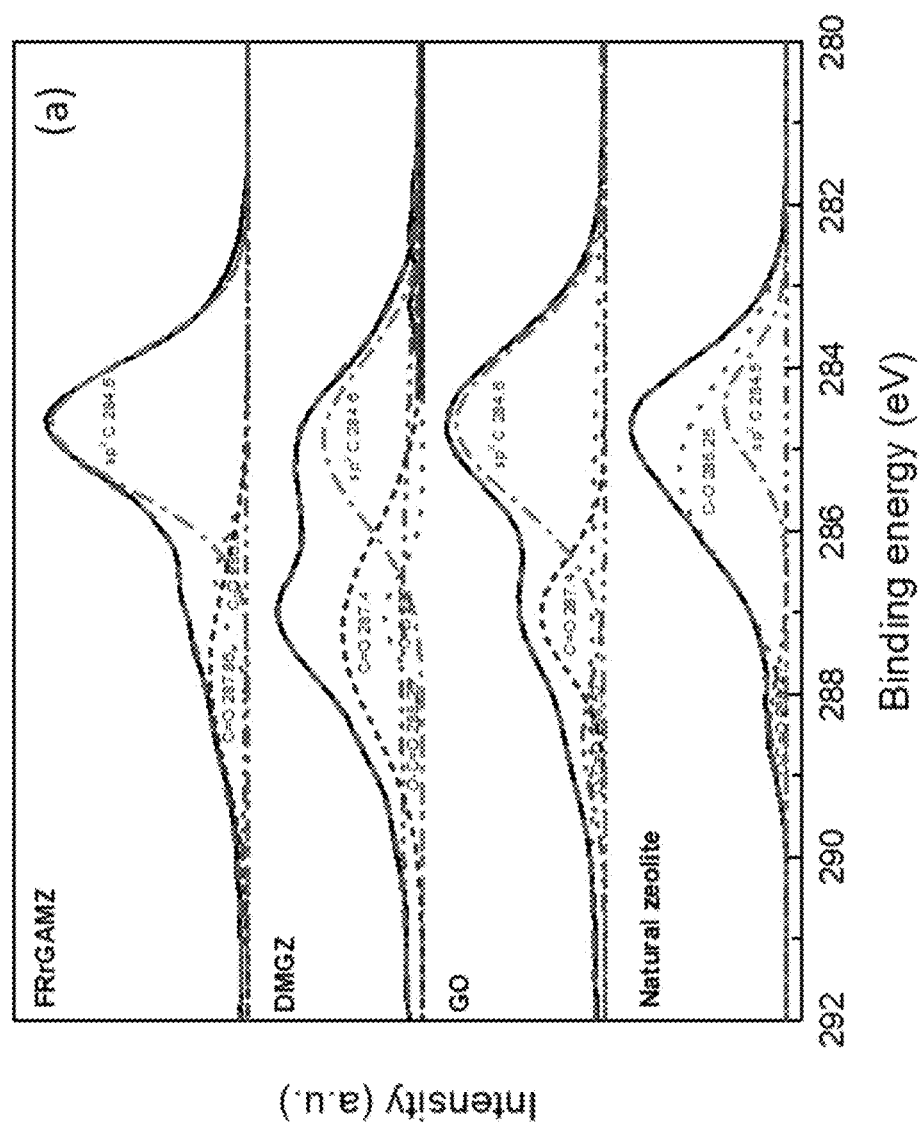
FIG. 25A High-resolution XPS scans for C1s peaks of GO, natural zeolite, DCGZ and FRrGAMZ FIG. 25B High-resolution XPS scans for N1 peaks of AMZ FIG. 25C High-resolution XPS scans for N1 peaks of AMZ
Figure 25B:
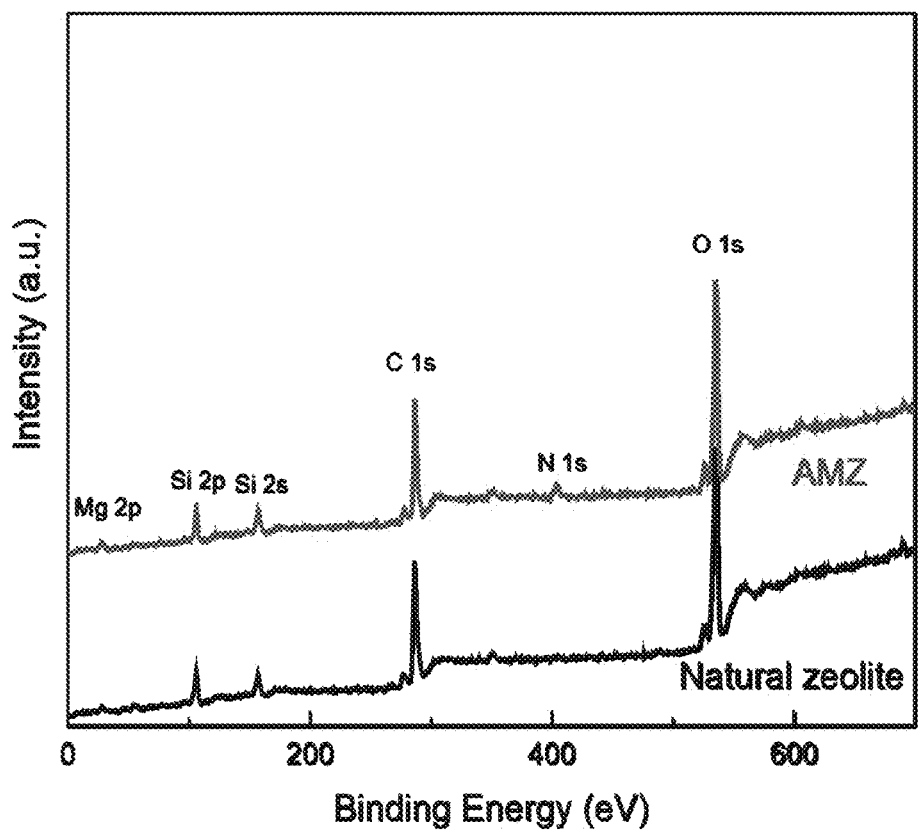
Figure 25C:
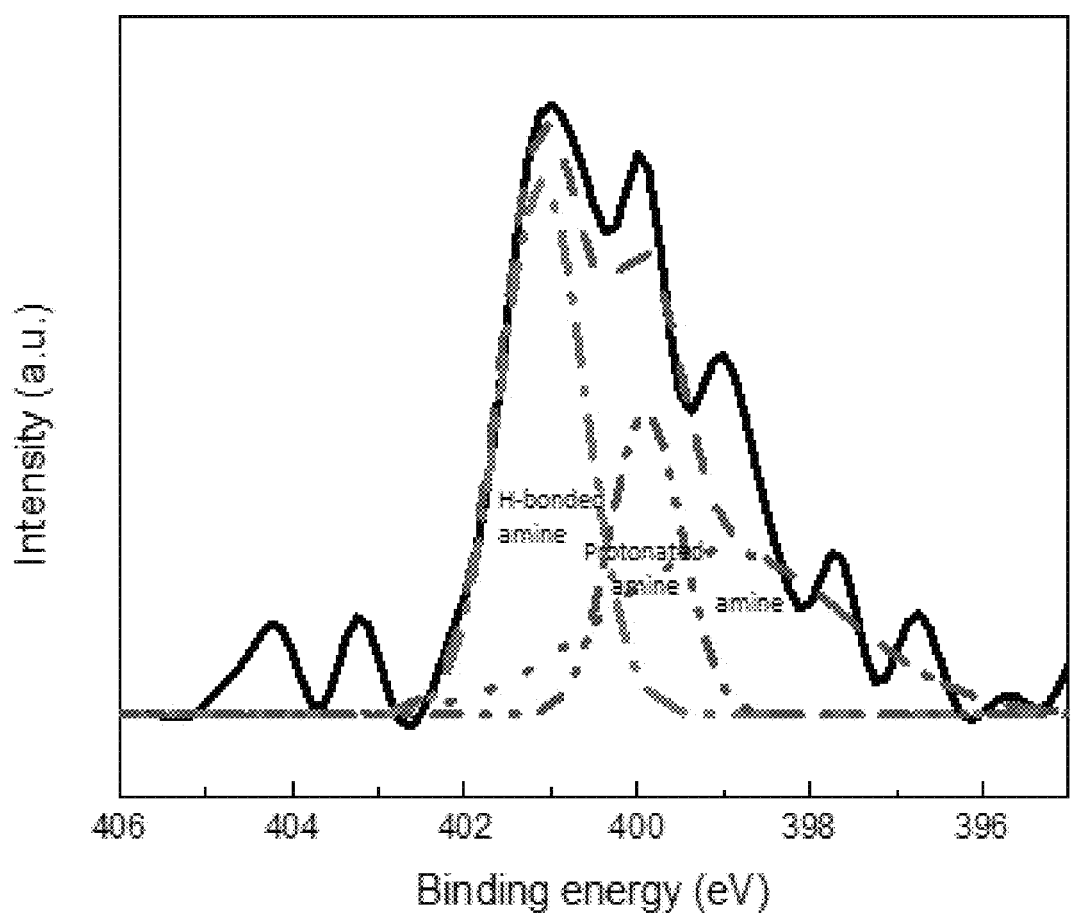

XPS was employed to probe the chemical feature of the graphene-based materials and the modified zeolite. To provide the detailed surface composition, XPS C1s core level spectrum were resolved into four peaks representing different chemical environments using a sum of Lorentzian Gaussian functions. The resolving results for commercial GO, natural zeolite, and DCGZ, are presented in FIG. 25A. Briefly, the C1s XPS spectrum of commercial GO indicates a considerable degree of oxidation with four components that correspond to carbon atoms in different functional groups: sp$^2$ C, C=O, and O—C=O, the binding energy of the peaks at 284.5, 287.4, and 288.5 eV respectively, which are fitted and assigned according to literature values. Also, the peaks, sp$^2$, C—O at 285.25 eV and O—C O bonds are found in natural zeolite which comes from hydrocarbon impurities typically obtained during sample preparation. XPS C1s core level scan spectra of DCGZ were resolved into four peaks, sp$^2$ C at 284.6 eV, C=O at 287.64 eV, O—C=O 288.25 eV, and C—O at 287.0 eV. The first three peaks are assigned to GO, while the last three are contributed by natural zeolite, which indicates that the GO was successfully coating on the zeolite surface. The AMZ displays a weak and broad N is XPS peak between 395 eV and 406 eV. As shown in FIGS. 25B and 25C, the presence of the three peaks at 398.76, 401.1, and 402.2 eV in the N is spectrum provides direct evidence of the successful grafting of APTES onto the surface of the zeolite. The peak at 399.8 eV is attributed to the free terminal amine groups on the APTES, whereas the peaks at 401.1 and 402.2 eV probably resulted from protonated amine $NH^{3+}$ or hydrogen bonded $NH_2$.

Figure 26:
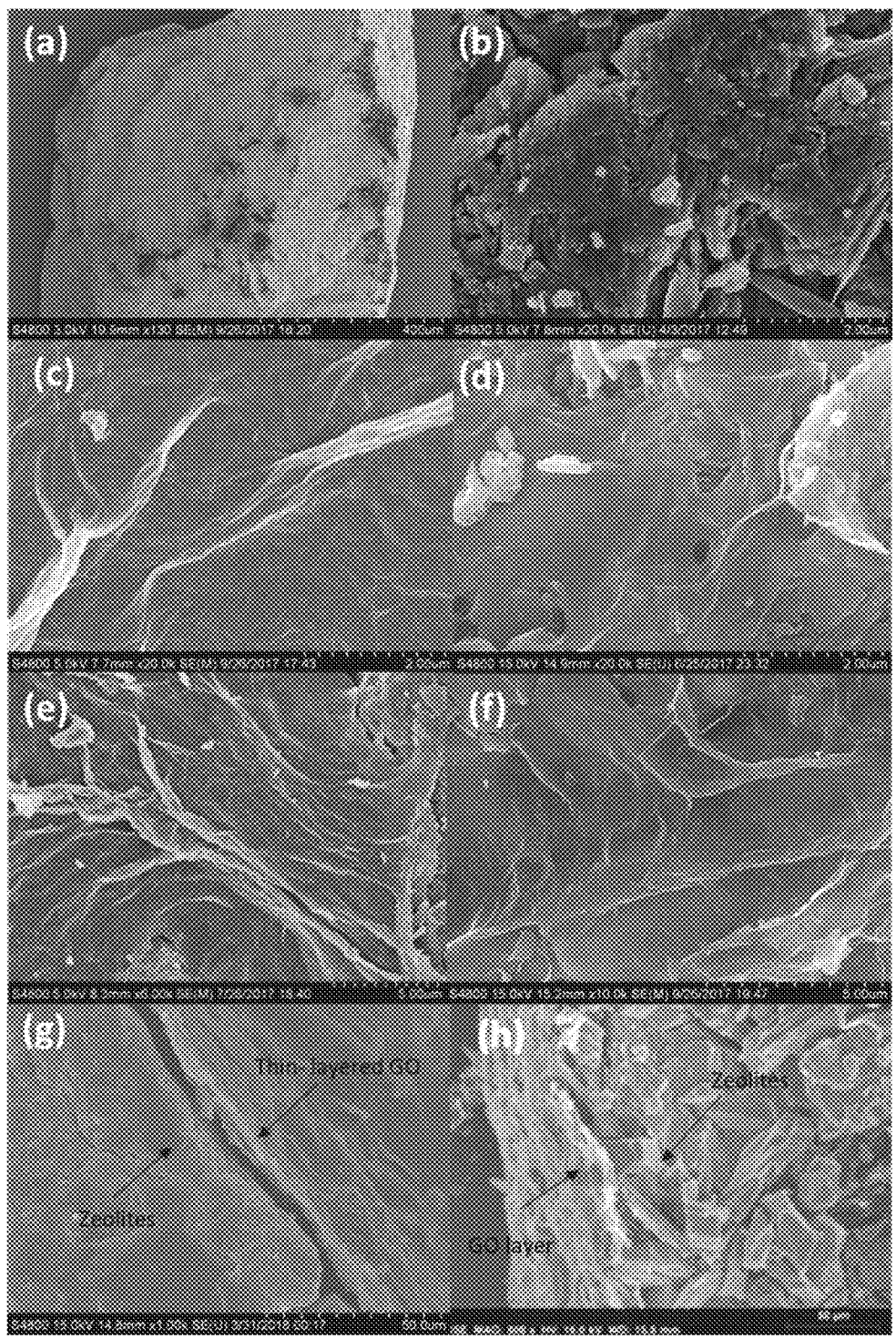
FIG. 26 shows SEM images of adsorbents: surface of natural zeolite (a, b), DCGZ (c), GAMZ (d), FRGAMZ (e) and FRrGAMZ (f); and cross-sections of DCGZ (g) and FRrGAMZ (h).

Direct observation of the GO adsorption on the zeolites surface was provided by SEM: the morphology of the surface of natural zeolite (a, b), AMZ (c), DCGZ (d), GAMZ (e), FRGAMZ (f) are displayed in FIG. 26. The natural zeolite and AMZ featured porous, sharp-edged and rough surface with mean diameter in the 10-20 μm range. SEM images obtained from GO coated zeolite are essentially identical to those of the uncoated zeolite. The presence of GO coating layer on the zeolite surface results in the zeolite surface smoothness. Single or few layers coating was shown in (d) in FIG. 26, which is the evidence that GO sheets were coupled to the zeolites. After modification by APTES, GAMZ, the surface was partially coated by GO which means that the surface of the zeolite was not saturated by GO adsorption. Zeolites can interact with GO sheets through physisorption and electrostatic binding. This finding is corroborated by EDX element mapping measurements shown in Table 5B. SEM images of low and high loading GO on the zeolite (DCGZ & FRGAMZ) cross section was observed in (g) and (h) in FIG. 26, respectively. This observation indicates that thin-layered GO of DCGZ was coated on the zeolites surface around 1 to 1.5 μm. While after the four-time coating, the thickness of GO layers increased to 2 to 3 μm. The binding of the zeolite to GO maintains the interaction between them. EDX was conducted to quantify and elucidate the chemical compositions of GO with zeolite. The C, O, Si and Al were selected as the general elements. It is shown that with increased coating times, the ratio of C/O atomic ratio has increased from 0.06 for natural zeolite to 0.49 for FRGAMZ, while the pure C/O of pure GO is 3.1.

TABLE 5B

EDX analysis of chemical compositions

| Samples(wt %) | C | O | Si | Al | C/O |
|---|---|---|---|---|---|
| Natural Zeolite | 3.25 ± 0.86 | 55.25 ± 3.80 | 35.98 ± 1.86 | 5.71 ± 2.46 | 0.06 |
| DMGZ | 12.59 ± 2.01 | 47.01 ± 5.45 | 42.46 ± 1.24 | 0.72 ± 0.37 | 0.21 |
| GAMZ | 16.12 ± 3.59 | 45.21 ± 1.84 | 35.98 ± 2.55 | 2.79 ± 0.02 | 0.36 |
| FRGAMZ | 23.05 ± 5.09 | 47.52 ± 6.13 | 29.01 ± 9.50 | 1.22 ± 0.29 | 0.49 |
| FRrGAMZ | 42.80 ± 3.02 | 38.28 ± 4.10 | 17.43 ± 1.84 | 1.49 ± 0.67 | 1.12 |

For all samples, BET and DFT specific pore volume and surface areas, $V_{BET}$, $V_{DFT}$, $S_{BET}$ and $S_{DFT}$ gave in Table 5C. The $V_{BET}$ and $S_{BET}$ values were calculated for assuming mesoporous geometry. The $V_{DFT}$ and $S_{DFT}$ values were calculated using the regularized density functional theory model assuming microporous geometry. Comparing the values of the few layered DCGZ with GAMZ calculated by BET and DFT, both pores volume and surface area were reduced. It is possible to conclude that the strong bonding of the GO coating layer reduced the specific surface area contributed from GO sheet. After four times recoating, the pore volume (BET) increases to $8.5 \times 10^{-2}$ cm$^3$ g$^{-1}$ while the pore volume (DFT) is lower than DCGZ. However, these specific surface areas are approximately equal. It indicated that multiple coating layers were formed on the zeolites surface while the specific active surface area was the same or even reduced. It is highly possible to lead to a decrease of adsorption capacity of GO.

TABLE SC

BET and DFT specific volume and surface of all samples

| Samples | Pore structure VBET (cm$^3$ g$^{-1}$) | VDFT (cm$^3$ g$^{-1}$) | BET S(m$^2$g$^{-1}$) | SOFT (m$^2$ g$^{-1}$) |
|---|---|---|---|---|
| CZ | $7.09 \times 10^{-3}$ | $3.8 \times 10^{-2}$ | 15.08 | 14.7 |
| DCGZ | $3.1 \times 10^{-2}$ | 0.1 | 101.6 | 159.4 |
| GAMZ | $2.7 \times 10^{-2}$ | $2.4 \times 10^{-2}$ | 51.0 | 109.6 |
| FRGAMZ | $8.5 \times 10^{-2}$ | $7.6 \times 10^{-2}$ | 101.6 | 159.3 |
| FRrGAMZ | $6.8 \times 10^{-2}$ | $6.1 \times 10^{-2}$ | 60.8 | 94.8 |

An appropriate assumption for this phenomenon can be explained by the bonding intensity between GO and zeolites. Before the zeolite surface modification, the thin GO coating layers have a weak interaction with zeolites surface, which led to a more substantial microporous volume and surface area. The gap between GO layers and zeolites can be seen in the SEM image of the cross-section of DCGZ in (g) in FIG. 26. After modification, the thin GO layers have a robust electrostatic attraction with the modified zeolite surface. Thus, the specific volume and active surface area of GO was reduced. Even though increasing the GO layers by repeating the coating steps, it could not contribute to improving the specific volume and surface area which is possible lead to a decrease of adsorption capacity of GO.

In-situ GO reduction on zeolite. In-situ reduction of GO on the support material is desirable for water purification process due to the insolubility of rGO with water and its incompatibility with zeolites surface. Chemical reduction is effective at moderate temperatures but involves considerable care, multiple steps, and some of the reagents are toxic. Vitamin C was introduced as a reducing reagent to in-situ reduce the GO on zeolites. The desorption of rGO from zeolite is not desirable for economic and environmental reasons. As previously mentioned, the interaction between zeolites surface and GO are mainly attributed to their hydrophilicity. The functional groups of GO, such as —COOH, —OH, offer negative charges so that GO can be adsorbed on the zeolites surface tightly. The oxygen functional groups in GO sheets can be removed and the conjugated graphene network reestablished by vitamin C reduction.

Figure 27:
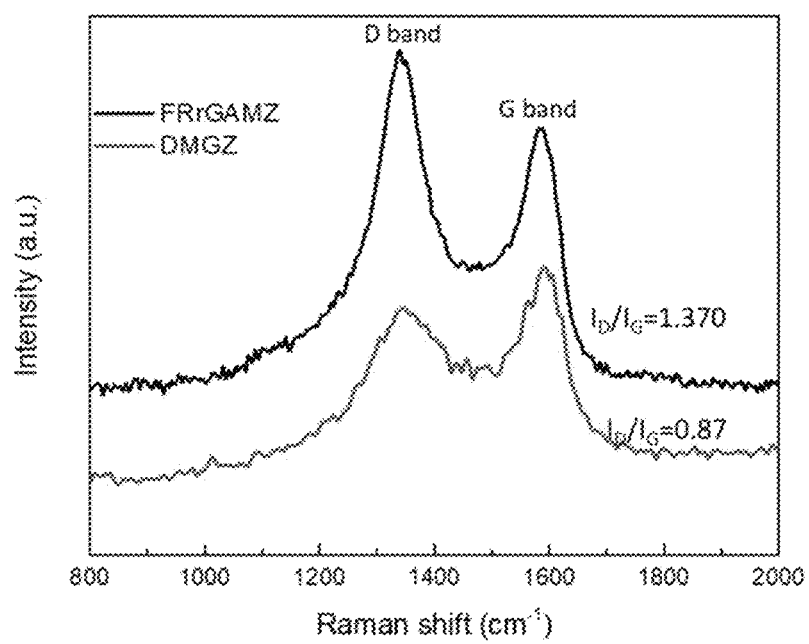
FIG. 27 shows Raman spectra of DCGZ and FRrGAMZ.
Figures 28A, 28B:
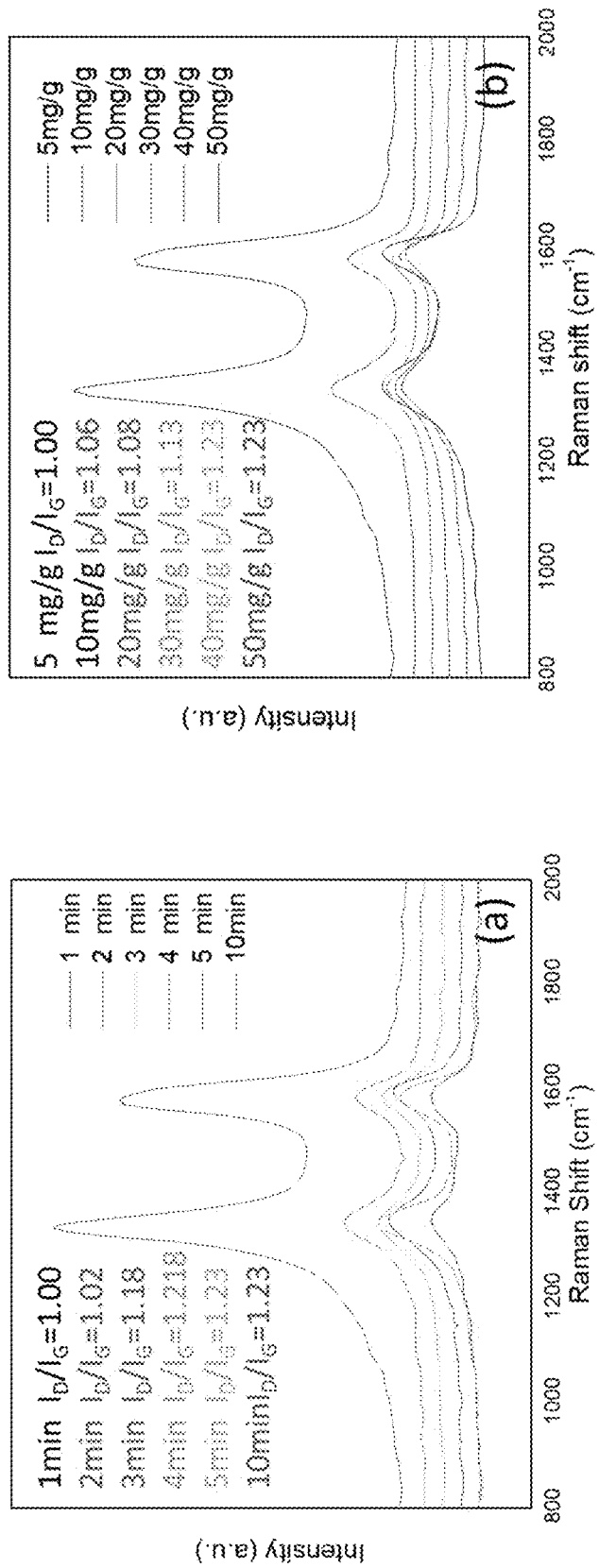
FIG. 28A shows Raman spectra of in-situ reduction of GO by being reduced for 1 to 10 min by vitamin C.
FIG. 28B shows Raman spectra of in-situ reduction of GO by being reduced by different amount of vitamin C.
Figure 28C:
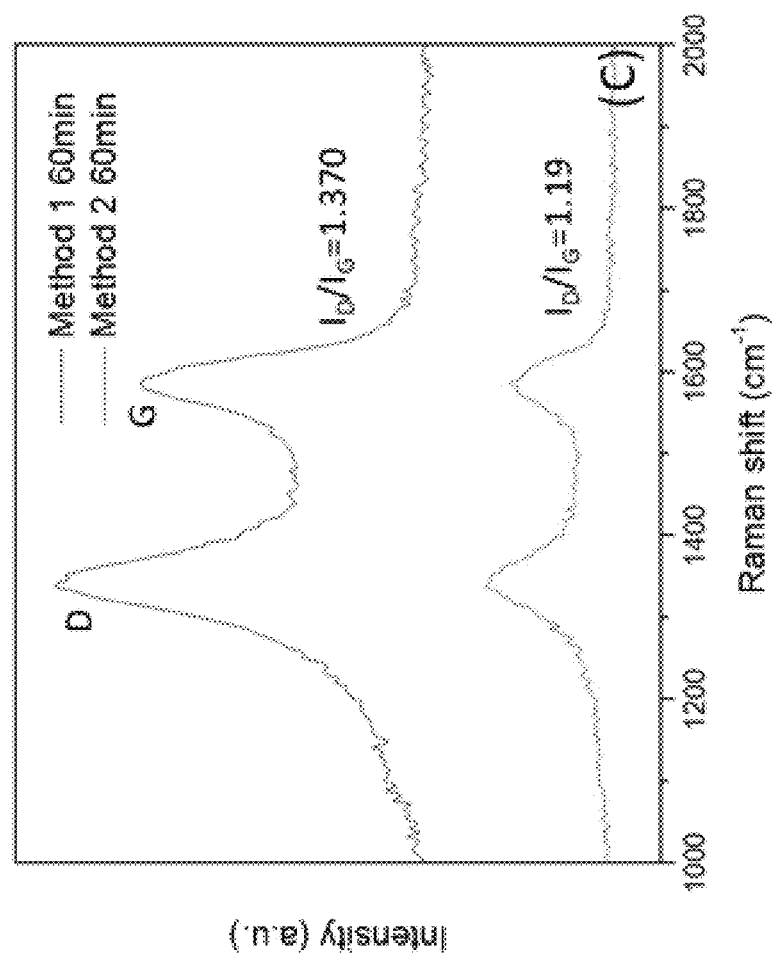
FIG. 28C shows Raman spectra of in-situ reduction of GO by different adding methods of vitamin C. The adding method 1: was mixing 50 mg g vitamin C powders with adsorbents directly, then adding 1 ml g$^{-1}$ (adsorbent) water at 90° C. in water bath for 60 min. The adding method 2: was mixing 50 mg ml$^{-1}$ vitamin C solution with adsorbents, then react at 95° C. in water bath for 60 min.

In FIG. 27, Raman spectra of DCGZ and FRrGAMZ displayed two prominent peaks at 1340 cm-1 and 1585 cm$^{-1}$ corresponding to the well-documented G and D bands, respectively. The $I_D/I_G$ intensity ratio of DCGZ was calculated to be 0.87. After four-times coating, FRGAMZ was reduced at 90° C. for 1 hour with 50 mg g$^{-1}$ vitamin C solution, and the $I_D/I_G$ intensity ratio was dramatically increased to 1.37, suggesting that the reaction of vitamin C formed a greater extent of reduction and a more substantial number of defects over the graphene sheets. Also, to control the degree of in-situ reduction of GO on zeolite, the influence of the concentration of vitamin C and reaction time were studied and are shown in FIG. 28A-28C. The results show that the extent of in-situ GO reduction was well-controlled by the above factors, and the optimized reduction conditions were used for further research. Meanwhile, surface and cross-section morphology of FRrGAMZ are shown in (f) and (h) in FIG. 26 providing evidence that few layers of rGO were coating on the modified zeolites surface.

Interestingly, adding vitamin C method can also affect the reduction gradient of GO, which is shown in FIG. 28C. Mixing the vitamin C powder with GAMZ directly leads to a higher extent of reduction, while the ratio of $I_D/I_G$ can only reach to 1.19 by adding the vitamin C solution. Possible explanation is that the local concentration of vitamin C obtained by method 1 is higher than the one by method 2. The higher the concentration of vitamin C, the more reduction extent of GO can be achieved. Herein, we used the method 1 for further research.

In addition to constituting a well-controlled in-situ reduction of GO on zeolites surface, information provided by XPS analysis of Cis spectra of FRrGAMZ shows that the peak change is contributed from C=O and O—C=O groups. After treatment by vitamin C, the C=O bonding shifts from 287.4 eV to 287.86 eV, and the intensity of C=O and O—C=O peaks is reduced dramatically, which indicates the loss of oxygen and conversion to new chemical species. Theoretically, the oxygen-containing functional groups on the GO nanosheets are the only resource of C=O on the zeolite, so the peak area percentages of C=O to the total peak area of all chemical bonds can be used to indicate the reduction degree of GO. The remaining C=O group and C—O peak contributed from rGO and zeolite respectively suggested that the reduction of GO was partially reduced. The zeta potential in FIG. 24B also shows that the value of zeta potential of rGO is higher than GO due to the lack of functional groups on the surface. Therefore, the value of zeta potential of rGO with modified zeolite is higher than that of GO with the modified zeolites. Exemplarily, the value of zeta potential of FRGAMZ (−8.2 eV) is lower than the one of FRGAMZ (−16.8 eV) at pH=2, which indicates that the in-situ reduction procedure occurred on zeolite readily by adding vitamin C. The EDX analysis in Table 5B shows that the ratio of C/O increased from 0.49 for FRGAMZ to 1.12 for FRrGAMZ, confirming the decomposition of the functional groups of GO on the zeolite surface. BET analysis in Table 5C also shows a reduction of microporous volume and specific surface area. This method provides a quantitative evaluation of in-situ reduction of GO on zeolite by vitamin C.

Figure 29A:
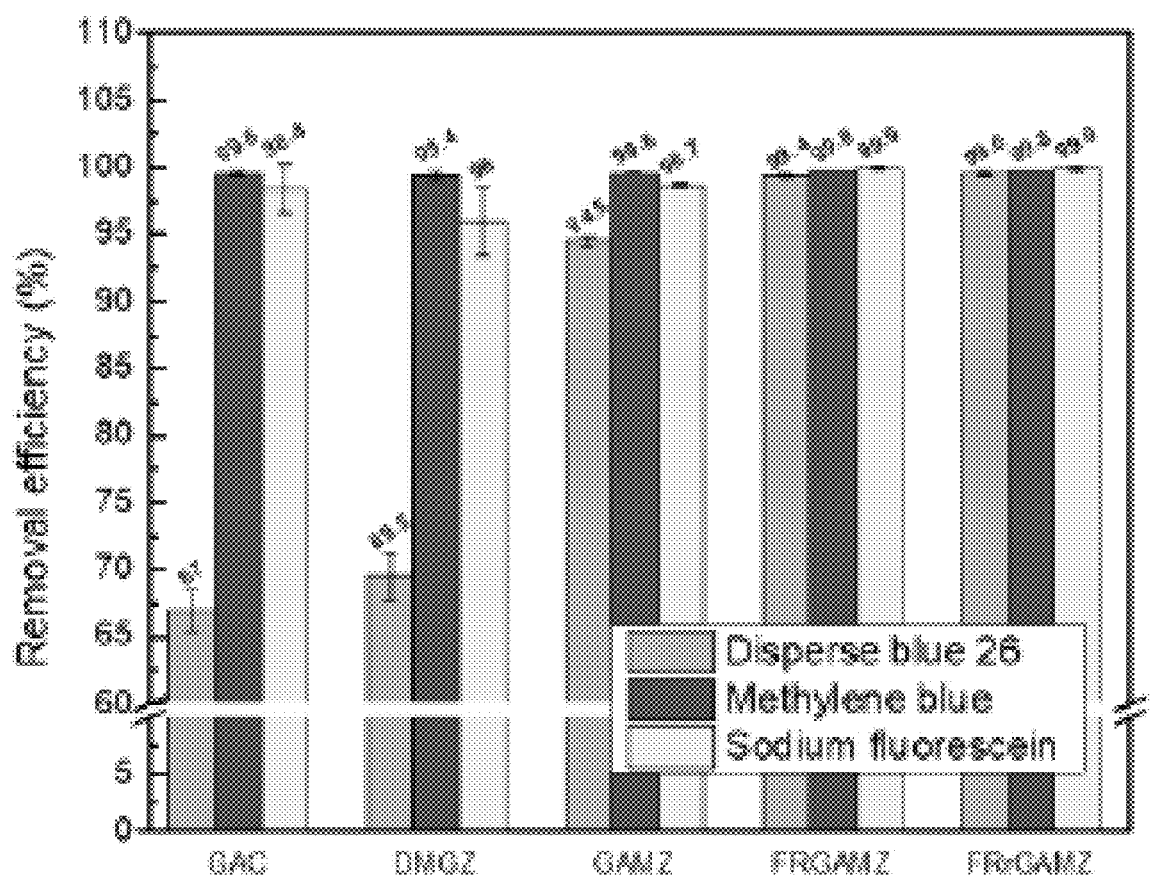
FIG. 29A shows the removal efficiency of organic model compounds by different engineered zeolites.
Figure 29B:
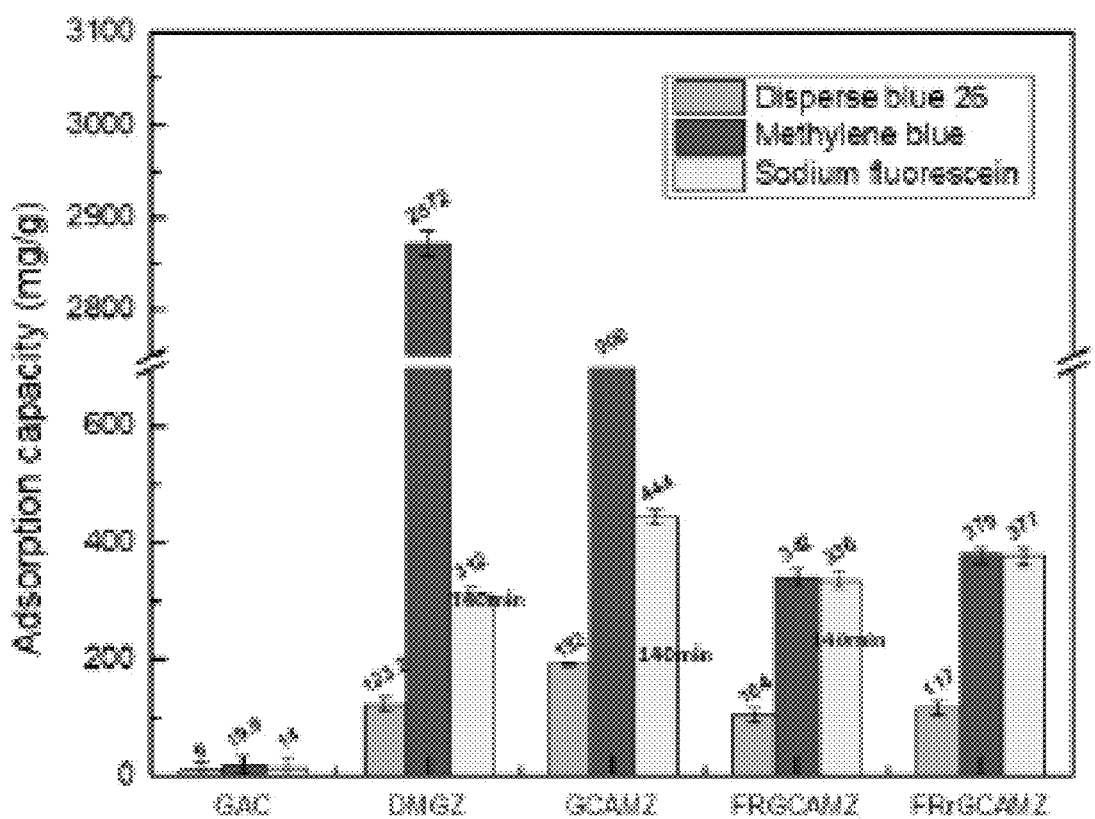
FIG. 29B shows the adsorption capacity of organic model compounds by different engineered zeolites.

Organic model compounds adsorption experiment. To examine the removal efficiency and adsorption capability of the adsorbents, non-ionic disperse blue 26, cationic methylene blue and anionic sodium fluorescein were selected in this study. FIGS. 29A and 29B show the results of the removal efficiency and adsorption capacity of the variably charged organic model compounds which is compared with the commercial GAC. Adsorption experiments shows that thin-layered graphene-based materials have higher removal efficiency capability than GAC. In order to prove that the CZ does not contribute significantly to adsorption capacity for organic model compounds, the adsorption experiment of CZ was conducted. It shows that the adsorption capacity of the column test is only 0.26 mg g$^{-1}$, 0.51 mg g$^{-1}$ and 2.12 mg g$^{-1}$ for disperse blue 26, sodium fluorescein and methylene blue, respectively.

Figure 24B:
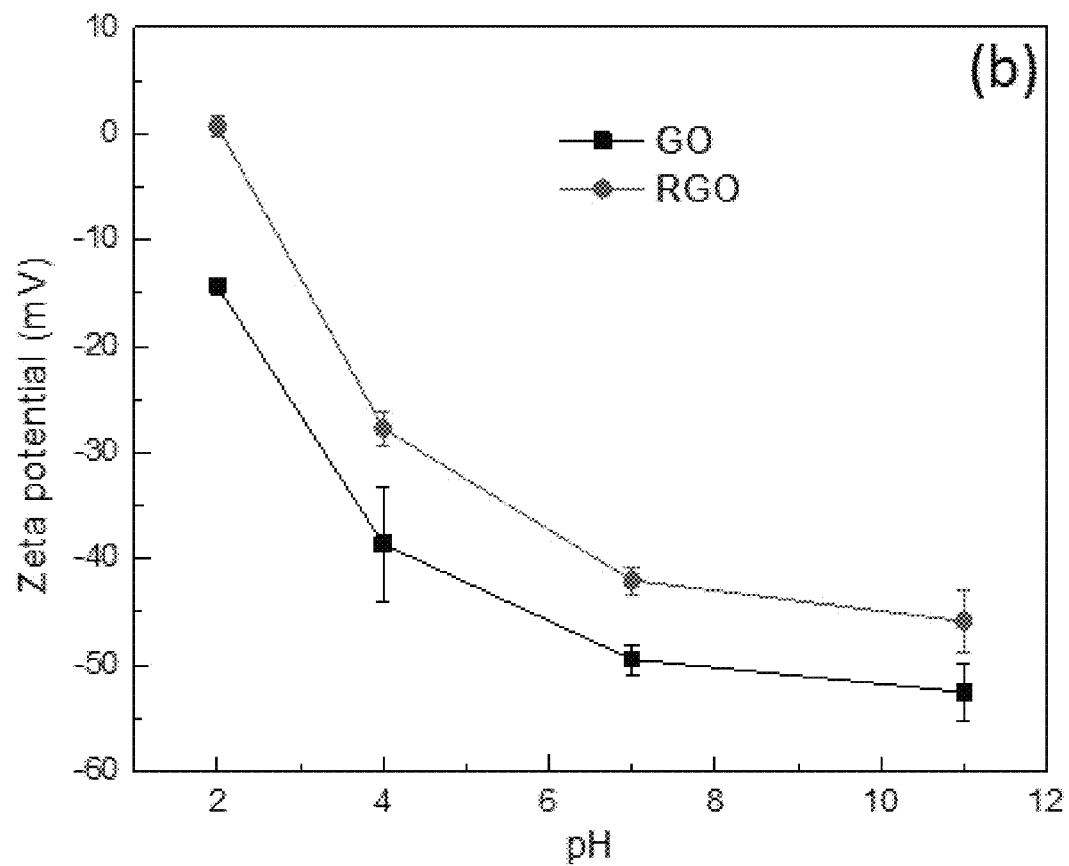
FIG. 24B shows Zeta potential of GO and rGO

The contribution from clean zeolite is insignificant. In FIG. 29A, it shows that the removal efficiency of disperse blue 26 increased from 69.5% for DCGZ to 94.5% for GAMZ. The zeta potential in FIGS. 24A and 24B provides that charge of disperse blue 26 is higher than GAMZ but less than methylene blue in the pH range between 2 to 11. Thus, the mechanism of adsorption of disperse blue 26 for GAMZ should result from the large surface area with active sites of GO and π-π stacking interaction between organic model compounds and GO. With the increasing of GO loading, the removal efficiency of disperse blue 26 reaches up to 99.4% for FRGAMZ. Especially, FRrGAMZ shows a remarkable removal efficiency of 99.9% for disperse blue 26, which should be benefited from both high loading and partially in-situ reduction of GO.

Similarly, the removal efficiency of anionic dye increased from 96% for DCGZ to 99.9% for FRrGAMZ. For cationic methylene blue, all the adsorbents showed an excellent removal efficiency which was over 99% because of π-π electron donor-acceptor interactions and electrostatic attraction between positively charged dye ions and negatively charged adsorbents. Another explanation for the excellent removal is that the unique porous structure of natural zeolites gives an excellent cationic exchange and sorption properties confirmed by numerous studies so far. For anionic sodium fluorescein, the removal efficiency of DCGZ is less than commercial GAC probably due to the strong electrostatic repulsion from GO. With the increasing amount of GO, the π-π stacking interaction and large surface area play a vital role in the adsorption. Moreover, the partial reduction of GO by vitamin C improved the adsorption capacity of sodium fluorescein. In FIG. 29A, the order of removal efficiency of variably charged organic model compounds was FRrGAMZ>FRGAMZ>GAMZ>DCGZ.

The adsorption capacities of graphene-based materials attached on natural zeolite were obtained and are shown in FIG. 29B. They display remarkable adsorption capabilities of variably charged organic model compounds much higher than GAC. To the best of our knowledge, the single adsorbent applied for adsorption of multiple charged organic model compounds was reported for the first time.

Figure 29C:
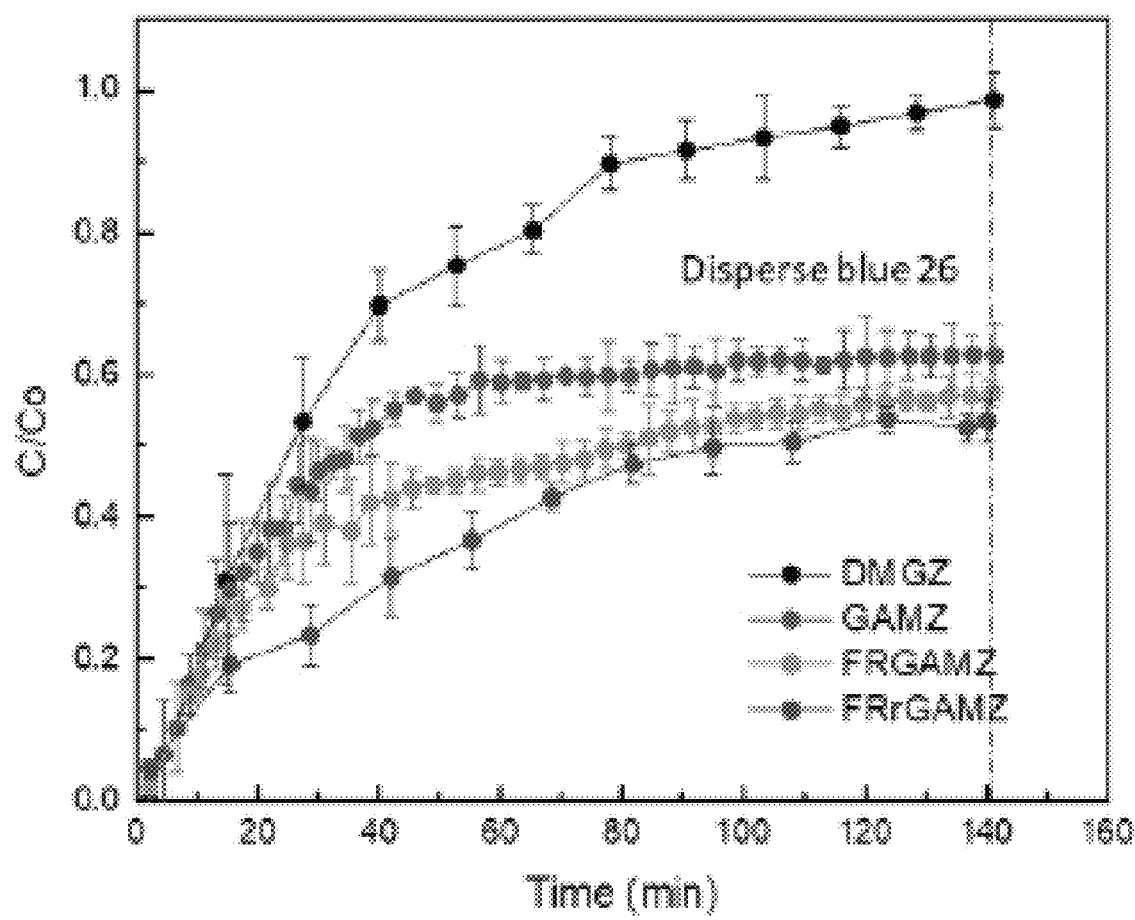
FIG. 29C shows the exhaustion experiment for disperse blue 26.
Figure 29D:
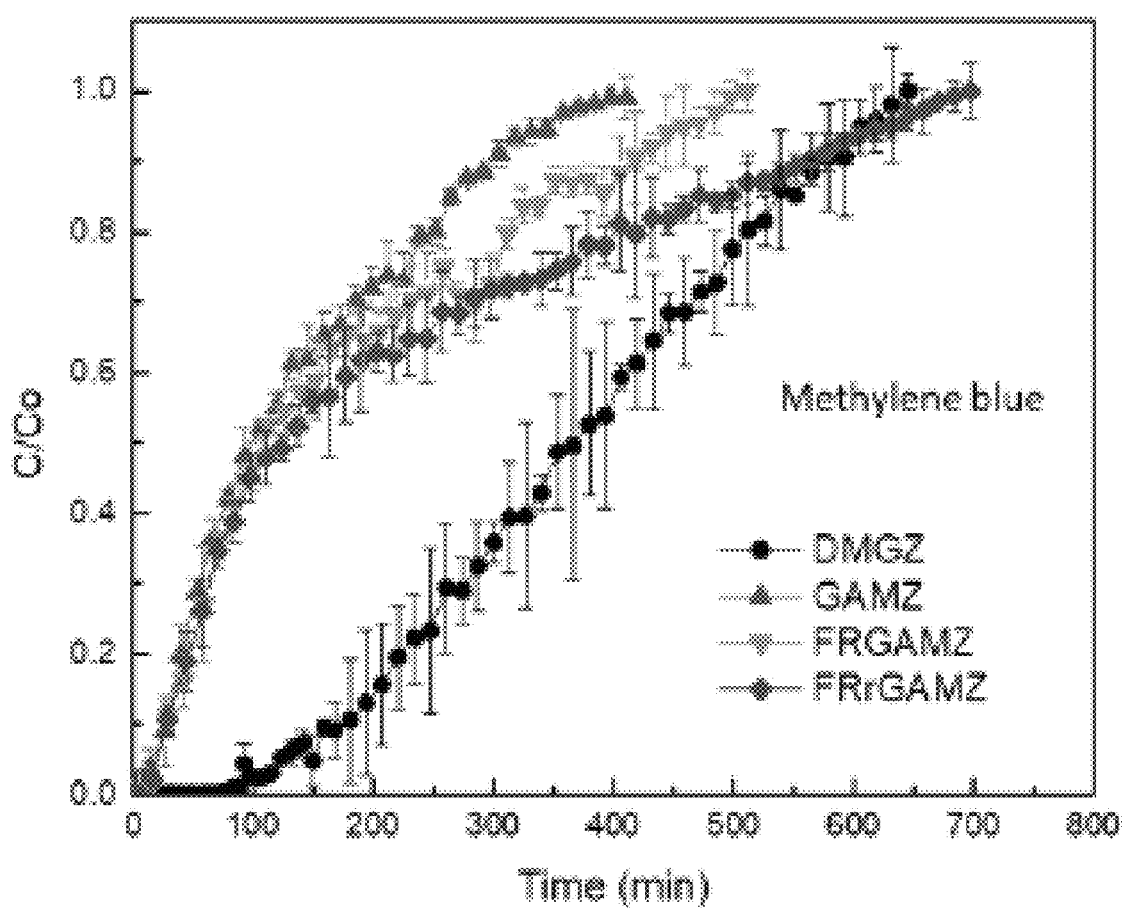
FIG. 29D shows the exhaustion experiment for methylene blue.
Figure 29E:
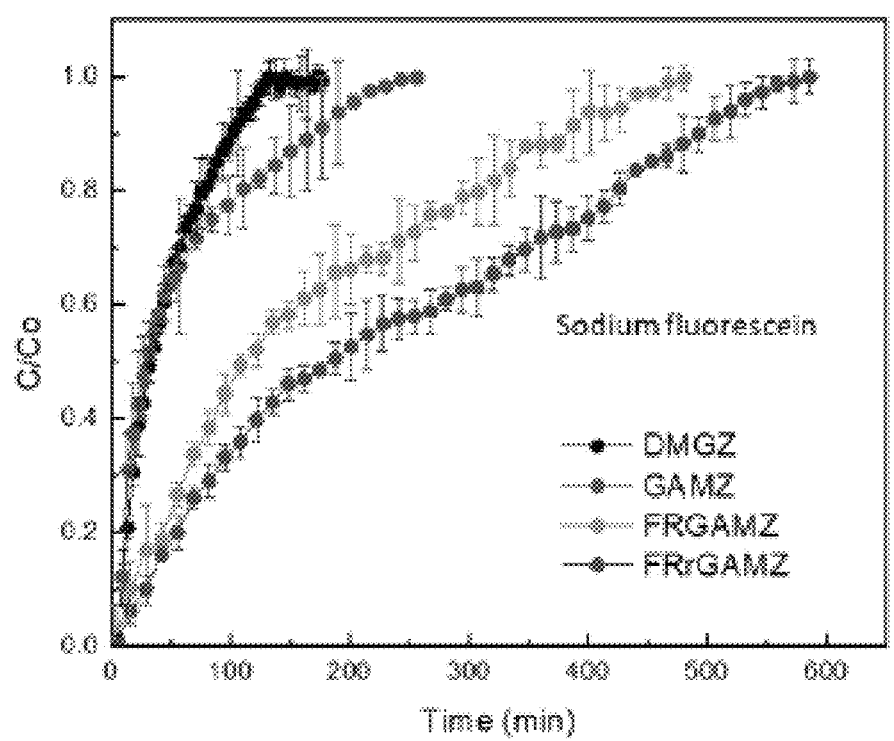
FIG. 29E shows the exhaustion experiment for sodium fluorescein.

The breakthrough curves for organic model compounds are presented in FIGS. 29C, 29D, and 29E. For disperse blue 26, faster attainment of exhaustion was observed for natural zeolite at 80 min and DCGZ at 120 min. As the loading of GO increased, smoother breakthrough curves were obtained. The maximum adsorption capacity obtained is 192 mg g$^{-1}$ for GAMZ. This experiment was performed up to 140 min, which was much higher than that of most of the reported adsorbents, such as multi-walled carbon nanotubes (77.5 mg g$^{-1}$ neutral red), activated carbon (48.7 mg g$^{-1}$ for congo red) and metal oxide (105 mg g$^{-1}$ neutral red). It is worth pointing out that the adsorption capacity of GAMZ is higher than DCGZ, possibly because it is related to the increased electrostatic interactions with the surface of GO which is due to a more homogenous coating and relatively more active sites per mass. Compared with GAMZ, the adsorption capacity of disperse blue 26 for higher loading FRGAMZ was decreased from 192 mg g$^{-1}$ for GAMZ up to 117 mg g$^{-1}$ up to 140 min, because its active sites per mass were reduced as a result of the multiple layers caused by multiple coating steps. However, decreased adsorption capacity caused by increasing layers of GO reduces the active sites per mass.

Additionally, FRrGAMZ which was reduced from FRGAMZ has a higher adsorption capacity due to the partially reduced GO. Similarly, the adsorption experiment of cationic organic model compounds, methylene blue, exhibited a remarkable adsorption capacity shown in FIG. 29D. It was noted that the DCGZ has a higher adsorption capacity of 2872 mg g$^{-1}$ than the others. This result indicates that the remarkable performance toward cationic adsorbates is probably correlated to the electrostatic interaction between the large surface area of single or few layers of GO with negatively charged natural zeolite and the positively charged dye. The positively charged GAMZ shown in FIG. 29A maintains an incredible adsorption capacity for methylene blue which achieves approximately 900 mg g$^{-1}$. Its remarkable adsorption is due to the large surface area and single or few layers of GO loading. As coating layers increase on the surface, the adsorption capacity of methylene blue decreases from 900 mg g$^{-1}$ to 342 mg g$^{-1}$ for FRGAMZ due to the decrease of specific coating layers of GO on the zeolites surface.

In FIG. 29E, the breakthrough curves of anionic sodium fluorescein show that the DCGZ reaches the saturation point at 145 min, while the GAMZ reaches approximately 240 min. With the increasing loading and reduction of GO, the maximum saturation reaches up to 600 min for FRrGAMZ. The increased adsorption sites in the presence of rGO improved the adsorption capacity for organic model compounds. The adsorption capacity decreases slightly from 444 mg g$^{-1}$ for GAMZ to 377 mg g$^{-1}$ for FRGAMZ. It can be explained by the increased coating layers and decreased specific surface area of GO on zeolites. In general, the high capacities for variably charged organic model compounds for the robust multifunctional adsorbent are due to the increased adsorption sites, π-π stacking of rGO and electrostatic interaction to adsorbates.

Pops adsorption. In 1976, United States Congress banned PCBs domestic production, and the U.S. Environmental Protection Agency (EPA) suggests that PCB exposures below the oral reference dose (RFD) of 20 ng kg$^{-1}$ day$^{-1}$. 42 U.S. Food and Drug Administration (FDA) estimated that the daily BPA exposure level for adults in 2007 was about 0.16 μg kg$^{-1}$ day$^{-1}$. In addition, the Office of Water estimated a cancer slope factor of 70 μg kg$^{-1}$ day$^{-1}$ for PFOA based on testicular tumors and confirmed its lifetime.

Figure 30:
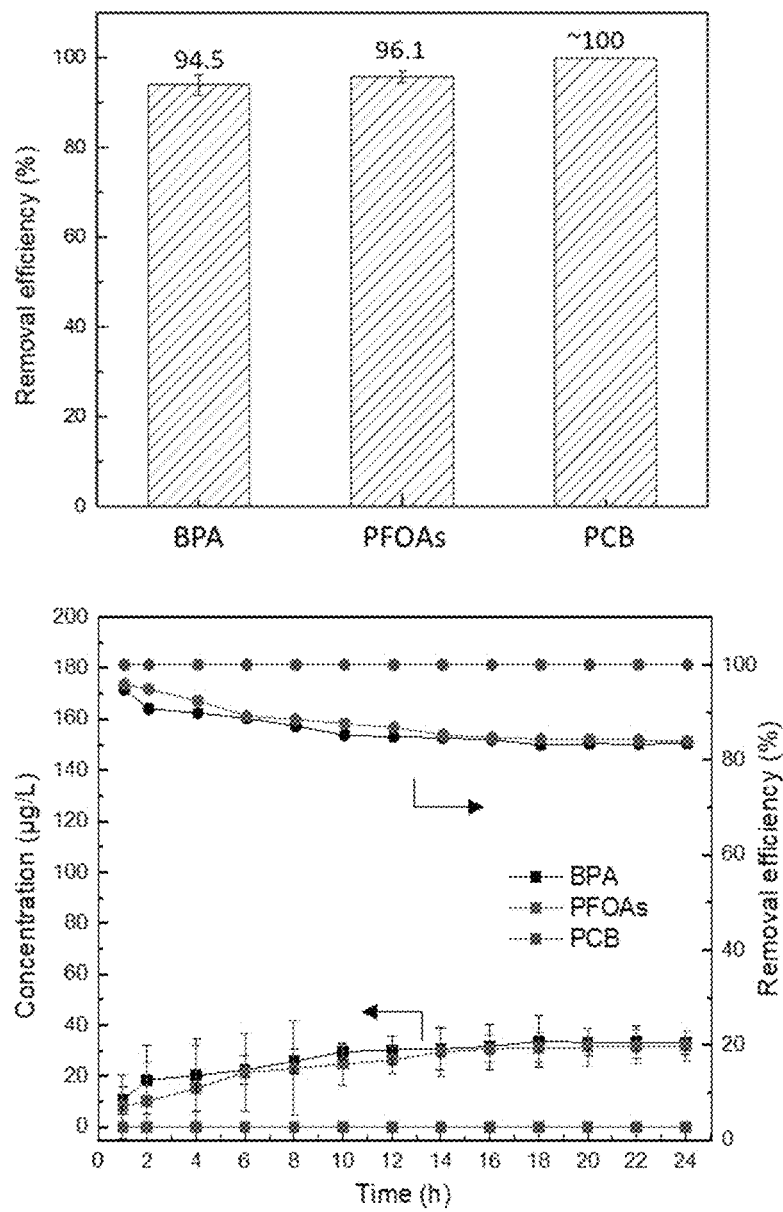
FIG. 30 shows the removal efficiency and time course of removal of POPs (40 mg L$^{-1}$, 1 ml) by FRrGAMZ.

To evaluate the removal ability of our adsorbent for removing POPs from water, 40 mg/L of PCB, BPA and PFOA solutions were introduced to FRrGAMZ by independent column tests. As shown in FIG. 30, FRGAMZ has high removal efficiencies to adsorb these POPs, especially for PCB which has 100% removal due to its relatively positively charged property. Also, lower removal efficiency for BPA and PFOA is possibly due to the hydrophobicity and presence of negative charge, whereas, it maintains 94.5% and 96.1% removal respectively. It is, as discussed above, because of the large surface area and π-π stacking of rGO. To investigate adsorption ability, the experiment was also conducted with 200 μg L$^{-1}$ POPs for 24 hours shown in FIG. 30. Neutral pH value and flow rate for 5 ml min$^{-1}$ were selected to simulate the water treatment condition.

These results indicate that rGO can provide excellent adsorption for PCB which are relatively positively charged when compared to the adsorbent. It also shows that over 82% of BPA and PFOA in the solutions can adsorb onto the FRGAMZ after 24 hours. These results are consistent with organic model compound adsorption studies for disperse blue 26 and sodium fluorescein removal discussed in Example 3. The long-term POPs adsorption experiments show that our adsorbent has a good adsorption ability for different charged organic contamination.

Figure 31:
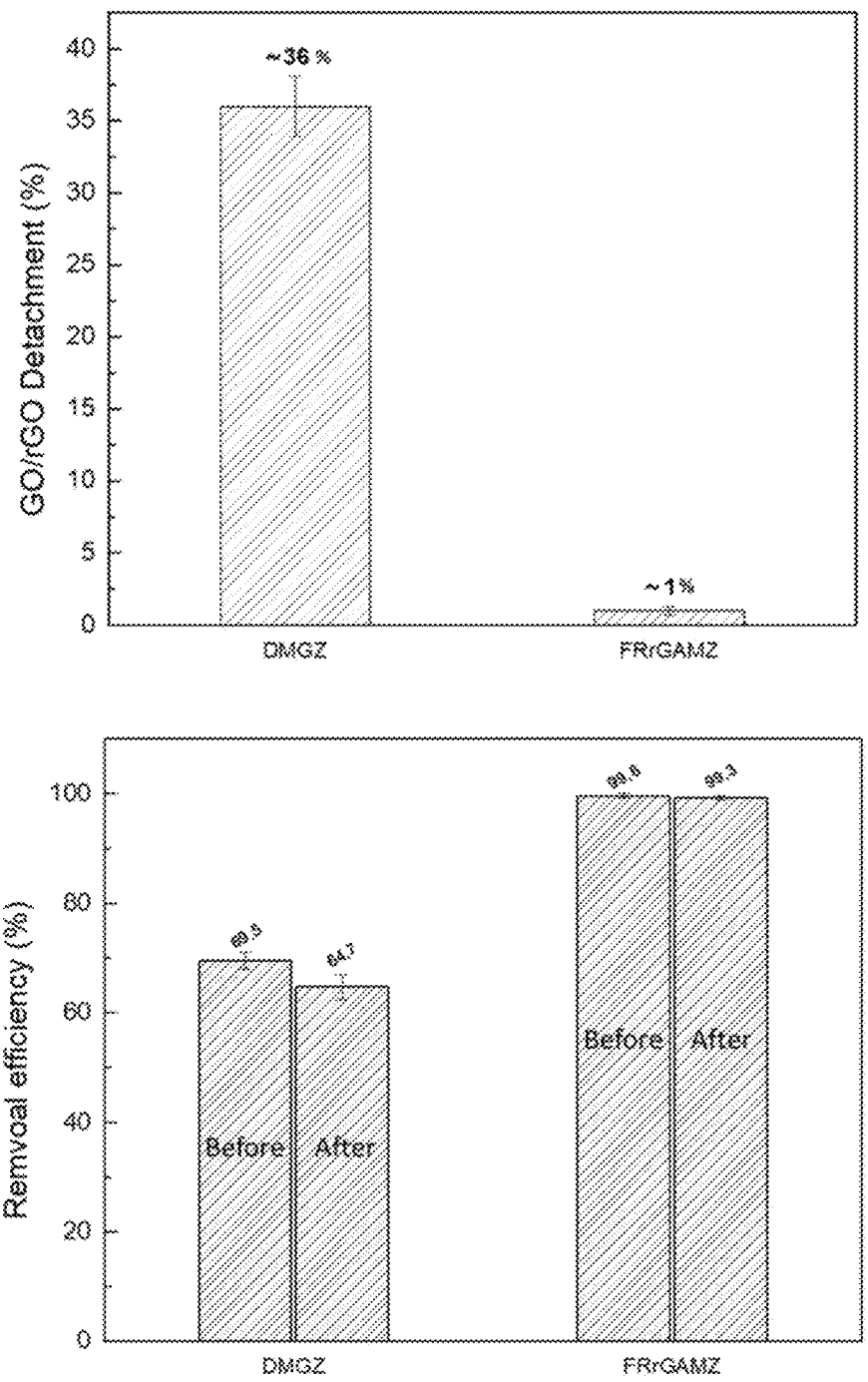
FIG. 31 shows the relative weight percent of GO/rGO detached from DCGZ and FRrGAMZ and the removal efficiency of disperse blue 26 before and after desorption experiment for DCGZ and FRrGAMZ.
Figure 32:
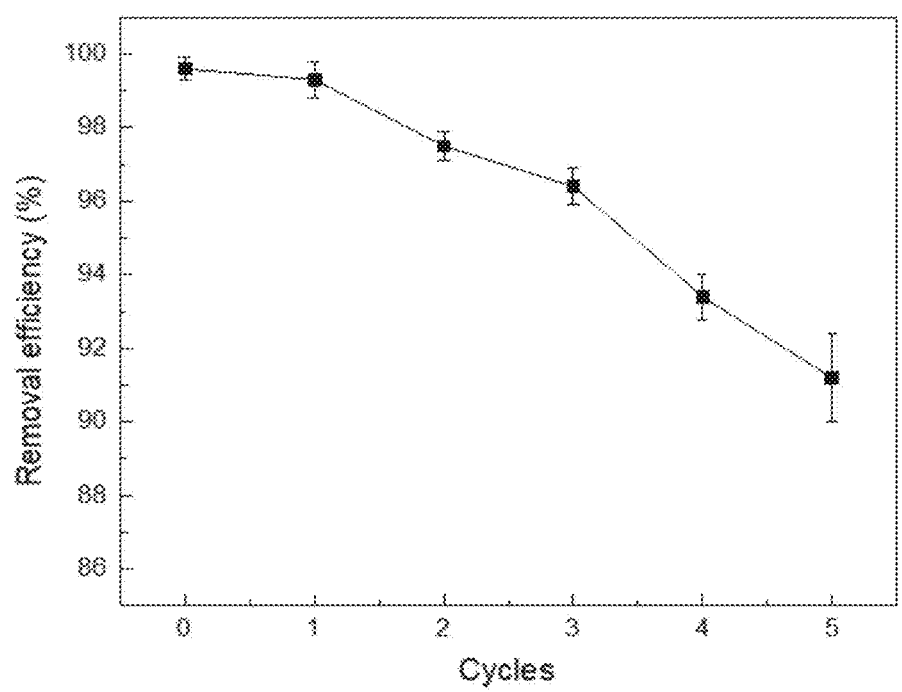
FIG. 32 shows the removal efficiency of disperse blue 26 for thermal regeneration of FRrGAMZ under N2 at 550° C. for 1 hour.

Desorption experiment and thermal regeneration. To test the stability of the robust multifunctional adsorbent for large scale application, the desorption and thermal regeneration experiment were also explored. The relative weight loss of GO/rGO detached from zeolites and removal efficiency of disperse blue 26 were measured and shown in FIG. 31. It has been reported by many studies that the desorption of graphene-based materials from the surface of support material are mainly caused by the weak driving force between them. After shaking at 200 rpm for 24 hours, about 36% of GO was detached from DCGZ and the removal efficiency of disperse blue 26 reduced from 69.5% to 64.7%. While 1% weight loss of rGO was detached from the FRrGAMZ, 99.3% removal was maintained. This is attributed to the well-controlled partial reduction of GO by vitamin C, and the strong interaction between zeolite and rGO. To determine the thermal regeneration ability, FRrGAMZ was tested by heating under N2 at 550° C. for 1 hour and tested by non-ionic disperse blue 26 was selected as adsorbate. The result shows that the removal efficiency reduced with cycle numbers and maintained over 91% after five cycles in FIG. 32. The decrease of removal efficiency may be caused by the loss of active sites of rGO.

Conclusion. In summary, a thin-layered rGO with cleaned and acid-treated zeolite as a substrate was developed as a novel adsorbent for POPs removal from water. We overcame the limited GO loading firstly by modifying the natural zeolite surface by APTES to increase the loading of GO and to limit the desorption of graphene-based materials from the surface. Secondly, the reduction extent and gradient of the adsorbed GO on zeolites surface was successfully controlled by environmentally friendly vitamin C and microwave in-situ to enhance the adsorption capacity for POPs. The thin-layered rGO provided a reliable and effective way to remove POPs from water. The high adsorption capacities were attributed to the more active sites on the rGO. It is easily recycled and exhibits good regeneration ability which is beneficial to reduce the cost. These results prove that the thin-layered rGO coated on zeolites can be used for various types of water contaminants and is a promising candidate for water purification.

Example 6

Modeling of Adsorption Mechanism of FRrGAMZ for Organic Model Compound Removal

Materials. Australian natural zeolite, (clinoptilolite, diameter: 0.7-1 mm, chemical composition: 68.26% $SiO_2$, 12.99% $Al_2O_3$, 4.11% $K_2O$, 2.09% CaO, 1.37% $Fe_2O_3$, 0.83% MgO, 0.64% $Na_2$, 0.23% $TiO_2$, Zeolite Australia Ltd.), graphene oxide (ACS Materials), Triton X™-100, Vitamin C (Sigma-rich, 99%), methylene blue (Electron Microscopy Sciences).

Batch experiment. Adsorption capacity studies were conducted by batch experiments and column tests using the organic model compounds in aqueous solution. Batch experiments were carried out to determine the adsorption performance of organic model compounds onto the adsorbents in a 250 mL glass flask. The sample was immersed in 100 mL of a specific concentration of methylene blue and was shaken at 150 rpm for 48 hours to reach adsorption equilibrium. The study was conducted at room temperature to represent conditions that are typical in the industrial setting. The pH of the solution was adjusted with a 0.1 M solution of NaOH and a 0.1M solution of HCl. The effect of various factors on the rate of adsorption process was assessed by varying contact time, concentration of organic model compounds, and pH of the solution. All experiments were carried out in triplicate, and the average values were taken for analyses.

Mathematical Modeling

Kinetic study of adsorption mechanism of FRrGAMZ. The kinetic models are adopted to describe the mechanism of the adsorption process. From the literature research, the adsorption mechanism of graphene-based materials was usually fitted to the pseudo-second-order kinetics model described by the following equation (6.1).

$$\frac{t}{q_t} = \frac{1}{k_1 q_e^2} + \frac{1}{q_e} t \tag{6.1}$$

where $q_t$ is the adsorption capacity by time, qc is the adsorption capacity at equilibrium, and $k_1$ (g $mg^{-1}$ $min^{-1}$) is the rate constant for the pseudo-second-order kinetics model. From the equation (6.1), the values of the $k_1$ and $q_e$ can be calculated from the slope and intercept of the linear plots of $t/q_t$ verses t.

The equilibrium adsorption data were analyzed by Langmuir isothermal models described by equation (6.2).

$$\frac{C_e}{q_e} = \frac{C_e}{q_m} + \frac{1}{q_m k_L} \tag{6.2}$$

where $C_e$ (mg/L) is the equilibrium concentration, $q_e$ (mg/L) is the amount adsorbed at equilibrium, $k_L$ (L/mg) is the equilibrium adsorption constant which are related to the heat of adsorption, and $q_m$(mg/g) is the maximum adsorption capacity for complete monolayer coverage. The values of $C_e/q_e$ versus Ce determine $q_m$ and $k_L$ from the intercept and the slope, respectively. The dimensionless equilibrium parameter $R_L$ is expressed for essential characteristics of Langmuir isotherm model, which is given by the following equation:

$$R_L = \frac{1}{1 + k_L C_0} \tag{6.3}$$

The value of $R_L$ indicates that the type of the isotherm to be either unfavorable ($R_L > 1$), linear ($R_L = 1$), favorable ($0 < R_L < 1$) or irreversible ($R_L = 0$).

TABLE 6A

The effect of different initial concentrations of methylene blue onto FRrGAMZ at room temperature.

| $C_o$ (mg/L) | $q_{e,\,exp}$ (mg $g^{-1}$) | $q_e$ (mg $g^{-1}$) | $k_1$ (g $mg^{-1}$ $min^{-1}$) | $R^2$ |
|---|---|---|---|---|
| 20 | 191.64 | 192.8 | $2.522 \times 10^{-5}$ | 0.9997 |
| 40 | 381 | 384.61 | $2.766 \times 10^{-5}$ | 0.9995 |
| 100 | 631.52 | 632.5 | $3.232 \times 10^{-5}$ | 0.9998 |

Figure 33:
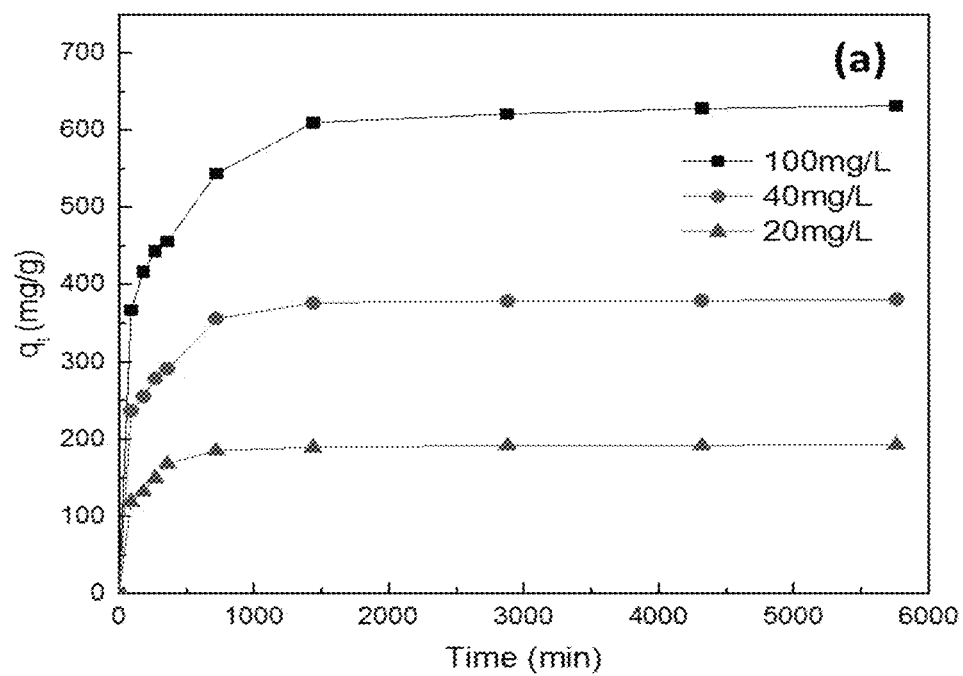
FIG. 33 shows the effect of different concentration on adsorption capacity of methylene blue onto FRrGAMZ.

The effect of different concentration on adsorption capacity of methylene blue onto FRrGAMZ is shown in FIG. 33. The adsorption capacity of methylene blue onto FRrGAMZ increased with the increase of contact time and initial concentration. The higher initial concentration of methylene blue can provide a higher driving force to enhance the sorption of dyes due to the mass transfer resistances between the aqueous solution and solid phases.

Figure 34:
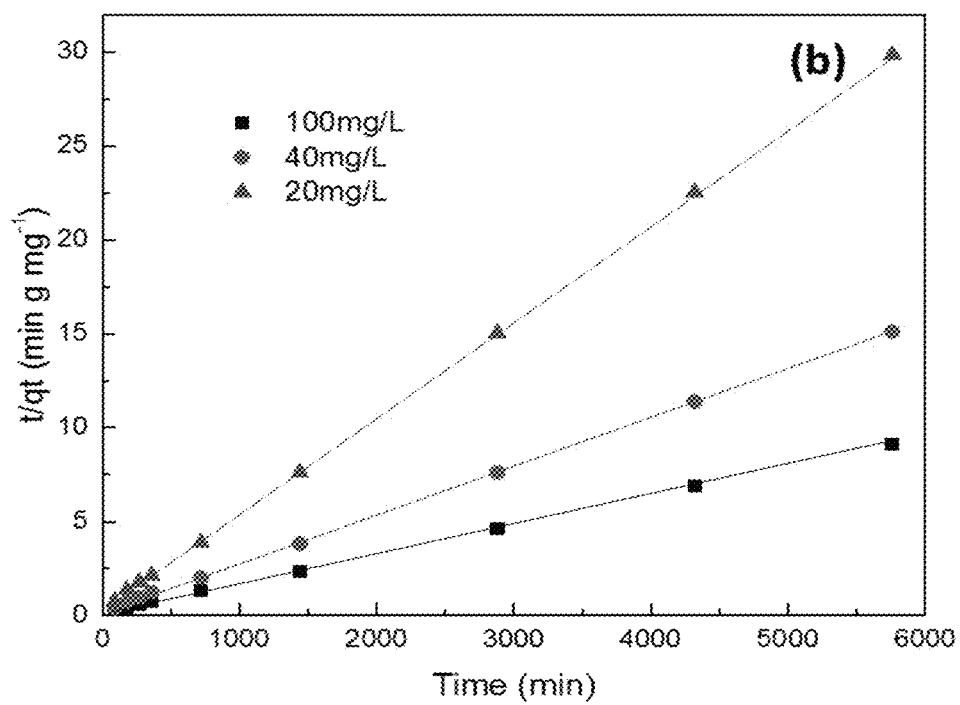
FIG. 34 shows pseudo-second order kinetics of adsorption methylene blue onto FRrGAMZ. The concentrations of methylene blue are 20 mg L$^{-1}$, 40 mg L$^{-1}$ and 100 mg L$^{-1}$, respectively. The experiment conditions are at room temperature, at pH=6~7.

The pseudo-second-order kinetics model expressed by equation (6.1) was adopted to examine the mechanism of the adsorption process. The kinetic constants $k_1$ and correlation coefficients $R^2$ for the model were calculated and listed in Table 6A, where calculated from the slope and intercept of the linear plots of $t/q_t$ versus t in FIG. 34. It was observed that all of the correlation coefficients of pseudo-secondorder kinetics model are higher than 0.9995, and the values of calculated $q_{e,cal}$ agree very well with the experimental results $q_{e,exp}$.

TABLE 6B

Parameters and the correlation coefficients of Langmuir isothermal models for the adsorption of methylene blue onto FRrGAMZ at room temperature.

| $C_o$ | $C_e$ | $q_e$ | $q_m$ | $k_L$ | $R_L$ | $R^2$ |
|---|---|---|---|---|---|---|
| 20 | 0.72 | 192.8 | 724.4 | 0.3733 | 0.19 | 0.9992 |
| 40 | 1.54 | 384.61 | | | 0.06 | |
| 100 | 36.75 | 632.5 | | | 0.03 | |
| 120 | 53.23 | 667.7 | | | 0.02 | |
| 150 | 77.74 | 722.6 | | | 0.02 | |

Meanwhile, the adsorption data were analyzed using Langmuir isothermal models given by the equation (6.2). The values of Langmuir constants and correlation coefficients $R^2$ obtained from the linear regression were listed in Table 6B. The experimental data were well fitted with the Langmuir isotherm model, and all the values of $R_L$ were less than 1, which means that Langmuir model was favorable in this study.

The organic molecules adsorption on to the graphene-based materials has been noted by many authors. The adsorption mechanism can be explained by the electrostatic interactions, H-bonding and π-π stacking on the rGO sheets. It was proved that the essential interaction between the positive charged methylene blue and rGO sheets is electrostatic interactions, while the other two mechanisms act simultaneously in the adsorption process.

The presence of π-π stacking on the rGO sheets allows the interaction between bulk n systems on the rGO surface and organic molecules with C=C bonds or aromatic rings. Generally, π-π interactions depend on the size and shape of the aromatic system and the substitution unit of molecules. The planar molecules are easy to approach multiwalled carbon nanotubes via a face-to face conformation, which is favorite for π-π interactions between the conjugated aromatic chromophore skeleton and the rGO sheets. On the contrary, the non-planar molecules are kept apart from rGO sheets due to the spatial restriction, resulting low π-π interactions with the rGO sheets. The chemical structures of methylene blue and sodium fluorescein are polar molecules and disperse blue 26 is non-polar molecules. Therefore, this fact suggests that the π-π stacking interactions between the rGO, methylene blue and sodium fluorescein is stronger than rGO and disperse blue 26.

H-bonding, noncovalent forces, can occur between the surface of rGO sheets and organic molecules. The remaining —OH and —COOH on the rGO sheets act as the hydrogen electron donor, and the oxygen atoms and aromatic rings of the organic compounds act as the elector accepter. The higher number of —OH and —COOH groups remained on the GO sheets, the more active sites for organic molecules adsorption. From the XPS in Example 5, it was found that the C—O—C are hardly left on the rGO sheets, which means that the C—O—C group doesn't contribute to the H-bonding of organic molecules. Several studies reported that increased oxygen-containing functional groups on activated carbon decreased the adsorption of chemicals which can form H-bonds. The adsorption mechanism on reduced graphene oxides of benzene does not occur via the formation of H-bonding, while the hydrogen bond between reduced graphene oxide and aniline or naphthylamine was weaker, resulting in a lower adsorption capacity. Hydrogen bonding mechanisms in the adsorption of nitroaromatic compounds onto graphene materials have been ruled out. Electrostatic interaction between norfloxacin and the adsorbents was one of the major factors controlling the adsorption process. From the adsorption mechanism study and column experiment, it indicates that hydrogen bonding possibly cannot make as significant contribution to overall adsorption process of organic model compounds onto rGO sheets.

Figure 35A:
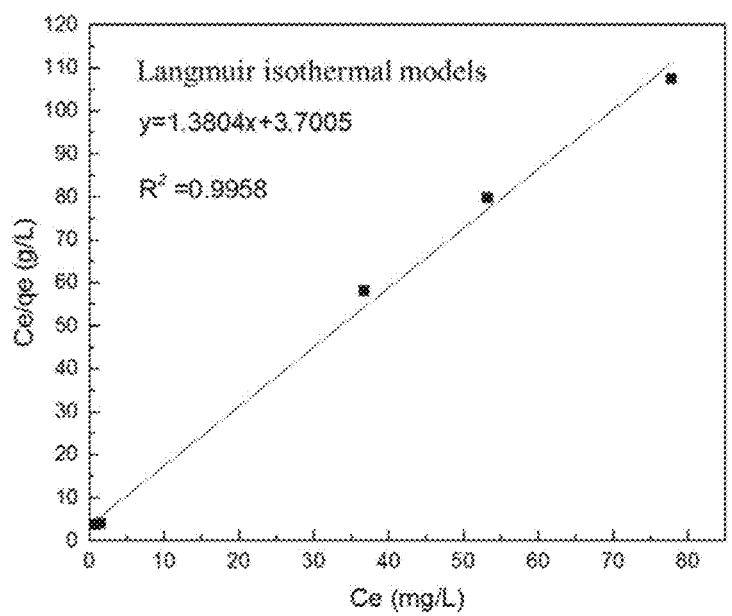
FIG. 35A shows Langmuir and adsorption isotherm of methylene blue onto FRrGAMZ at room temperature.
Figure 35B:
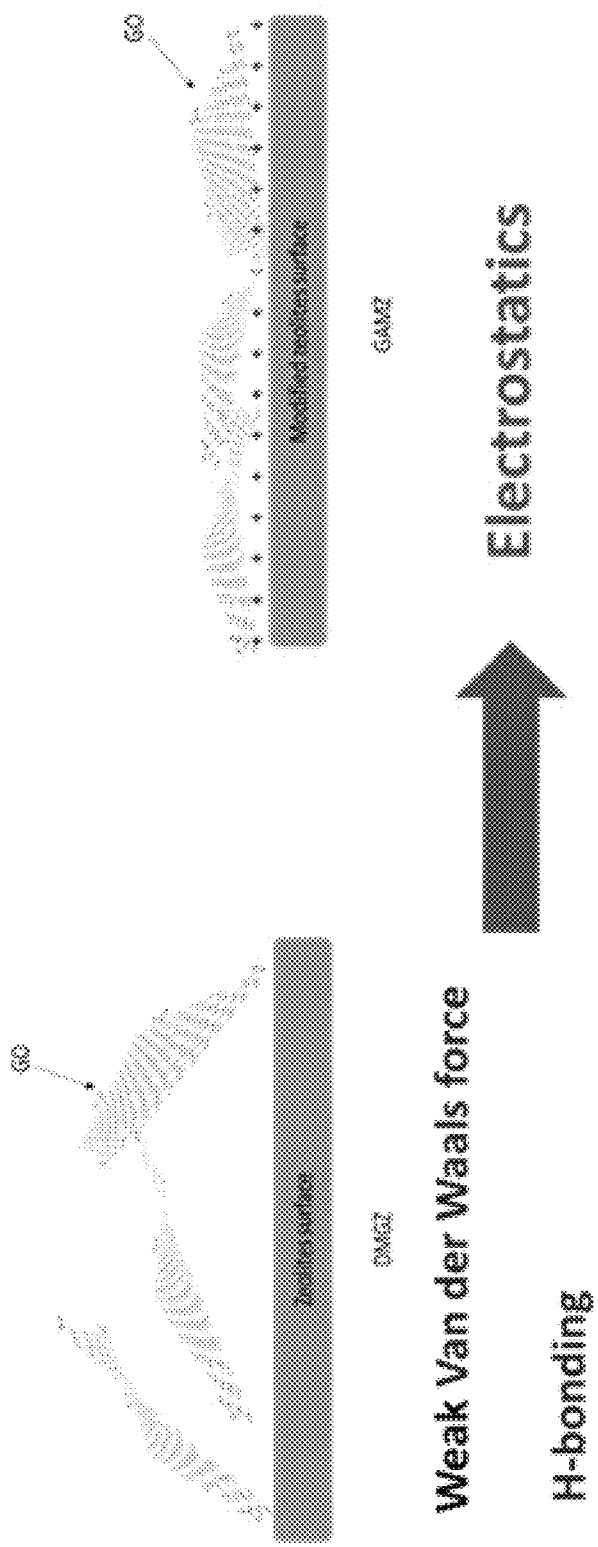
FIG. 35B shows proposed interactions between zeolites surface and GO sheets before and after surface modification by APTES.

An explanation of the zeolites surface modification by APTES and the interaction with GO sheets can be seen in FIG. 35B. The first step in this process is the physisorption of APTES to the zeolites surface through H-bonding and H-bond acceptor on the zeolites surface ($SiO_2$ and $Al_2O_3$). Then the positive amine group was introduced by the APTES modification, the charge of zeolites surface was changed from positive to negative. (Proved by zeta potential and XPS) The —OH and —COOH groups on the GO sheets with negative charges can easily react with amine groups to form the GO-NH through the electrostatic attraction which is much stronger than the Van der Waals force and H-bonding. The π-π stacking on the GO sheets also contributed to interactions. Herein, the higher loading of GO sheets was achieved through the enhancement of interactions between zeolites surface and GO sheets.

Conclusion. In this Example, the adsorption mechanism of FRrGAMZ for organic model compound, methylene blue, was studied. It indicated that pseudo-second-order kinetics model and Langmuir isothermal model were fitted to the experiment results. Besides that, the hypothesis of adsorption mechanism was given, which suggested that the electrostatic interactions and π-π stacking between the rGO sheets and organic model compounds are the main adsorption mechanisms.

Example 7

Materials and Methods and Experimental Design

Materials. Escott zeolite (0.7-1.0 mm) was purchased from Zeolite Australia PTY (57.0 wt/o clinoptilolite). Cystamine dihydrochloride (96%)(Sigma-Aldrich), Thioacetamide (Sigma Aldrich), Zinc Acetate Dihydrate (Acros Chemicals) were used without further modifications. NaCl, KCl, $MgCl_2$, and $CaCl_2$(Sigma Aldrich) were used to prepare salt solutions. Lead Nitrate (99%) was purchased from Fisher Chemicals and was used to prepare initial solutions. Deionized water (DI-water) and ultra-high purity water were prepared in the laboratory. $HNO_3$ and NaOH solution were used to adjust the solution pH. pH was measured by using OAKTON pH 700 benchtop meter equipped with a single junction pH electrode.

Cystamine Dihydrochloride Zeolite. A 0.05 M solution was prepared by adding 2.25 g (10 mmol) of cystamine dihydrochloride crystals to 200 mL DI water. 10 g of sodium-treated zeolite (see below) was added to the solution and refluxed at 85° C. for 48 hours. Treated zeolite was washed with DI water and dried at 100° C. for 12 hours.

Zinc Sulfide Zeolite. A stoichiometric ratio of clean zeolite (CZ), zinc acetate dihydrate and thioacetamide was sonicated in an aqueous medium for 3 hr. Ultrasonic irradiation was accomplished with a high intensity ultrasonic probe (QSONICA 1375, 2.54 cm Ti horn, 20 kHz, 67 W/cm²). A Pyrex beaker (total volume of 4 L) was used, which was kept in a water bath to control the temperature of the batch. The reactant amounts and experimental parameters for the sonochemical preparation of ZnS functionalized zeolite (ZnS—Z) are summarized in Table 7A.

TABLE 7A

Reactant amounts and experimental parameters for sonochemical preparation of ZnS—Z

| Reactants | CZ | Zinc acetate dihydrate | thioacetamide | DI-water | Sonication time, h | Batch temperature |
|---|---|---|---|---|---|---|
| | | Amount, g | | | | |
| ZnS—Z | 4.50 | 21.53 | 7.51 | 3000 | 3 | <80° C. |

Characterization of Materials. The specific surface area, pore volume, and average pore radius of zeolite were measured by Brunauer-Emmett-Teller analysis (BET), Quantachrome Instruments. The FTIR spectrum of each sample was obtained at room temperature by using the Shimadzu FTIR Tracer-100 and LabSolution IR software. Infrared spectra were recorded in the range of 4000 to 400 $cm^{-1}$. Thermogravimetric analysis (TGA) was performed using TA Instruments (Shimadzu DTG-60AH) from 25° C. to 850° C. under nitrogen atmosphere. Scanning electron microscopy (SEM) and energy dispersive spectroscopy (EDS) were performed with a Hitachi S-4800 equipped with a Bruker EDS detector, generating images and providing chemical composition of the samples. Electron microscopy was performed under 15.0 kV accelerating voltage with an extraction current of 15 ρA. Liquid chromatography mass spectroscopy (LC-MS) was used to identify the lead complex when reacting with cystamine dihydrochloride (Shimadzu LCMS-2020). Lead concentration in the solution was analyzed by using the Inductively coupled plasma mass spectrometry (ICP-MS), Thermo Element 2 High Resolution with a lead detection limit of 0.1 ppb. All samples were diluted and acidified by putting 0.2% nitric acid before ICP-MS analysis. Surface potential of the adsorbent was measured by Malvern Zetasizer nano series. Particles hardness was measured by TQC Hardness Pen.

Adsorption Experiments. In order to investigate the effect of the solutions' pH on adsorption behavior, adsorption experiments were performed in initial lead concentrations of 560 ppb. The pH value of 560 ppb solutions were adjusted to 47, and 10 by using $HNO_3$ and NaOH. In a batch experiment, 0.50 g of adsorbent was added to 100 mL of the solution and placed on a shaking table at 200 rpm for 4 hours. Samples were collected over time, and the residual concentration of lead was determined by ICP-MS.

Lead Sorption Kinetics. Adsorption experiments were performed in six different initial compositions: 10, 25, 50, 100, 250, and 500 ppm. The pH level in the initial solutions was adjusted to 5. Isotherm experiments were conducted by adding 0.20 g of adsorbent to 200 mL of the initial solutions while on the shaking table at 200 rpm. Samples were collected after 24 hours and the residual concentration of lead was determined by ICP-MS.

Column Test and Particles Regeneration. Column test was employed to saturate the adsorbent particles with Pb. A column with a height of 200 mm and an internal diameter of 10 mm was used in this test. The column was packed with 4.00 g of ZnS—Z to make a height of 50 mm. The column was then operated in such a manner that 1,000 mL of 100 ppm lead solution was constantly added to it by using a peristaltic pump (Cole-Parmer variable speed) and allowing it to flow along gravity in downflow mode with a constant flow rate of 0.08 mL/s.

Example 8

Functionalizing Zeolite with Cystamine

Zeolite physical properties. BET analysis was conducted to investigate the porosity properties of zeolite. The specific surface area, pore volume, and average pore radius of zeolite were measured. Results are summarized in Table 8A. Pore size distribution showed that the material is 86% mesoporous and 14% macroporous.

TABLE 8A

Porosity parameters of zeolite.

| Surface area, $m^2/g$ | Pore volume, $cm^3/g$ | Average pore radius, Å |
|---|---|---|
| 15.14 | 0.03 | 10.24 |

The hardness of zeolite was measured to evaluate its strength while going over different steps relevant to transportation and handling of material. By using TQC hardness tester, the hardness of zeolite was evaluated as 30 N. This hardness is in a range of 6-7 Mohs hardness. Materials hardness and strength are directly related; with higher hardness, the materials more resistant against deformation.

Zeolite Functionalization with Cystamine Functional Groups. Since the functionalization process of zeolite with cystamine dihydrochloride occurs via an ion exchange process, the most favorable exchangeable cation in zeolite structure needed to be found. $Na^+$, $K^+$, $Mg^{2+}$, and $Ca^{2+}$ are the four exchangeable cations present in zeolite structure. To determine the most exchangeable cation in the zeolite structure, zeolite was first treated with NaCl, KCl, $MgCl_2$, and $CaCl_2$) salts separately. To do this, a 2 M solution of sodium salt (NaCl) was prepared by adding 23.36 g of NaCl to 200 mL DI water. 10 g of CZ was added to the solution and refluxed at 85° C. for 48 hours. Treated zeolite was washed with DI water and dried at 100° C. for 12 hours. The process was repeated by using potassium salt (KC), magnesium salt ($MgCl_2$), and calcium salt ($CaCl_2$).

Na, K, Mg, and Ca amounts were evaluated in zeolite by EDS before and after the treatment. Results are shown in Table 8B.

TABLE 8B

EDS analysis for CZ and salt treated zeolites.

| | Na/Si, wt %/wt % | K/Si | Mg/Si | Ca/Si |
|---|---|---|---|---|
| CZ | 0.0135 ± 0.0034 | 0.0303 ± 0.0018 | 0.0145 ± 0.0062 | 0.1000 ± 0.0027 |
| Na-Z | 0.0916 ± 0.0028 | 0.0810 ± 0.0083 | 0.0018 ± 0.0006 | 0.0247 ± 0.0004 |
| K-Z | 0.0004 ± 0.0002 | 0.2046 ± 0.0462 | 0.0003 ± 0.0003 | 0.0139 ± 0.0004 |
| Mg-Z | 0.0083 ± 0.0054 | 0.0680 ± 0.0277 | 0.0302 ± 0.0077 | 0.0626 ± 0.0097 |
| Ca-Z | 0.0008 ± 0.0002 | 0.0260 ± 0.0022 | 0.0138 ± 0/0005 | 0.1293 ± 0.0025 |

As can be seen in Table 8B, sodium's content showed the most increase in zeolite structure after being treated by NaCl salt. It was concluded that Na is the most favorable exchangeable cation in zeolite structure and from that point, NaCl was selected as the pre-treatment agent for the functionalization process. The main goal of the pre-treatment step is to saturate the zeolite structure with its most favorable exchangeable cation, so that more contents of the cystamine functional group can be introduced to the zeolite structure.

Sulfur (as a soft donor atom) which is usually formed in holodirected Pb (II) complexes, is also able to enforce a hemidirected structure. Both hemidirected and holodirected environment are found for coordination numbers 6-8.

Sulfur (as a soft donor atom) can form complexes with lead with coordination numbers of 6-8. Considering the theoretical coordination number 6-8 the Pb:cystamine ratio falls in the range of 1:3 to 1:4. Because there are two sulfur atoms in cystamine dihydrochloride chemical formula. Table 8C shows the required number of mol of cystamine to adsorb one mole lead depending on the theoretical Pb:cystamine dihydrochloride ratio. It should be mentioned that after dissolving in water, cystamine dihydrochloride ($C_{14}H_{12}N_2S_2 \cdot 2HCl$) transforms to cystamine ($C_{14}H_{12}N_2S_2$).

TABLE 8C

Required number of sulfur atoms in lead adsorption.

| Pb:cystamine ratio | mol of Pb | mol of required cystamine |
|---|---|---|
| 1:3 | 1 | 3 |
| 1:4 | 1 | 4 |

In order to validate the theoretical assumption and identify the actual Pb:cystamine ratio, a batch experiment was designed as follows: 200 mL of a 10 ppm lead solution was prepared and the pH level was adjusted to pH=5. Next, 5 mL of a 0.008 M cystamine dihydrochloride solution was added to the batch (equal to 0.04 mmol cystamine dihydrochloride) as the adsorbent material. The batch was run for 24 hours at 200 rpm at room temperature. Residual lead concentration was measured in the solution by using ICP-MS. The residual concentration was measured as 0.196 ppm. Calculating the amount of lead which was adsorbed by cystamine revealed that the Pb:cystamine ratio equals 1:4. At this time LCMS was employed to identify: the cystamine dihydrochloride from when dissolved in water and (2) the lead-cystamine complex. In the cystamine dihydrochloride solution a component with a mass of 153.05 (m/z) was observed which is attributed to cystamine. In the lead-cystamine dihydrochloride solution, a component with a mass of 657.87 (m/z) (3*153.05+1*207.20) was found which shows a Pb: cystamine ratio of 1:3. Based on these experiments and results, adsorption capacity is expected to be improved by an amount of 1 mmol lead for every 3 mmol of cystamine dihydrochloride (or cystamine) that is loaded on the zeolite.

To functionalize the pre-treated zeolite with cystamine functional groups, a 0.05 M solution of cystamine dihydrochloride was prepared by adding 2.25 g (10 mmol) of cystamine dihydrochloride crystals to 200 mL DI water. 10 g of sodium treated zeolite (NaCl—Z) was added to the solution, and the mix was refluxed at 85° C. for 48 hours. Treated zeolite (hereinafter $CDHZ^1$) was washed with DI water and dried at 100° C. for 12 hours. To verify if the pre-treatment process was required to introduce cystamine functional groups to the zeolite, the functionalization process was also repeated on the clean zeolite (CZ) (hereinafter CDHZ*).

To assure that the functionalization goals were accomplished, the chemical composition of the functionalized zeolite was analyzed by using EDS. Results are listed in Table 8D.

TABLE 8D

EDS analysis for zeolite and cystamine functionalized zeolites.

| | Na/Si | K/Si | Mg/Si | Ca/Si | S/Si |
|---|---|---|---|---|---|
| CZ | 0.0135 ± 0.0034 | 0.0303 ± 0.0186 | 0.0145 ± 0.0062 | 0.1000 ± 0.0027 | 0.0078 ± 0.0011 |
| CDHZ* | 0.0132 ± 0.0098 | 0.0477 ± 0.0193 | 0.0145 ± 0.0039 | 0.0860 ± 0.0136 | 0.0230 ± 0.0096 |
| $CDHZ^1$ | 0.0694 ± 0.0115 | 0.0298 ± 0.0140 | 0.0100 ± 0.0093 | 0.0231 ± 0.0024 | 0.0572 ± 0.0041 |

Figure 36A:
FIG. 36A shows an SEM image for CZ.
Figure 36B:
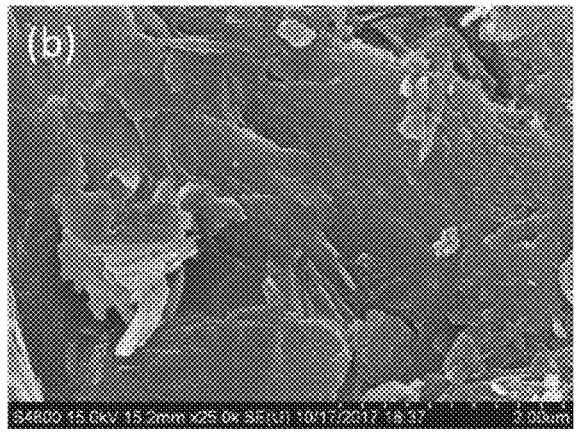
FIG. 36B shows an SEM image for CDHZ$^1$: no significant change in structure is seen after functionalization process.
Figure 37A:
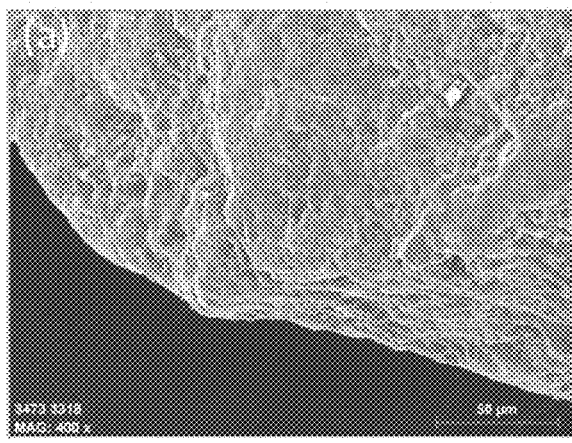
FIG. 37A and FIG. 37B show sulfur distribution on CDHZ$^1$.
Figure 37B:
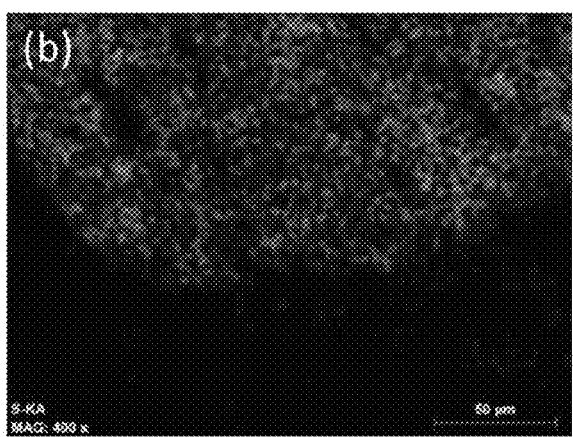

As can be seen in Table 8D, the sulfur amount (sulfur was considered as an element to identify cystamine functional group) in $CDHZ^1$ is greater than that of CDHZ*. This confirmed that pre-treating zeolite with NaCl successfully allowed introduction of more cystamine functional groups to zeolite structure. Greater amounts of $Na^+$, as the most favorable exchangeable cation in the zeolite structure, can address this observation. Another point that should be mentioned here is the Na content in NaCl—Z and $CDHZ^1$. The Na/Si value was decreased from 0.0916 in NaCl—Z to 0.0694 in $CDHZ^1$. This verifies that cystamine groups have been introduced to the zeolite structure via an ion exchange with Na⁺ ions. Also, as shown in FIGS. 36A and 36B, the functionalization does not lead to any observable surface changes as the functionalization is only a surface treatment technology. FIGS. 37A and 37B show the sulfur distribution in functionalized zeolites structure.

To quantify the amount of cystamine functional groups that are introduced to zeolite, the concentration of sulfur in the cystamine dihydrochloride solution was measured before and after the functionalization process by using ICP-MS. Calculations based on the measured concentrations revealed that 57.21% of the cystamine groups have been successfully introduced to zeolite during the fabrication process. By considering the actual amount of loaded cystamine on zeolite, the adsorption capacity of the treated zeolite is expected to be improved as shown in Table 8E.

TABLE 8E

Expected improvement in the zeolite's adsorption capacity.

| mmol Cystamine | mmol Pb | mg Pb |
|---|---|---|
| 3 | 1 | 207.20 |
| 0.57 | 0.19 | 39.37 |

FTIR spectroscopy was used for cystamine functional group analysis of the $CDHZ^1$. FTIR spectra were recorded in the range of 4000 to 400 cm⁻¹.

Figure 38:
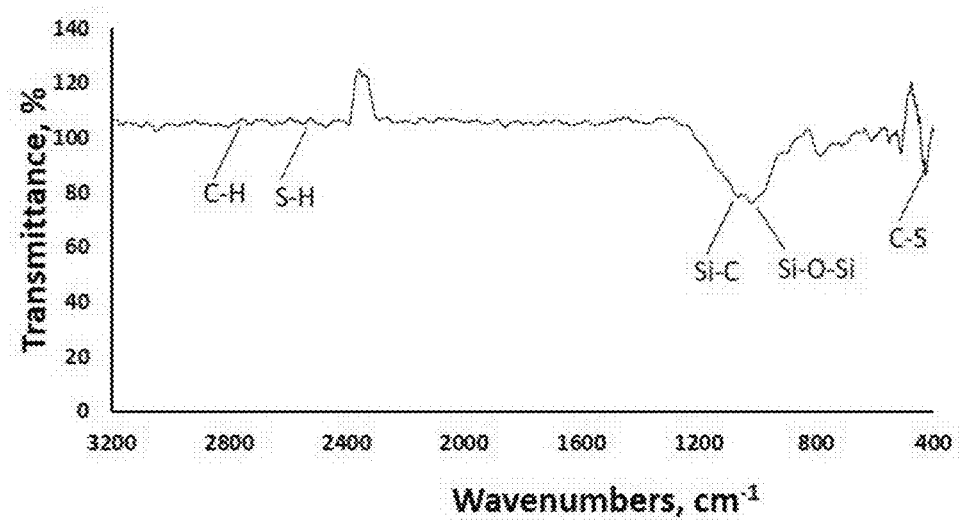
FIG. 38 shows FTIR spectra of CDHZ$^1$.

The FTIR spectra of $CDHZ^1$ is shown in FIG. 38. The presence of cystamine ions is confirmed by the observation of bands assigned to C—H vibrations at 2850-2930 cm⁻¹, and of stretching bands attributed to the S—H and C—S vibrations at 2555 and 686 cm⁻¹, respectively. Si—C and Si—O—Si bands were also observed at 1100 and 1024 cm⁻¹, respectively.

Figure 39:
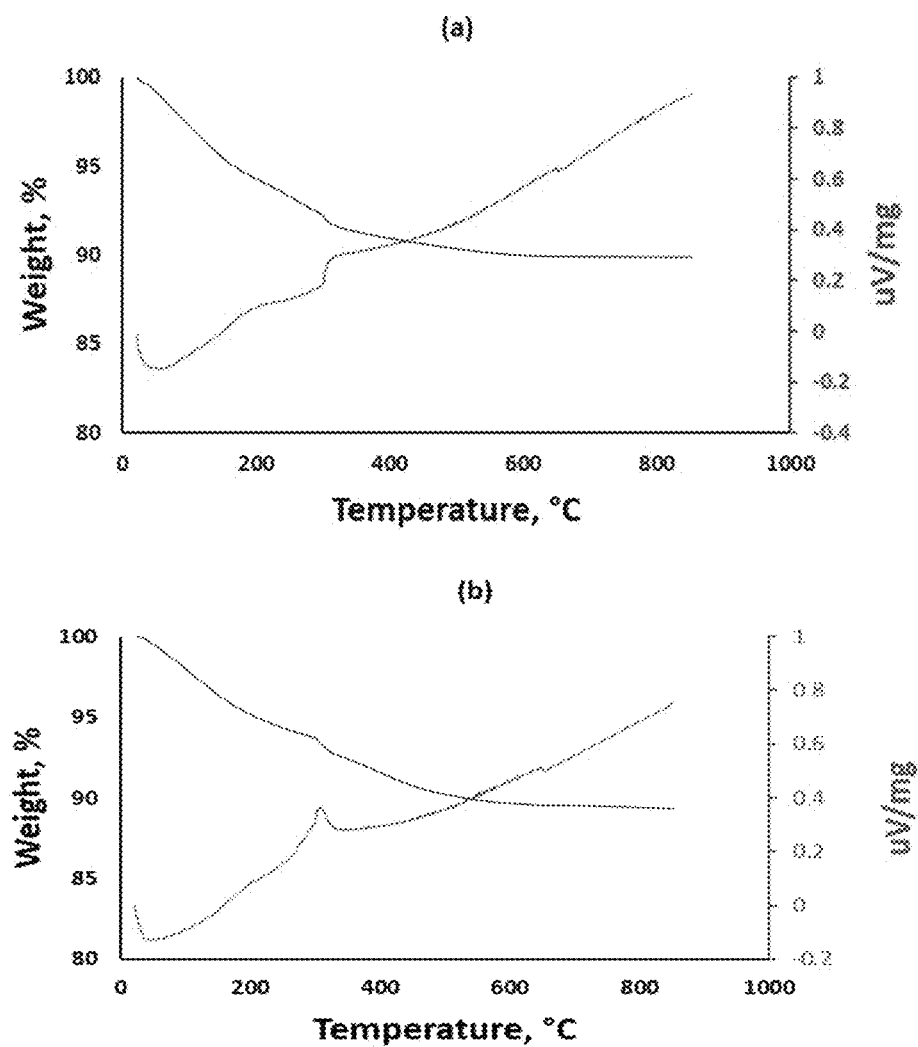
FIG. 39 shows a TGA plot of: (a) CZ and (b) CDHZ$^1$

The thermogravimetric analysis, FIG. 39, shows a water loss of (CZ=3.31%, $CDHZ^1$=2.83%) in the 60-150° C. This water loss is due to the weakly bonded water. The TGA thermograms show another weight loss of (CZ=2.18%, CDHZ=2.05%) in the temperature 150-250° C., due to the water located in zeolite cavities, and bound to the non-framework cations. There is a third water of (CZ=0.27%, CDHZ=0.52%) in 450-500° C. corresponding to structural water. CZ and $CDHZ^1$ showed 3.1/% and 5.76% weight loss respectively in 200-800° C., so the difference is attributed to the decomposition of cystamine functional groups on $CDHZ^1$.

Equilibrium Adsorption Experiments for Lead. Table 8F shows the list of experimental factors, and the range of each factor.

TABLE 8F

Experimental factors.

| | Factors | | Range |
|---|---|---|---|
| Zeolite | Particle size | Fixed | 0.7-1.0 mm |
| | Structure/type | Fixed | Clinoptilolite |
| | dosage | Fixed | 0.20 g-0.50 g |
| Functional groups | Functional groups/ zeolite ratio | Variable | 1 mmol/g 2 mmol/g |
| Performance | Initial concentration | Variable | 0.5-500 ppm |
| | Solution pH | Variable | 4-10 |
| | Temperature | Fixed | RT |
| | Contact time | Variable | 0.1-24 h |

Adsorption experiments were performed in ppb scale to investigate the initial solution pH on adsorption behavior of $CDHZ^1$. The pH values of 560 ppb solutions were adjusted to 4, 7, and 10 (by using $HNO_3$ and NaOH solutions) to study the effect of initial solution pH on adsorbents' removal efficiency. To do this, 0.50 g of $CDHZ^1$ was added to 100 mL of the solution while on the shaking table at 200 rpm for 4 hours. Solutions at different pHs with $CDHZ^1$ were sampled at minutes 3, 10, 30, 90, 180, and 240. The residual concentration of lead was determined by ICP-MS.

The general reaction scheme for hydroxide formation of divalent metal cations, $M^{2+}$, is described in Equation (9):

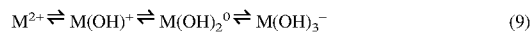

$$M^{2+} \rightleftharpoons M(OH)^+ \rightleftharpoons M(OH)_2^0 \rightleftharpoons M(OH)_3^- \quad (9)$$

Figure 40:
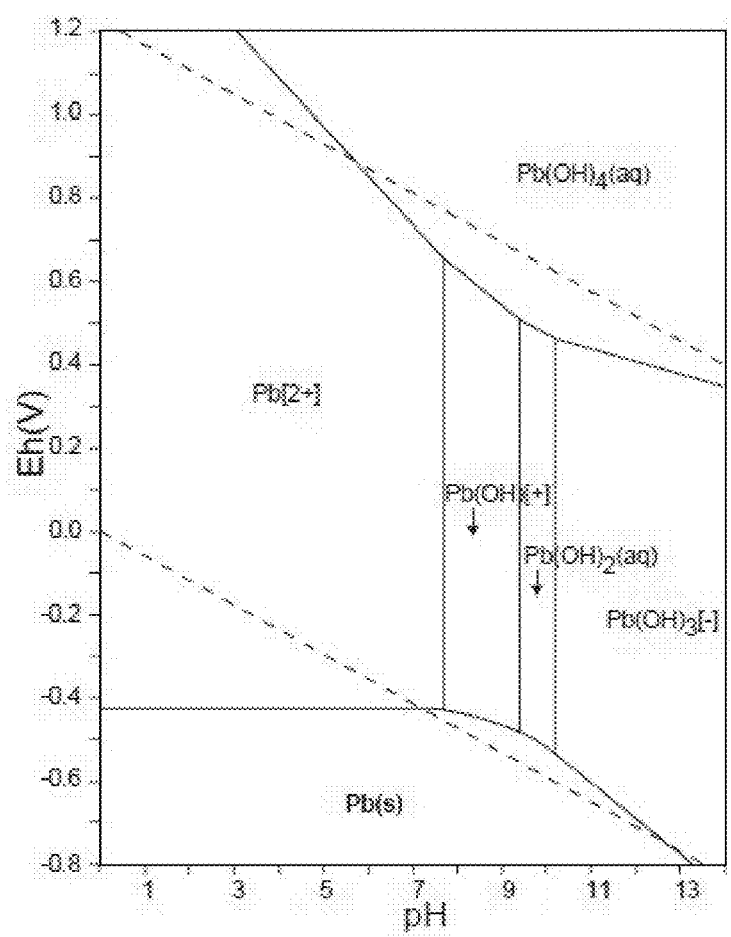
FIG. 40 shows a Pourbaix diagram for Pb.

As shown in FIG. 40, $Pb^{2+}$ is the predominant specie in the solution at pH<8; at pH≥8 $Pb(OH)^+$ cations begin to form and are the dominant species in this range. Lead starts to precipitate as $Pb(OH)_2$ at pH≥9.5.

The effect of solution pH on the adsorption reaction can be interpreted in terms of (a) electrostatic interactions between charged adsorbent particles and the heavy metals ions and (b) Pb species at tested pH ranges.

Figure 41:
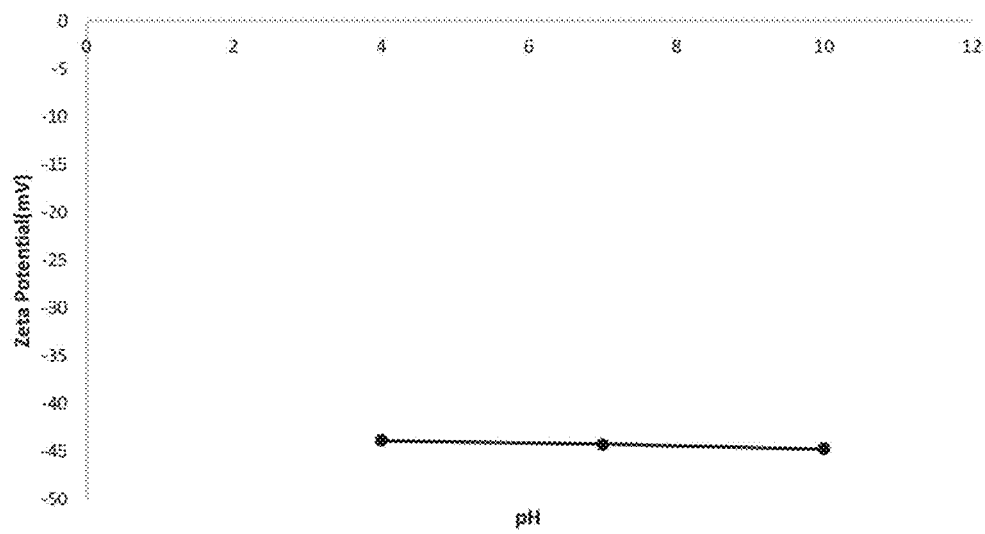
FIG. 41 shows Zeta potential of CDHZ$^1$ at different pH values.

In order to investigate the electrostatic interactions between the surface of the adsorbent and Pb at different pH ranges, the zeta potential of the adsorbent surface was measured at pH=4, pH=7, and pH=10. As can be seen in FIG. 41, the zeta potential at CDHZ surface is a negative value at all the studied pH ranges and was decreased from −43.80 mV to −44.70 mV by increasing the solution pH from 4 to 10. The negative charge of $CDHZ^1$ surface can be addressed by Si:Al ratio in the zeolite's structure. The negative charge of zeolite is resulted from the isomorphous substitution of Si by Al.

Under all investigated conditions (pH=3, 7, 10), the adsorbent is negatively charged which caused $Pb^{2+}$ (at pH=4) and $Pb(OH)^+$ (at pH=7) to electrostatically adsorb onto the adsorbent. This is not valid at pH=10 because $Pb(OH)_2$ is electrically neutral.

Figure 42:
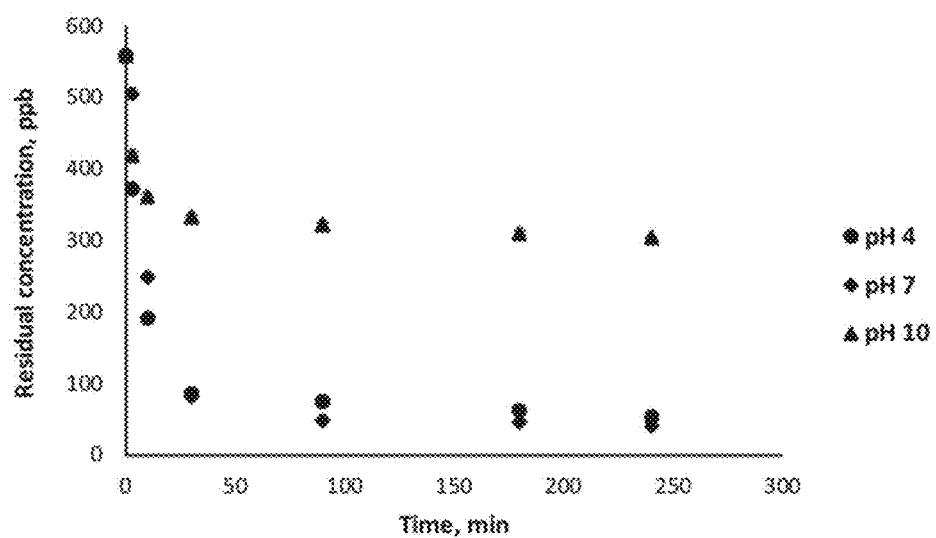
FIG. 42 shows pH effect on residual concentration of lead for CDHZ$^1$.

As seen in FIG. 42 fabricated materials in this research can effectively remove $Pb^{2+}$ from contaminated waters in pH range of 4-7.

Adsorption Isotherms. Increasing solution pH from 7 to 10 resulted in a decrease in the performance of $CDHZ^1$. This can be attributed to the $Pb(OH)_2$ precipitates formed in this pH range, shown in FIG. 41. These precipitates limited the accessibility of the $Pb^{2+}$ ions to the cystamine functional groups in $CDHZ^1$ structure. Although the concentration of cystamine functional groups is a factor affecting the immobilization of $Pb^{2+}$ ions, the accessibility of metal ions to these binding sites is also a controlling factor in the process.

As explained earlier, the adsorption isotherm is used to address the interactive behavior between solutes, and adsorbent materials. The fit of an isotherm with using the Langmuir equation, FIG. 42, assumes that adsorption occurs at specific homogeneous sites within the adsorbent. A linear expression for Langmuir isotherm is:

$$\frac{1}{q_e} = \frac{1}{q_{max}K_LC_e} + \frac{1}{q_{max}} \quad (10)$$

where $q_e$ is the equilibrium concentration of lead on adsorbent (μg/g), $C_e$ is the equilibrium concentration of lead in solution (μg/L), and $q_{max}$ is the adsorption capacity of the adsorbent. $K_L$ is the Langmuir constant that evaluates the affinity between adsorbate and adsorbent. Freundlich isotherm is one of the most common model in explaining the non-ideal and reversible adsorption process. This model is not limited to the formation of a monolayer on the adsorbent surface, which means it can also be applied to multilayer adsorptions as well. With considering multilayer adsorption, the total adsorbed amount is the summation of adsorption on all sites, where stronger binding sites are occupied first until the adsorption energy is decreasing up to the completion of the adsorption process. Freundlich model is based on the relation between the adsorbed quantity ($q_e$) and the remained solute concentration ($C_e$), equation (11):

$$q_e = K_F C_e^{\frac{1}{n}} \quad (11)$$

where $K_F$ is the constant of Freundlich isotherm ($L^{1/n} mg^{(1-1/n)}/g$), and $1/n$ is the Freundlich exponent. Equation (11) can be written in linear form as shown in Equation (12):

$$\log q_e = \frac{1}{n}\log C_e + \log K_F \quad (12)$$

Figure 43:
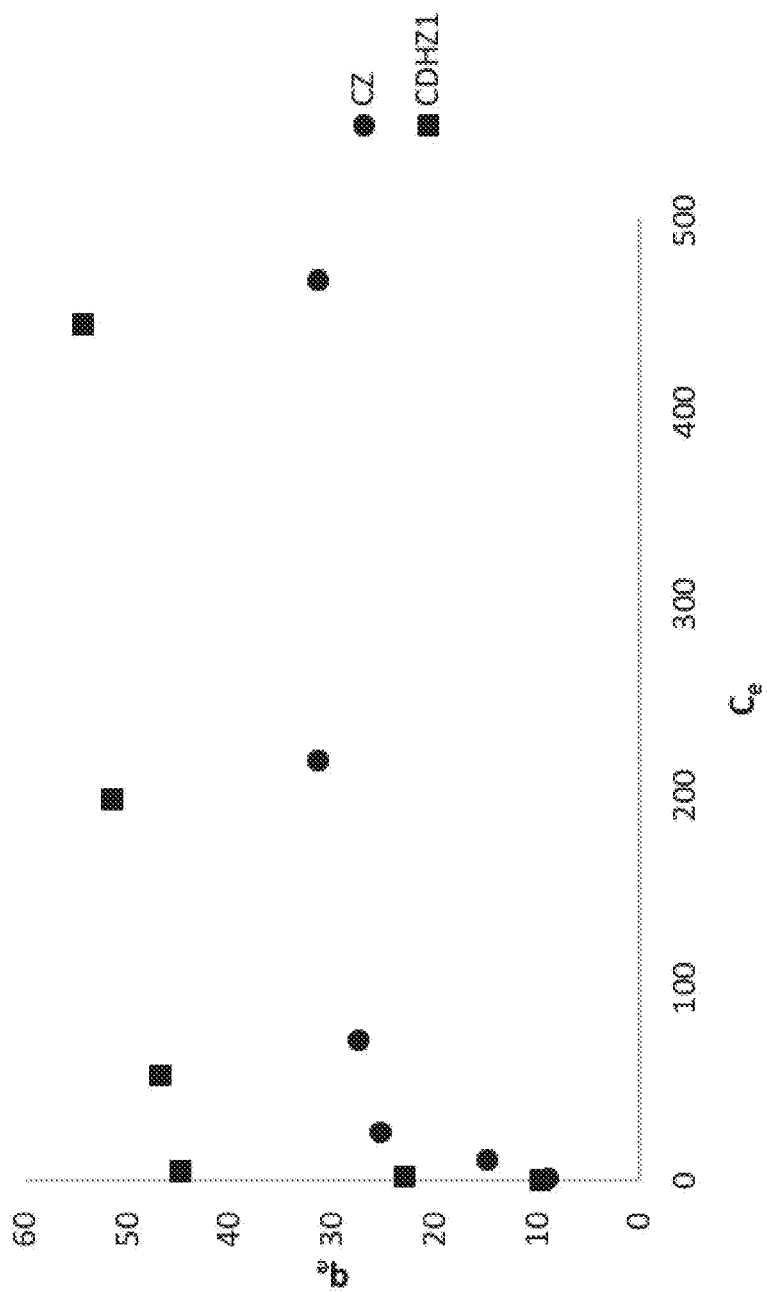
FIG. 43 shows isotherm plots of CZ and CDHZ$^1$.

A lead solution with initial concentrations of 10, 25, 50, 100, 250 and 500 ppm at a pH level of 5 have been employed for the batch tests. Lead removal tests were conducted by using 0.20 g of CZ and CDHZ over 24 hours to evaluate equilibrium residual concentration. FIG. 43 shows the isotherm plot for CZ and CDHZ.

Figure 44:
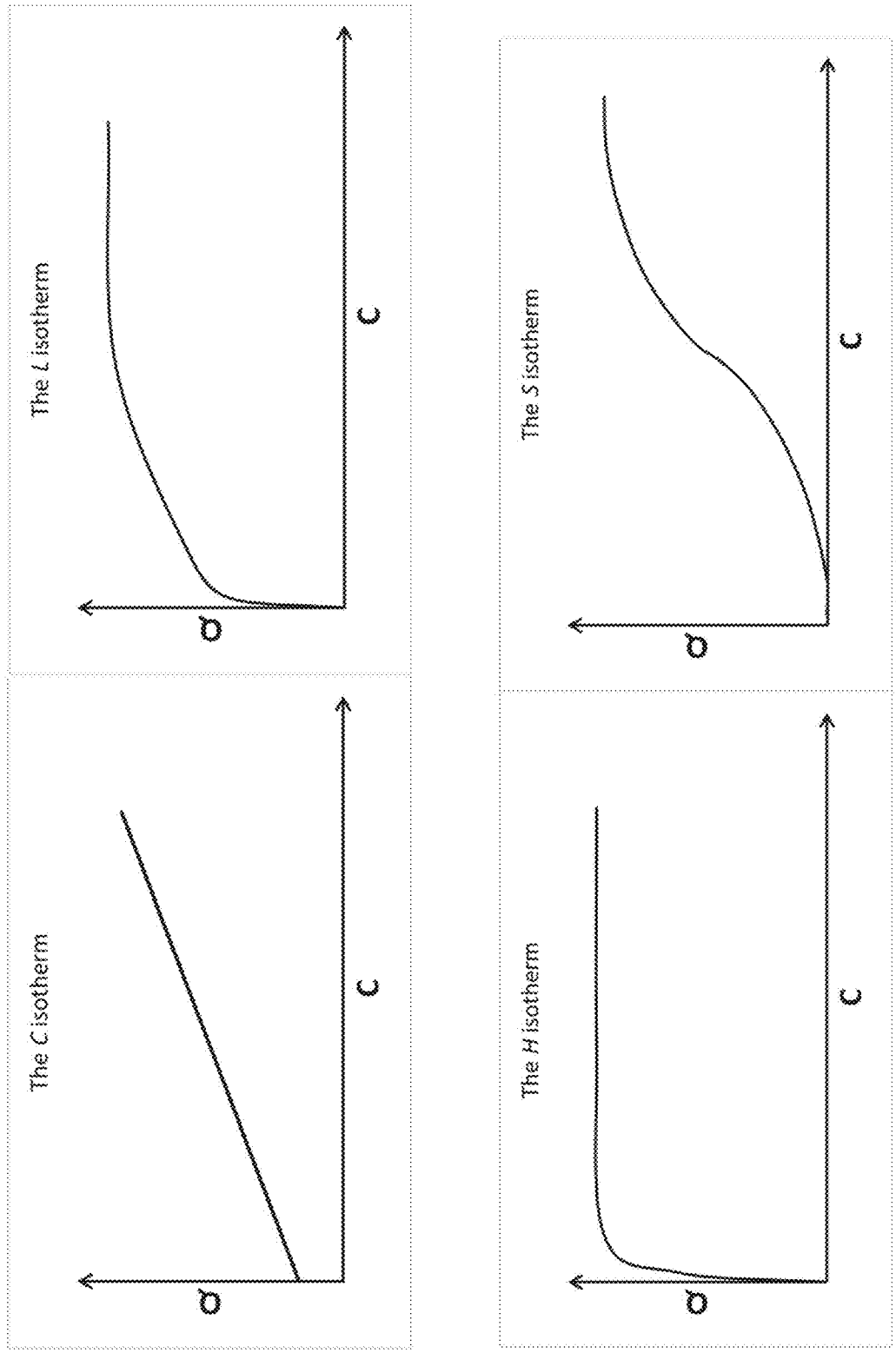
FIG. 44 shows the four main shapes of isotherms.
Figures 45A, 45B:
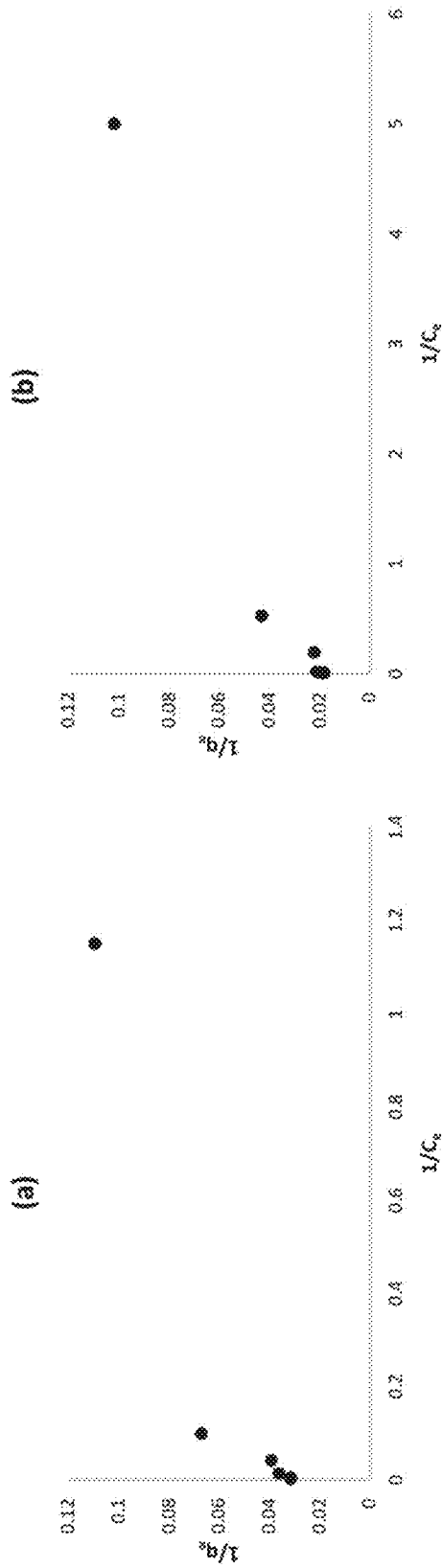
FIG. 45A shows an isotherm model: Langmuir model for CZ.
FIG. 45B shows an isotherm model: Langmuir model for CDHZ$^1$.
Figures 45C, 45D:
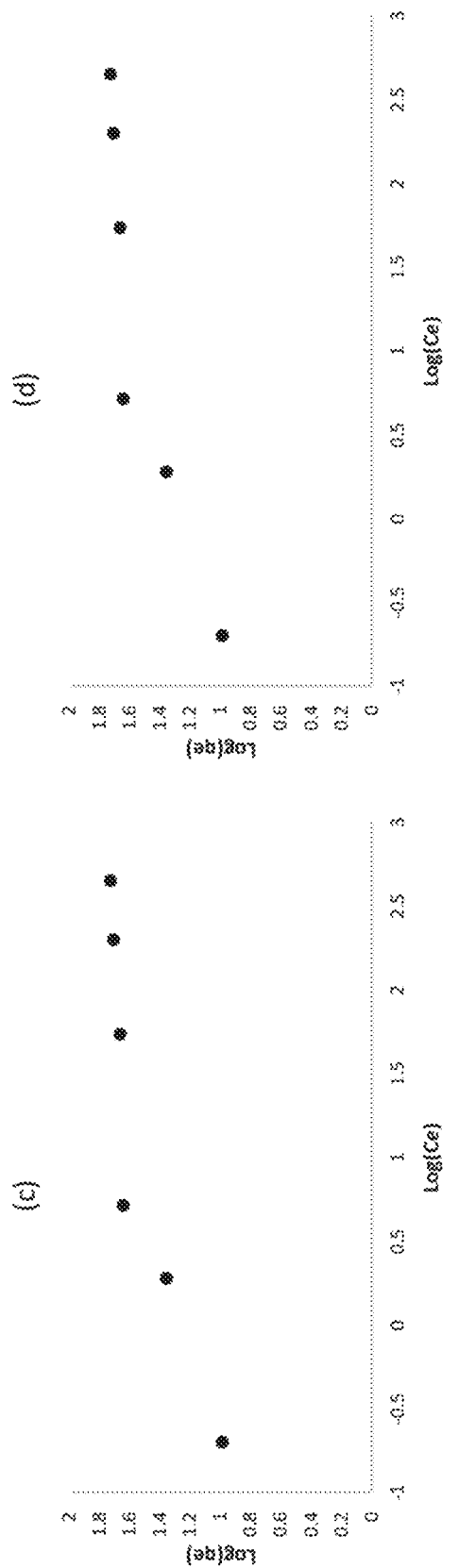
FIG. 45C shows Freundlich model for CZ.
FIG. 45D shows Freundlich model for CDHZ$^1$.

In 1974 Giles, *Journal of colloid and interface science*, 1974. 47(3): p. 755-765. proposed a general model for isotherms' sorption. In their model, they categorized the isotherms in 4 cases which are now used as the 4 main shapes of isotherms. FIG. 44 schematically shows the shape of these 4 isotherms.

By comparing the results shown in FIG. 43 with the four main types of isotherms, shown in FIG. 44, it seemed that CZ and $CDHZ^1$ fit within the H isotherm. H isotherm is considered as a case of the L isotherm, with the only difference that in isotherm H the initial slope is very high. In L and H models, the ratio between the residual concentration of the solute in the solution and adsorbed on the adsorbent decreases when the initial concentration of the solute increases. This suggests a progressive saturation of the adsorbent material.

FIG. 45A-45D show Langmuir and Freundlich models for CZ and $CDHZ^1$.

The adsorption equilibrium between the adsorbate and a surface is a measure of their interactions. The driving force for adsorption results from the specific affinity of the solute for the solid. This kind of attraction can be predominantly one of electrical, van der Waals (physisorption), or of a chemical nature (chemisorption). The isotherm constants and correlation coefficients were calculated for the mentioned isotherm models and listed in Table 8F.

TABLE 8F

Isotherm constants for CZ and $CDAZ^1$.

|  | Parameters | CZ | $CDHZ^1$ |
|---|---|---|---|
| Langmuir | $R^2$ | 0.872 | 0.964 |
|  | $K_L$, L/mg | 0.617 | 1.376 |
|  | $q_{max}$, mg/g | 25.707 | 44.843 |
| Freundlich | $R^2$ | 0.752 | 0.813 |
|  | $K_F$, $L^{1/n} mg^{(1-1/n)}/g$ | 10.179 | 19.218 |
|  | 1/n | 0.209 | 0.204 |

Figure 46:
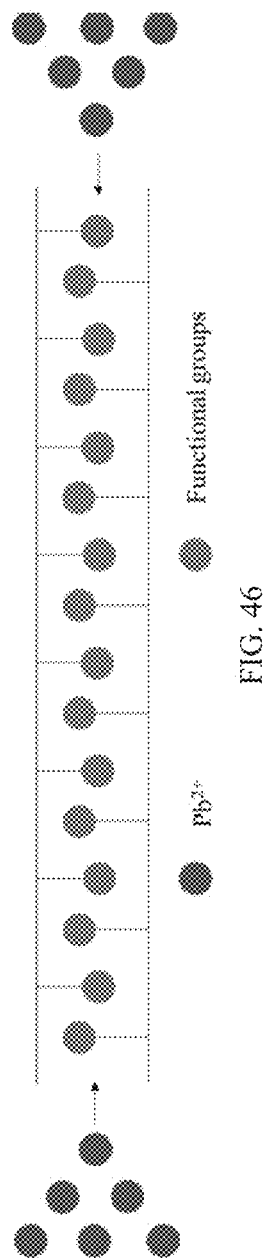
FIG. 46 shows a Pb adsorption schematic on CDHZ$^1$.
Figures 47A, 47B:
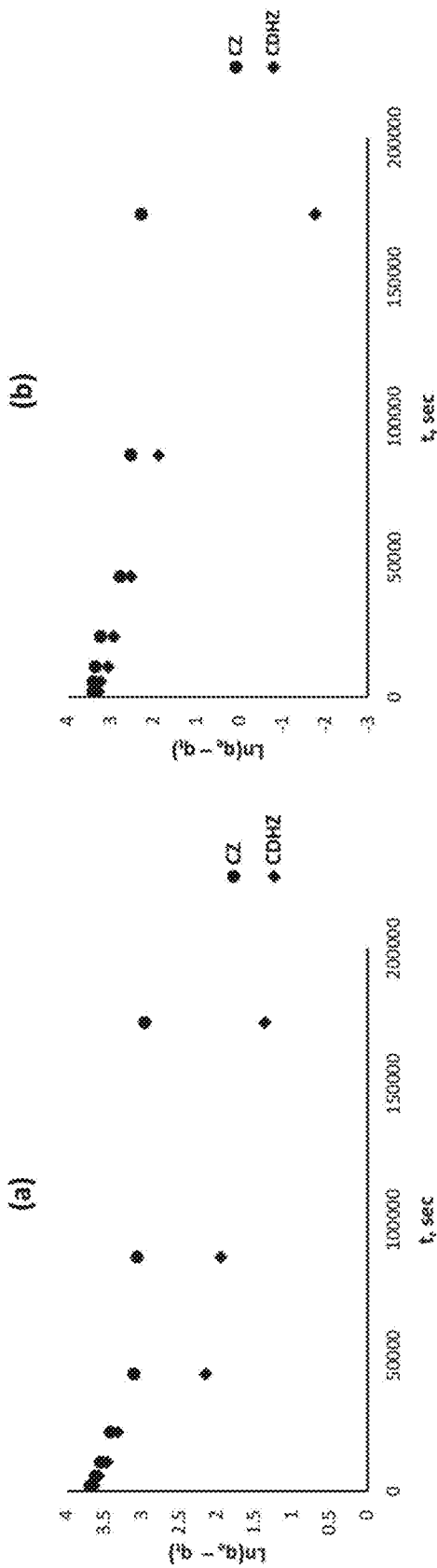
FIG. 47A and FIG. 47B show Pseudo isotherm model: Pseudo first order model before and after the interruption respectively.
Figures 47C, 47D:
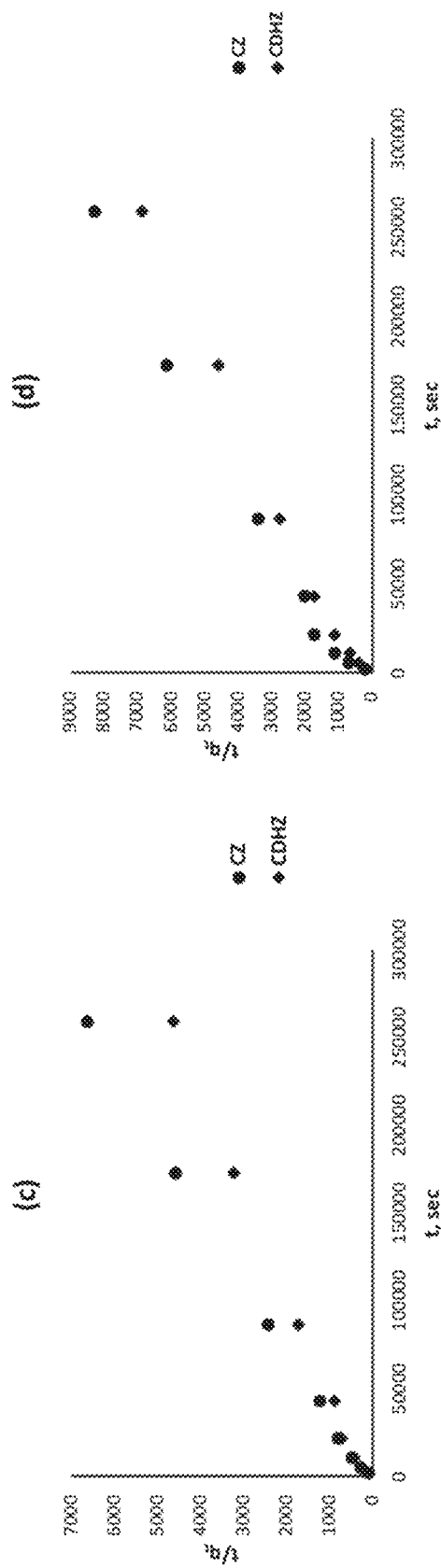
FIG. 47C and FIG. 47D show Pseudo isotherm model: Pseudo second order model before and after the interruption, respectively.

As explained earlier in this section, adsorption capacity was expected to be improved by an amount of 39.37 mg after functionalizing zeolite with the cystamine functional groups that are loaded on the zeolite. Experimental values in FIG. 43 showed an increase of 23.04 mg/g for the cystamine dihydrochloride zeolite, $CDHZ^1$. This difference in calculated improvement in maximum adsorption capacity of $CDHZ^1$ (39.37 mg/g), and actual improvement in maximum adsorption capacity of $CDHZ^1$ (23.04 mg/g) was attributed to the accessibility of the functional groups for the $Pb^{2+}$ cations. When $CDHZ^1$ is added to a solution containing $Pb^{2+}$ cations while stirring, the adsorbent comes in contact with the bulk of the solution, FIG. 46. At first, $Pb^{2+}$ ions react with the cystamine functional groups located at the edge of the pores of the microporous adsorbent. Adsorption of more $Pb^{2+}$ on the adsorbent during the contact time can create a partial block against the entry of additional aqueous solution. As the number of inserted ions increases the blocking increases, resulting in harder access to the binding sites for more metal ions. This mechanism allows explaining the adsorption behavior of $CDHZ^1$ and the differences found between the theoretical and actual maximum adsorption capacities by using the concentration of cystamine functional groups combined with their accessibility. Based on the explained mechanism, not all the binding sites can be expected to be accessible for $Pb^{2+}$ cations. Comparing the theoretical adsorption capacity of $CDHZ^1$ (69.97 mg/g CDHZ 1) with that of the experimental value (54.50 mg/g $CDHZ^1$), it was concluded that 77.89% of the functional groups were accessible to $Pb^{2+}$ cations. Also, functionalizing zeolite improved its adsorption capacity for lead by 173.24% compared with the adsorption capacity of zeolite.

It needs to be mentioned that although there is a theoretical cation exchange capacity of the zeolite, this number cannot be considered as the exchange capacity for lead ions. It reports the total amount of cations that can be exchanged. Experiments were performed to evaluate the actual amount of lead that zeolite is able to exchange with its exchangeable cations.

Mechanism and Kinetics: Pseudo Model and Diffusion Studies. To study the kinetics of metal ion uptake by $CDHZ^1$ and investigate the contact time effect to find the equilibrium state, Pseudo model, first and second order was employed. The Pseudo first-order and Pseudo second-order models can be formulated in Equations (13) and (14), respectively:

$$\ln(q_e - q_t) = \ln q_e - K_{P1} t \quad (13)$$

$$\frac{t}{q_t} = \frac{1}{(K_{P2} q_e^2)} + \left(\frac{1}{q_e}\right) t \quad (14)$$

where $q_t$ is adsorption capacity at time t, $K_{p1}$ and $K_{p2}$ are the Pseudo first-order and Pseudo second-order adsorption rate constant ($min^{-1}$), respectively. 1000 mL Lead solution with a concentration of 12 ppm at pH the level of 5 was used for a batch test. Lead removal tests conducted using 0.20 g of $CDHZ^1$ and solution was sampled at hours: 0.5, 1.5, 3, 6, 12, 24, 48 and 72. FIG. 47A-47D show the Pseudo plots for CZ and $CDHZ^1$. Calculated parameters are listed in Table 8G.

TABLE 8G

| Pseudo model parameters. | | | |
|---|---|---|---|
| | | CZ | CDHZ[1] |
| Pseudo first order Before interruption | $R^2$ | 0.734 | 0.841 |
| Pseudo second order | $R^2$ | 0.995 | 0.997 |

Figure 48:
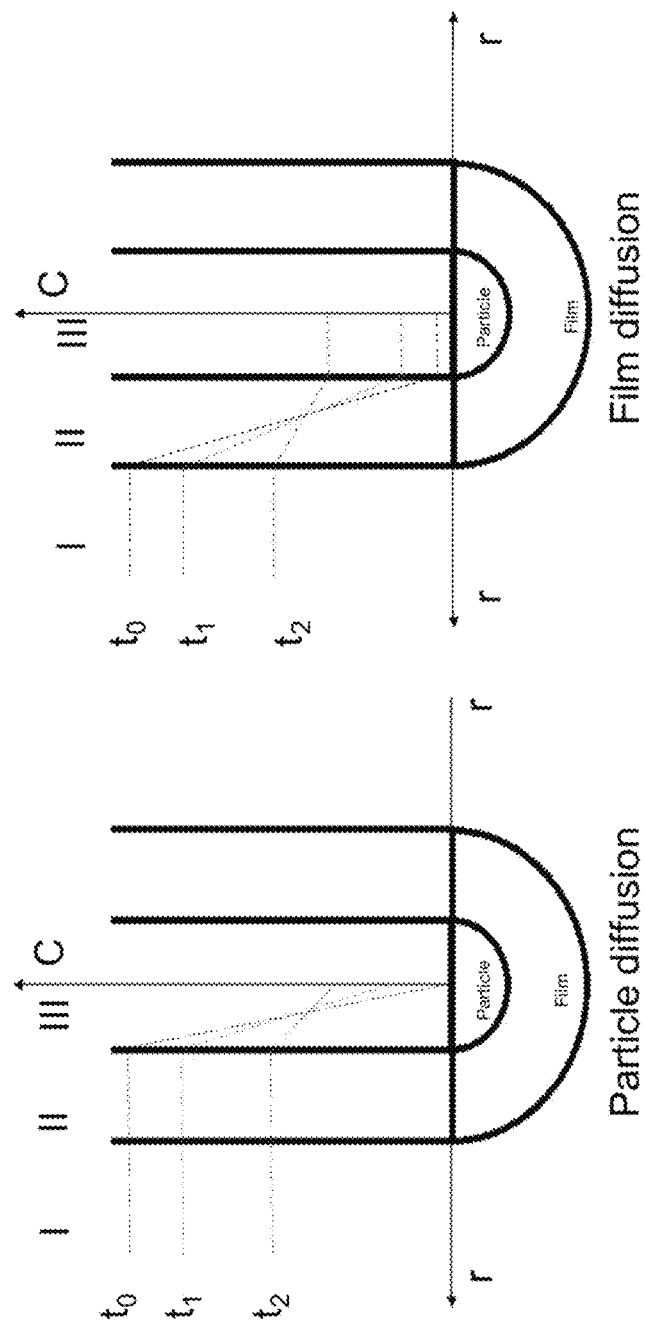
FIG. 48 shows diffusion model schematics.

The rate-determining step of the adsorption process is established to be a diffusion of the counter ions, rather than an actual chemical exchange reaction at the fixed ionic groups. In a sorption experiment, there are two potential rate determining steps: interdiffusion of ions in the adsorbent (particle diffusion), and interdiffusion of ions in the liquid film (film diffusion). There are two other rate-determining steps that have been investigated: counter ion exchange across the interface between ion exchanger and solution, and actual chemical exchange reaction. The first one is very unlikely due to theoretical reasons and is not supported by experiments. The second one has been ruled out for the ordinary ion exchange process. FIG. 48 schematically shows particle diffusion and film diffusion in an adsorption process.

Using Fick's first law in diffusion, Equation (15):

$$J = D\frac{dC}{dX} \quad (15)$$

where J is diffusion flux (mol m$^{-2}$ s$^{-1}$), D is the diffusion coefficient (m$^2$ s$^{-1}$), C is concentration (mol m$^3$), and X is position (m). Faster mixing speeds in batch tests increase the concentration gradient between solution and particle; this causes an increase in diffusion's flux. Faster mixing speed also makes the film thinner; this, again causes an increase in diffusion's flux. Faster mixing speeds shorten the required time to the equilibrium state by increasing the diffusion's flux. In other words, mixing speed does not affect the adsorption capacity, it affects the required time to reach the equilibrium state.

Figure 49:
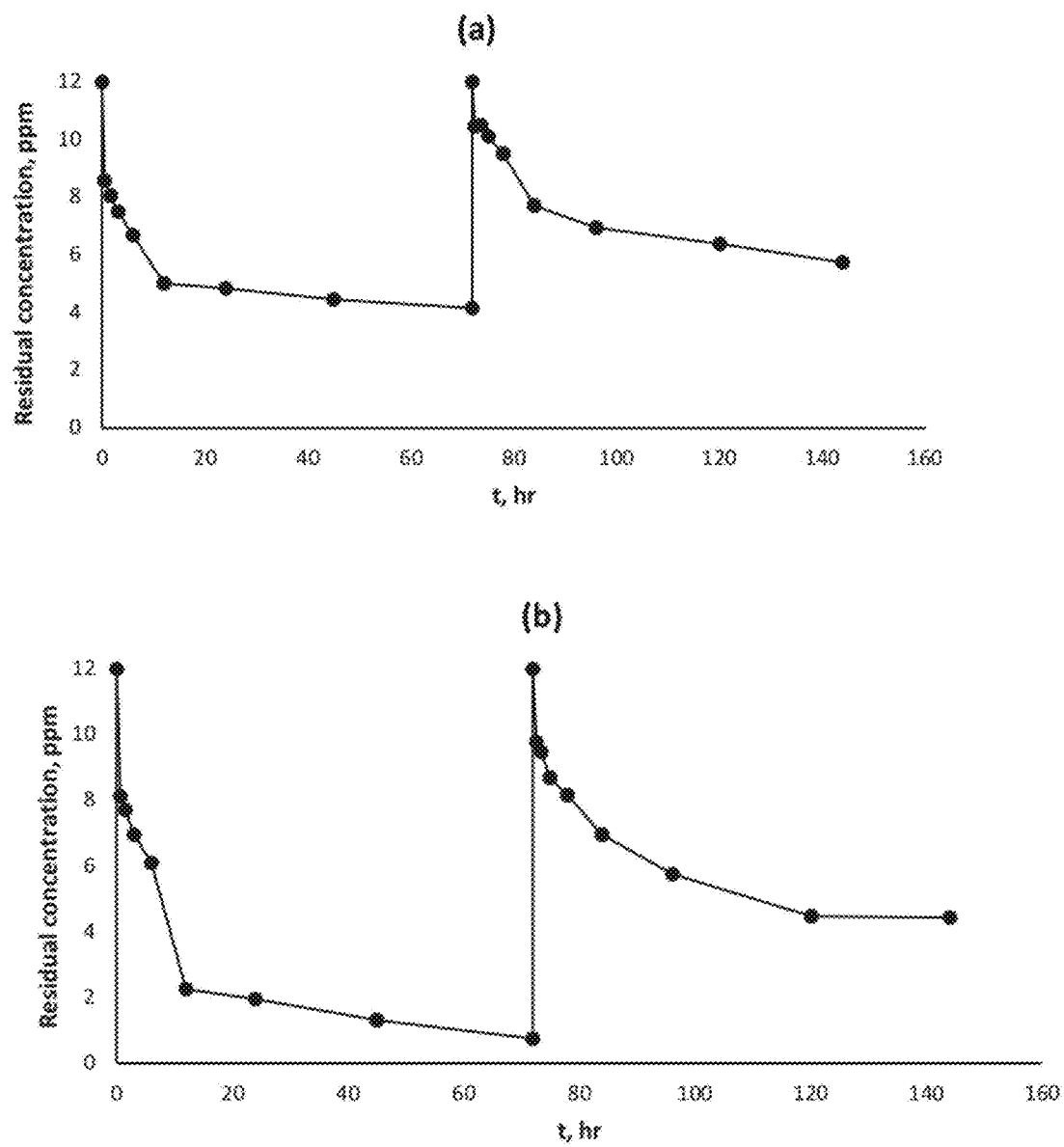
FIG. 49 shows interruption test results for: (a) CZ, (b) CDGHZ$^1$.

Following discussion explains the specifications of particle diffusion control process and film diffusion control process. In particle diffusion: (1) the film diffusion is much faster than particle diffusion, (2) concentration gradients exist only in the beads, (3) exchange flux is proportional to the concentration of fixed charges, interdiffusion coefficient in the beads, and inversely proportional to the radius of the beads. In film diffusion: (1) particle diffusion is much faster than film diffusion, (2) concentration gradients exist only in the film, (3) exchange flux is proportional to solution concentration, interdiffusion coefficient in the film, and inversely proportional to the film thickness. To distinguish between particle diffusion and film diffusion in the adsorption process, interruption test was employed as an experimental method. To do this, after letting the batch (with same experimental design as explained earlier for the kinetics study) run for 72 hours, the particles were removed from the solution for a brief period of time (without any actions on the particles) and then re-immersed the particles in a fresh lead solution (1,000 mL of 12 ppm concentration at a pH level of 5). The batch was run for another 72 hours while the solution was sampled at hours: 0.5, 1.5, 3, 6, 12, 24, 48 and 72. The short time between the two batches gives enough time for the concentration gradient in the particles to disappear, so: (1) with particle diffusion control, the adsorption rate immediately after re-immersion is greater than that prior to the interruption, (2) with film diffusion control, no concentration gradients in the particles exist, and the rate depends on the concentration difference across the film. FIG. 49 shows the interruption test results for CZ and CDHZ[1].

Figure 50:
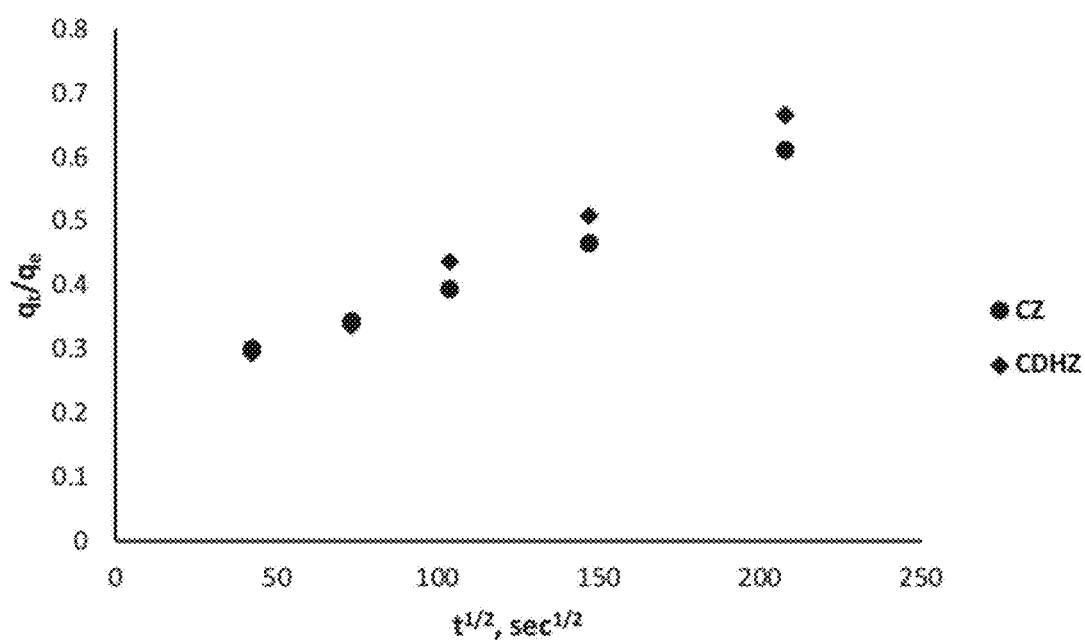
FIG. 50 shows a particle diffusion model plot.

As can be seen in FIG. 49, the ion exchange rate was found to be greater than prior to the interruption immediately after reimmersion, which confirms the ion exchange process to be as a particle diffusion-controlled process. With the obtained evidence of a particle diffusion control process, analysis of the experimentally gathered data was performed using the following particle diffusion Equation (16):

$$\frac{q_t}{q_e} = \frac{6}{r}\sqrt{\frac{Dt}{\pi}} + C \quad (16)$$

where t is contact time (s), r is the radius of the adsorbent particle (equal to 0.5 mm in this work), and D is apparent diffusion coefficient. $q_t/q_e$ was plotted versus $t^{1/2}$ and shown in FIG. 50. The plots show a linear trend with an intercept close to zero for CZ and CDHZ, thus this model is likely to be the dominant rate controlling step.

Calculation results of the kinetic models mentioned above showed that the Pseudo second-order had the best linearity for Pb adsorption, and according to the $R^2$ values, is the kinetic mechanism for lead adsorption.

Diffusion of Pb$^{2+}$ into CDHZ[1] was faster than CZ (due to greater diffusion coefficient value), as can be seen in Table 8H. This can be addressed by considering the presence of other components in CZ (impurities of the natural zeolite) that can affect the pass of Pb$^{2+}$ through the CZ structure, since this adsorbent material was not pretreated before the adsorption test, or it was more difficult for Pb$^{2+}$ ions to be exchanged with exchangeable cations in the natural zeolite structure.

TABLE 8H

| Particle diffusion parameters. | | |
|---|---|---|
| | CZ | CDHZ |
| $R^2$ | 0.986 | 0.991 |
| C | 0.210 | 0.188 |
| D (cm$^2$ s$^{-1}$) | 7.01 * 10$^{-9}$ | 9.37 * 10$^{-9}$ |

Effect of Cystamine Loadings on Removal Efficiency. As shown in the previous section, the adsorption capacity of CZ was increased from 31.46 to 54.50 mg/g for CDHZ[1]. At this point, cystamine functional group's concentration is assumed to be in a direct relationship with the adsorption capacity of the functionalized zeolite. In order to investigate this assumption, zeolite was functionalized in a way that greater amounts of cystamine groups were introduced to the zeolite's structure. To functionalize the pre-treated zeolite (NaCl—Z) with cystamine functional groups, a 10 mM solution of cystamine dihydrochloride was prepared by adding 4.50 g (20 mmol) of cystamine dihydrochloride crystals to 200 mL DI water. 10 g of sodium treated zeolite (NaCl—Z) was added to the solution and refluxed at 85° C. for 48 hours. Treated zeolite was washed with DI water and dried at 100° C. for 12 hours. This material is called as CDHZ[2]. EDS analysis was employed to investigate the chemical composition of CDHZ[2] adsorbent.

TABLE 81

EDS analysis for $CDHZ^1$ and $CDHZ^2$.

| | Na/Si | K/Si | Mg/Si | Ca/Si | S/Si |
|---|---|---|---|---|---|
| CZ | 0.0135 ± 0.0034 | 0.0303 ± 0.0186 | 0.0145 ± 0.0062 | 0.1000 ± 0.0027 | 0.0078 ± 0.0011 |
| $CDHZ^1$ | 0.0694 ± 0.0115 | 0.0298 ± 0.0140 | 0.0100 ± 0.0093 | 0.0231 ± 0.0024 | 0.0572 ± 0.0041 |
| $CDHZ^2$ | 0.0499 ± 0.0350 | 0.0448 ± 0.0350 | 0.0059 ± 0.0038 | 0.0353 ± 0.0072 | 0.0762 ± 0.0045 |

As can be seen in Table 81 the sulfur amount (as an element to quantify the amount of cystamine functional group) in $CDHZ^2$ is greater than that of $CDHZ^1$. This proves that functionalizing zeolite with a more concentrated cystamine dihydrochloride was successfully able to increase the amount of cystamine functional groups on the zeolite.

To evaluate the effectiveness of increased loadings of cystamine dihydrochloride on zeolite (from 1 mmol to 2 mmol), a batch test with the following specifications was designed: 200 mL of a 100 ppm lead solution was prepared, and the pH level was adjusted to pH=5. Next, 0.20 g of $CDHZ^2$ was added to the batch as the adsorbent material. The batch was mixed for 24 hours at 200 rpm at room temperature. Residual lead concentration was measured in the solution by using ICP-MS. The residual concentration was measured to be 51.26 ppm. No significant improvement in adsorption capacity can be found when comparing the results with the same batch by using $CDHZ^1$ (54.09 ppm residual concentration of lead). As explained earlier, it was assumed that the concentration of cystamine groups on zeolite structure can play a critical role in improving the adsorption capacity of the adsorbent. What the observed results suggest is that although the concentration of the cystamine groups on zeolite was increased, only a small number of $Pb^{2+}$ ions were able to access the binding sites. In other words, the results demonstrated that the concentration of the cystamine groups is not the only parameter that affects the $Pb^{2+}$ adsorption capacity of cystamine functionalized zeolite. And the adsorption of the $Pb^{2+}$ is also affected and controlled by their accessibility to the active sites.

In this section, the leaching of cystamine groups from CDHZs is investigated. There are two possible reasons that cystamine groups might be leached off from the CDHZs: (1) leaching of cystamines from CDHZs because of a loose connection, and (2) leaching of cystamines from CDHZs during the $Pb^2$ adsorption tests. To quantify the amount of lost cystamines because of any of the mentioned reasons, first the amount of sulfur that is present in CDHZs structure (because of cystamine groups) was calculated as shown below and summarized in Table 8J.

Cystamine dihydrochloride formula=$C_4H_4Cl_2N_2S_2$, molar weight=225.20 g/mol. There are two sulfurs in one structure unit, which is 2*32.06 g sulfur in 1 mole cystamine dihydrochloride.

TABLE 8J

Cystamine dihydrochloride and sulfur loadings on zeolite.

| | Cystamine dihydrochloride loading on adsorbent | S loading on adsorbent, mg/g zeolite |
|---|---|---|
| $CDHZ^1$ | 1 mmol | 64.14 |
| $CDHZ^2$ | 2 mmol | 128.26 |

To examine the first possibility of leaching cystamines, 0.20 g of $CDHZ^1$ added to 200 mL of Ultra-high purity water for 24 hours at 200 rpm. The amount of sulfur in the batch was measured by using ICP-MS. Results are listed in Table 8K. Sulfur concentration in the batch was converted to sulfur loss as μg Sulfur/g Zeolite, by using Equation (17):

$$\text{Sulfur loss}\left(\frac{\mu gS}{gZ}\right) = \text{sulfur concentration in batch}\left(\frac{\mu g}{L}\right) * \text{Batch Volume (L)} * \frac{1}{CDHZ \text{ mass (g)}} \quad (17)$$

Since the batch volume of 0.20 L, and adsorbent mass in the batch equals to 0.20 g, these two cancel out and the value of sulfur loss (μg S/g Z) equals to the concentration of sulfur in the batch. Sulfur loss percent was also calculated by using Equation (18):

$$\text{Sulfur loss percent} = \frac{\text{sulfur loss}}{\text{initial sulphur}} * 100 \quad (18)$$

TABLE 8K

Sulfur concentration in Ultra-high purity water batch.

| | Initial sulfur in adsorbent, mg/g | Sulfur loss, mg/g | Sulfur loss, % |
|---|---|---|---|
| $CDHZ^1$ | 64.14 | 75.16 * $10^{-3}$ | 0.12 |

To calculate the number of mol of cystamine groups that was lost, Equation (19) was used:

$$\text{mol of thiol loss} = \frac{\text{sulphur loss}}{2 * \text{molar mass of sulphur}} \quad (19)$$

$$\text{thiol loss percent} = \frac{\text{mol thiol of loss}}{\text{initial thiol mol}} * 100 \quad (20)$$

Table 8L shows the cystamine groups loss in Ultra-high purity water batch.

TABLE 8L

Cystamine groups loss in Ultra-high purity water batch.

| | Initial cystamine in adsorbent, mol | Mol of cystamine loss | Cystamine loss, % |
|---|---|---|---|
| $CDHZ^1$ | 1 * $10^{-3}$ | 1.17 * $10^{-6}$ | 0.12 |

To quantify the amount of cystamine loss in an adsorption batch, this time 0.20 g of $CDHZ^1$ was added to 200 mL of a 10 ppm lead solution at pH=7, and mixed for 24 hours at 200 rpm at room temperature. The amount of sulfur in the batch was measured by using ICP-MS. Results are listed in Table 8M.

TABLE 8M

Sulfur concentration in lead removal batch.

| | Initial sulfur in adsorbent, mg/g | Sulfur loss, mg/g | Sulfur loss, % |
|---|---|---|---|
| CDHZ[1] | 64.14 | $89.75 * 10^{-3}$ | 0.14 |

Percent loss of cystamine in lead removal batch is shown in Table 8N.

TABLE 8N

Cystamine groups loss in lead removal batch.

| | Initial cystamine in adsorbent, mol | Mol of cystamine loss | Cystamine loss, % |
|---|---|---|---|
| CDHZ[1] | $1 * 10^{-3}$ | $1.40 * 10^{-6}$ | 0.14 |

As shown earlier, 0.12% of the cystamine loss is due to the loose connection between cystamine groups and zeolite structure, which means only 0.02% of cystamine functional groups are lost in the lead adsorption batch.

Example 9

Functionalizing Zeolite with Zinc Sulfide

Materials. Escott zeolite (0.7-1.0 mm) was purchased from Zeolite Australia PTY. Zinc acetate dehydrate 98% (Acros Organics), thioacetamide 99% (Sigma Aldrich) were used without further modification. Lead nitrate certified ACS crystalline (Fisher Chemical) and mercury (II) chloride ACS reagent >99.5% (Sigma Aldrich) were used to prepare lead and mercury solutions. Deionized water (DI-water) and extra pure water (EP-water) were prepared in the lab. $HNO_3$ and NaOH were used to adjust the solution pH.

Characterization. SEM-EDS was performed on a Hitachi S-4800 equipped with a Burker EDS detector to generate images and provide a chemical composition of the samples. Imaging was performed under 10.0 kV accelerating voltage with an extraction current of 10 µA. Surface area, pore volume and pore diameter were measured using a Quantachrome Autosorb IQ2 gas sorption analyzer. Samples were degassed at a final temperature of 350° C. for approximately 17 hours and analyzed with nitrogen adsorptive at 77 K. Samples for X-ray diffraction (XRD) analysis were carried out in a Bruker AXS D8 for 30 minutes from $2\theta=10°$ to 80° at 40 kV using a Cu tube (1.5418 Å). Transmission electron microscopy (TEM) and selected area electron diffraction (SAED) studies were performed in a Hitachi H9000NAR high resolution (HR) TEM using 300 keV electrons. Samples were ground with an agate mortar and pestle and supported on Cu TEM grids covered with amorphous holey carbon films.

ZnS—Z Fabrication. Sonochemical methods have been proven as a useful technique for generating novel materials. Ultrasound has its chemical effects from acoustics cavitation, which is basically formation, growth and impulsive collapse of bubbles in the liquid. Localized hot spots are formed as a result of the implosive collapse of the bubbles, through an adiabatic compression within the gas phase of the collapsing bubble. The extreme conditions resulted from bubble collapse have made the opportunity to prepare amorphous metals, carbides, oxides, sulfides, and composite nanoparticles. Zinc sulfide nanoparticles were grown on zeolite microstructure by using sonochemical methods in an aqueous batch containing zinc source and sulfur source.

Zeolite Functionalization with Sulfide Nanostructures. A stoichiometric ratio of clean zeolite (CZ), zinc acetate dihydrate and thioacetamide was sonicated in an aqueous medium for 3 hr. Ultrasonic irradiation was accomplished with a high intensity ultrasonic probe (QSONICA 1375, 2.54 cm Ti horn, 20 kHz, 67 W/cm²). A Pyrex beaker (total volume of 4 L) was used, which was kept in a water bath to control the temperature of the batch. The reactant quantities and experimental parameters for the sonochemical preparation of ZnS functionalized zeolite (ZnS—Z) are summarized in Table 9A.

TABLE 9A

Reactant amounts and experimental parameters for sonochemical preparation of ZnS-Z.

| reactant quantities, g | | | | | |
|---|---|---|---|---|---|
| Zeolite | Zinc acetate dihydrate | thioacetamide | DI-water | Sonication time, h | Batch temperature |
| 4.50 | 21.53 | 7.51 | 3000 | 3 | <80° C. |

Figure 51:
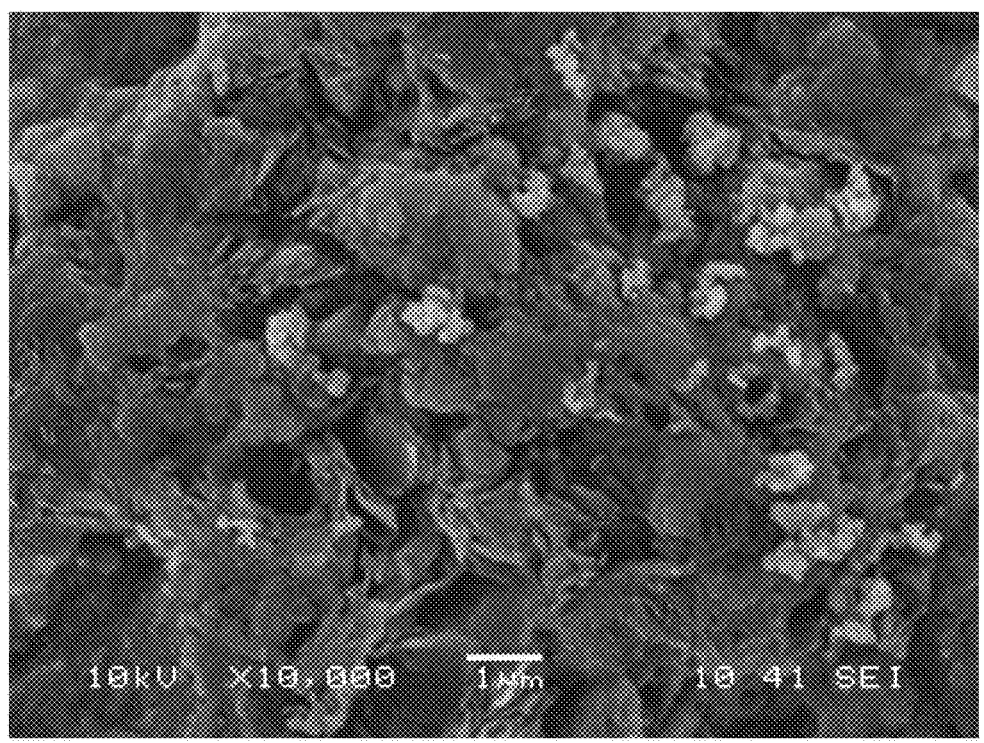
FIG. 51 shows SEM image of ZnS—Z: ZnS nano particles.
Figure 52:
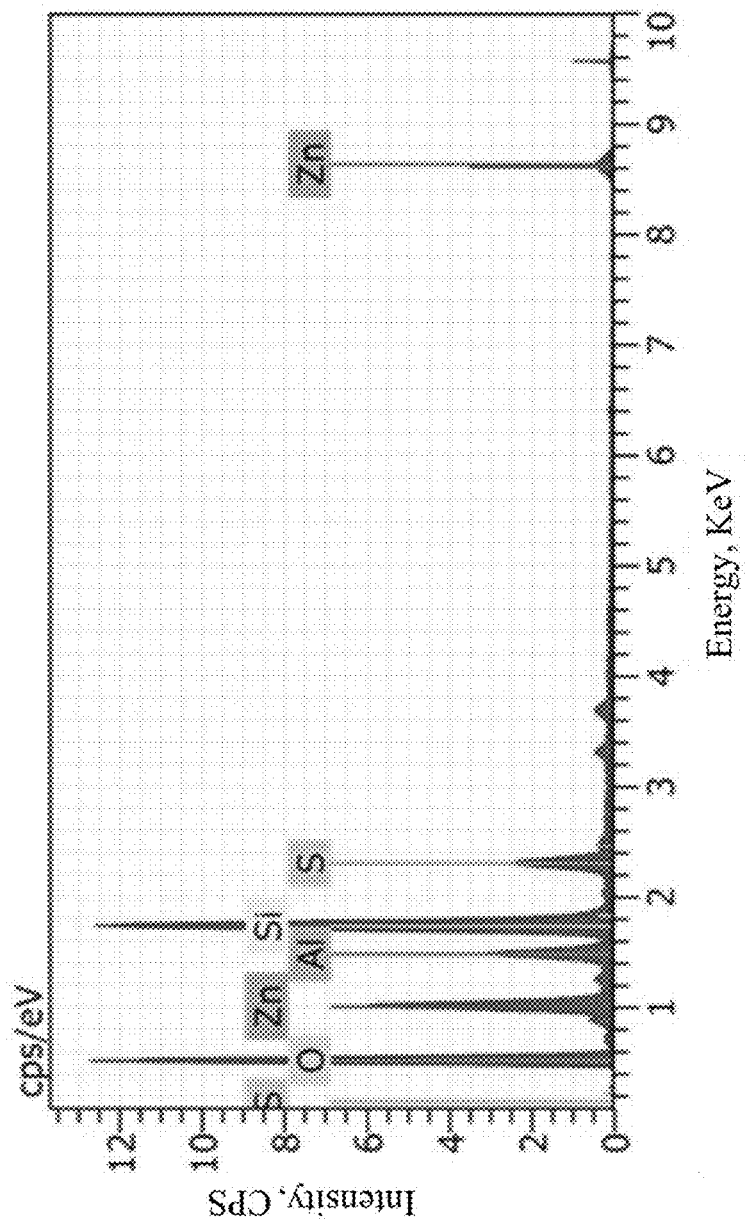
FIG. 52 shows EDS plot for ZnS—Z: zinc and sulfur in ZnS—Z.

In order to make sure that the functionalization process was successful, SEM imaging and EDS analysis were performed. As shown in FIG. 51, the sonochemical treatment was able to form ZnS nanoparticles with well-isolated spherical shapes, or ZnS clusters on the zeolite surface. The EDS pattern of ZnS—Z, FIG. 52, shows the presence of Zn and S peaks. The measured amounts of Si, Zn, and S by using the EDS are summarized in Table 9B. The variation of Zn:S ratio from 1:1 was related to the presence of Z in zeolite structure prior to the sonochemical process.

TABLE 9B

Atomic percent of O, Si, Zn, and S in CZ and ZnS-Z.

| | C, wt. % | |
|---|---|---|
| Element | CZ | ZnS-Z |
| O | 52.26 | 49.12 |
| Si | 30.81 | 27.33 |
| Zn | 3.85 | 6.59 |
| S | 0.23 | 5.26 |

Equilibrium Adsorption Experiments for Heavy Metals. Adsorption experiments were performed in six different initial compositions: 10, 25, 50, 100, 250, and 500 ppm. The pH level in the initial solutions was adjusted to 5. Isotherm experiments were conducted by adding 0.20 g of adsorbent to 200 mL of each of the solutions while on the shaking table at 200 rpm. Samples were collected after 24 hours and the residual concentration of lead and mercury was determined by inductively coupled plasma mass spectroscopy (ICP-MS) (Thermo Scientifc™ Element 2™ M High resolution) and mercury analyzer (MERX, Brooks Rand Co, Seattle, WA, USA), respectively. ICP-MS was performed in water samples for determination of lead concentration, preceded by filtration through 0.2 µm filter and preservation in 0.2% nitric acid.

The concentration of $Pb^{+2}$ or $Hg^{2+}$ (mg/L) in the aqueous solution was measured before ($C_o$) and after ($C_t$) adsorption. The $Pb^{+2}$ or $Hg^{+2}$ removal efficiency (q) was determined using Eq. 1.

$$\eta = 1 - \frac{C_t}{C_0} \times 100 \quad (1)$$

The adsorption capacity ($q_t$) was defined as the amount of $Pb^{+2}$ or $Hg^{+2}$ cations adsorbed by the adsorbent (mg/g) at time "t" and was determined according to Eq. 2.

$$q_t = \frac{V(C_0 - C_t)}{M} \quad (2)$$

Where V (L) is the volume of the $Pb^{+2}$ or $Hg^{+2}$ aqueous solution and M (g) is the dry mass of the adsorbent used in the experiment. Each experimental run was performed in triplicate, and the average removal efficiency was reported. Under equilibrium conditions, $C_t$ and $q_t$ were denoted as $C_e$ and $q_e$, respectively.

Regeneration of the adsorbent. Several adsorption/desorption cycles were conducted for lead to investigate the adsorption/desorption behavior of ZnS—Z. Column set up was used to saturate the adsorbent particles with lead. The regeneration of spent adsorbent was performed four times at room temperature.

Fixed-bed experiments were used to saturate the adsorbent particles with lead. They were performed to remove lead from aqueous solutions using Zn—S adsorbent. A 1000 mL of influent solution of 100 ppm was passed through the column as shown in the schematic diagram of the experimental setup in FIG. 53. The fixed-bed column was made of glass. A column with a height of 200 mm and an internal diameter of 10 mm was used in this test. The column was packed with 4.00 g of ZnS—Z to make a height of 50 mm. The column was then operated in such a manner that 1,000 mL of 100 ppm lead solution was constantly added to it by using a peristaltic pump (Cole-Parmer variable speed) and allowing it to flow along gravity in downflow mode with a constant flow rate of 0.08 mL/s.

The desorption was completed by flushing 10% $HNO_3$ solution through the column. Aliquots of the effluent were collected over time to quantify lead desorbed from Zn—S. After desorption step, particles were re-functionalized according to sonochemical method explained in section 2.2.

Three acids were screened for selection of best desorption results: nitric acid, hydrochloric acid and sulfuric acid, all at 10% concentration. One gram of functionalized zeolite was placed in a beaker with 100 mL of the 10% acid solution. Solution was allowed to shake for 24 hr at 200 rpm at room temperature.

Figure 54:
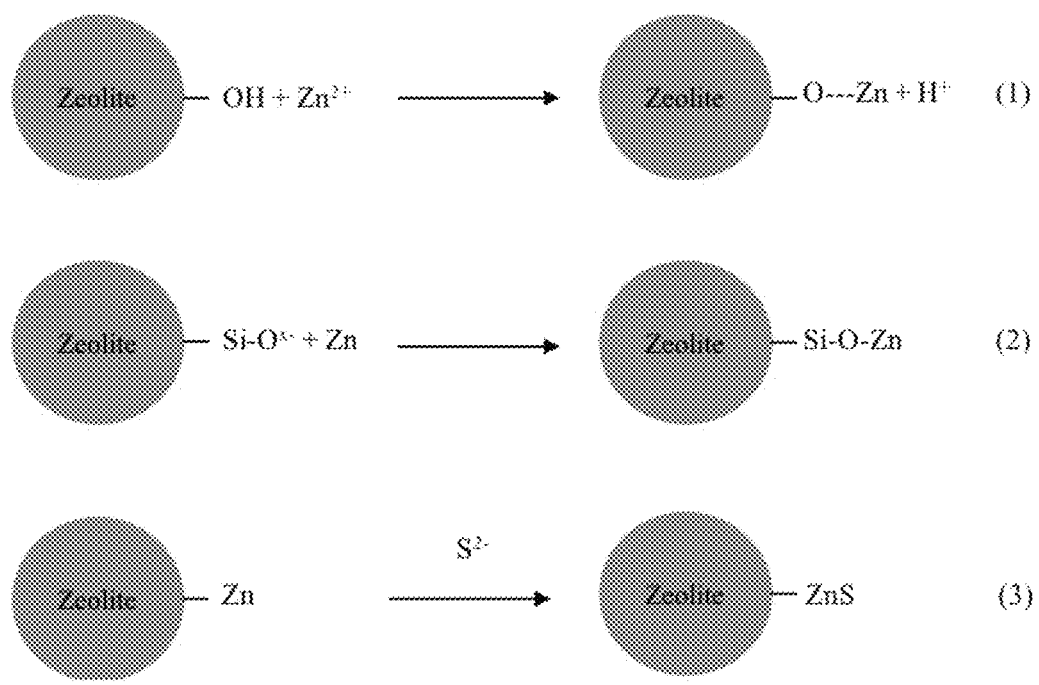
FIG. 54 shows ZnS—Z fabrication schematic.

Functionalization and characterization of sulfide nanostructure zeolite. In this study, zeolite surface worked as a substrate and the sulfide nanostructures functionalized the surface of the Australian zeolite clinoptilolite, which contains 67% of silica, for removal of lead and mercury from water. Basically, FIG. 54 summarizes three schemes as follows: (a) The reactivity of surface —OH groups, which allows for an effective interaction with Zn (scheme 1); (b) If reactants are sonicated, the breakage of the Si—O—Si link by sonication is energetically preferable because of reduction of the structural tension, owing to the greater length and lower rigidity of the free Si—O bond (scheme 2); (c) The zinc introduced to the silica surface then undergoes to ligand exchange with sulfide ions yielding ZnS coated on silica (scheme 3).

Nanoparticles have high surface adsorption activity and high reactivity and are expected to increase adsorption capacity. In fact, batch experiments indicate that ZnS—Z showed significant improvement in adsorption capacity for both lead (43 mg/g) and mercury (215 mg/g) when compared to CZ (22.2 mg/g and 6.9 mg/g, for lead and mercury, respectively). This material can be used for the removal of heavy metals from drinking water as single media or additive in Point of Use (POU) and Point of Entry (POE) Systems.

There are two mechanisms of adsorption simultaneously removing lead and mercury ions from the aqueous solution: (a) physical (cations are placed in holes and cavities at the surface and inside the zeolite grains) and (b) chemical (ion-exchange between cations placed on the zeolite surface and metal cations in the solution). The high affinity of the $Zn^{+2}$ at the zeolitic substrate surface was involved in the ion-exchange process with the solution containing $Pb^{+2}$ and $Hg^{+2}$ cations.

Figure 55:
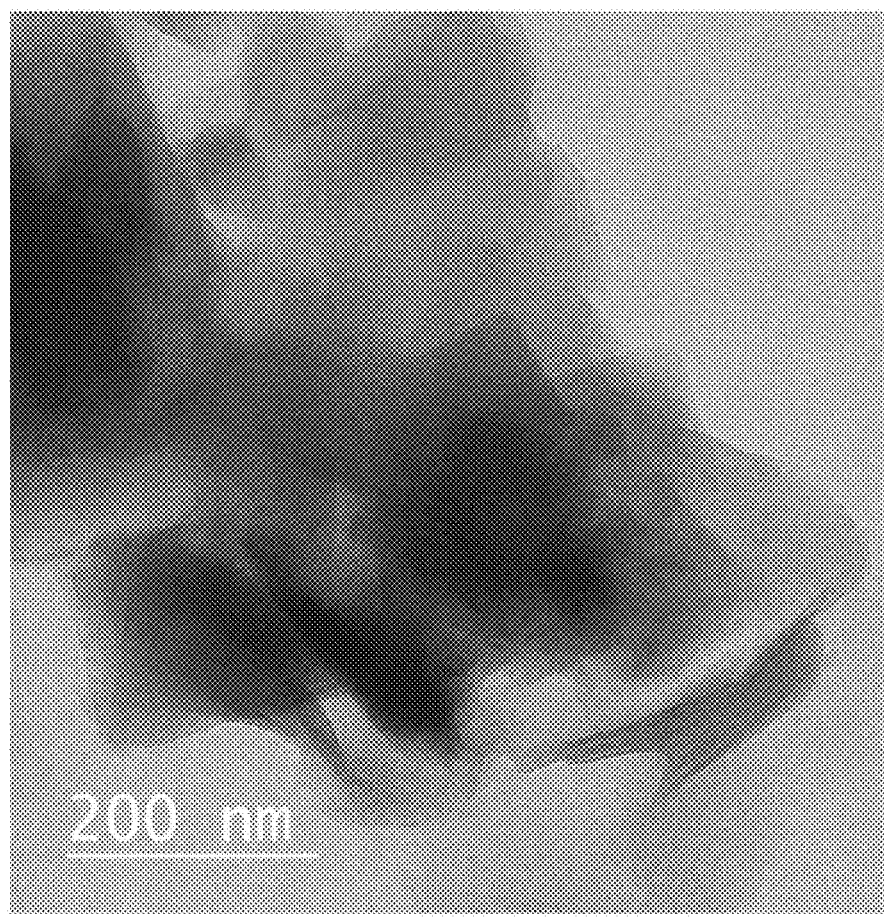
FIG. 55 shows TEM image of ZnS—Z.
Figure 56A:
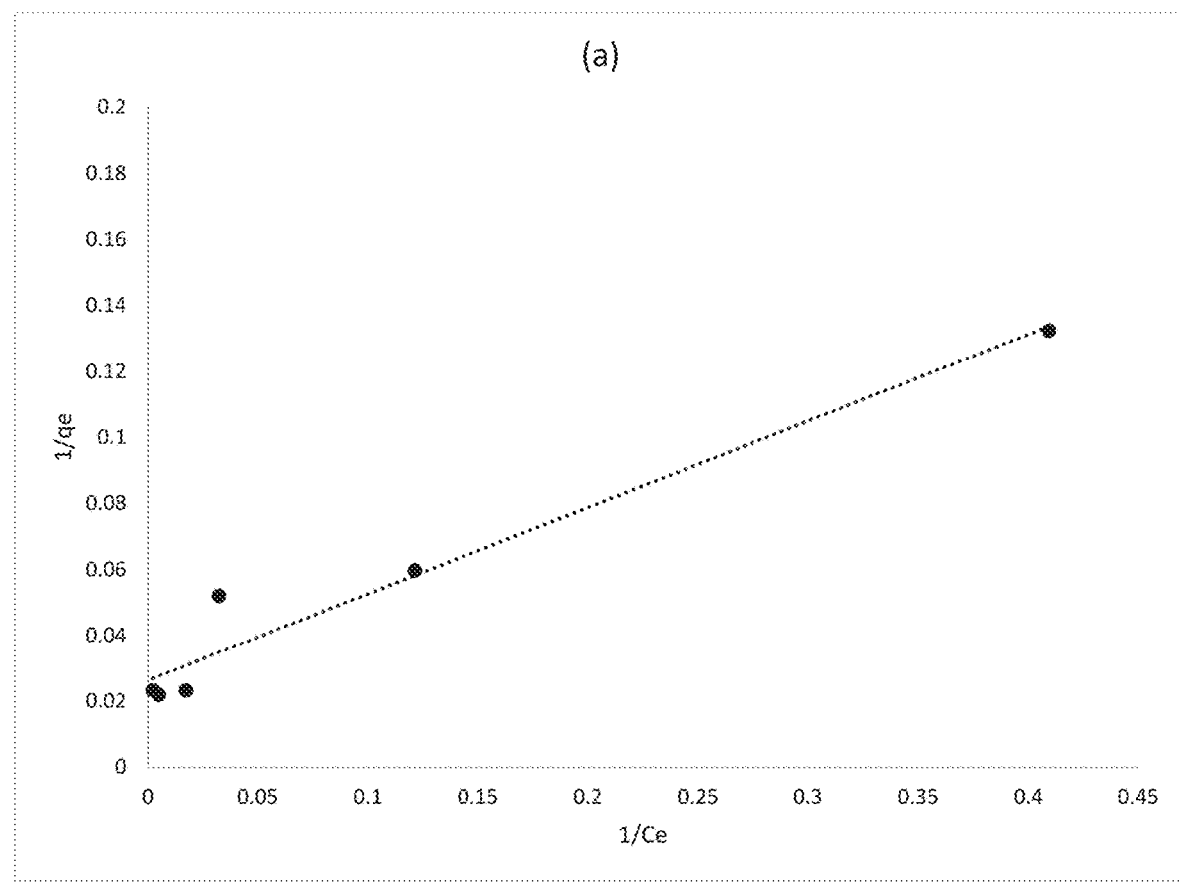
FIG. 56A shows an isotherm plot for Langmuir model for Pb adsorption.
Figure 56B:
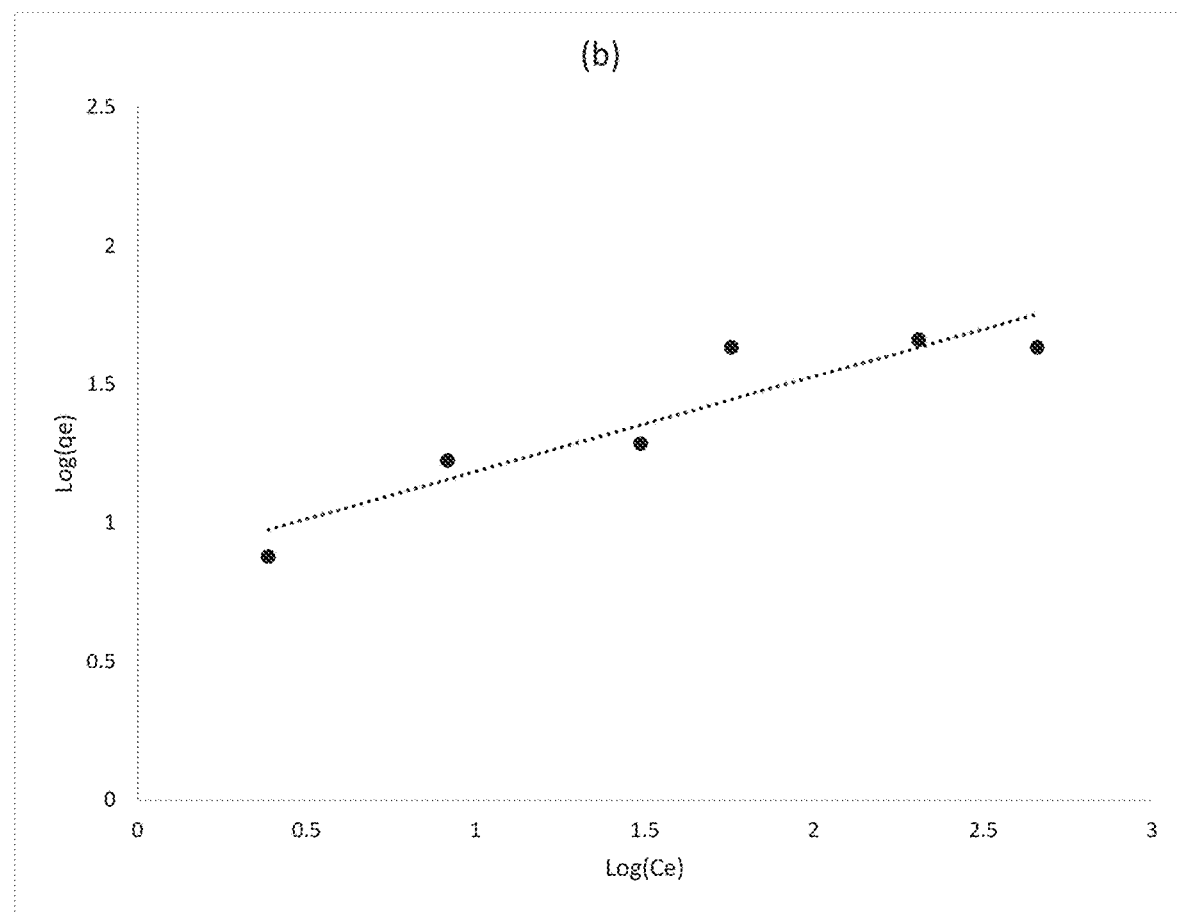
FIG. 56B shows an isotherm plot for Freundlich model for Pb adsorption.
Figure 56C:
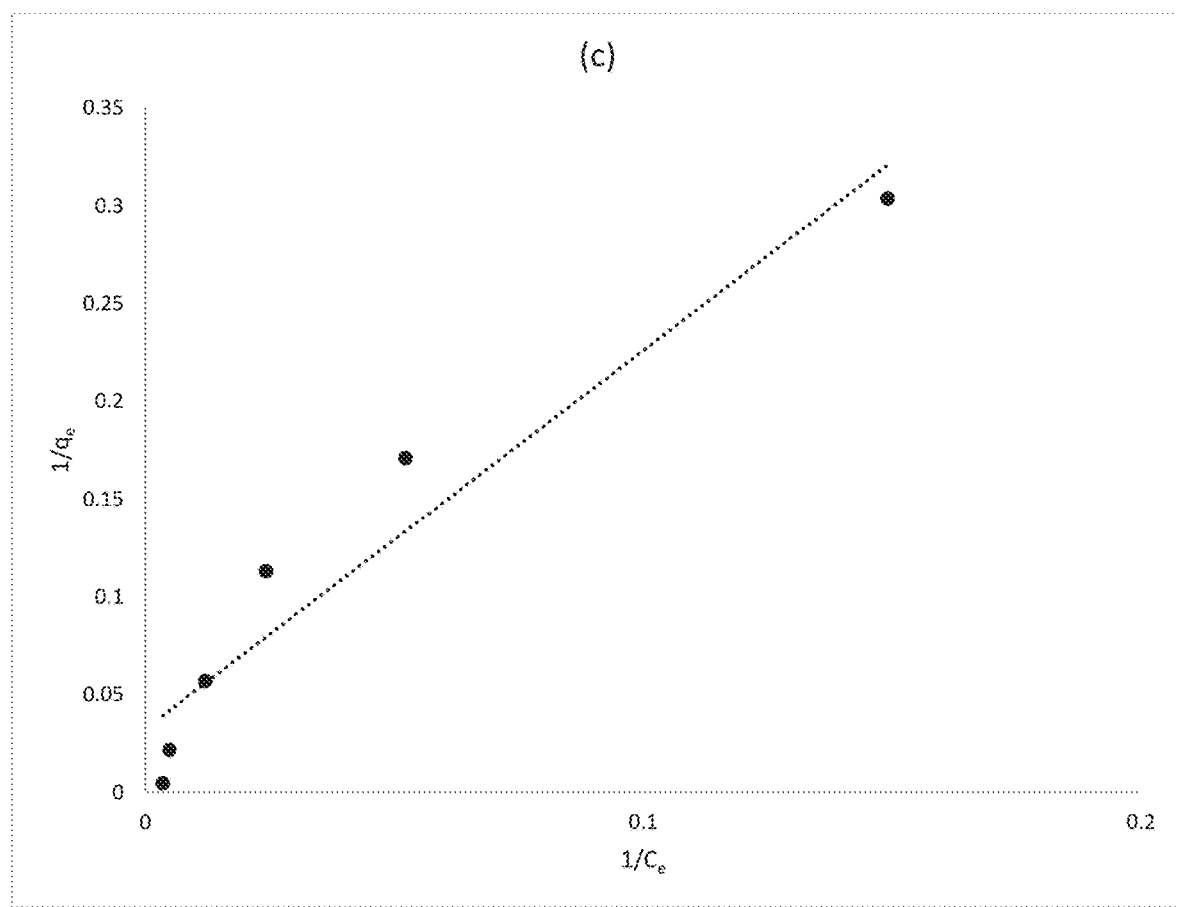
FIG. 56C shows an isotherm plot for Langmuir model for Hg adsorption.
Figure 56D:
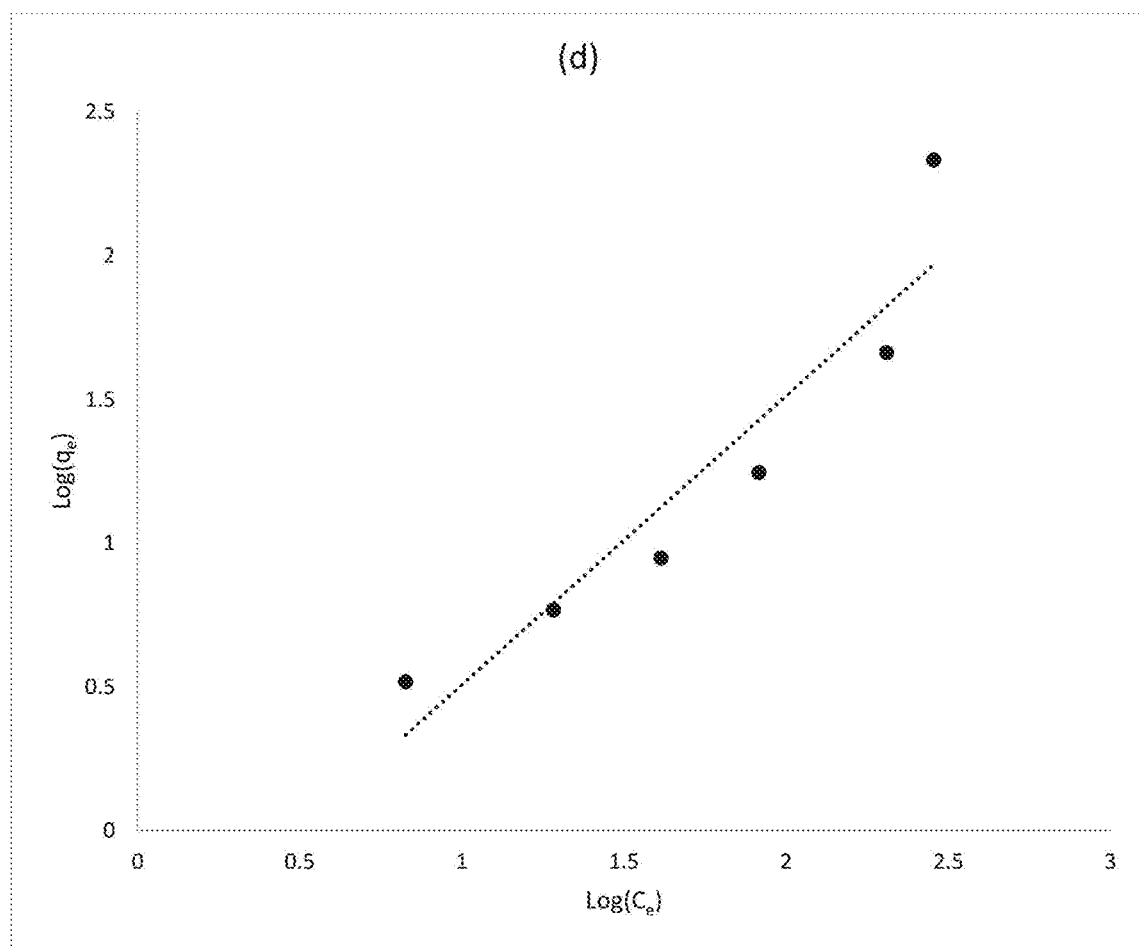
FIG. 56D shows an isotherm plot for Freundlich model for Hg adsorption.

High-resolution transmission electron microscopic (HR-TEM) imaging was carried out on the ZnS—Z particles, to study the nanocrystalline nature of the samples. The HRTEM image (FIG. 55) indicates that there are various structures in the system: from crystalline 2D sheet, 3D graphite-like phase and amorphous. This reveals a very complex structure with a combination of all three phase plus porous structure. Zeolite has a crystalline 3D structure and ZnS nanoparticles have a core-shell crystalline/amorphous structure. In addition to the structural information from a localized area, a selected area diffraction (SAD) pattern was obtained from the ZnS—Z sample to confirm the crystal structure. Differently from the SAD pattern of a non-functionalized zeolite, the first ring in the SAD pattern has very strong intensity and broad intensity distribution, which is due to by very small sizes of ZnS nanocrystals.

In order to obtain further insight on the role of sulfide nanoparticles and its synergistic interaction in zeolite, we characterized the zeolite particles by XRD. No significant distinctive peak was observed between zeolites with or without sulfide nanoparticles, indicating no significant change in the crystalline lattice detected by XRD.

We also characterized the surface area of ZnS—Z particles and compared to its precursor, the CZ particles. While the surface area of both particles is similar 8.807 m²/g and 10 m²/g, respectively, pore diameter of ZnS—Z is 20 times smaller (3.66 Å and 80 Å, respectively) and the pore volume is 25 times smaller ($8.096 \times 10^{-4}$ cm³/g and 0.02 cm³/g, respectively). This suggests that the Zn—S nanoparticles preferentially deposit inside of the pores, which facilitates confining and tagging of heavy metal particles inside of the pores.

Selectivity study of ZnS—Z. The sorption of $Pb^{+2}$ and $Hg^{+2}$ onto ZnS—Z as a function of their initial concentration at room temperature was studied by varying their concentration from 10 to 500 ppm while all other parameters were kept constant.

The adsorption isotherms were used to address the interactive behavior between solutes and adsorbent materials. The Langmuir isotherm was the first model used in this study. Langmuir isotherms assumes monolayer adsorption onto an adsorbent surface. This model can be expressed as Eq. (3):

$$\frac{1}{q_e} = \frac{1}{q_{max} K_L C_e} + \frac{1}{q_{max}} \quad (3)$$

where $q_e$ is the equilibrium concentration of lead on adsorbent (µg/g), $C_e$ is the equilibrium concentration of lead in solution (µg/L), and $q_{max}$ the adsorption capacity of the adsorbent. $K_L$ is the Langmuir constant that evaluates the affinity between adsorbate and adsorbent. In all experiments, $C_e$ can be measured and $q_e$ can be calculated; then $1/q_e$ can be plotted as a function of $1/C_e$. If the $R^2$ value shows acceptable linearity, then the adsorption process can be considered to follow Langmuir mode. Consequently, $K_L$ and $q_{max}$ can be obtained using the slope and the intercept of the plot.

The Freundlich isotherm was the second model in this study which can be expressed as Eq. (4):

$$q_e = K_F C_e^{\frac{1}{n}} \quad (4)$$

where $K_F$ is the constant of Freundlich isotherm ($L^{1/n}$ $mg^{(1-1/n)}$/g), and $1/n$ is the Freundlich exponent.

The isotherms were fitted to experimental data with equations 1 and 2 to determine the isotherms parameters. Results are shown in FIG. 56A-56D and Table 9C.

TABLE 9C

Isotherms parameters for Pb and Hg adsorption.

| | Parameters | Pb | Hg |
|---|---|---|---|
| Langmuir | $R^2$ | 0.955 | 0.930 |
| | $K_L$ | 0.099 | 0.017 |
| | $q_{max}$ (mg/g) | 38.46 | 30.864 |
| Freundlich | $R^2$ | 0.856 | 0.883 |
| | $K_F$ | 6.953 | 0.318 |
| | $1/n$ | 0.343 | 1.005 |

In this study, we also combined the isotherm equations with a mass balance similar to the modeling studied in adsorption. In a batch test with a known solution volume and initial concentration, the following equation should be satisfied at all the time:

$$C_0 = C_e + C_e^s \quad (5)$$

where $C_e$ is the adsorbate concentration in the solution at equilibrium (mg/L), and $C_e^s$ is the concentration of the adsorbate onto the adsorbent surface at equilibrium (mg/g). Expressing $q_e$ by means of solution volume (V), adsorbent mass (M), along with $C_0$ and $C_s^e$ equals to:

$$q_e = \frac{V C_e^s}{M} = \frac{V(C_0 - C_e)}{M} \quad (6)$$

Substituting Eq. (5) into Eq. (1), Langmuir equation, results in Eq. (7):

$$K_L \cdot C_e^2 + \left(1 + \frac{K_L q_{max} M}{V} - K_L \cdot C_0\right) \cdot C_e - C_0 = 0 \quad (7)$$

The resulting $C_e$ is now a function of $C_0$, M, and V with known parameters of $K_L$, and $q_{max}$. Thus the $C_e$ can explicitly and simply solved by using Eq. (7).

Similar to the Langmuir model, the Freundlich isotherm was reformulated with mass balance, substituting Eq. (6) into Eq. (4):

$$\frac{K_F M}{V} C_e^{\frac{1}{n}} + C_e - C_0 = 0. \quad (8)$$

Again, the resulting $C_e$ is now a function of $C_0$, M, and V with known parameters of $K_F$, and $1/n$. Thus, the $C_e$ can be solved by using Eq. (8).

Once the adsorption parameters were determined earlier, the equilibrium concentration, $C_e$ was predicted using Eqs. (7) and (8). Predicted data was compared with the experimental data to validate the prediction equations using the isotherm models. FIG. 56A-56D shows that the predicted data are consistent with the experimental data. This indicated that the equilibrium concentration, $C_e$, could be pre estimated before the actual adsorption test.

Effect of Competing Ions on ZnS—S' Removal Efficiency. The sorption of Pb, Hg, and Ni onto ZnS—Z was investigated as a function of their initial concentration in a mixed system by varying the metal concentrations from 1 to 25 ppm at room temperature while keeping all other parameters constant. Results are shown in Table 9D. Distribution coefficient ($K_d$) is defined as the ratio of the metal concentration on the adsorbent (solid phase) to that in the solution at the equilibrium state. Such coefficient is a useful index for comparing adsorption capacities of ZnS—Z for a particular ion under the same experimental condition.

Higher $K_d$ values indicate high metal retention by the adsorbent (solid phase) through chemical reactions. The distribution coefficient ($K_d$) was calculated over the whole range of the initial concentrations of Pb, Hg, and Ni. Also, an average $K_d$ was calculated to obtain a comparable value for each metal, so that the selectivity sequence of the metal ions has been established.

$K_d$ is illustrated as a function of metal ions concentration in Table 9D. Data in this table shows that with the increase in initial concentration the removal percentage of the metal ions is decreased. This shows that changes occur in the nature of adsorption sites involved in the sorption process, based on the metal ions concentration level. The higher $K_d$ values resulted in the experiments with lower metals concentrations associated with the adsorption sites of high selectivity, with relatively strong bonding energies. Otherwise, adsorption becomes unspecific at higher metal concentrations, when bonding sites become progressively occupied, and this results in lower $K_d$ values. Increasing the metal concentrations may also result in saturation of adsorption sites and decreasing the adsorption capacity.

According to the distribution coefficient values, the selectivity sequence of Pb, Hg, and Ni by ZnS—Z was obtained as Hg>Pb>Ni. Mercury showed the highest $K_d$ values followed by lead and nickel, Table 9D. This behavior is attributed to differences in metal characteristics and affinity for adsorption sites. Hg has a greater affinity to ZnS—Z functional groups since it is a soft Lewis acid; compared with $Ni^{2+}$ and $Pb^{2+}$ which are borderline Lewis acids. The sorption preference found by ZnS—Z for Pb over Ni is explained by: (a) the greater hydrolysis constant, (b) the higher atomic weight, and (c) the higher ionic radius (smaller hydrated radius).

TABLE 9D

Removal efficiency and distribution coefficient at equilibrium time.

| | Pb | | Hg | | Ni | |
|---|---|---|---|---|---|---|
| | Removal efficiency, % | $K_d$ | Removal efficiency, % | $K_d$ | Removal efficiency, % | $K_d$ |
| 1 | 74.00 | 2.85 | 87.00 | 6.69 | 14.00 | 0.16 |
| 5 | 52.00 | 1.08 | 80.40 | 4.10 | 13.60 | 0.15 |
| 10 | 21.00 | 0.26 | 69.80 | 2.31 | 7.40 | 0.08 |
| 25 | 2.08 | 0.02 | 26.80 | 0.37 | 6.00 | 0.06 |
| $K_d$, average | | 1.05 | | 3.37 | | 0.11 |

Figure 53:
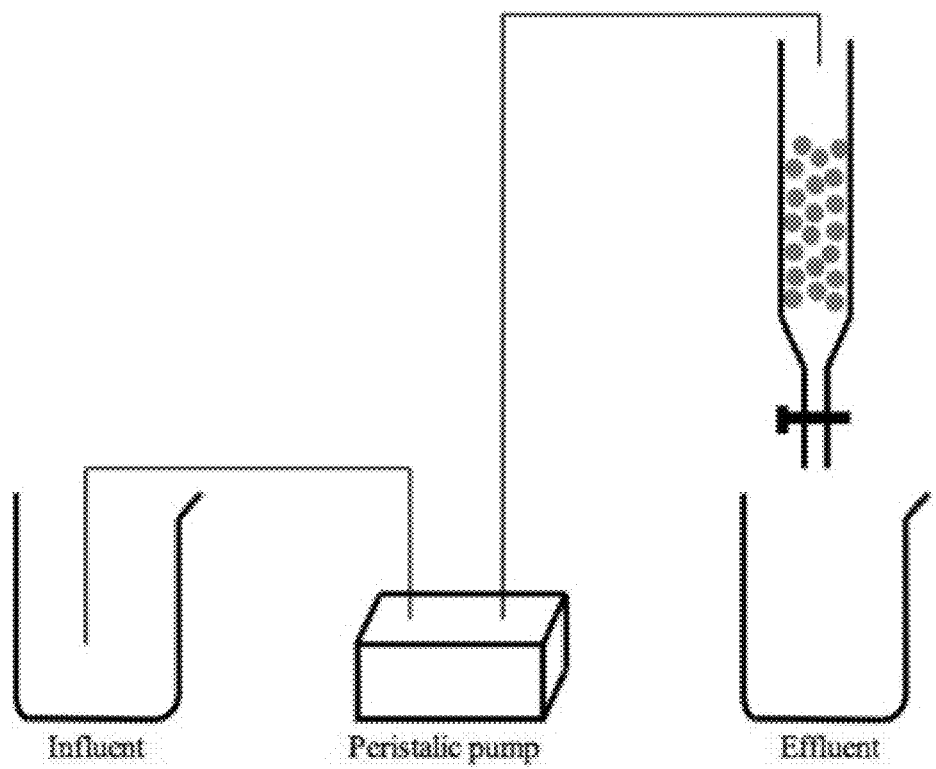
FIG. 53 shows a column test schematic.

ZnS—Z Particles Regeneration. In this section, four adsorption/desorption cycles were conducted for Pb, to investigate the adsorption/desorption behavior of ZnS—Z once it has been regenerated three times. Column test was employed to saturate the adsorbents particles with Pb. A column with a height of 200 mm and an internal diameter of 10 mm was used. The column was packed with 4.00 g of ZnS—Z to make a height of 50 mm. the column was then operated in such a manner that 1000 mL of 100 ppm lead solution was constantly added to it by using a peristaltic pump and allowing it to flow along gravity in down-flow mode with a constant flow rate of 0.08 mL/s. The rate of flow was monitored by measuring the amount of lead solution in mL flowing per minute at regular time intervals. Once the column was started, samples were collected at different time intervals. The process was continued until the whole 1000 mL lead solution is passed the column. Samples were taken to ICP-MS to measure the lead concentration in the samples. FIG. 53 shows schematics of the column test setup.

The main design parameters of this system are the contact time, and linear velocity which are shown in Equations (21-23):

$$\text{contact time} = \frac{\text{Bed volume } (m^3) * 60\left(\frac{\min}{h}\right)}{\text{Flow rate } \left(\frac{m^3}{h}\right)} = 0.82 \text{ min} \quad (21)$$

$$\text{linear velocity} = \frac{\text{Flow rate } \left(\frac{m^3}{h}\right) * \frac{h}{60 \min}}{\text{Surface area } (m^2)} = 0.06 \text{ m/min} \quad (22)$$

$$\text{space velocity} = \frac{\text{Flow rate } \left(\frac{m^3}{h}\right)}{\text{Bed volume } (m^3)} = 73.38 \text{ hr}^{-1} \quad (23)$$

In Table 9E all the parameters of the column test are listed.

TABLE 9E

Column test parameters.

| Parameter | Value |
|---|---|
| Particles diameter, mm | 0.70-1.00 |
| Column height, mm | 200 |
| Bed height, mm | 50 |
| Bed diameter, mm | 10 |
| Flow rate, mL/sec | 0.08 |
| Contact time, min | 0.82 |
| Linear velocity, m/min | 0.06 |
| Space velocity, hr$^{-1}$ | 73.38 |
| Influent concentration, ppm | 100 |

ZnS—Z was saturated with lead and exposed to regeneration cycles, each followed by re-functionalization of the used adsorbent, without going through the entire fabrication process. The reason for the re-functionalization step was to increase the lifetime of the adsorbent before full regeneration. The desorbent agent that that promoted the highest lead recovery (65.0%) from ZnS—Z was HNO$_3$, when compared to the other two desorbent agents (57.0% and 8.0% for HC and H$_2$SO$_4$, respectively), as shown in Table 9F.

TABLE 9F

Percentage of lead recovered from ZnS-Z when exposed to three desorbent agents

| | Lead recovery (%) | | |
|---|---|---|---|
| Time (hr) | HNO$_3$ | HCl | H$_2$SO$_4$ |
| 3 | 47.0 | 28.5 | 4.0 |
| 6 | 55.0 | 36.0 | 5.0 |
| 24 | 65.0 | 57.0 | 8.0 |

Figure 57:
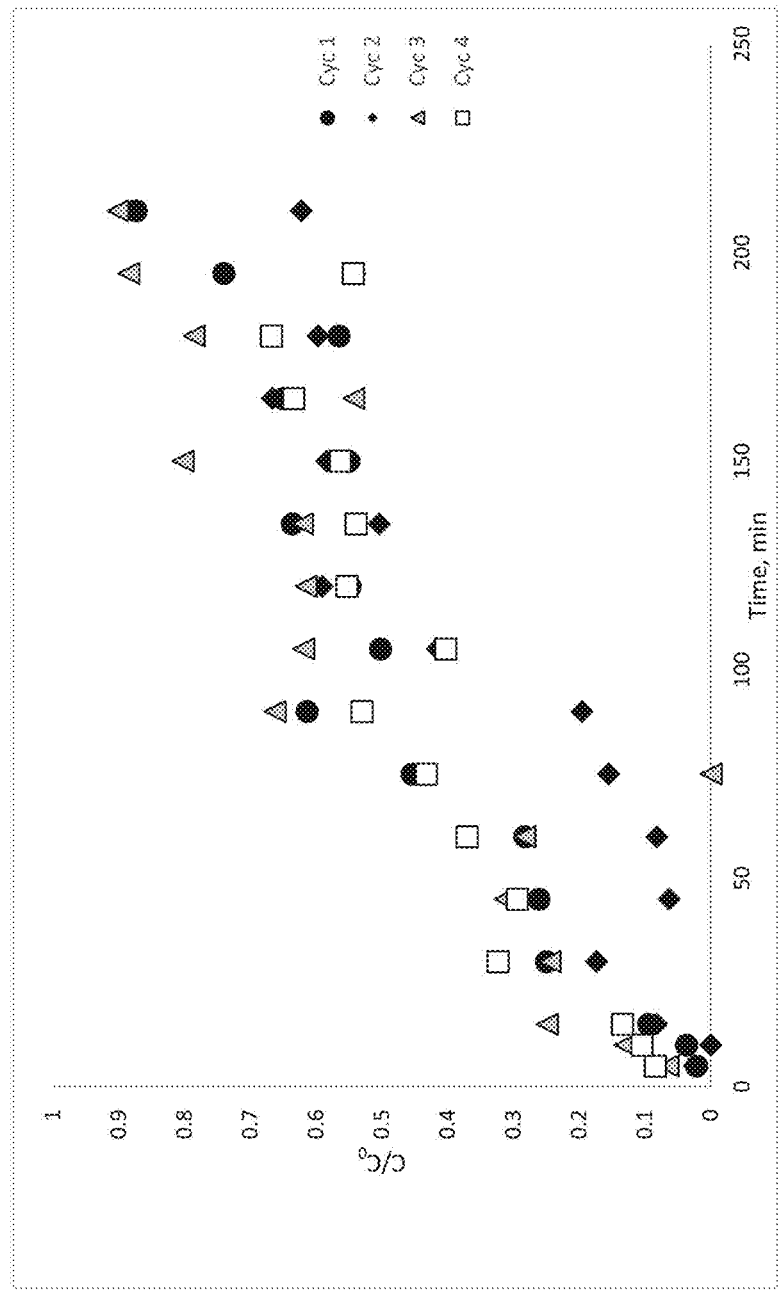
FIG. 57 shows regeneration cycles for Pb removal by using ZnS—Z.

The desorption was completed by using a 10% HNO$_3$ solution. After the desorption step, particles were re-functionalized according to the sonochemical process explained earlier in this paper. FIG. 57 shows $C_t/C_0$ ($C_t$ is Pb concentration in effluent at time t, $C_0$ is the effluent initial concentration) plots against time.

In this study, the material was exposed to harsh conditions to test the limit of the material: 1000 mL of lead solution with 100 ppm concentration. The removal efficiencies reached 63% for the first cycle, 61% for cycles 2 and 3 and 59% for cycle 4, as shown in Table 9G. No significant reduced regeneration efficiency was found up to four cycles. Although the removal efficiencies are low for conventional regeneration studies where the adsorbent is exposed to mild conditions, it is also evidence that the material is very resilient.

As seen in Table 9G during the first four cycles of adsorption/desorption, the regenerated ZnS—Z retained its removal efficiency. One main reason that accounts for this behavior is the fact that re-functionalization step can modify ZnS—Z structure by introducing functional groups to the particles. During the adsorption and/or desorption process, ZnS—Z can possibly lose some of its functional groups, so the re-functionalization step helps the particles to regain their functional groups. No reduced regeneration efficiency was found up to four cycles.

TABLE 9G

Removal efficiency for regenerated ZnS-Z particles.

| | Cycle 1 | Cycle 2 | Cycle 3 | Cycle 4 |
|---|---|---|---|---|
| Removal efficiency, % | 63 | 61 | 61 | 59 |

Conclusion. Zinc sulfide nanostructures (ZnS—Z) were successfully formed on the zeolite structure by employing a sonochemical process. As an outcome, ZnS—Z particles had higher adsorption capacity when compared to the base material, CZ, enhancing the adsorption capacity by a factor of 2 and 30 for lead (43 mg/g) and mercury (215 mg/g), respectively. This research represents a very important step toward engineered natural materials for enhanced adsorption for the removal of heavy metals from drinking water as single media or additive in Point of Use (POU) and Point of Entry (POE) Systems. In addition, Langmuir model described Pb and Hg sorption. Isotherm models along with the mass balance in the system were able to predict the equilibrium residual concentration for Pb and Hg adsorption on ZnS—Z. The effect of competing ions on the adsorption was studied in a mixed system including lead, mercury, and nickel ions. Hg demonstrated a higher affinity for adsorption sites relative to Pb and Ni. ZnS—Z particles were regenerated and have been used multiple cycles in a column test. ZnS—Z retained its adsorption capacity after being regenerated and re-used.

Example 10

Application of Isotherm Models to Predict: Equilibrium Concentration, Removal Efficiency, Adsorption Capacity, and Required Amount of Adsorbent In this Example, equations are developed to predict the equilibrium concentration ($C_e$), the removal efficiency (R %), the adsorption capacity ($q_e$), and the required amount of adsorption (M). Isotherm models used as explained in this chapter.

Langmuir Isotherm. In Langmuir model, the solid is assumed to have an adsorption capacity as $q_{max}$. In this model: (a) all adsorption sites are assumed to be identical, (b) each site adsorbs one molecule of the adsorbate material, and (c) all sites are independent energetically. Holding these assumptions true, the following reaction can be considered as shown in Equation (24):

Free site+solute⇌surface complex (24)

And Langmuir isotherm is equation (25):

$$\frac{1}{q_e} = \left(\frac{1}{K_L q_{max}}\right)\frac{1}{C_e} + \frac{1}{q_{max}} \tag{25}$$

Where $q_e$ is adsorbate mass adsorbed per unit adsorbent mass at equilibrium (mg/g), $K_L$ is Langmuir isotherm constant (L/mg), $C_e$ is adsorbate concentration at equilibrium (mg/L), and $q_{max}$ is the maximum adsorption capacity (mg/g). Maximum adsorption capacity, $q_{max}$, can also be expressed as $N_t$, which is a measure of the total number of functional groups available per gram of adsorbent.

Figure 58:
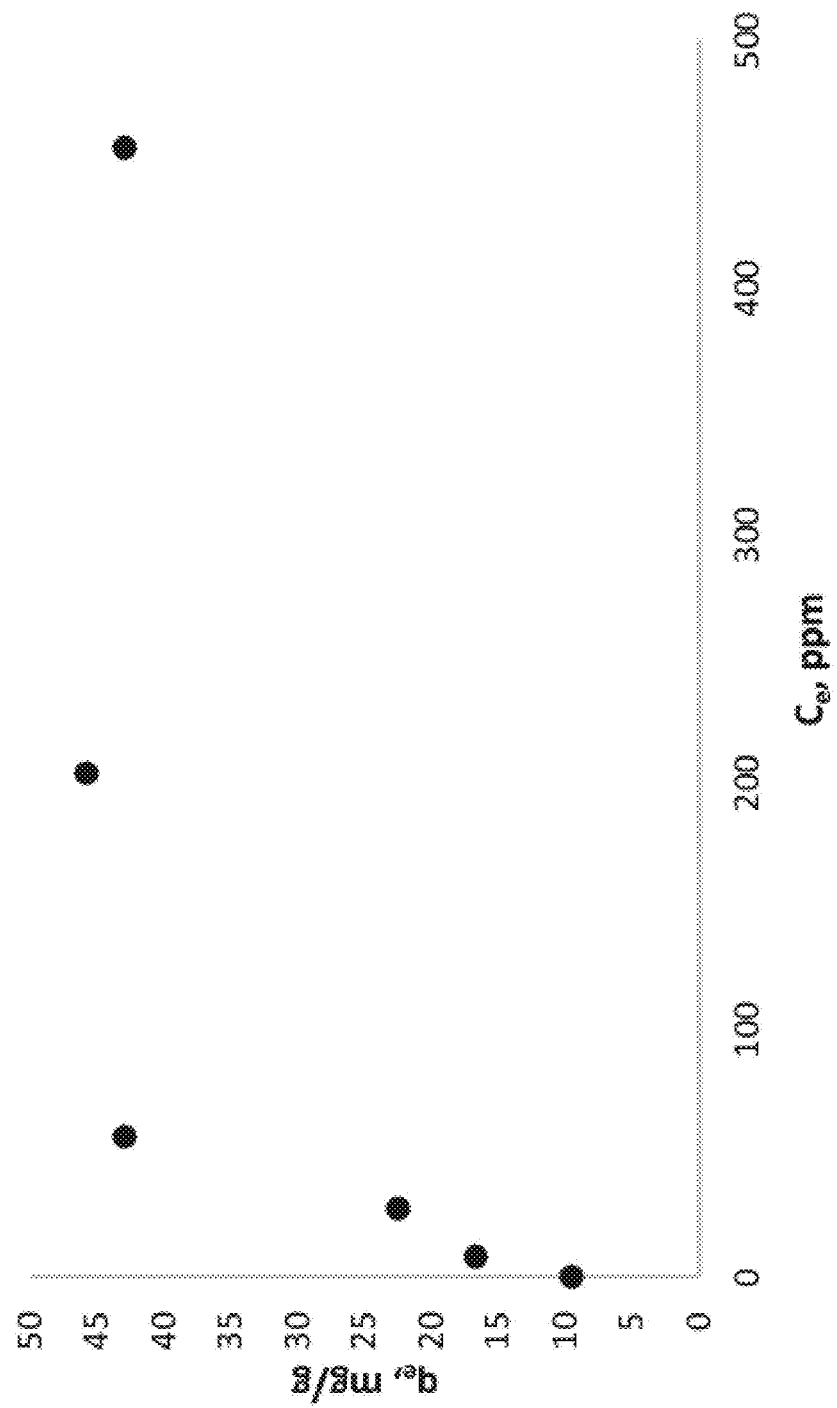
FIG. 58 shows an isotherm plot for lead removal tests by using ZnS—Z at pH=5.

Lead solution with initial concentrations of 10, 25, 50, 100, 250 and 500 ppm at a pH level of 5 were employed for the batch tests. Lead removal tests were conducted by using 0.20 g of ZnS—Z in 200 mL of the solution. The solution was mixing over 24 hours at 200 rpm at room temperature to reach the equilibrium state. FIG. 58 shows the isotherm plot for lead removal experiments.

Figure 59:
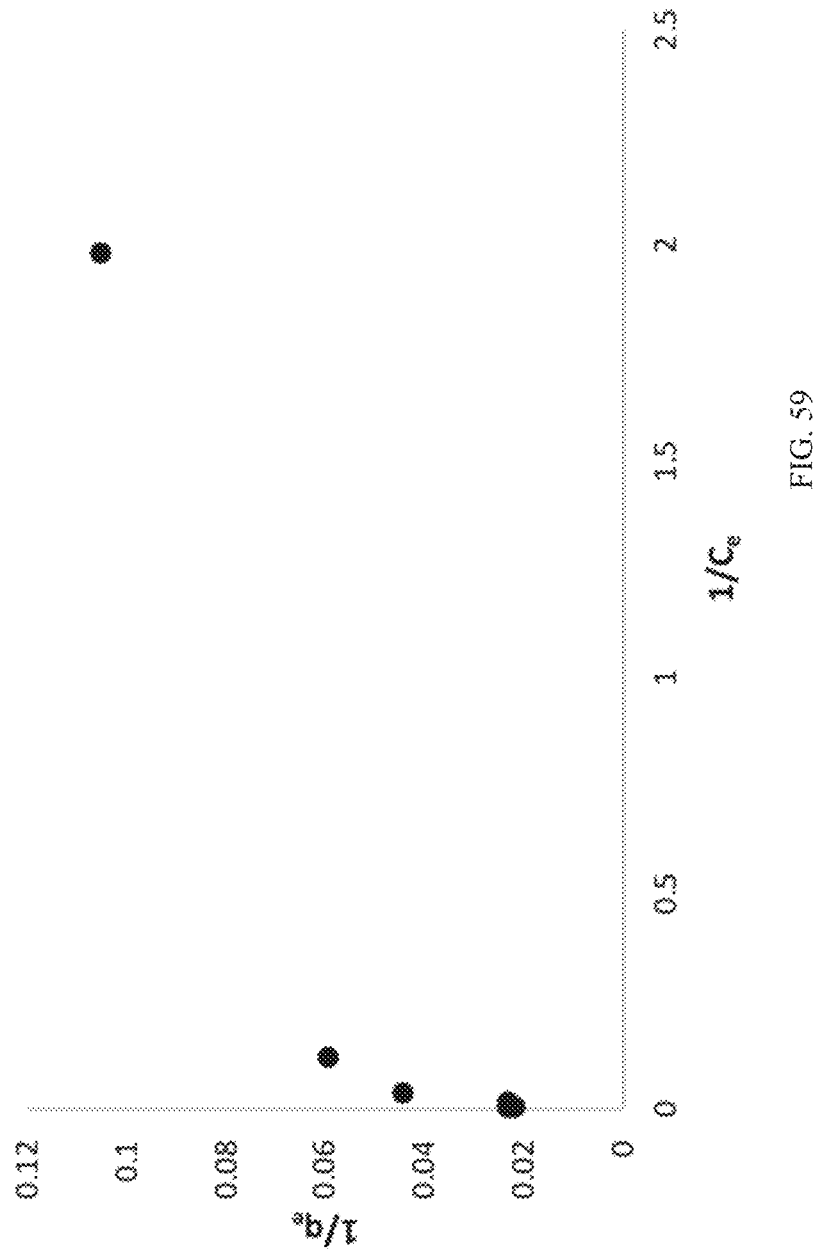
FIG. 59 shows a Langmuir plot for lead removal tests by using ZnS—Z at pH=5.

In Equation (25), $1/q_e$ can be plotted as a function of $1/C_e$. When the data shows a good linearity, the adsorption process is considered to follow Langmuir isotherm. $K_L$ and $q_{max}$ can be calculated by using slope and intercept, respectively. FIG. 59 shows the Langmuir model plot for removal batch tests at pH=5. Calculated parameters are listed in Table 10A.

TABLE 10A

Langmuir model parameters for lead removal tests by using ZnS-Z at pH = 5.

| Parameter | Value |
|---|---|
| $R^2$ | 0.826 |
| $q_{max}$, mg/g | 30.487 |
| $K_L$, L/mg | 0.879 |

In this study, the mass balance in the batch was also used as shown in Equation (26):

$$V \cdot C_0 = V \cdot C_e + V \cdot C_e^s \tag{26}$$

Where $C_0$ is the initial concentration of the solute, $C^y$ is the concentration of the solute on adsorbent at the equilibrium. Equilibrium adsorption capacity $q_e$ can be expressed in terms of solution volume, V, and adsorbent mass, M, as Equation (27):

$$q_e = \frac{V \cdot C_e^s}{M} = \frac{V(C_0 - C_e)}{M} \tag{27}$$

Substituting Equation (27) in Equation (25), gives the following second-order function in which $C_e$ is one argument variable, Equation (28):

$$K_L C_e^2 + \left(1 + \frac{K_L \cdot q_{max} \cdot M}{V} - K_L \cdot C_0\right) \cdot C_e - C_0 = 0 \tag{28}$$

All variables other than $C_e$ were considered as constants, and $C_e$ can explicitly be solved:

$$K_L = a \tag{28.1}$$

$$\left(1 + \frac{K_L \cdot q_{max}}{V} - K_L \cdot C_0\right) = b \tag{28.2}$$

$$C_0 = c \tag{28.3}$$

$$C_e = \frac{-b \pm \sqrt{b^2 - 4ac}}{2a} \tag{28.4}$$

The calculated $C_e$ is a function of $C_0$ and M for a specific V with parameters $K_L$ and $q_{max}$. Once $K_L$ and $q_{max}$ were obtained from the conducted set of adsorption experiments (Table 26), equilibrium solute concentrations were calculated for the given initial solute concentration and adsorbent mass in a fixed volume. Calculated values were plotted versus the experimental values of equilibrium concentration ($C_e$), and is shown in FIG. 60.

Figure 60:
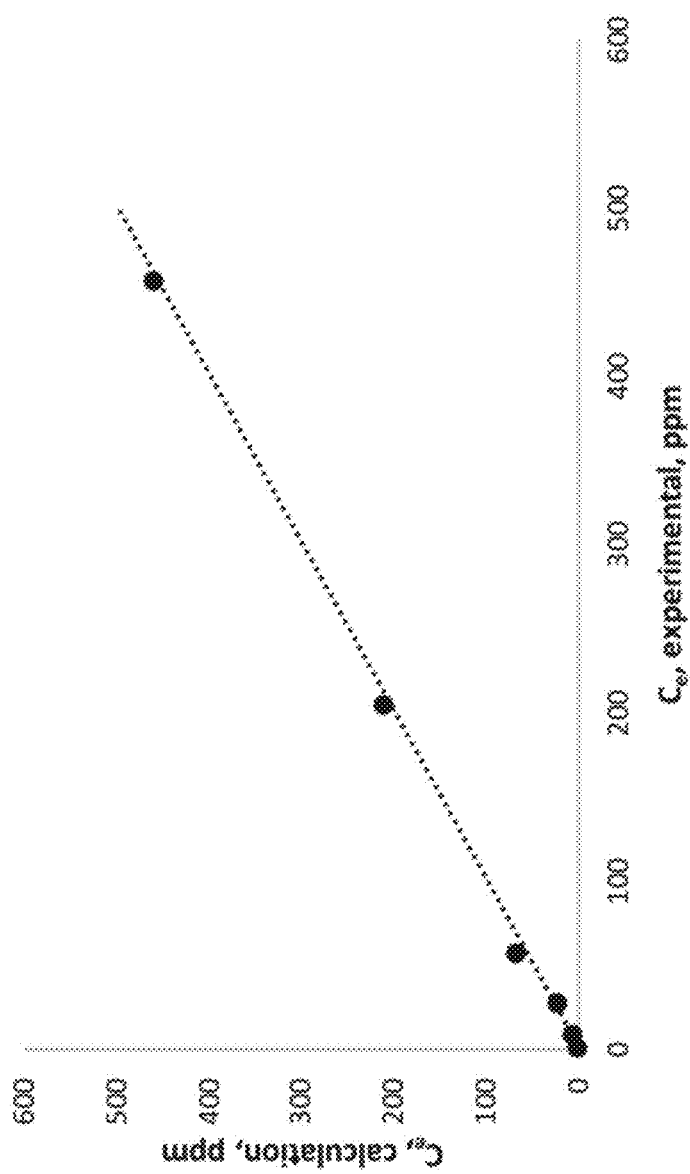
FIG. 60 shows calculated versus experimental values of $C_e$, by using Langmuir model.

As shown in FIG. 60, calculated values for equilibrium concentrations, $C_e$, are in agreement with the experimental values.

After finding $C_e$, removal efficiency, R, can also be calculated as a function of $C_0$ and M by using Equation (29).

$$R = \frac{C_0 - C_e}{C_0} \tag{29}$$

Also, for a given $C_0$ and target removal efficiency, the model equation to predict the required mass of adsorbent can be obtained by using Equation (30):

$$M = \frac{V \cdot R}{K_L \cdot q_{max} \cdot (1-R)} + \frac{V \cdot R}{q_{max}} \cdot C_0 \quad (30)$$

Modified Langmuir Equation. If one investigates the Langmuir model in generate detail, and considers its theoretical background that can be explained as a reversible adsorption and desorption process for A species, the equation will be expressed as Equation (31):

$$A + V \rightleftarrows A_{ad} \quad (31)$$

Where V and $A_{ad}$ are the vacant and occupied sites, respectively. The respective rates for adsorption and desorption can be expressed by Equations (32-33):

$$r_a = k_a C(1\theta) \quad (32)$$

$$r_d = k_d \theta \quad (33)$$

where C is solute concentration and θ is surface coverage. This coverage θ also can be defined as $q/q_{max}$, where q is the adsorption capacity and $q_m$ is maximum adsorption capacity, respectively.

When in equilibrium, $r_a = r_d$, yielding the Langmuir isotherm, modelled in Equations (34-35):

$$\theta_e = \frac{K_L C_e}{1 + K_L C_e} \quad (34)$$

Or $$q_e = \frac{q_m K_L C_e}{1 + K_L C_e} \quad (35)$$

where $K_L = K_a/K_d$ is the Langmuir equilibrium constant.

Equation (32) shows that the rate of adsorption depends on the fraction of available vacant sites, and the concentration of the solute. This means that the forward adsorption rate approaches zero when the available vacant sites are being occupied by the adsorbate, or in other words, when the adsorbent is saturated by solute, θ0=1. In equation (32) the term (1θ) is the limiting factor for the adsorption rate. On the other hand, in equation (33), it shows that the desorption rate only depends on the surface coverage, θ, without the concentration of the solute being considered as a factor. Following the statistical rate theory differences in chemical potential ($\mu_s - \mu_b$) of solute in adsorbent phase ($\mu_s$) and solution phase ($\mu_b$) is the driving force of the desorption reaction. Therefore, solute concentration is a parameter affecting the desorption process. For example, if we consider two systems with adsorbents that have similar surface coverage and are in contact with solutions of differing solute concentrations, $C_1 < C_2$. According to the Langmuir model the desorption rate in these two systems should be similar since the rate of desorption only depends on surface coverage, θ. However, the solute chemical potential in solution $\mu_b$ is not identical between the two systems. The tendency of the solute to be desorbed from the adsorbent's surface is greater in the system with a lower solute concentration in the solution, system 1. Thus, it can be concluded that desorption is affected by the solution's solute concentration. As soon as the bulk solution is saturated by the solute ($C_s$), there will be no further unidirectional desorption occurring, so it can be said that desorption is possible in an unsaturated solution, with its highest rate of desorption at C=0. The lowest rate, on the other hand, is when C→$C_s$. This leads to the conclusion that the rate of desorption is proportional to $C_s$–C, as shown in Equation (36):

$$r_d = k_d(C_s - C)\theta \quad (36)$$

Equating Equations (32) and (36) at equilibrium yields Equations (37) and (38):

$$\theta_e = \frac{K_{ML} C_e}{(C_s - C_e) + K_L P_e} \quad (37)$$

Or, $$q_e = \frac{q_m K_{ML} C_e}{(C_s - C_e) + K_{ML} C_e} \quad (38)$$

where $K_{ML}$ is the modified Langmuir equilibrium constant, and $C_s$ is solute solubility in water. It is important to note that $K_{ML}$ is a dimensionless constant.

Finally, the linear form of this equation can be written as Equation (39):

$$\frac{1}{q_e} = \frac{C_s}{K_{ML} q_m C_e} + \frac{(K_{ML} - 1)}{K_{ML} q_m} \quad (39)$$

Plotting $1/q_e$ versus $1/C_e$ yields a straight line with a slope of $C_s/K_{ML} q_m$ and an intercept value of $(K_{ML}-1)/K_{ML} q_m$. The shape of this plot will be identical to the Langmuir model plot, because the $q_e$ and $C_e$ values are determined experimentally and regardless of the model which is used to fit the data. $C_s$ values are available in. Since in this study lead solutions were prepared by using lead nitrate, $Pb(NO)_3$, the solubility of lead nitrate in water at room temperature was used to calculate the $C_s$ value for lead. Lead nitrate solubility in water at room temperature equals 597 g/L, and this equals 373.485 g/L lead ions. Calculated values of the modified Langmuir model are listed in Table 10B.

TABLE 10B

Calculated values of the modified Langmuir model for ZnS-Z at pH = 5.

| Parameter | Value |
|---|---|
| $R^2$ | 0.826 |
| $C_S$, mg/L | 373.485 * $10^3$ |
| $q_m$, mg/g | 30.497 |
| $K_{ML}$ | 3.287 * $10^5$ |

As can be seen in Tables 10A-10B, calculated values of $q_m$ are very close: 30.487 versus 30.497 for Langmuir and modified Langmuir models, respectively. This can be addressed by considering the range of solute concentration at which the experiments were carried out. The most concentrated solution had a concentration level of 500 ppm (500 mg/L), while the solubility of the solute was 373.485*$10^3$ mg/L. Which means the solubility of the solute is about 747 times and 830 times larger than initial and equilibrium concentrations of the solute respectively. It can be concluded that the tendency of the solute to be desorbed from the adsorbent's surface is high in the system where the equilibrium concentration is negligible compared to the saturation concentration of the solute.

Freundlich Isotherm. Freundlich isotherm is the most commonly used model that explains the non-ideal and reversible adsorptions. This model is not limited to the formation of a monolayer on the adsorbent surface, so it can be applied to multilayer adsorption systems. Considering multilayer adsorption, the total quantity adsorbed is the summation of adsorption on all sites, where sites possessing greater binding activity are occupied first until the adsorption energy has decreased to the point of adsorption process completion. The Freundlich model is based on the relation between the adsorbed quantity ($q_e$) and the concentration of remaining solute ($C_e$), equation (40):

$$q_e = K_F \cdot C_e^{1/n} \tag{40}$$

Where $K_F$ is the Freundlich isotherm constant ($L^{1/n}$ $mg^{(1-1/n)}/g$), and $1/n$ is the Freundlich exponent (n=index of heterogeneity). Equation (17) can be written in linear form as shown in Equation (41):

$$\log q_e = \frac{1}{n} \log C_e + \log K_F \tag{41}$$

Figure 61:
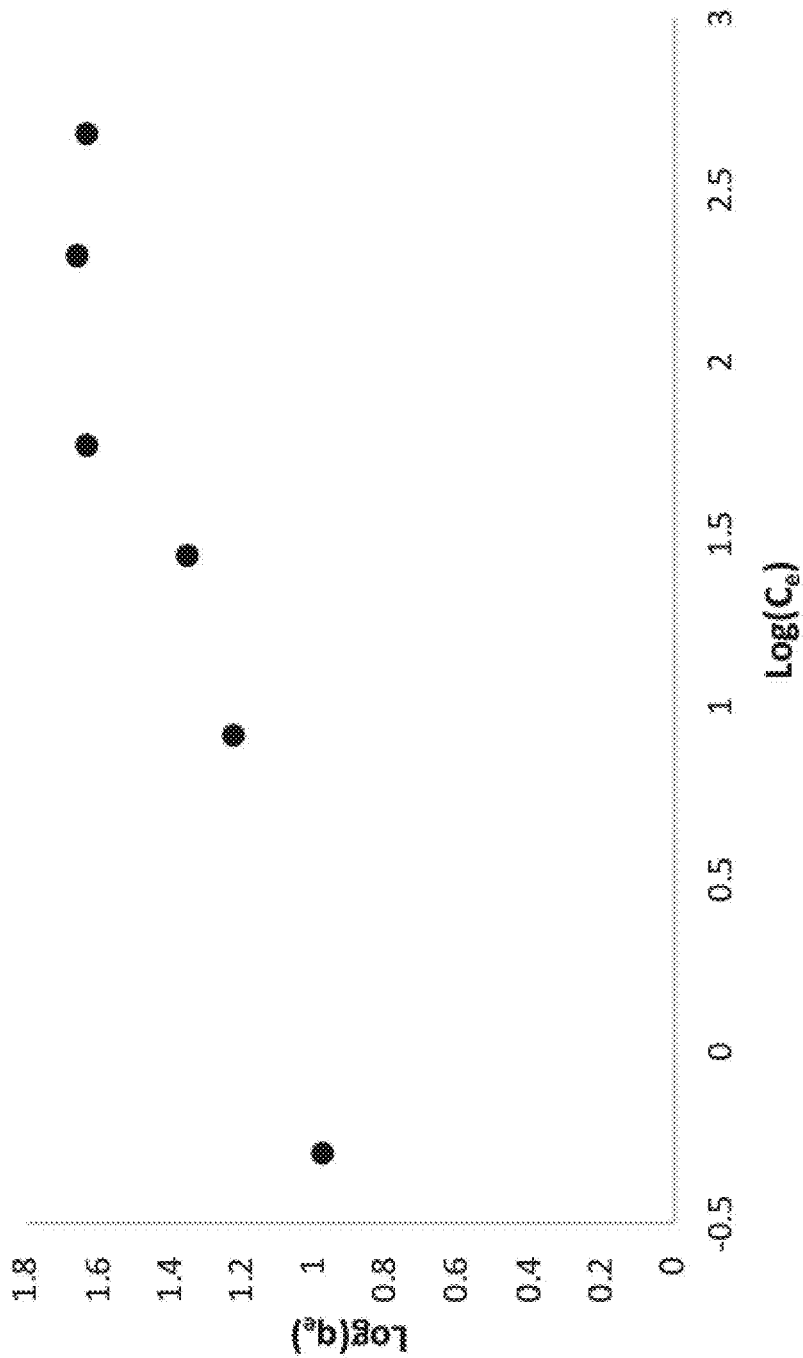
FIG. 61 shows Freundlich plot for lead removal tests by using ZnS—Z at pH=5.

Like the Langmuir adsorption isotherm, Equation (41) was used to evaluate whether or not the adsorption process satisfies the Freundlich isotherm. To do this, the data from the batch experiments were employed. FIG. 61 shows the Freundlich isotherm plot for lead removal experiments.

Calculated parameters for the Freundlich isotherm are listed in Table 10C. As can be seen in FIG. 61 and Table 10C the experimental results showed appreciable linearity, $R^2=0.910$, meaning that the adsorption process was considered to follow Freundlich isotherm.

TABLE 10C

Freundlich isotherm constants for ZnS-Z at pH = 5.

| Parameter | Value |
|---|---|
| $R^2$ | 0.910 |
| 1/n | 0.251 |
| $K_F$ | 11.145 |

Reformulating the Freundlich isotherm with mass balance in the system can be expressed as Equation (42):

$$\frac{K_F M}{V} \cdot C_e^{1/n} + C_e - C_0 = 0 \tag{42}$$

In which, $C_e$ is the argument variable. Again, $C_e$ is a function of $C_0$ and M for a specific V with parameters $K_F$ and $1/n$.

Figure 62:
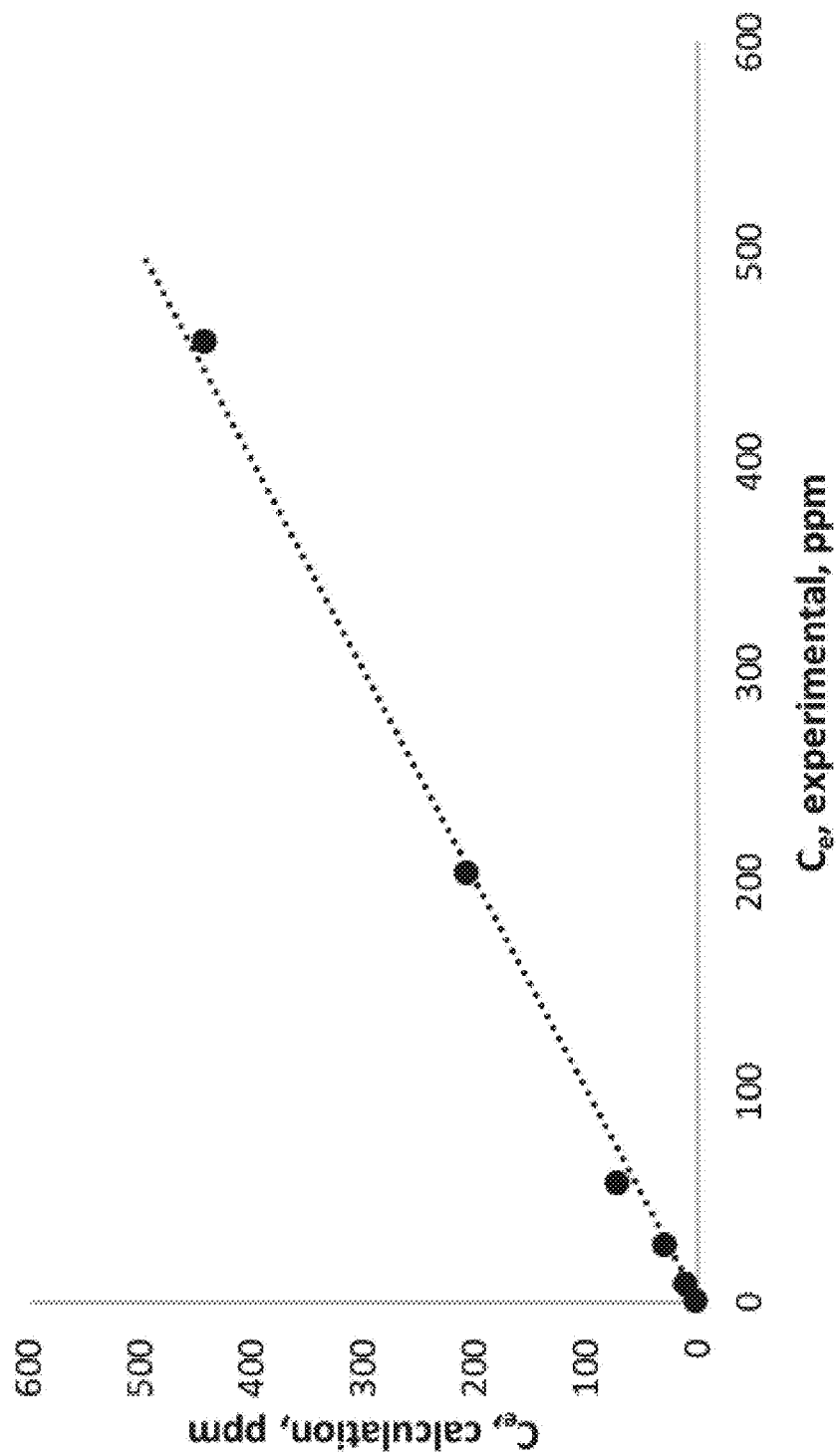
FIG. 62 shows calculated versus experimental values of $C_e$, by using Freundlich model.

Once $K_F$ and $1/n$ were obtained from the conducted set of adsorption experiments (Table 28), equilibrium solute concentrations were calculated for the given initial solute concentration and adsorbent mass in a fixed volume. Calculated values were plotted versus the experimental values of equilibrium concentration ($C_e$), and is shown in FIG. 62. As shown in FIG. 62, calculated values for equilibrium concentrations, $C_e$, are in agreement with the experimental values.

The required mass of the adsorbent for the desired removal efficiency can also be derived as equation (43):

$$M = \frac{V}{K_F} \frac{R}{(1-R)^{1/n}} C_0^{(1-1/n)} \tag{43}$$

pH-dependent Model. As described in the following section, all experiments were carried out at a constant pH level. Therefore, all the derived equations are only valid for the pH level at which the experiments are conducted. In order to develop a model with the ability to predict the equilibrium residual concentration at different pH levels, experiments were conducted to generate adsorption isotherm data across multiple pH values. All the data sets were able to be fitted to the Langmuir model, and $K_L$ values were calculated across the experimental range of pH values. Considering the $K_L$ value as a criterion for the affinity between adsorbent and adsorbate, it was assumed that the value of $K_L$ could vary with the change of solution pH. To obtain the relationship between $K_a$ and pH: log ($K_a$) values were plotted against pH. The linear relationship is described using Equation (44):

$$\text{Log } K_a = m^*\text{pH} + d \tag{44}$$

where m and d are line fitting parameters.

Substituting Equation (44) in Equation (28) will give:

$$(10^{m*pH+d})C_e^2 + \left(1 + \frac{(10^{m*pH+d}) \cdot q_{max}}{V} - (10^{m*pH+d}) \cdot C_0\right) \cdot C_e - C_0 = 0 \tag{45}$$

This analytical equation can be used to describe variation in adsorption at differing pH values using a consistent set of isotherm parameters.

Figure 63A:
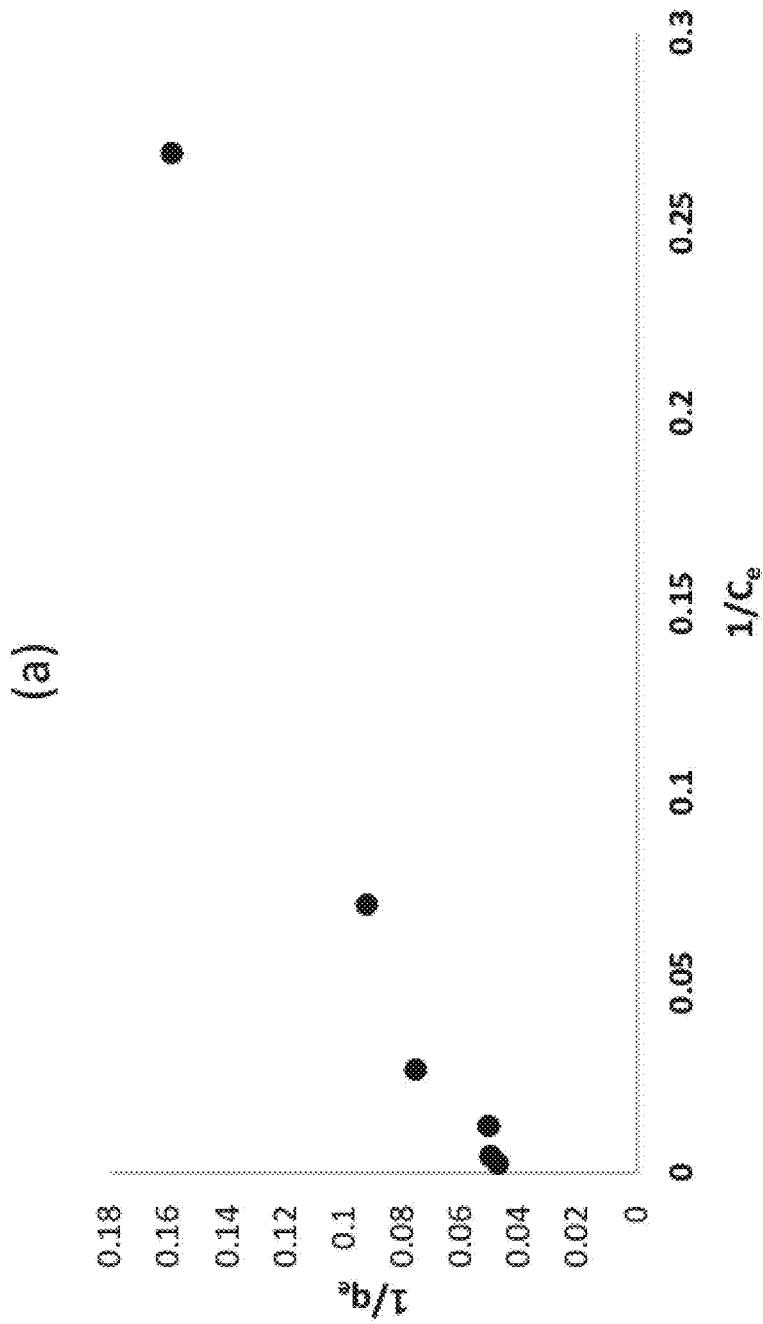
FIG. 63A shows Langmuir plot for lead removal test by using ZnS—Z at pH=3.
Figure 63B:
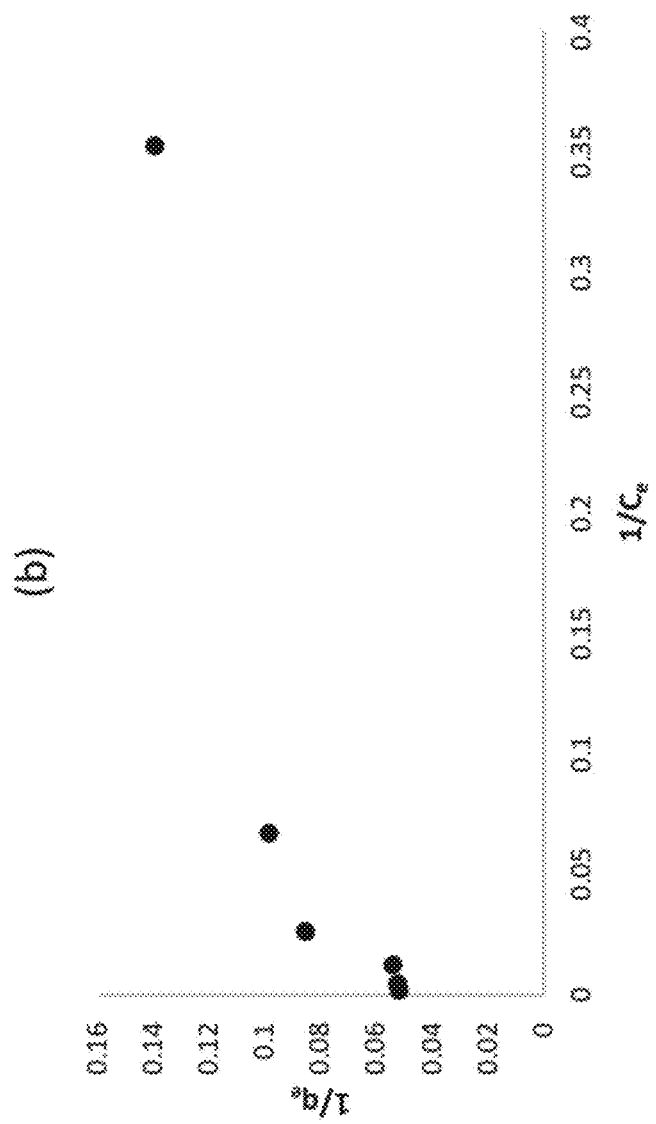
FIG. 63B shows Langmuir plot for lead removal test by using ZnS—Z at pH=4.

To verify the hypothesis, the data set were generated by performing lead adsorption tests on ZnS—Z at pH levels of 3 and 4. The data were fitted with the Langmuir model and are shown in FIG. 63A-63B. The estimated values of $K_L$ are summarized in Table 10D.

TABLE 10D

Langmuir isotherm parameters for lead adsorption on ZnS-Z at pH = 3 and pH = 4.

| | | pH = 3 | pH = 4 |
|---|---|---|---|
| Langmuir isotherm | $R^2$ | 0.961 | 0.820 |
| | $q_{max}$, mg/g | 18.780 | 19.223 |
| | $K_L$, L/mg | 0.130 | 0.270 |

Figure 64:
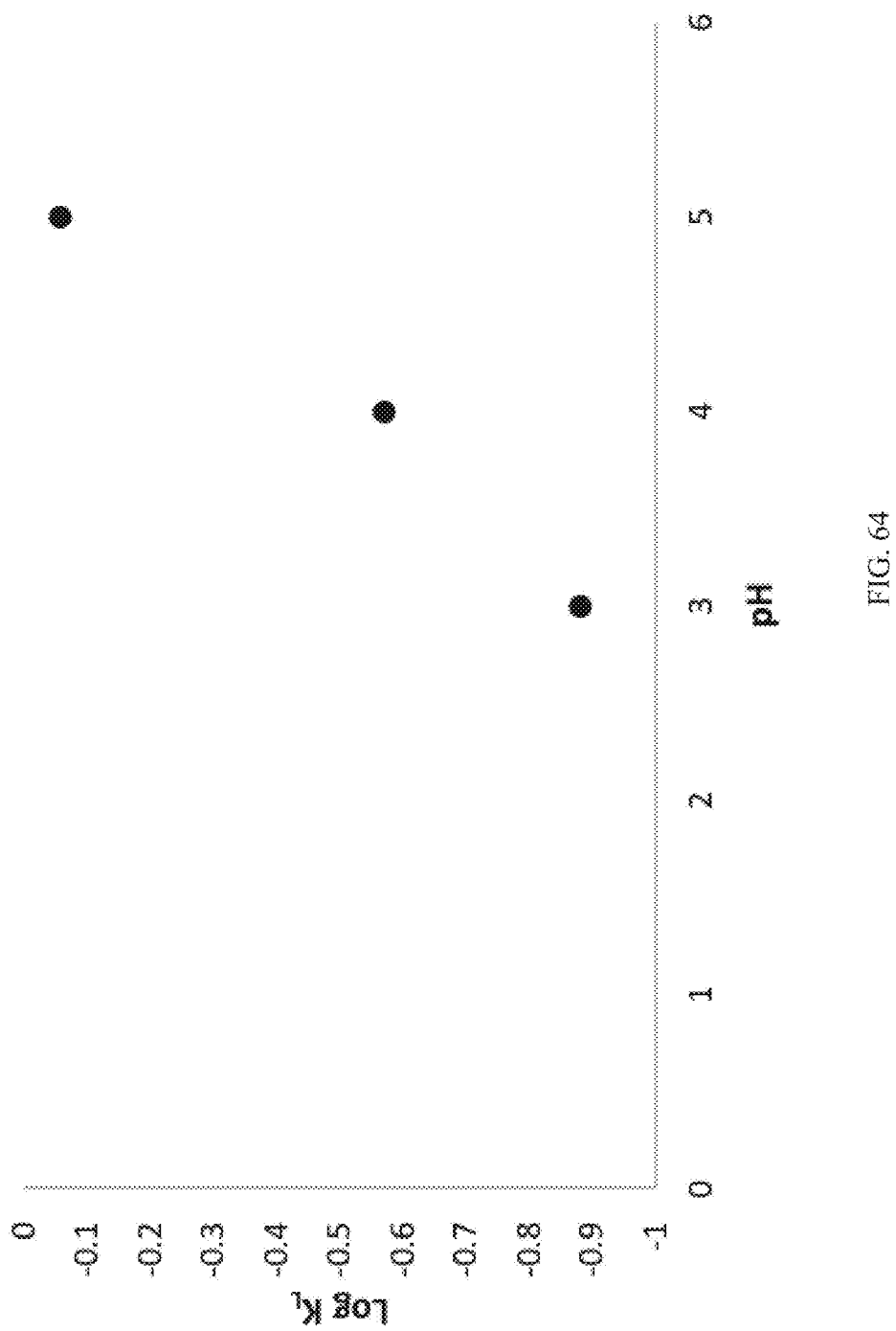
FIG. 64 shows Langmuir constant ($K_L$) vs. pH for lead adsorption on ZnS—Z.

To establish a relationship between $K_L$ and pH, Log($K_L$) values were plotted against pH values as shown in FIG. 64. The $R^2$ value for the linear fit was 0.98 and the linear equation is shown in Equation (46):

$$\text{Log}(K_L) = 0.41 \text{ pH} - 2.14 \tag{46}$$

Substituting Equation (46) in Equation (45):

$$(10^{0.41*pH-2.14})C_e^2 + \left(1 + \frac{(10^{0.41*pH-2.14}) \cdot q_{max} \cdot M}{V} - (10^{0.41*pH-2.14}) \cdot C_0\right) \cdot C_e - C_0 = 0 \tag{47}$$

Figure 65A:
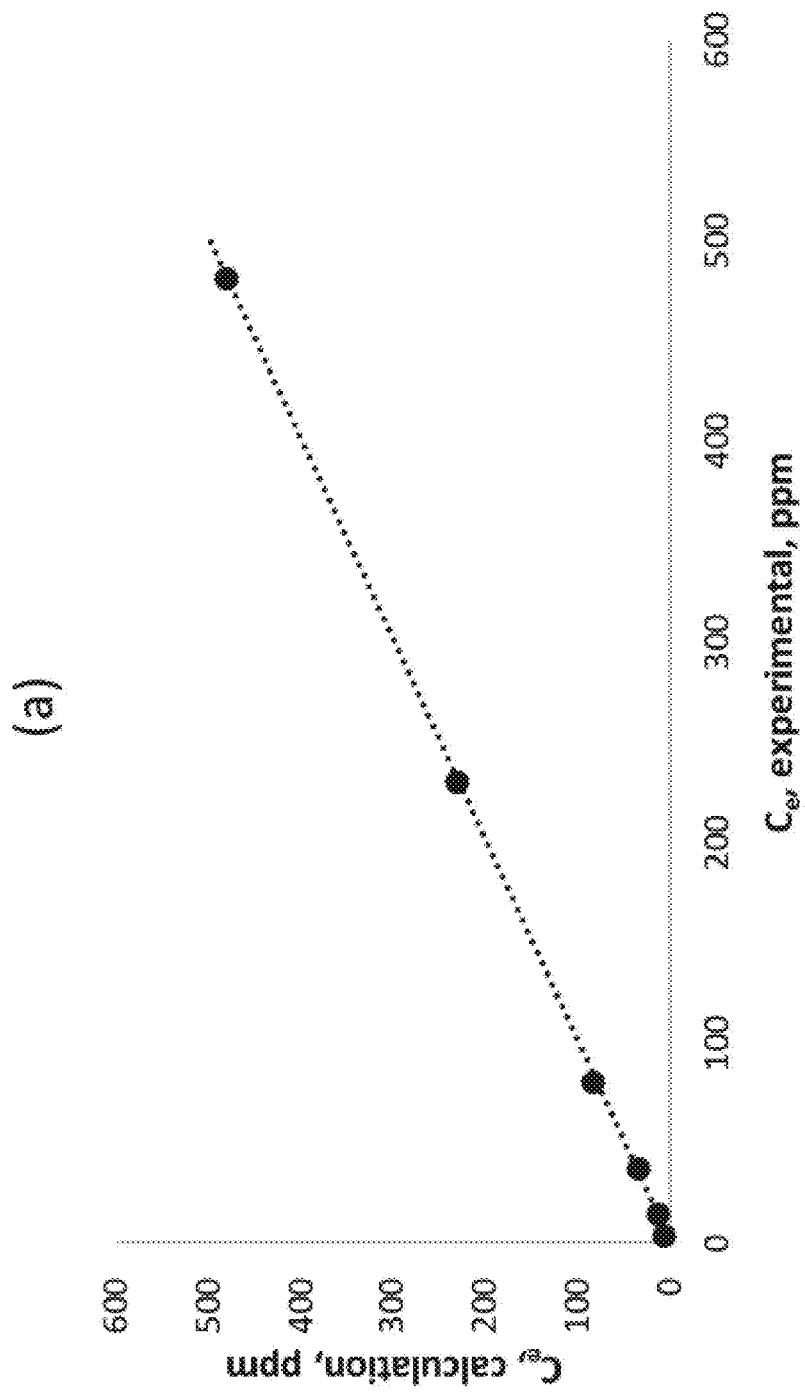
FIG. 65A shows predicted versus experimental values of $C_e$: (a) pH=3.
Figure 65B:
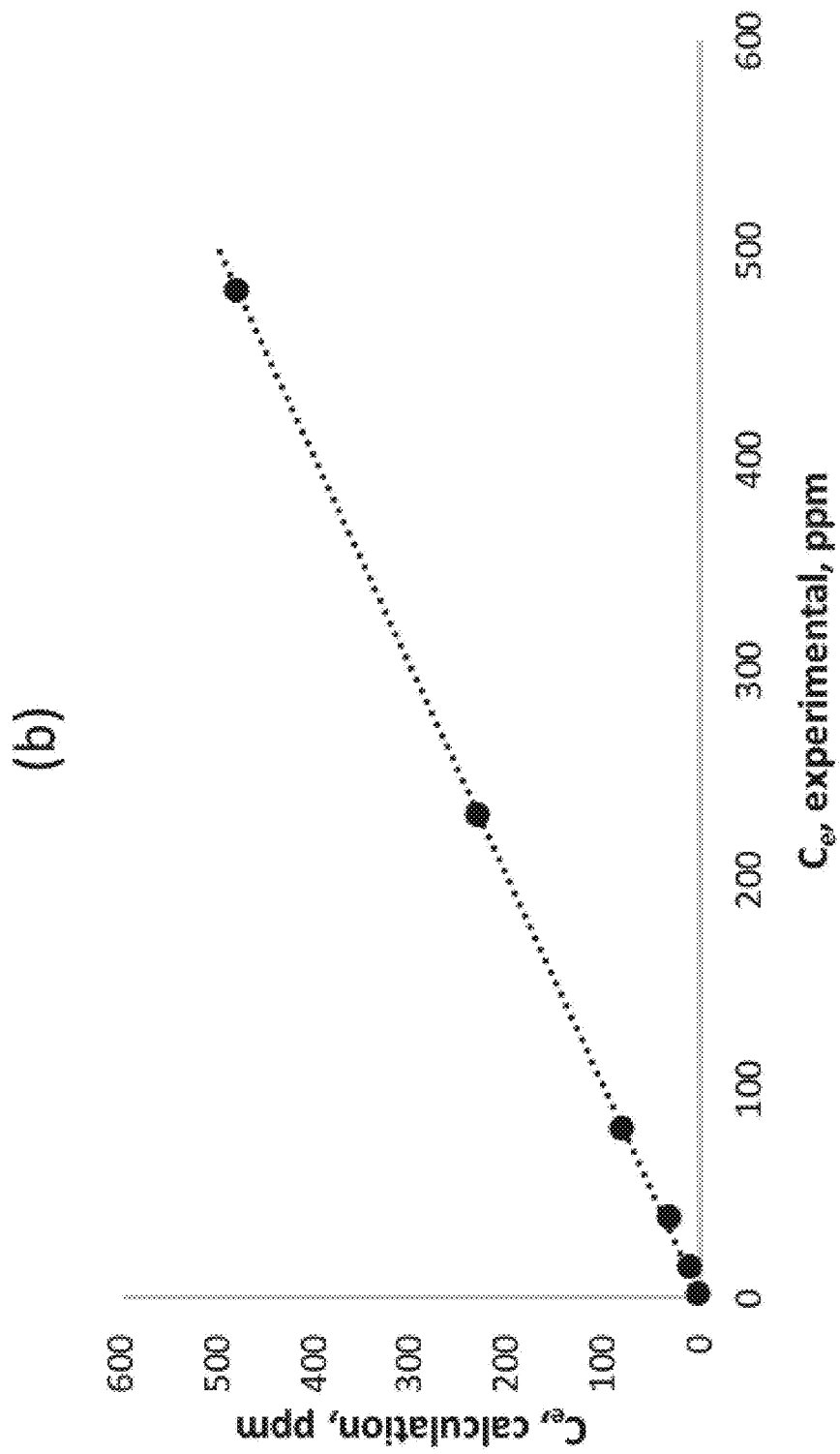
FIG. 65B shows predicted versus experimental values of $C_e$: (b) pH=4.
Figure 65C:
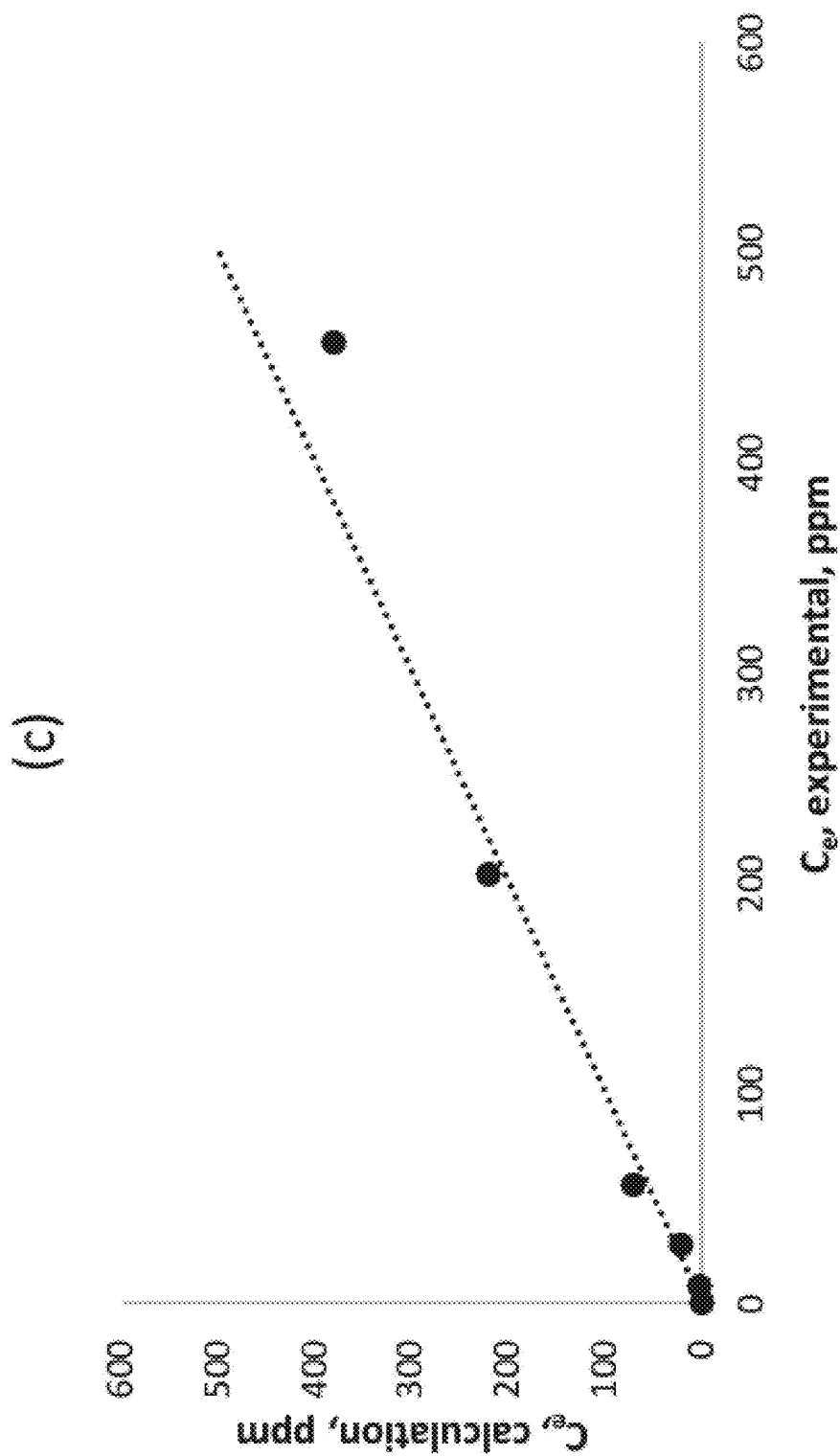
FIG. 65C shows predicted versus experimental values of $C_e$: (c) pH=5.

To validate the ability of Equation (47) to predict the equilibrium residual concentration, predictions for experimental adsorption data was carried out. These predictions were compared with the experimental data of lead adsorption on ZnS—Z at multiple pH values of 3, 4, and 5; the results are summarized in FIG. 65A-65C. This figure shows that Equation (47), as a prediction model, was able to predict experimental data at different pH levels. Predictions were conducted for 6 different initial concentrations and showed an excellent match with experimental data.

Conclusion. By combining the isotherm models with mass balance of lead ions in the liquid and solid phase, equilibrium residual concentration for lead adsorption on ZnS—Z were successfully predicted. An isotherm-based analytical model to predict the equilibrium residual concentration and removal efficiency at multiple pH values was proposed by relating the Langmuir constant ($K_L$) to the solution pH. To validate the prediction models, predicted values were compared with experimental data of lead adsorption on ZnS—Z. The models were able to predict the solute concentration at the equilibrium state, and removal efficiency by using initial solute concentration and adsorbent mass per solution volume. It was further shown that solute initial concentration can be used to estimate the mass of absorbent required for a given removal efficiency. This method becomes an important tool for researchers and water engineers for optimization of adsorbents for removal of lead from water.

The foregoing description of the specific aspects will so fully reveal the general nature of the invention that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A composition comprising
   (a) a zeolite substrate;
   (b) a coating adhered to the zeolite substrate, the coating consisting of graphene oxide and/or reduced graphene oxide, in the form of one or more nanosheets; and
   (c) a surfactant bonded to the one or more nanosheets;
   wherein the one or more nanosheets is adhered to the zeolite substrate by the surfactant.

2. The composition of claim 1, wherein the zeolite substrate is a clinoptilolite zeolite substrate.

3. The composition of claim 1, wherein the surfactant is a cationic surfactant.

4. The composition of claim 3, wherein the cationic surfactant is a quaternary ammonium surfactant.

5. The composition of claim 4, wherein the quaternary ammonium surfactant is a hexadecyl trimethyl ammonium halide.

6. The composition of claim 1, wherein the surfactant is a nonionic surfactant.

7. The composition of claim 1, wherein the surfactant is an anionic surfactant.

8. The composition of claim 1, wherein the coating consisting of graphene oxide in the form of the one or more nanosheets.

9. The composition of claim 1, wherein the coating consisting of reduced graphene oxide in the form of the one or more nanosheets.

10. A method of preparing the composition of claim 1 comprising adhering one or more graphene oxide nanosheets to a zeolite substrate.

11. A composition comprising:
    (a) a zeolite substrate;
    (b) a coating adhered to the zeolite substrate, the coating consisting of graphene oxide and/or reduced graphene oxide, in the form of one or more nanosheets; and
    (c) a -silyl-$C_{2-4}$alkylene-$NH_2$ group bonded to the zeolite substrate.

* * * * *